(12) United States Patent
    Spink et al.

(10) Patent No.: US 10,357,829 B2
(45) Date of Patent: Jul. 23, 2019

(54) THREE-DIMENSIONAL PRINTING OF THREE-DIMENSIONAL OBJECTS

(71) Applicant: VELO3D, INC., Campbell, CA (US)

(72) Inventors: Brian Charles Spink, Santa Clara, CA (US); Zachary Ryan Murphree, San Jose, CA (US); Tasso Lappas, Pasadena, CA (US); Kimon Symeonidis, Easton, PA (US); Rueben Joseph Mendelsberg, Santa Clara, CA (US)

(73) Assignee: Velo3D, Inc., Campbell, CA (US)

( * ) Notice: Subject to any disclaimer, the term of this patent is extended or adjusted under 35 U.S.C. 154(b) by 0 days.

(21) Appl. No.: 15/909,809

(22) Filed: Mar. 1, 2018

(65) Prior Publication Data

US 2018/0250775 A1    Sep. 6, 2018

Related U.S. Application Data

(60) Provisional application No. 62/466,280, filed on Mar. 2, 2017, provisional application No. 62/539,990, filed on Aug. 1, 2017.

(51) Int. Cl.
*B33Y 80/00* (2015.01)
*B22F 3/105* (2006.01)
(Continued)

(52) U.S. Cl.
CPC .............. *B22F 3/1055* (2013.01); *B22F 3/11* (2013.01); *B23K 15/0013* (2013.01);
(Continued)

(58) Field of Classification Search
None
See application file for complete search history.

(56) References Cited

U.S. PATENT DOCUMENTS 3,864,809 A    2/1975  Donachie
4,177,087 A   12/1979  Hills et al.
(Continued)

FOREIGN PATENT DOCUMENTS

CN    101835554 A    9/2010
CN    102076456 A    5/2011
(Continued)

OTHER PUBLICATIONS

Adam, et al. Design for additive manufacturing—element transitions and aggregated structures. CIRP Journal of Manufacturing Science and Technology. Nov. 2014; 7:20-28.
(Continued)

*Primary Examiner* — Adam Krupicka
(74) *Attorney, Agent, or Firm* — Ronit Buller; Wilson Sonsini Goodrich and Rosati

(57) ABSTRACT

The present disclosure provides three-dimensional (3D) printing methods, apparatuses, systems and/or software to form one or more three-dimensional objects, some of which may be complex. The three-dimensional objects may be formed by three-dimensional printing using one or more methodologies. In some embodiments, the three-dimensional object may comprise an overhang portion, such as a cavity ceiling, with diminished deformation and/or auxiliary support structures.

31 Claims, 47 Drawing Sheets

(51) Int. Cl.
| | |
|---|---|
| *B23K 15/00* | (2006.01) |
| *B23K 15/02* | (2006.01) |
| *B23K 26/03* | (2006.01) |
| *B23K 26/04* | (2014.01) |
| *B23K 26/06* | (2014.01) |
| *B23K 26/342* | (2014.01) |
| *G05B 19/4099* | (2006.01) |
| *B23K 37/06* | (2006.01) |
| *B23K 26/70* | (2014.01) |
| *B23K 26/354* | (2014.01) |
| *B23K 26/352* | (2014.01) |
| *B23K 26/34* | (2014.01) |
| *B23K 26/08* | (2014.01) |
| *B23K 26/12* | (2014.01) |
| *B23K 26/082* | (2014.01) |
| *B23K 26/10* | (2006.01) |
| *B23K 15/06* | (2006.01) |
| *B23K 15/10* | (2006.01) |
| *B23K 26/00* | (2014.01) |
| *B22F 3/11* | (2006.01) |
| *B33Y 40/00* | (2015.01) |
| *B33Y 10/00* | (2015.01) |
| *B33Y 30/00* | (2015.01) |
| *B33Y 50/02* | (2015.01) |
| *B23K 103/00* | (2006.01) |
| *B22F 7/00* | (2006.01) |
| *C22C 1/04* | (2006.01) |

(52) U.S. Cl.
CPC ...... *B23K 15/0086* (2013.01); *B23K 15/0093* (2013.01); *B23K 15/02* (2013.01); *B23K 15/06* (2013.01); *B23K 15/10* (2013.01); *B23K 26/0006* (2013.01); *B23K 26/032* (2013.01); *B23K 26/034* (2013.01); *B23K 26/04* (2013.01); *B23K 26/0608* (2013.01); *B23K 26/0626* (2013.01); *B23K 26/0643* (2013.01); *B23K 26/082* (2015.10); *B23K 26/0876* (2013.01); *B23K 26/10* (2013.01); *B23K 26/123* (2013.01); *B23K 26/127* (2013.01); *B23K 26/1224* (2015.10); *B23K 26/34* (2013.01); *B23K 26/342* (2015.10); *B23K 26/354* (2015.10); *B23K 26/355* (2018.08); *B23K 26/703* (2015.10); *B23K 26/704* (2015.10); *B23K 37/06* (2013.01); *G05B 19/4099* (2013.01); *B22F 7/002* (2013.01); *B22F 2003/1056* (2013.01); *B22F 2003/1057* (2013.01); *B22F 2003/1058* (2013.01); *B22F 2203/00* (2013.01); *B22F 2203/11* (2013.01); *B22F 2999/00* (2013.01); *B23K 2103/00* (2018.08); *B33Y 10/00* (2014.12); *B33Y 30/00* (2014.12); *B33Y 40/00* (2014.12); *B33Y 50/02* (2014.12); *B33Y 80/00* (2014.12); *C22C 1/0458* (2013.01); *G05B 2219/35134* (2013.01); *G05B 2219/49007* (2013.01)

(56) References Cited

U.S. PATENT DOCUMENTS

| | | |
|---|---|---|
| 4,323,756 A | 4/1982 | Brown et al. |
| 4,359,622 A | 11/1982 | Dostoomian et al. |
| 4,823,158 A | 4/1989 | Casey et al. |
| 4,863,538 A | 9/1989 | Deckard |
| 4,927,582 A | 5/1990 | Bryson |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,396,333 A | 3/1995 | Aleshin et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,530,221 A | 6/1996 | Benda et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,859,786 A | 1/1999 | Klein |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 5,951,864 A | 9/1999 | Hazrati et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,376,148 B1 | 4/2002 | Liu et al. |
| 6,391,251 B1 | 5/2002 | Keicher et al. |
| 6,401,001 B1 | 6/2002 | Jang et al. |
| 6,483,596 B1 | 11/2002 | Philippi et al. |
| 6,492,651 B2 | 12/2002 | Kerekes |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |

(56) References Cited

U.S. PATENT DOCUMENTS

| | | |
|---|---|---|
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |
| 6,688,886 B2 | 2/2004 | Hughes et al. |
| 6,722,872 B1 | 4/2004 | Swanson et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,861,613 B1 | 3/2005 | Meiners et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,949,216 B2 | 9/2005 | Brice et al. |
| 6,955,023 B2 | 10/2005 | Rotheroe |
| 6,963,338 B1 | 11/2005 | Bachelder et al. |
| 6,986,654 B2 | 1/2006 | Imiolek et al. |
| 6,989,115 B2 | 1/2006 | Russell et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |
| 7,296,599 B2 | 11/2007 | Cox et al. |
| 7,326,377 B2 | 2/2008 | Adams |
| 7,419,632 B2 | 9/2008 | Keller |
| 7,435,368 B2 | 10/2008 | Davidson et al. |
| 7,452,500 B2 | 11/2008 | Uckelmann |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,799,253 B2 | 9/2010 | Hochsmann et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 7,991,465 B2 | 8/2011 | Bartic et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,556,981 B2 | 10/2013 | Jones et al. |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 * | 12/2014 | Detor .................... C25D 3/56 205/103 |
| 8,915,620 B2 | 12/2014 | Vaes et al. |
| 8,945,456 B2 | 2/2015 | Zenere et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,037,068 B2 | 5/2015 | Kojima |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |

(56) References Cited

U.S. PATENT DOCUMENTS

| | | |
|---|---|---|
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,272,369 B2 | 3/2016 | Bruck et al. |
| 9,308,583 B2 | 4/2016 | El-Dasher et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,366,422 B2 | 6/2016 | McClure et al. |
| 9,380,304 B1 | 6/2016 | Chang et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,662,840 B1 | 5/2017 | Buller et al. |
| 9,676,145 B2 | 6/2017 | Buller et al. |
| 9,700,908 B2 | 7/2017 | Baker et al. |
| 9,757,760 B2 | 9/2017 | Halder et al. |
| 9,827,717 B2 | 11/2017 | Huang et al. |
| 9,835,568 B2 | 12/2017 | Woods et al. |
| 9,886,526 B2 | 2/2018 | Huang et al. |
| 9,919,360 B2 | 3/2018 | Buller et al. |
| 9,919,476 B2 | 3/2018 | Paternoster et al. |
| 1,003,518 A1 | 7/2018 | Weilhammer et al. |
| 1,003,530 A1 | 7/2018 | Reinarz et al. |
| 1,011,223 A1 | 10/2018 | Schlick et al. |
| 1,020,745 A1 | 2/2019 | Buller et al. |
| 1,027,252 A1 | 4/2019 | Buller et al. |
| 2002/0017509 A1 | 2/2002 | Ishide et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0090410 A1 | 7/2002 | Tochimoto et al. |
| 2002/0104973 A1 | 8/2002 | Kerekes |
| 2002/0145213 A1 | 10/2002 | Liu et al. |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0201255 A1 | 10/2003 | Manetsberger et al. |
| 2003/0222066 A1 | 12/2003 | Low et al. |
| 2003/0232512 A1 | 12/2003 | Dickinson et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0200816 A1 | 10/2004 | Chung et al. |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar et al. |
| 2005/0258570 A1 | 11/2005 | Kong et al. |
| 2005/0278933 A1 | 12/2005 | Macke et al. |
| 2005/0287031 A1 | 12/2005 | Macke et al. |
| 2006/0003095 A1 | 1/2006 | Bullen et al. |
| 2006/0054079 A1 | 3/2006 | Withey et al. |
| 2006/0111807 A1 | 5/2006 | Gothait et al. |
| 2006/0118532 A1 | 6/2006 | Chung et al. |
| 2006/0156978 A1 | 7/2006 | Lipson et al. |
| 2006/0181700 A1 | 8/2006 | Andrews et al. |
| 2006/0187326 A1 | 8/2006 | Spencer et al. |
| 2006/0192322 A1 | 8/2006 | Abe et al. |
| 2006/0208396 A1 | 9/2006 | Abe et al. |
| 2006/0214335 A1 | 9/2006 | Cox et al. |
| 2006/0228248 A1 | 10/2006 | Larsson |
| 2006/0228897 A1 | 10/2006 | Timans et al. |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0052836 A1 | 3/2007 | Yamada et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0257672 A1 | 10/2009 | Sullender et al. |
| 2009/0314391 A1 | 12/2009 | Crump et al. |
| 2010/0006228 A1 | 1/2010 | Abe et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0174392 A1 | 7/2010 | Fink et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |

(56) References Cited

U.S. PATENT DOCUMENTS

| | | |
|---|---|---|
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0187713 A1 | 8/2011 | Pershing et al. |
| 2011/0190904 A1 | 8/2011 | Lechmann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0013710 A1 | 1/2012 | Ehrlich et al. |
| 2012/0052145 A1 | 3/2012 | Chen et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0133928 A1 | 5/2012 | Urano et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0213615 A1 | 8/2012 | Sakaue |
| 2012/0223059 A1 | 9/2012 | Ackelid |
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0235548 A1 | 9/2012 | Cordes et al. |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0089642 A1 | 4/2013 | Lipson et al. |
| 2013/0093866 A1 | 4/2013 | Ohlhues et al. |
| 2013/0101746 A1 | 4/2013 | Keremes et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0186558 A1 | 7/2013 | Comb et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0329098 A1 | 12/2013 | Lim et al. |
| 2013/0330470 A1 | 12/2013 | Gersch et al. |
| 2014/0034626 A1 | 2/2014 | Illston |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1 | 11/2014 | Fockele et al. |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0084240 A1 | 3/2015 | Shuck et al. |
| 2015/0088295 A1 | 3/2015 | Hellestam et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0178286 A1 | 6/2015 | Dhollander et al. |
| 2015/0185454 A1 | 7/2015 | Kalkbrenner et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0298211 A1 | 10/2015 | Abe et al. |
| 2015/0298397 A1 | 10/2015 | Chen et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367418 A1 | 12/2015 | Buller et al. |

(56) References Cited

U.S. PATENT DOCUMENTS

| | | |
|---|---|---|
| 2015/0367419 A1 | 12/2015 | Buller et al. |
| 2015/0367447 A1 | 12/2015 | Buller et al. |
| 2015/0367453 A1 | 12/2015 | Herzog |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0026337 A1 | 1/2016 | Wassvik et al. |
| 2016/0026889 A1 | 1/2016 | Parkhomenko et al. |
| 2016/0059310 A1 | 3/2016 | Junker et al. |
| 2016/0059352 A1 | 3/2016 | Sparks et al. |
| 2016/0067740 A1 | 3/2016 | Voris et al. |
| 2016/0067779 A1 | 3/2016 | Dautova et al. |
| 2016/0082666 A1 | 3/2016 | De et al. |
| 2016/0082668 A1 | 3/2016 | Perret et al. |
| 2016/0107263 A1 | 4/2016 | Koerber |
| 2016/0114431 A1 | 4/2016 | Cheverton et al. |
| 2016/0114432 A1 | 4/2016 | Ferrar et al. |
| 2016/0114531 A1 | 4/2016 | Chuang et al. |
| 2016/0114535 A1 | 4/2016 | Kritchman et al. |
| 2016/0121399 A1 | 5/2016 | Buller et al. |
| 2016/0121548 A1 | 5/2016 | Nauka et al. |
| 2016/0129502 A1 | 5/2016 | Varetti |
| 2016/0129631 A1 | 5/2016 | Chen et al. |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151833 A1 | 6/2016 | Tsao |
| 2016/0151860 A1 | 6/2016 | Engeli et al. |
| 2016/0154906 A1 | 6/2016 | Schmidt et al. |
| 2016/0159010 A1 | 6/2016 | Perez et al. |
| 2016/0179064 A1 | 6/2016 | Arthur et al. |
| 2016/0185048 A1 | 6/2016 | Dave et al. |
| 2016/0193696 A1 | 7/2016 | McFarland et al. |
| 2016/0193785 A1 | 7/2016 | Bell et al. |
| 2016/0193790 A1 | 7/2016 | Shuck et al. |
| 2016/0214175 A1 | 7/2016 | Nordstrom |
| 2016/0228987 A1 | 8/2016 | Baudimont et al. |
| 2016/0236279 A1 | 8/2016 | Ashton et al. |
| 2016/0236419 A1 | 8/2016 | Griffin et al. |
| 2016/0241885 A1 | 8/2016 | Ström et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0284123 A1 | 9/2016 | Hare et al. |
| 2016/0288254 A1 | 10/2016 | Pettit et al. |
| 2016/0297006 A1 | 10/2016 | Buller et al. |
| 2016/0299996 A1 | 10/2016 | Huang |
| 2016/0300356 A1 | 10/2016 | Kitamura et al. |
| 2016/0303687 A1 | 10/2016 | Ljungblad |
| 2016/0311025 A1 | 10/2016 | Kaneko |
| 2016/0318129 A1 | 11/2016 | Hu et al. |
| 2016/0320236 A1 | 11/2016 | Fortin et al. |
| 2016/0320771 A1 | 11/2016 | Huang |
| 2016/0321384 A1 | 11/2016 | Pal et al. |
| 2016/0326880 A1 | 11/2016 | Slavens et al. |
| 2016/0332384 A1 | 11/2016 | De Pena et al. |
| 2016/0339639 A1 | 11/2016 | Chivel |
| 2016/0361874 A1 | 12/2016 | Park et al. |
| 2017/0001371 A1 | 1/2017 | Sobue et al. |
| 2017/0001379 A1 | 1/2017 | Long |
| 2017/0014902 A1 | 1/2017 | Tanaka et al. |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0087769 A1 | 3/2017 | Lancaster-Larocque et al. |
| 2017/0090461 A1 | 3/2017 | Chong et al. |
| 2017/0102689 A1 | 4/2017 | Khajepour et al. |
| 2017/0106603 A1 | 4/2017 | Pobihun |
| 2017/0123222 A1 | 5/2017 | Demuth et al. |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144254 A1 | 5/2017 | Buller et al. |
| 2017/0144374 A1 | 5/2017 | Ono et al. |
| 2017/0145586 A1 | 5/2017 | Xiao |
| 2017/0157845 A1 | 6/2017 | Bihari et al. |
| 2017/0165751 A1 | 6/2017 | Buller et al. |
| 2017/0165752 A1 | 6/2017 | Buller et al. |
| 2017/0165753 A1 | 6/2017 | Buller et al. |
| 2017/0165754 A1 | 6/2017 | Buller et al. |
| 2017/0165792 A1 | 6/2017 | Buller et al. |
| 2017/0189963 A1 | 7/2017 | Buller et al. |
| 2017/0216917 A1 | 8/2017 | Zhang et al. |
| 2017/0217095 A1 | 8/2017 | Buller et al. |
| 2017/0225198 A1 | 8/2017 | Nevarez et al. |
| 2017/0232515 A1 | 8/2017 | Demuth et al. |
| 2017/0239719 A1 | 8/2017 | Buller et al. |
| 2017/0239720 A1 | 8/2017 | Levin et al. |
| 2017/0239752 A1 | 8/2017 | Buller et al. |
| 2017/0239891 A1 | 8/2017 | Buller et al. |
| 2017/0239892 A1 | 8/2017 | Buller et al. |
| 2017/0252975 A1 | 9/2017 | Park et al. |
| 2017/0259337 A1 | 9/2017 | Furukawa |
| 2017/0259502 A1 | 9/2017 | Chapiro et al. |
| 2017/0259504 A1 | 9/2017 | Lin et al. |
| 2017/0266878 A1 | 9/2017 | Furukawa |
| 2017/0266887 A1 | 9/2017 | Roviaro et al. |
| 2017/0274589 A1 | 9/2017 | Wu et al. |
| 2017/0282245 A1 | 10/2017 | Yasuda et al. |
| 2017/0282294 A1 | 10/2017 | Uchida |
| 2017/0291372 A1 | 10/2017 | Milshtein et al. |
| 2017/0297110 A1 | 10/2017 | Echigo et al. |
| 2017/0304894 A1 | 10/2017 | Buller |
| 2017/0304944 A1 | 10/2017 | Symeonidis et al. |
| 2017/0305140 A1 | 10/2017 | Wüst |
| 2017/0320265 A1 | 11/2017 | Baumann et al. |
| 2017/0333994 A1 | 11/2017 | Schmitt et al. |
| 2017/0334024 A1 | 11/2017 | Buller et al. |
| 2017/0341143 A1 | 11/2017 | Abe et al. |
| 2017/0341183 A1 | 11/2017 | Buller et al. |
| 2017/0341299 A1 | 11/2017 | Kniola et al. |
| 2017/0341307 A1 | 11/2017 | Vilajosana et al. |
| 2017/0348771 A1 | 12/2017 | Kawada et al. |
| 2017/0355146 A1 | 12/2017 | Buller et al. |
| 2017/0355147 A1 | 12/2017 | Buller et al. |
| 2018/0001553 A1 | 1/2018 | Buller et al. |
| 2018/0001556 A1 | 1/2018 | Buller et al. |
| 2018/0001557 A1 | 1/2018 | Buller et al. |
| 2018/0015670 A1 | 1/2018 | Gu et al. |
| 2018/0021855 A1 | 1/2018 | De et al. |
| 2018/0056391 A1 | 3/2018 | Buller et al. |
| 2018/0071986 A1 | 3/2018 | Buller et al. |
| 2018/0093416 A1 | 4/2018 | Prexler et al. |
| 2018/0093418 A1 | 4/2018 | Lappas et al. |
| 2018/0093419 A1 | 4/2018 | Lappas et al. |
| 2018/0095450 A1 | 4/2018 | Lappas et al. |
| 2018/0099454 A1 | 4/2018 | Hümmeler et al. |
| 2018/0104892 A1 | 4/2018 | Herzog et al. |
| 2018/0111193 A1 | 4/2018 | Romano et al. |
| 2018/0111194 A1 | 4/2018 | Buller et al. |
| 2018/0111195 A1 | 4/2018 | Romano et al. |
| 2018/0111196 A1 | 4/2018 | Brezoczky et al. |
| 2018/0111197 A1 | 4/2018 | Romano et al. |
| 2018/0111198 A1 | 4/2018 | Vitanov et al. |
| 2018/0111319 A1 | 4/2018 | Brezoczky et al. |
| 2018/0111320 A1 | 4/2018 | Zhao et al. |
| 2018/0117845 A1 | 5/2018 | Buller et al. |
| 2018/0126460 A1 | 5/2018 | Murphree et al. |
| 2018/0126461 A1 | 5/2018 | Buller et al. |
| 2018/0126462 A1 | 5/2018 | Murphree et al. |
| 2018/0126629 A1 | 5/2018 | Staal et al. |
| 2018/0126649 A1 | 5/2018 | Romano et al. |
| 2018/0126650 A1 | 5/2018 | Murphree et al. |
| 2018/0133635 A1 | 5/2018 | Hofmann et al. |
| 2018/0133801 A1 | 5/2018 | Buller et al. |
| 2018/0133956 A1 | 5/2018 | Buller et al. |
| 2018/0141126 A1 | 5/2018 | Buller et al. |
| 2018/0178286 A1 | 6/2018 | Martin et al. |
| 2018/0185915 A1 | 7/2018 | Beauchamp |

(56) References Cited

U.S. PATENT DOCUMENTS

| | | |
|---|---|---|
| 2018/0185961 A1 | 7/2018 | Meidani et al. |
| 2018/0186079 A1 | 7/2018 | Vilajosana et al. |
| 2018/0207721 A1 | 7/2018 | Schlick et al. |
| 2018/0236550 A1 | 8/2018 | Herzog et al. |
| 2018/0244034 A1 | 8/2018 | Sutcliffe et al. |
| 2018/0281067 A1 | 10/2018 | Small et al. |
| 2018/0281236 A1 | 10/2018 | Elgar et al. |
| 2018/0281237 A1 | 10/2018 | Frechman et al. |
| 2018/0281282 A1 | 10/2018 | Elgar et al. |
| 2018/0281283 A1 | 10/2018 | Frechman et al. |
| 2018/0281284 A1 | 10/2018 | Elgar et al. |
| 2018/0319150 A1 | 11/2018 | Buller et al. |
| 2019/0022944 A1 | 1/2019 | Döhler et al. |
| 2019/0118263 A1 | 4/2019 | Buller et al. |

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 105904729 A | 8/2016 |
| CN | 105921747 A | 9/2016 |
| DE | 19939616 A1 | 3/2001 |
| DE | 102004061836 A1 | 7/2006 |
| DE | 102007029142 A1 | 1/2009 |
| DE | 102010048335 A1 | 4/2012 |
| DE | 102013208651 A1 | 11/2014 |
| DE | 102014000022 A1 | 7/2015 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |
| EP | 2522446 A1 | 11/2012 |
| EP | 2583773 A2 | 4/2013 |
| EP | 2620241 A1 | 7/2013 |
| EP | 2789413 A1 | 10/2014 |
| EP | 2832473 A1 | 2/2015 |
| EP | 2832474 A1 | 2/2015 |
| EP | 2873751 A1 | 5/2015 |
| EP | 2992942 A1 | 3/2016 |
| EP | 3127635 A1 | 2/2017 |
| EP | 3208077 A1 | 8/2017 |
| EP | 3263316 A1 | 1/2018 |
| JP | 2001009921 A | 1/2001 |
| JP | 2003502184 A | 1/2003 |
| JP | 2003245981 A | 9/2003 |
| JP | 2004143581 A | 5/2004 |
| JP | 2006150977 A | 6/2006 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| KR | 20160059726 A | 5/2016 |
| KR | 20160076708 A | 7/2016 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9828124 A2 | 7/1998 |
| WO | WO-9933641 A1 | 7/1999 |
| WO | WO-0102160 A1 | 1/2001 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A2 | 8/2009 |
| WO | WO-2010026396 A2 | 3/2010 |
| WO | WO-2013092997 A1 | 6/2013 |
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015025171 A2 | 2/2015 |
| WO | WO-2015034362 A1 | 3/2015 |
| WO | WO-2015040433 A2 | 3/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017054842 A1 | 4/2017 |
| WO | WO-2017079091 A1 | 5/2017 |
| WO | WO-2017100695 A1 | 6/2017 |
| WO | WO-2017143077 A1 | 8/2017 |
| WO | WO-2017179001 A1 | 10/2017 |
| WO | WO-2018005439 | 1/2018 |
| WO | WO-2018064349 A1 | 4/2018 |
| WO | WO-2018075741 A1 | 4/2018 |
| WO | WO-2018128695 A2 | 7/2018 |
| WO | WO-2018129089 A1 | 7/2018 |
| WO | WO-2018160807 A1 | 9/2018 |
| WO | WO-2018183396 A1 | 10/2018 |

OTHER PUBLICATIONS

Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.

Anusci, Victor. Aerosint Is Developing the First Commercial Multi-powder SLS 3D Printer. 3D Printing Media Network. Web. Published Jan. 28, 2018. 4 pages. URL:< https://www.3dprintingmedia.network/aerosint-multi-powder-sls-3d-printer/>.

Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.

Arcam EBM at Sirris Belgium. Uploaded Jun. 17, 2010. 2 pages. https://www.youtube.com/watch?v=nR7EtduqVYw&list=PLD7ckJoR_kR6ua0GOMlyJ1mpCKh342iLl.

(56) References Cited

OTHER PUBLICATIONS

Arnet, et al. Extending Laser Bending for the Generation of Convex Shapes. Proc. Instn. Mech. Engrs., vol. 209, pp. 433-442.
Ashby, Mike. Teach Yourself: Phase Diagrams and Phase Transformations. 5th Edition, Mar. 2009, Cambridge. 55 pages.
Cheng, et al. Thermal Stresses Associated with Part Overhang Geometry in Electron Beam Additive Manufacturing: Process Parameter Effects. 25th Annual International Solid Freeform Fabrication Symposium-An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.
Cloots, et al. Assessing new support minimizing strategies for the additive manufacturing technology SLM. Aug. 16, 2013. sffsymposium. engr.utexas.edu/Manuscripts/2013/2013-50-Cloots.pdf. 13 pages.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/855,744, filed Dec. 27, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/871,763, filed Jan. 15, 2018.
Co-pending U.S. Appl. No. 15/886,544, filed Feb. 1, 2018.
Co-pending U.S. Appl. No. 15/893,523, filed Feb. 9, 2018.
Co-pending U.S. Appl. No. 15/909,388, filed Mar. 1, 2018.
Co-pending U.S. Appl. No. 15/909,396, filed Mar. 1, 2018.
Co-pending U.S. Appl. No. 15/909,406, filed Mar. 1, 2018.
Co-pending U.S. Appl. No. 15/909,783, filed Mar. 1, 2018.
Co-pending U.S. Appl. No. 15/909,784, filed Mar. 1, 2018.
Co-pending U.S. Appl. No. 15/909,806, filed Mar. 1, 2018.
Co-pending U.S. Appl. No. 15/909,826, filed Mar. 1, 2018.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer; 2008 edition (Nov. 26, 2007).561 pages. DOI: 10.1007/978-0-387-72344-0.
David et al. Welding: Solidification and microstructure. The Journal of The Minerals, Metals & Materials Society (TMS). Jun. 2003, vol. 55, Issue 6, pp. 14-20.
Direct Manufacturing: ARCAM. Uploaded on Jun. 6, 2011. 2 pages. https://www.youtube.com/watch?v=M_qSnjKN7f8.
Doxygen. CGAL 4.11.1—Kinetic Data Structures. User Manual. Web. Published Apr. 8, 2006. 4 pages. URL:< https://doc.cgal.org/latest/Manual/how_to_cite_cgal.html>.
EOS. Direct Metal Laser Sintering Published Aug. 22, 2012. https://www.youtube.com/watch?v=cRE-Pzl6uZA.
European Search Report and Search Opinion dated Nov. 30, 2017 for European Patent Application No. EP17178143.8.
Ex Parte Quayle Action dated Apr. 19, 2017 for U.S. Appl. No. 15/374,821.
Extended European Search Report dated Jul. 7, 2017 for European Patent Application No. EP17156707.6.
Gaudin, Sharon. Researcher works to make 3D-printed metals stronger, customizable. Oct. 2014. Accessed online on Mar. 22, 2018. 4 pages. URL:< https://www.computerworld.com/article/2838780/researcher-works-to-make-3d-printed-materials-stronger-customizable.html>.
Geiger, et al. The Mechanisms of Laser Forming. Annals of the CIRP, vol. 42, Jan. 1993, pp. 301-304.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson, et al. Additive Manufacturing Technologies. Springer 2010. 472 pages.
Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Hauser, et al. Further Developments in Process Mapping and modelling in direct metal selective laser melting. Aug. 2004, 15th solid Free Form Fabrication Proceedings. Austin, Texas, pp. 448-459.
Hu, et al. Computer simulation and experimental investigation of sheet metal bending using laser beam scanning. International Journal of Machine Tools and Manufacture, 41, Mar. 2001, pp. 589-607.
Hu, et al. Experimental and numerical modeling of buckling instability of laser sheet forming. International Journal of Machine Tools & Manufacture, 42 (2002) pp. 1427-1439.
Hussein. The development of Lightweight Cellular Structures for Metal Additive Manufacturing. Nov. 2013, thesis of University of Exeter, pp. 1-228.
integrativemodeling.org. IMP, the Integrative Modeling Platform. Web. Published Jul. 26, 2013.1 page. URL:< https://integrativemodeling.org/>.
International Search Report and Written Opinion dated Jan. 9, 2018 for International PCT Patent Application No. PCT/2017/054043.
International Search Report and Written Opinion dated Jan. 16, 2017 for International PCT Patent Application No. PCT/US2016/059781.
International Search Report and Written Opinion dated Feb. 12, 2018 for International PCT Patent Application No. PCT/US2017/057340.
International Search Report and Written Opinion dated Feb. 14, 2017 for International PCT Patent Application No. PCT/US2016/042818.
International Search Report and Written Opinion dated Feb. 19, 2016 for International PCT Patent Application No. PCT/US2015/059790.
International Search Report and Written Opinion dated Apr. 5, 2017 for International PCT Patent Application No. PCT/US2016/066000.
International search report and written opinion dated Apr. 11, 2016 for PCT/US2015/065297.
International Search Report and Written Opinion dated May 18, 2017 for International PCT Patent Application No. PCT/US2017/018191.
International Search Report and Written Opinion dated Aug. 30, 2017 for International PCT Patent Application No. PCT/US2017/039422.
International Search Report and Written Opinion dated Sep. 20, 2016 for International PCT Patent Application No. PCT/US2016/034454.
International search report and written opinion dated Sep. 20, 2016 for PCT/US2016/034454.
International Search Report and Written Opinion dated Oct. 18, 2016 for International PCT Patent Application No. PCT/US2016/041895.
International search report and written opinion dated Oct. 30, 2015 for PCT Application No. US2015/036802.
International search report and written opinion dated Sep. 13, 2016 for PCT Application No. US-2016034857.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.

(56) References Cited

OTHER PUBLICATIONS

Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1):7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Kumar. Powder deposition and sintering for a two-powder approach to solid freeform fabrication. Department of Mechanical Engineering, University of Florida. Aug. 1998; 169-173.
Laser Engineered Net Shaping (LENS) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Maji, et al. Finite Element Analysis and Experimental Investigations on Laser Bending of AlSl304 Stainless Steel Sheet. Procedia Engineering 64 (2013) pp. 528-535.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Merriam-Webster. Definition of "reservoir". Retrieved Dec. 21, 2017. 13 pages. URL:< https://merriam-webster.com/dictionary/reservoir>.
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re- melted pre- placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):36*-395.
Mumatz, et al. A Method to Eliminate Anchors/Supports from Directly Laser Melted Metal Powder Bed Processes. Aug. 2011, Additive Manufacturing Research Group, Wolfson School of Mechanical Engineering, Loughborough University, pp. 55-64.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
Netfabb-Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of Allowability dated Oct. 17, 2017 for U.S. Appl. No. 14/744,910.
Notice of allowance dated Jan. 5, 2017 for U.S. Appl. No. 15/085,884.
Notice of Allowance dated Jan. 12, 2018 for U.S. Appl. No. 15/435,120.
Notice of Allowance dated Jan. 12, 2018 for U.S. Appl. No. 15/435,128.
Notice of Allowance dated Feb. 6, 2018 for U.S. Appl. No. 15/374,821.
Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of Allowance dated Aug. 7, 2017 for U.S. Appl. No. 14/744,910.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 8, 2017 for U.S. Appl. No. 15/435,128.
Notice of Allowance dated Dec. 9, 2016 for U.S. Appl. No. 15/188,939.
Notice of Allowance dated Dec. 11, 2017 for U.S. Appl. No. 15/435,120.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office Action dated Jan. 2, 2018 for U.S. Appl. No. 15/288,251.
Office action dated Jan. 7, 2016 for U.S. Appl. No. 14/744,859.
Office action dated Jan. 11, 2016 for U.S. Appl. No. 14/745,032.
Office Action dated Jan. 24, 2018 for U.S. Appl. No. 15/615,004.
Office Action dated Jan. 25, 2018 for U.S. Appl. No. 15/634,727.
Office Action dated Feb. 7, 2017 for U.S. Appl. No. 14/744,988.
Office Action dated Feb. 7, 2018 for U.S. Appl. No. 15/614,979.
Office Action dated Feb. 7, 2018 for U.S. Appl. No. 15/719,229.
Office Action dated Feb. 8, 2017 for U.S. Appl. No. 14/744,859.
Office action dated Feb. 10, 2016 for U.S. Appl. No. 14/744,910.
Office Action dated Feb. 14, 2018 for U.S. Appl. No. 15/634,228.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office Action dated Mar. 7, 2017 for U.S. Appl. No. 15/399,712.
Office Action dated Mar. 7, 2018 for U.S. Appl. No. 15/399,186.
Office action dated Mar. 10, 2016 for U.S. Appl. No. 14/744,675.
Office Action dated Mar. 23, 2017 for U.S. Appl. No. 15/399,186.

(56) References Cited

OTHER PUBLICATIONS

Office Action dated Apr. 28, 2017 for U.S. Appl. No. 15/374,616.
Office Action dated Jun. 15, 2017 for U.S. Appl. No. 15/288,251.
Office action dated Jun. 29, 2016 for U.S. Appl. No. 14/744,859.
Office Action dated Jun. 29, 2017 for U.S. Appl. No. 15/435,128.
Office action dated Jul. 1, 2016 for U.S. Appl. No. 14/745,032.
Office Action dated Jul. 3, 2017 for U.S. Appl. No. 15/435,120.
Office action dated Jul. 19, 2016 for U.S. Appl. No. 15/085,884.
Office action dated Jul. 21, 2016 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office action dated Aug. 25, 2016 for U.S. Appl. No. 14/744,988.
Office Action dated Aug. 25, 2017 for U.S. Appl. No. 15/339,712.
Office action dated Sep. 10, 2015 for U.S. Appl. No. 14/744,675.
Office action dated Sep. 11, 2017 for U.S. Appl. No. 15/374,821.
Office action dated Sep. 13, 2016 for U.S. Appl. No. 15/188,939.
Office action dated Sep. 15, 2017 for U.S. Appl. No. 15/374,616.
Office Action dated Sep. 18, 2017 for U.S. Appl. No. 15/634,228.
Office action dated Oct. 2, 2015 for U.S. Appl. No. 14/744,955.
Office Action dated Oct. 19, 2017 for U.S. Appl. No. 15/399,186.
Office action dated Nov. 1, 2016 for U.S. Appl. No. 15/085,884.
Office action dated Nov. 12, 2015 for U.S. Appl. No. 14/745,108.
Office Action dated Nov. 16, 2017 for U.S. Appl. No. 15/634,267.
Office action dated Nov. 18, 2016 for U.S. Appl. No. 15/188,939.
Office Action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. Lens 850R 3D Printer for Structual Metals. Optomec. YouTube—Web. Published on Jun 3, 2012. 3 pages. URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
PCT/US2017/064474 International Search Report and Written Opinion dated Apr. 30, 2018.
PCT/US2018/012250 International Search Report and Written Opinion dated Apr. 30, 2018.
Proto Labs. Direct Metal Laser Sintering (DMLS). Published Sep. 10, 2014. https://www.protolabs.com/additive-manufacturing/direct-metal-laser-sintering 2 pages.
Rhinehart, R.R. §2.13 Control Theory: Mode-Based Control, in Bela G. Liptak, Instrument Engineers' Handbook, vol. 2: Process Control and Optimization, 209-213. CRC Press; 4 edition (Sep. 29, 2005),ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
Sandvik Materials Technology website. Accessed Nov. 14, 2014. http://www.smt.sandvik.com/en/products/metal-powder/additive-manufacturing/.
Saunders, Marc. Real-time AM monitoring opens up new process control opportunities. Web: LinkedIn. Published on Jan. 3, 2018. 12 pages. URL:< https://www.linkedin.com/pulse/real-time-am-monitoring-opens-new-process-control-marc-saunders/>.
Schott. Tie-19: Temperature Coefficient of the Refractive Index. Technical Information: Advanced Optics. Schott AG. Jul. 2016. 10 pages.
Schott. Tie-19: Temperature Coefficient of the Refractive Index. Technical Information: Advanced Optics. Schott North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Shen, et al. An analytical model for estimating deformation in laser forming. Computational Materials Science, 37 (2006) pp. 593-598.
Shen, et al. Modelling of laser forming—An review. Computational Materials Science 46 (2009) pp. 834-840.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Symeonidis, Kimon. The Controlled Diffusion Solidification Process: Fundamentals and Principles. Ph.D. Thesis. Worcester Polytechnic Institute. Apr. 2009. 137 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/339,712 Notice of Allowance dated May 23, 2018.
U.S. Appl. No. 15/374,318 Notice of Allowance dated Apr. 20, 2018.
U.S. Appl. No. 15/374,442 Office Action dated May 21, 2018.
U.S. Appl. No. 15/374,535 Office Action dated Apr. 20, 2018.
U.S. Appl. No. 15/374,616 Office Action dated Mar. 26, 2018.
U.S. Appl. No. 15/374,821 Notice of Allowance dated Apr. 4, 2018.
U.S. Appl. No. 15/435,090 Office Action dated May 18, 2018.
U.S. Appl. No. 15/435,110 Office Action dated Apr. 19, 2018.
U.S. Appl. No. 15/634,267 Office Action dated Apr. 3, 2018.
U.S. Appl. No. 15/719,133 Office Action dated Mar. 28, 2018.
U.S. Appl. No. 15/853,700 Office Action dated Apr. 6, 2018.
U.S. Appl. No. 15/855,744 Office Action dated Apr. 27, 2018.
U.S. Appl. No. 15/871,763 Office Action dated Apr. 19, 2018.
U.S. Appl. No. 15/893,523 Notice of Allowance dated May 7, 2018.
U.S. Appl. No. 15/909,826 Office Action dated May 2, 2018.
Van Der Eijk, et al. Metal printing process: development of a new rapid manufacturing process for metal parts. Proceedings of the World PM 2004 conference held in Vienna. Oct. 17-21, 2004. 5 pages.
Wang et al. Effects of thermal cycles on the microstructure evolution of Inconel 718 during selective laser melting process. Additive Manufacturing. vol. 18, Dec. 2017, pp. 1-14.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 9, 2012.
Wright, Roger. Wire Technology, Process Engineering and Metallurgy, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Yin. Accurately quantifying process-relevant powder properties for AMPM applications. Freeman Technology. May 2014. 39 pages.
Barriobero-Vila et al. Inducing Stable $\alpha + \beta$ Microstructures during Selective Laser Melting of Ti-6Al-4V Using Intensified Intrinsic Heat Treatments. Materials (Basel). Mar. 2017; 10(3): 268.
Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Co-pending U.S. Appl. No. 16/030,795, filed Jul. 9, 2018.
Co-pending U.S. Appl. No. 16/031,896, filed Jul. 10, 2018.
Co-pending U.S. Appl. No. 16/125,644, filed Sep. 7, 2018.

(56) References Cited

OTHER PUBLICATIONS

Co-pending U.S. Appl. No. 16/137,295, filed Sep. 20, 2018.
EP15809160.3 European Search Report dated Aug. 7, 2018.
EP15866668.5 European Search Report dated Aug. 7, 2018.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/339,712 Notice of Allowance dated Jul. 10, 2018.
U.S. Appl. No. 15/374,442 Notice of Allowance dated Oct. 3, 2018.
U.S. Appl. No. 15/374,535 Notice of Allowance dated Sep. 24, 2018.
U.S. Appl. No. 15/374,616 Office Action dated Aug. 15, 2018.
U.S. Appl. No. 15/399,186 Notice of Allowance dated Sep. 17, 2018.
U.S. Appl. No. 15/435,065 Office Action dated Aug. 16, 2018.
U.S. Appl. No. 15/435,078 Office Action dated Aug. 16, 2018.
U.S. Appl. No. 15/435,110 Notice of Allowance dated Sep. 25, 2018.
U.S. Appl. No. 15/634,267 Office Action dated Sep. 6, 2018.
U.S. Appl. No. 15/634,727 Office Action dated Sep. 20, 2018.
U.S. Appl. No. 15/719,084 Office Action dated Jul. 12, 2018.
U.S. Appl. No. 15/719,133 Office Action dated Sep. 24, 2018.
U.S. Appl. No. 15/719,229 Office Action dated Oct. 5, 2018.
U.S. Appl. No. 15/788,495 Office Action dated Oct. 3, 2018.
U.S. Appl. No. 15/803,686 Office Action dated Sep. 19, 2018.
U.S. Appl. No. 15/803,688 Office Action dated Sep. 20, 2018.
U.S. Appl. No. 15/830,421 Office Action dated Jul. 26, 2018.
U.S. Appl. No. 15/830,470 Office Action dated Jul. 5, 2018.
U.S. Appl. No. 15/853,700 Office Action dated Sep. 11, 2018.
U.S. Appl. No. 15/861,548 Office Action dated Sep. 6, 2018.
U.S. Appl. No. 15/861,553 Office Action dated Aug. 7, 2018.
U.S. Appl. No. 15/871,763 Notice of Allowance dated Aug. 15, 2018.
U.S. Appl. No. 15/871,763 Notice of Allowance dated Sep. 17, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,784 Office Action dated Jul. 13, 2018.
U.S. Appl. No. 15/909,806 Office Action dated Aug. 13, 2018.
U.S. Appl. No. 15/909,826 Notice of Allowance dated Aug. 30, 2018.
U.S. Appl. No. 15/937,778 Office Action dated Sep. 21, 2018.
U.S. Appl. No. 15/937,790 Office Action dated Sep. 25, 2018.
U.S. Appl. No. 15/937,812 Office Action dated Sep. 7, 2018.
Xu et al. In situ tailoring microstructure in additively manufactured Ti-6Al-4V for superior mechanical performance. Acta Materialia. vol. 125, Feb. 15, 2017, pp. 390-400.
Bremen et al. Selective Laser Melting. Laser Technik Journal. vol. 9, No. 2, Apr. 2012. 6 pages.
Calvert, Jack G. Glossary of Atmospheric Chemistry Terms (Recommendations 1990). Pure & Appl. Chem., vol. 62, No. 11, Jan. 1, 1990, pp. 2167-2219.
Co-pending U.S. Appl. No. 16/177,090, filed Oct. 31, 2018.
Co-pending U.S. Appl. No. 16/183,557, filed Nov. 7, 2018.
Co-pending U.S. Appl. No. 16/195,810, filed Nov. 19, 2018.
Das et al. Producing metal parts with selective laser sintering/hot isostatic pressing. JOM; Dec. 1998, vol. 50, Issue 12, pp. 17-20.
*Formlabs* v. *DWS*. Civil Action filed on Jun. 29, 2018 in the United States Court for the Eastern District of Virginia. Case No. 1:18-cv-00810-CMH-IDD. 13 pages.
IUPAC. "Inert gas". IUPAC Compendium of Chemical Terminology. Published Feb. 24, 2014.< http://goldbook.iupac.org/html/l/I03027.html.
Ryan et al. Fabrication methods of porous metals for use in orthopaedic applications. Biomaterials. May 2006; vol. 27, Issue 13, pp. 2651-2670.
U.S. Appl. No. 15/399,186 Notice of Allowance dated Dec. 20, 2018.
U.S. Appl. No. 15/435,110 Notice of Allowance dated Dec. 20, 2018.
U.S. Appl. No. 15/614,979 Office Action dated Nov. 5, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,267 Notice of Allowance dated Dec. 28, 2018.
U.S. Appl. No. 15/634,666 Office Action dated Oct. 18, 2018.
U.S. Appl. No. 15/830,421 Office Action dated Nov. 13, 2018.
U.S. Appl. No. 15/855,744 Office Action dated Nov. 19, 2018.
U.S. Appl. No. 15/861,553 Office Action dated Dec. 14, 2018.
U.S. Appl. No. 15/870,561 Office Action dated Nov. 19, 2018.
U.S. Appl. No. 15/871,763 Notice of Allowance dated Nov. 5, 2018.
U.S. Appl. No. 15/909,388 Office Action dated Dec. 14, 2018.
U.S. Appl. No. 15/909,806 Office Action dated Dec. 26, 2018.
U.S. Appl. No. 15/937,798 Office Action dated Oct. 26, 2018.
U.S. Appl. No. 15/937,817 Office Action dated Nov. 23, 2018.
U.S. Appl. No. 15/188,885 Office Action dated Apr. 9, 2019.
U.S. Appl. No. 15/909,406 Notice of Allowance dated Apr. 4, 2019.
Co-pending U.S. Appl. No. 16/245,183, filed Jan. 10, 2019.
Co-pending U.S. Appl. No. 16/248,665, filed Jan. 15, 2019.
Co-pending U.S. Appl. No. 16/253,103, filed Jan. 21, 2019.
Co-pending U.S. Appl. No. 16/291,759, filed Mar. 4, 2019.
Kopeliovich, Dmitri. Electropolishing. SubsTech: Substances & Technologies. Web Article. Dec. 14, 2013. Printed Jan. 13, 2019. 5 pages. URL:<http://www.substech.com/dokuwiki/doku.php?id=electropolishing.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/435,078 Office Action dated Jan. 10, 2019.
U.S. Appl. No. 15/479,531 Office Action dated Jan. 9, 2019.
U.S. Appl. No. 15/634,228 Notice of Allowance dated Feb. 20, 2019.
U.S. Appl. No. 15/634,727 Notice of Allowance dated Feb. 7, 2019.
U.S. Appl. No. 15/719,084 Office Action dated Feb. 8, 2019.
U.S. Appl. No. 15/803,686 Notice of Allowance dated Feb. 19, 2019.
U.S. Appl. No. 15/855,744 Notice of Allowance dated Feb. 15, 2019.
U.S. Appl. No. 15/861,544 Office Action dated Feb. 15, 2019.
U.S. Appl. No. 15/886,544 Office Action dated Mar. 21, 2019.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,784 Notice of Allowance dated Mar. 27, 2019.
U.S. Appl. No. 15/909,784 Office Action dated Jan. 18, 2019.
U.S. Appl. No. 15/909,826 Office Action dated Feb. 13, 2019.
U.S. Appl. No. 15/937,778 Office Action dated Feb. 12, 2019.
U.S. Appl. No. 15/937,790 Office Action dated Jan. 31, 2019.
U.S. Appl. No. 15/937,798 Office Action dated Mar. 7, 2019.
U.S. Appl. No. 15/937,812 Office Action dated Feb. 7, 2019.

* cited by examiner

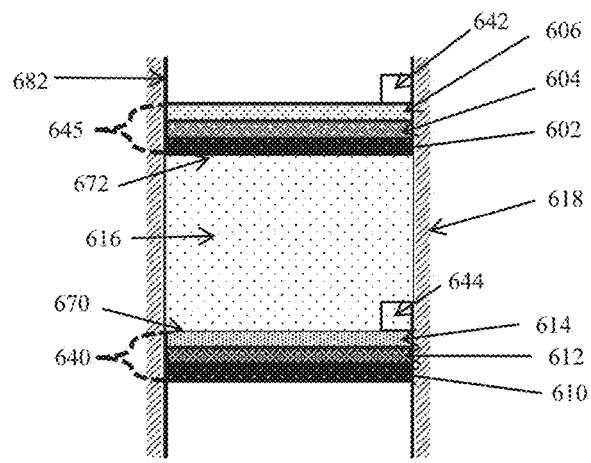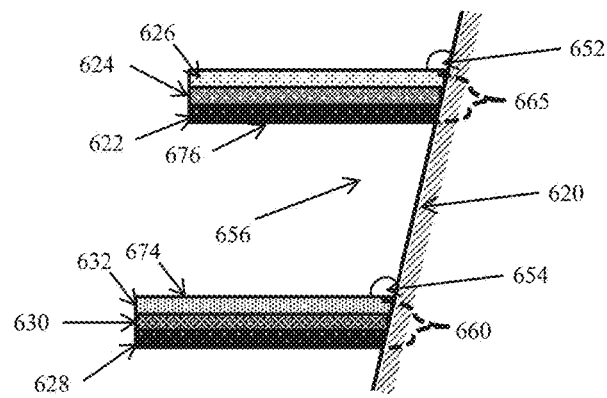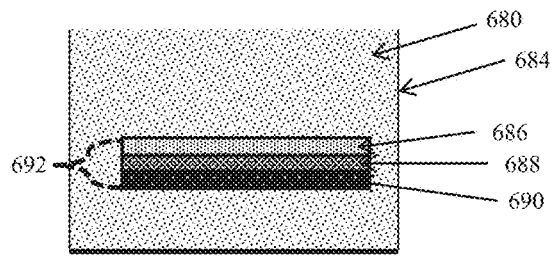

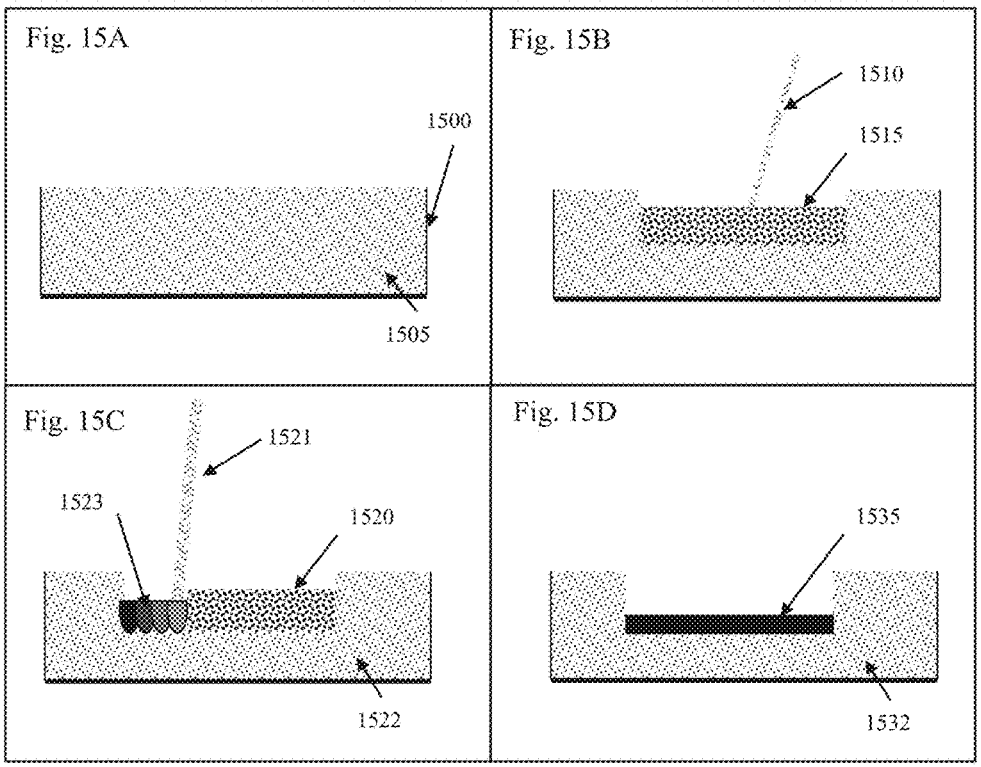

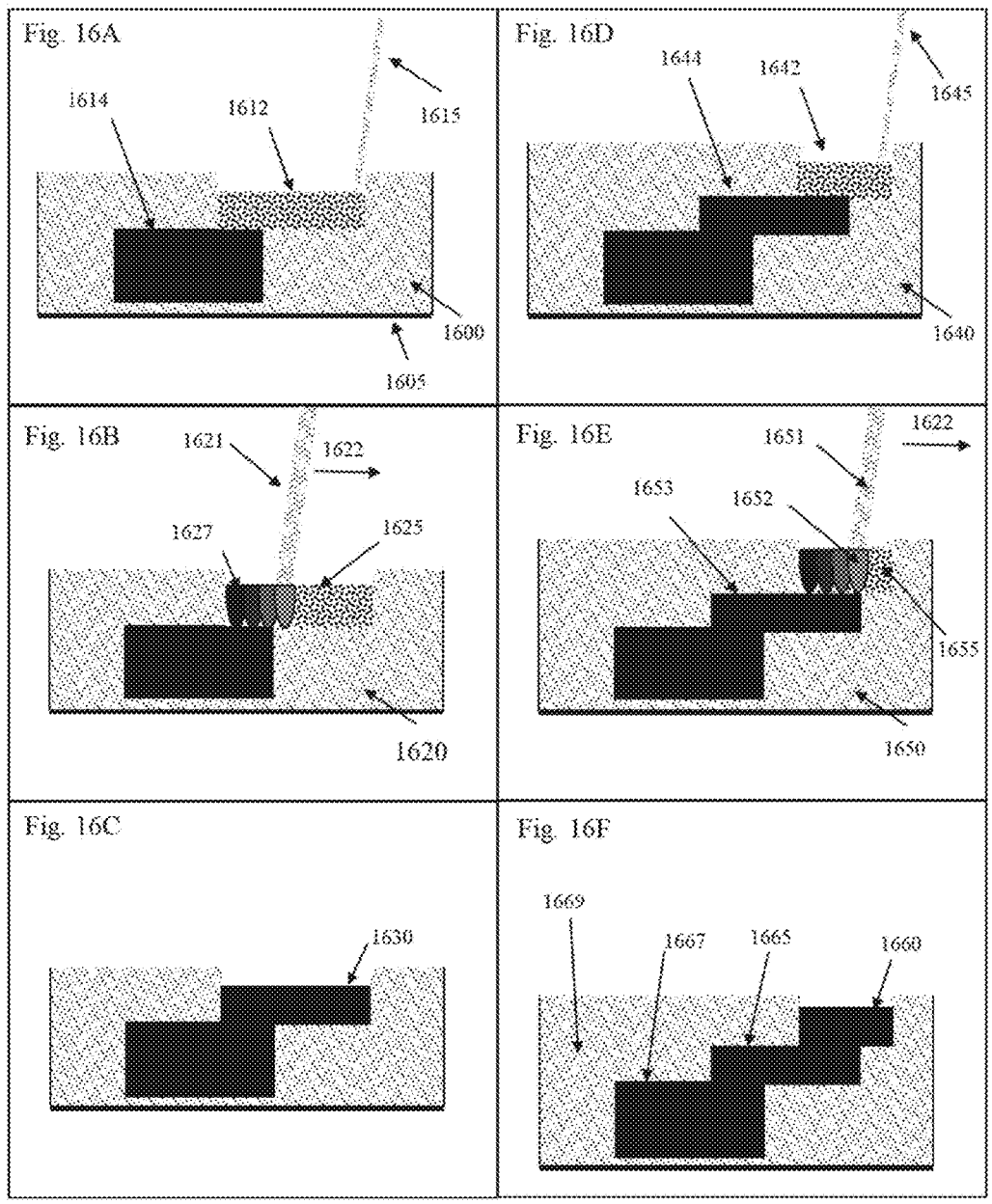

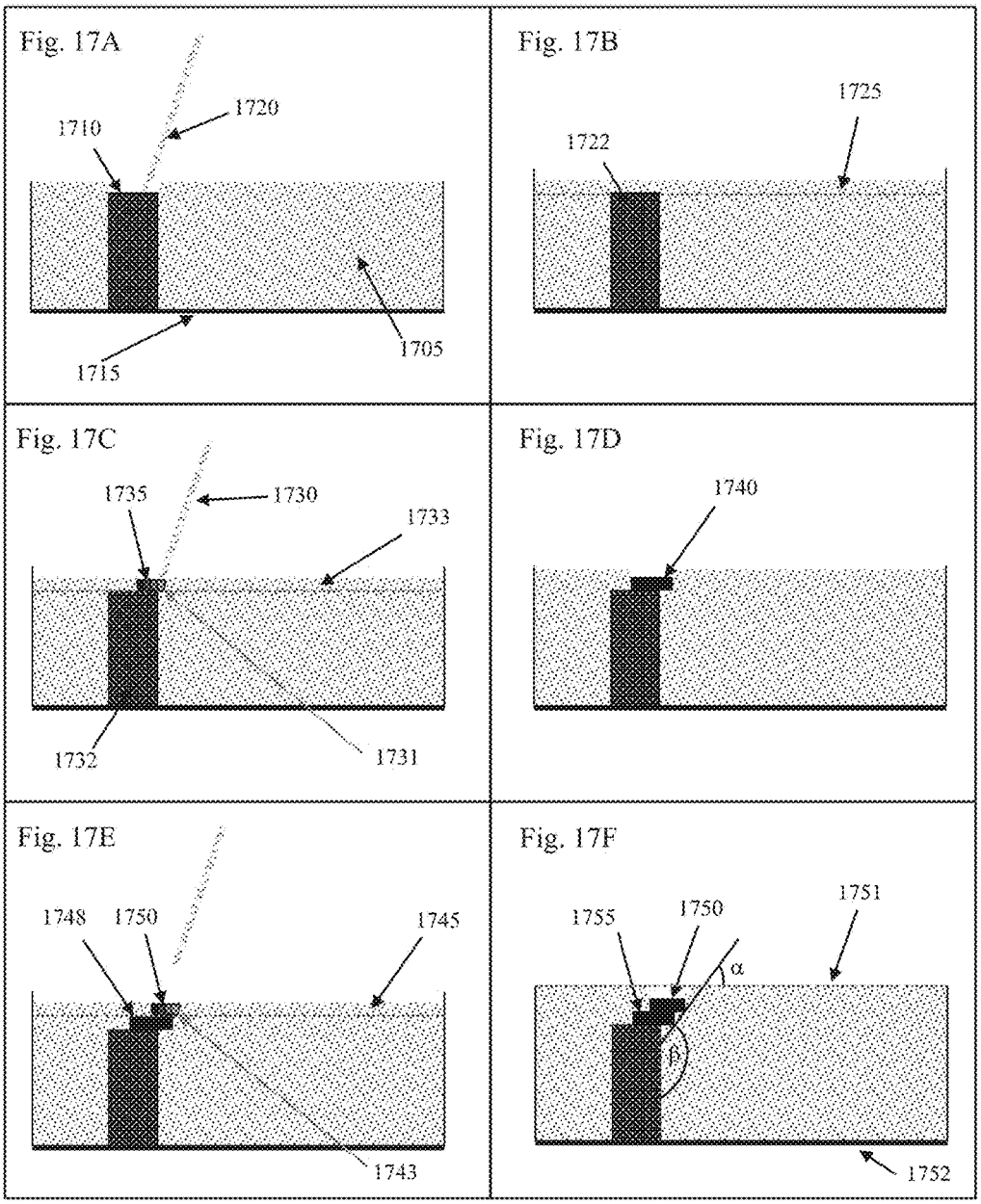

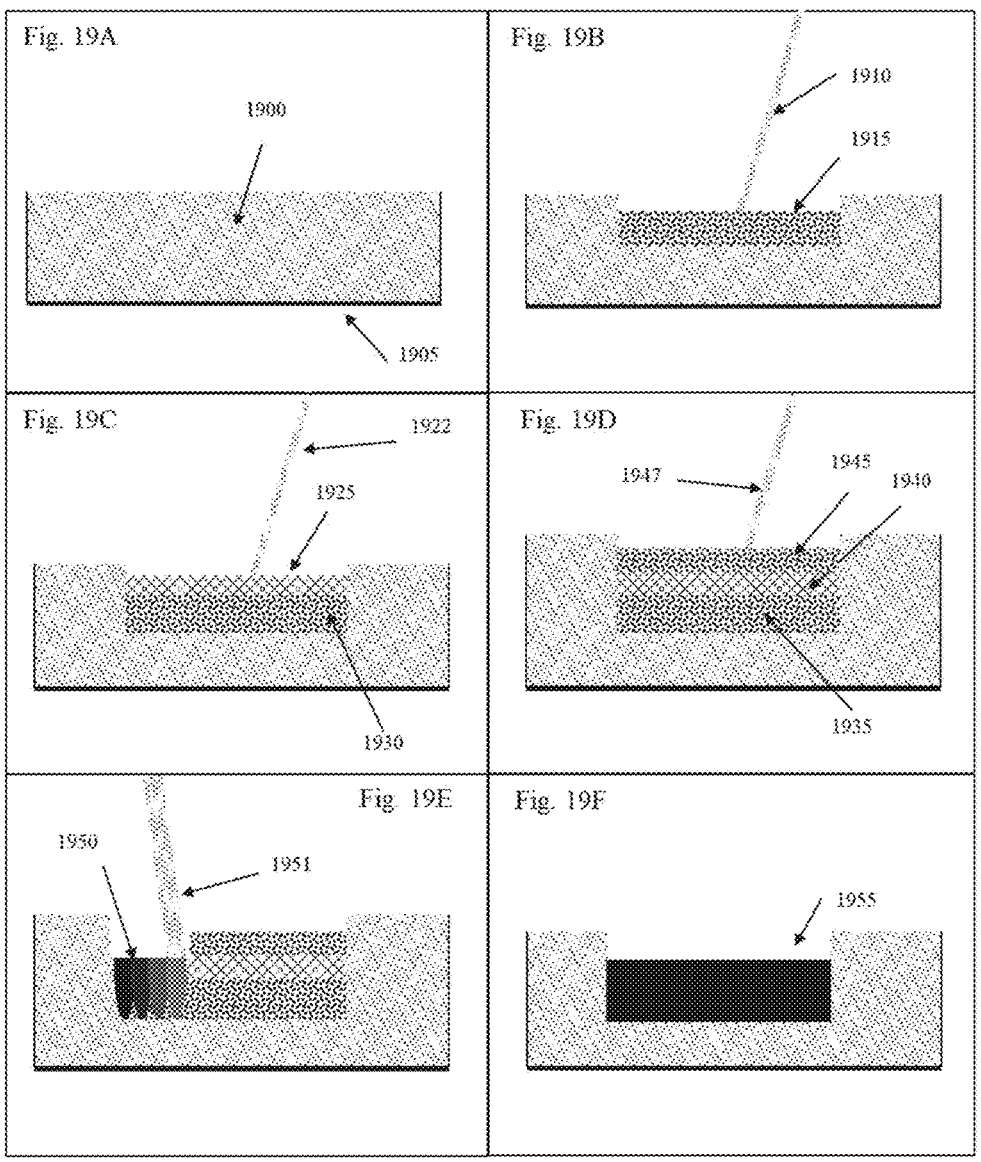

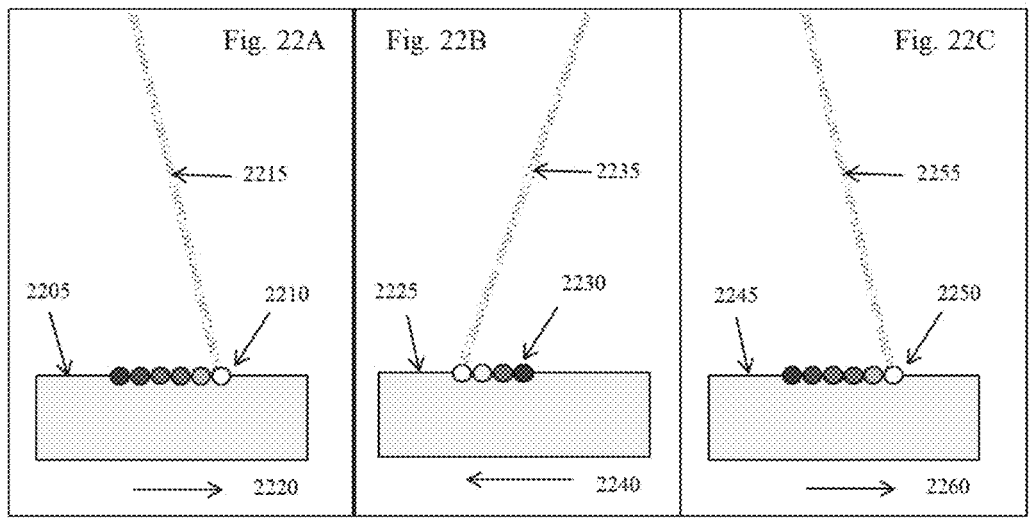
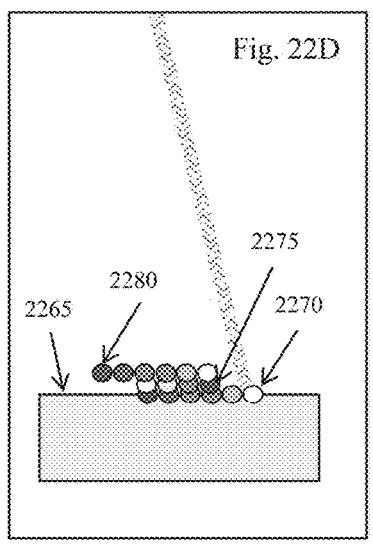
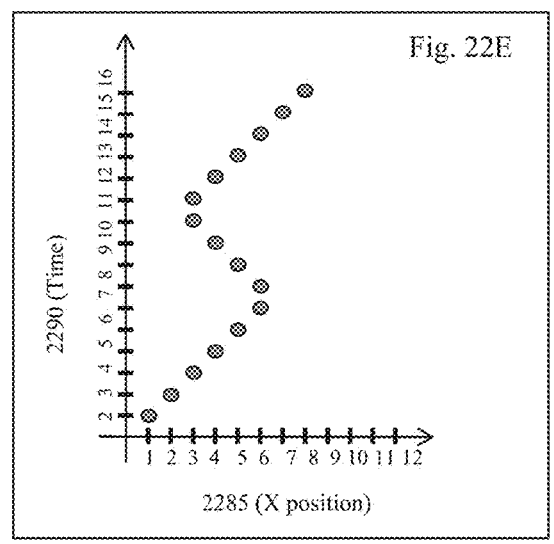

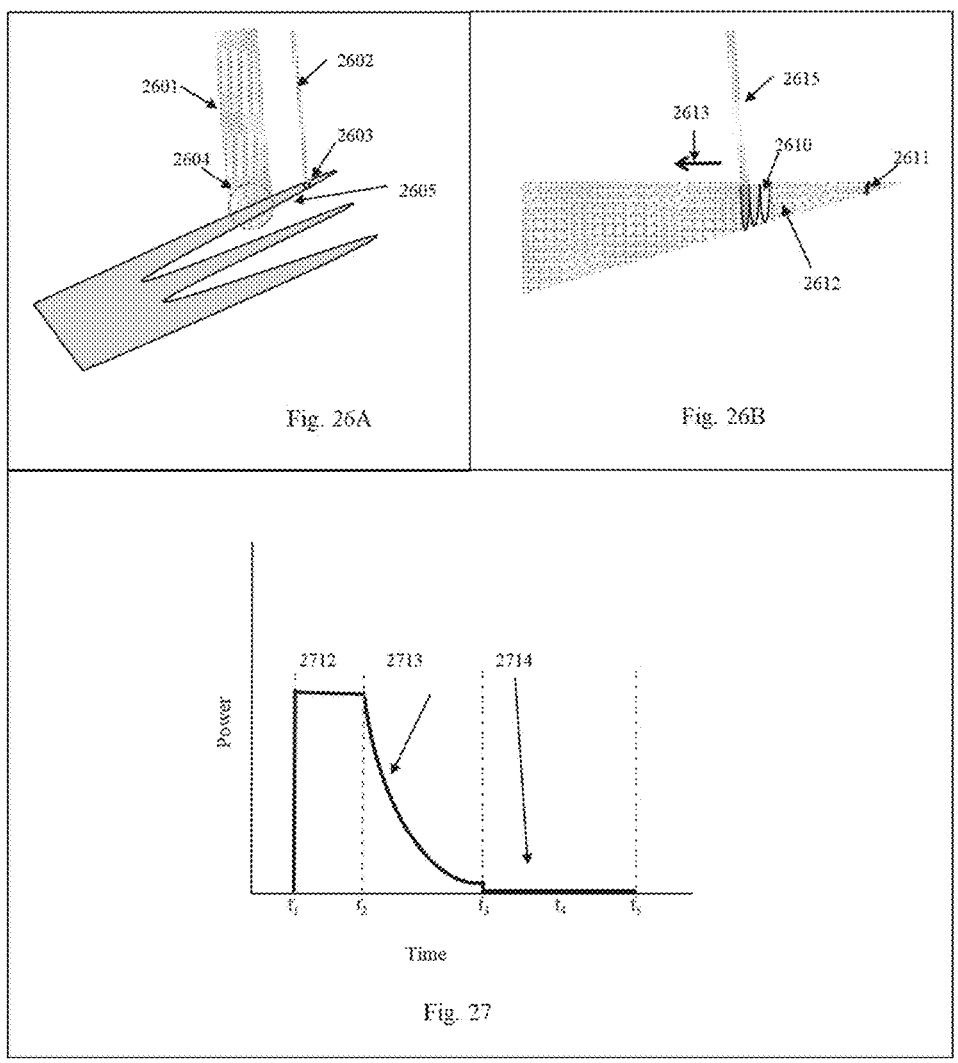

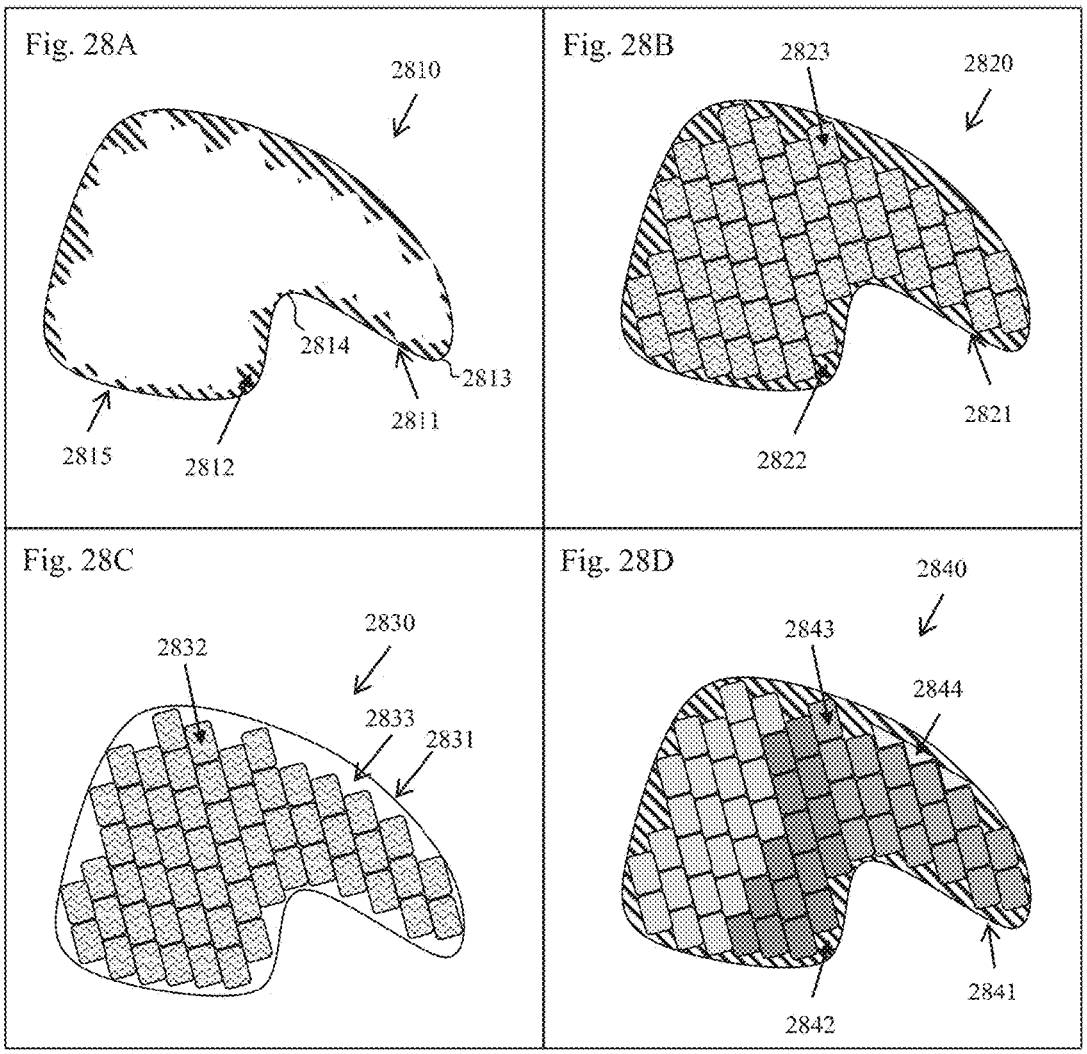

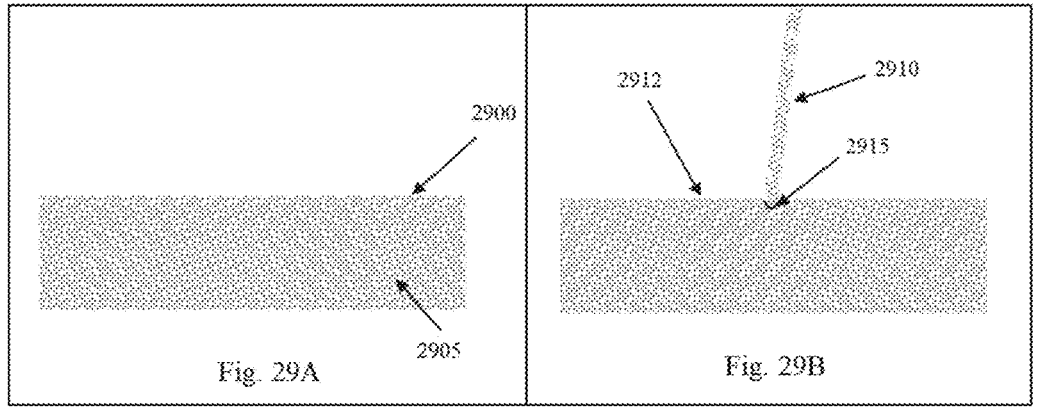
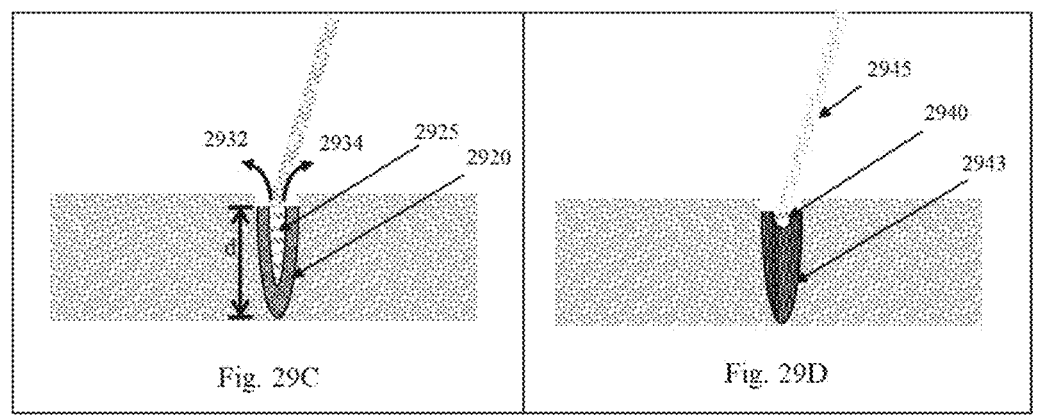
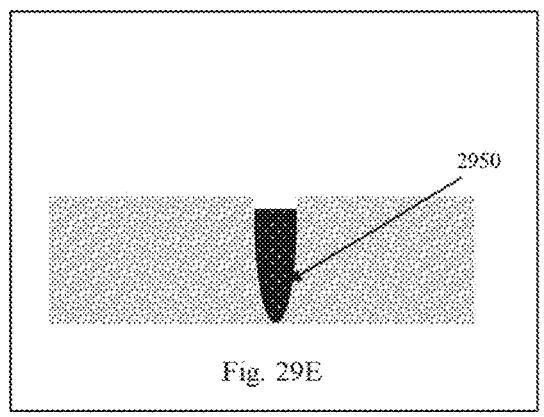

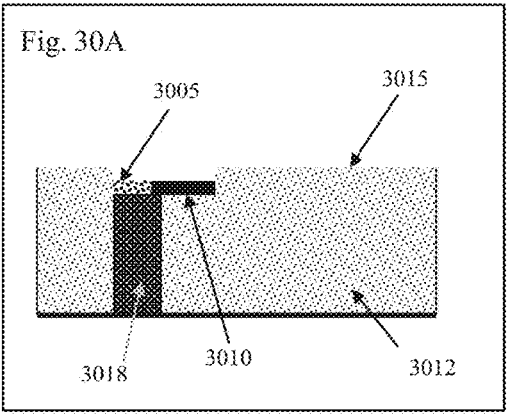
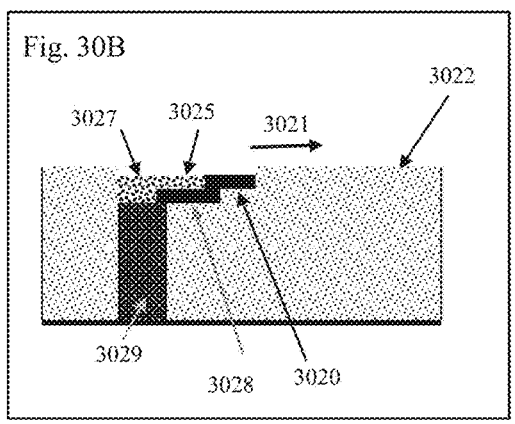
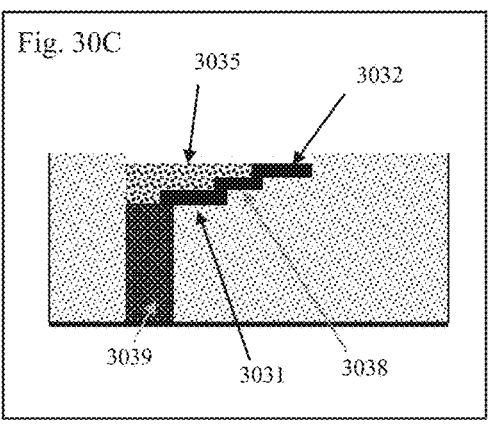
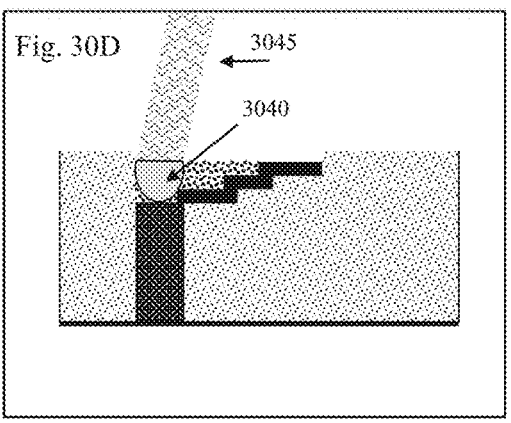
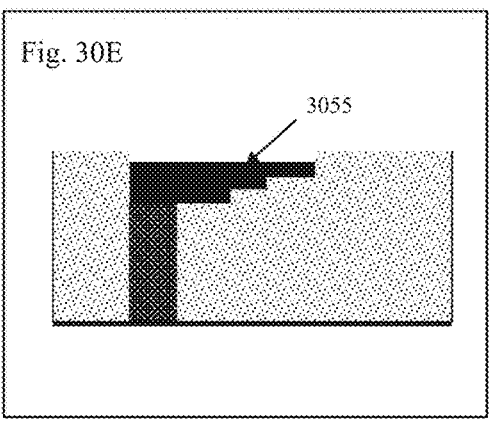

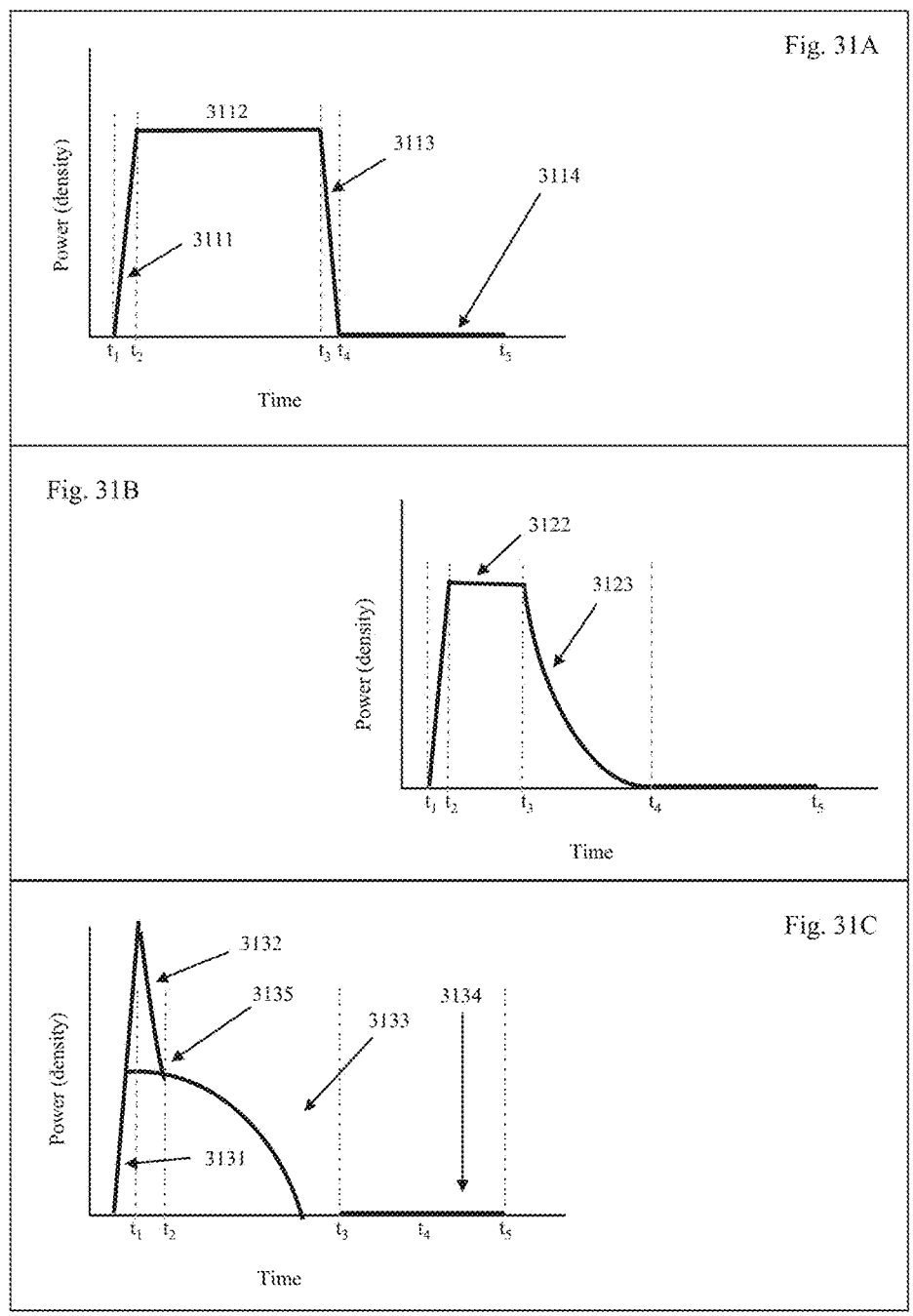

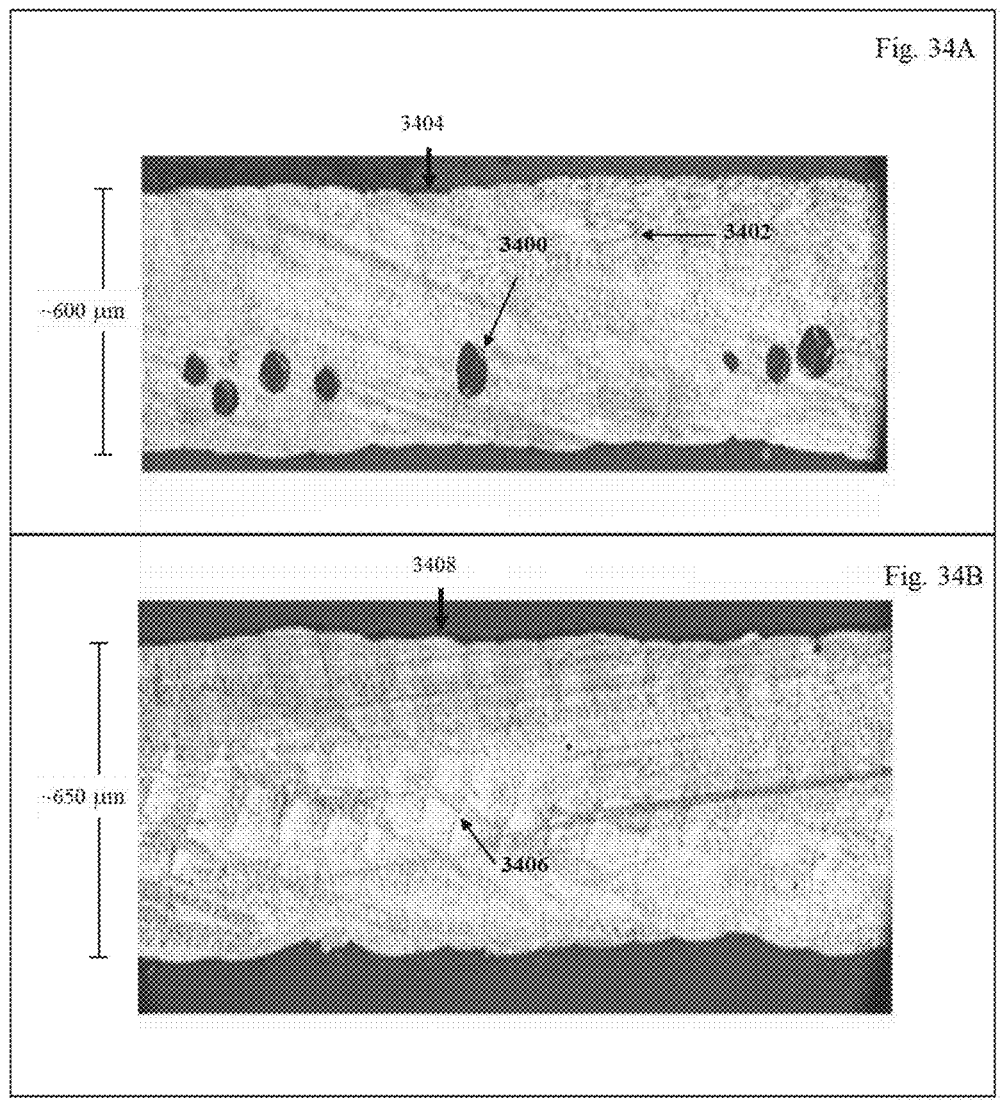

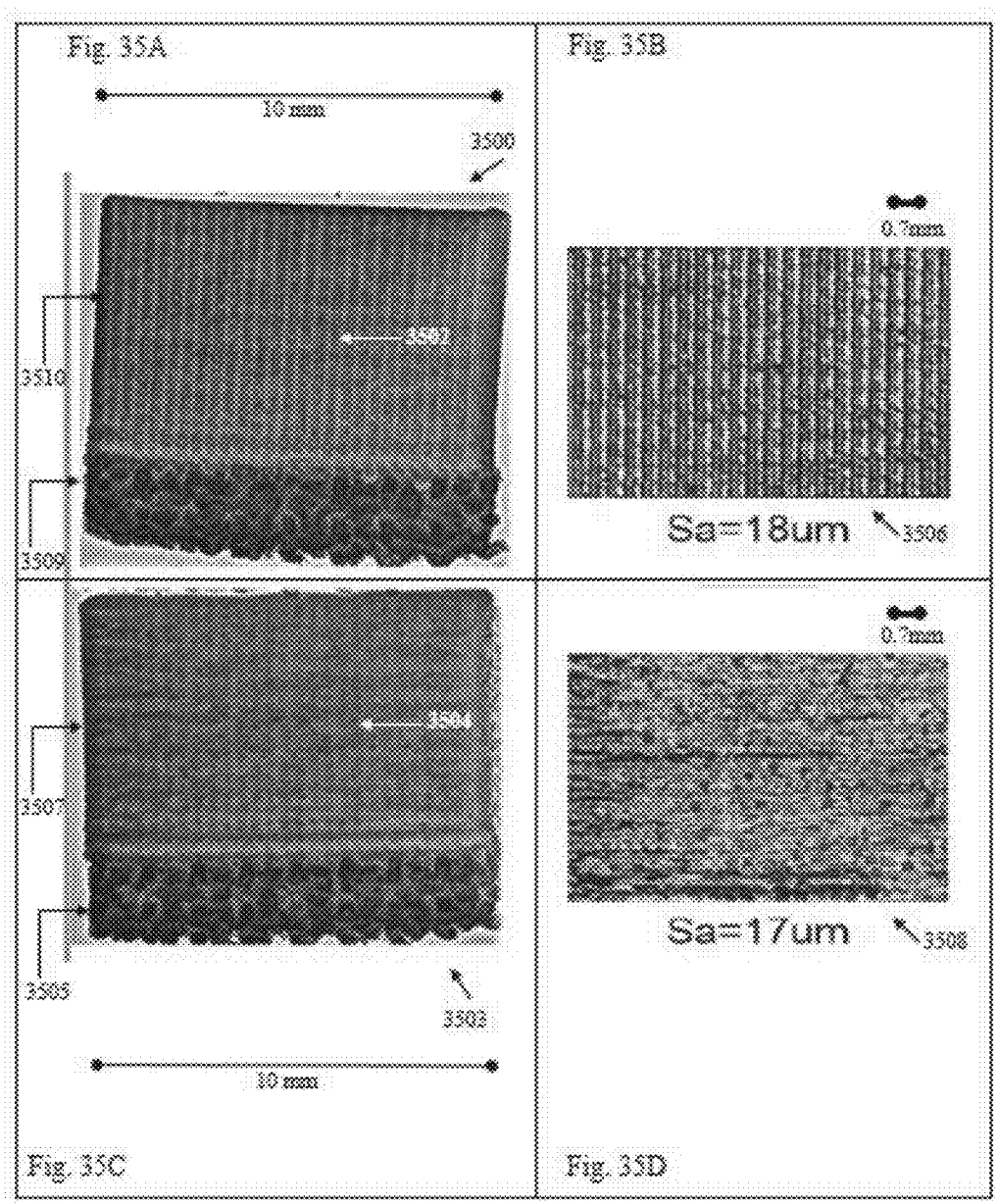

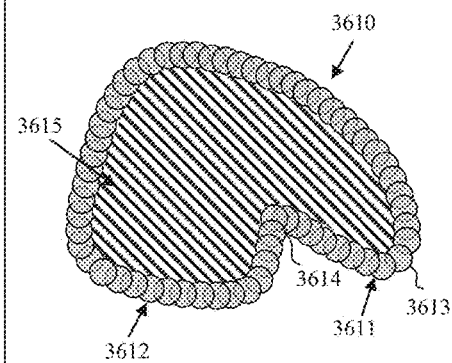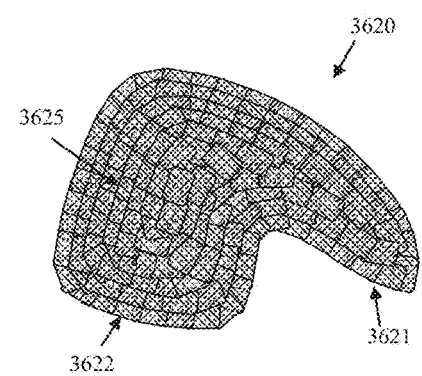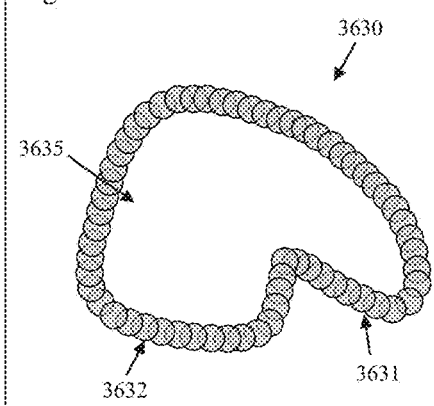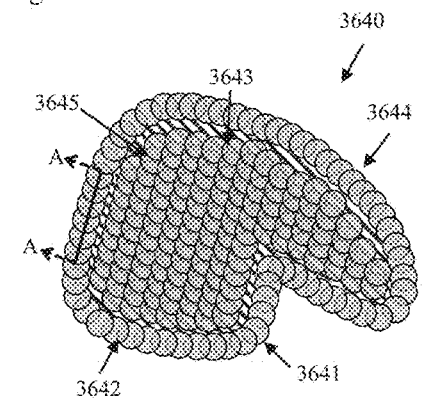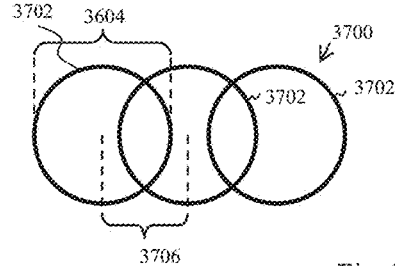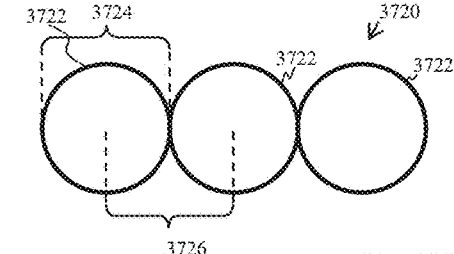

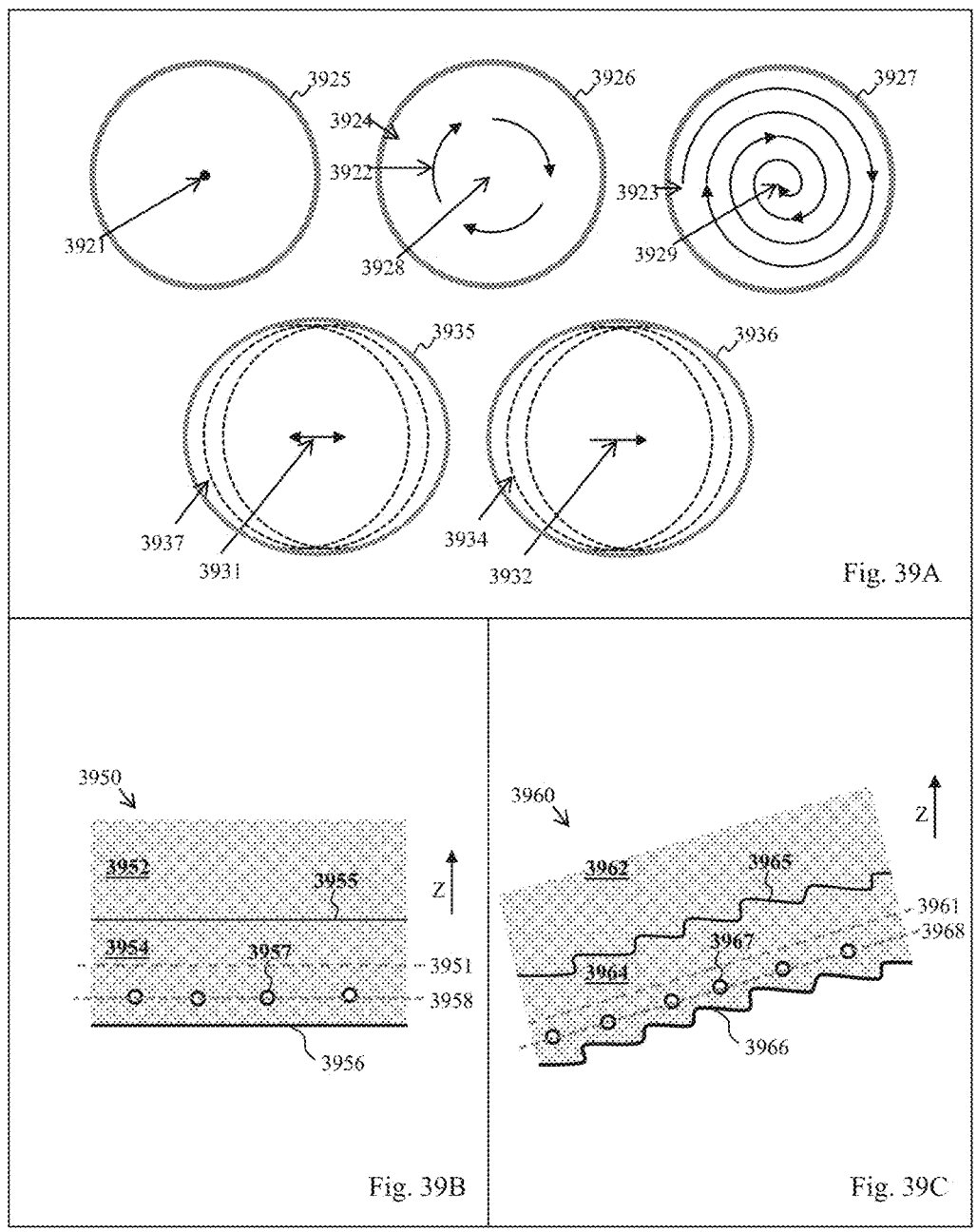

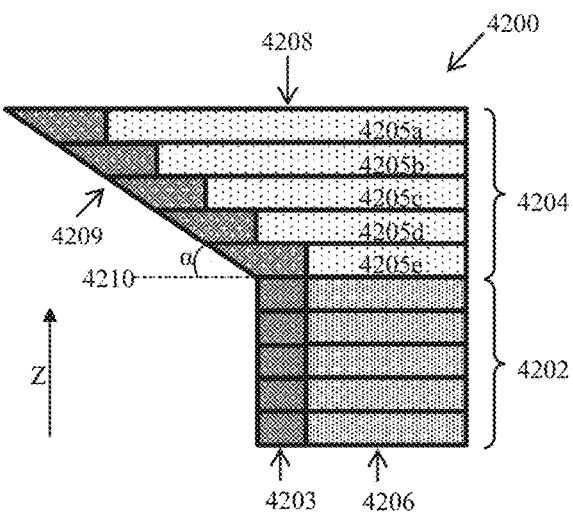
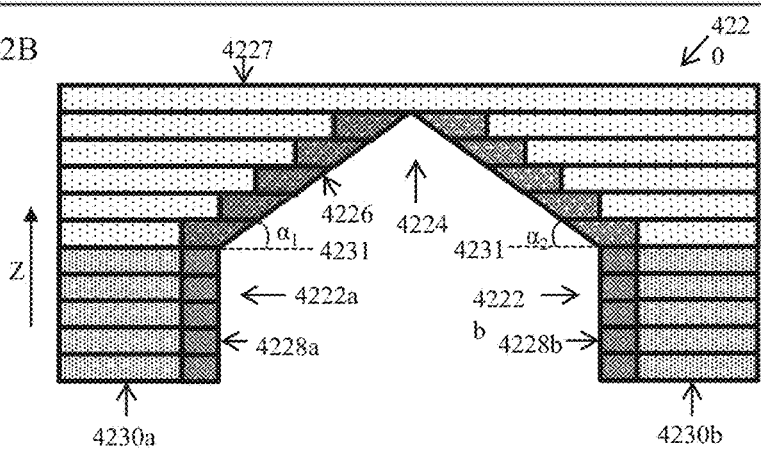
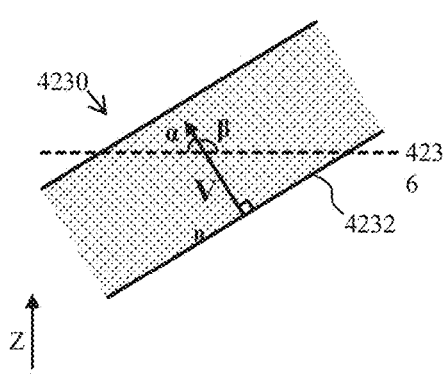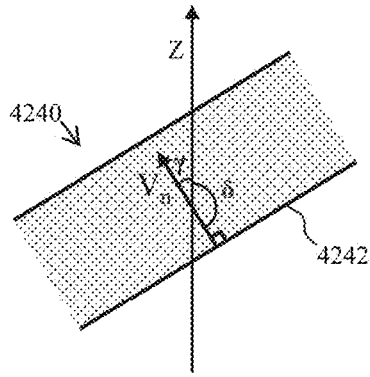

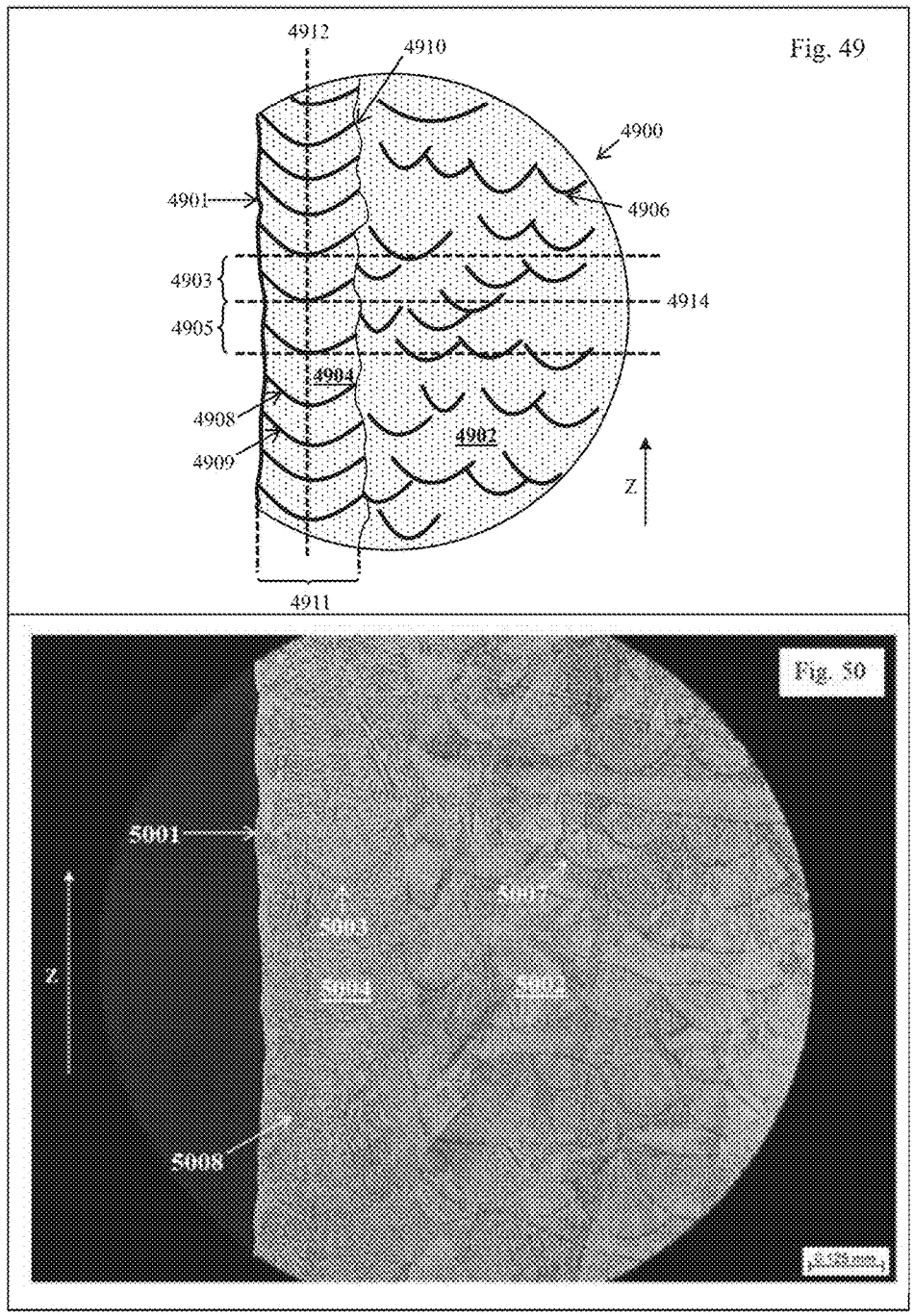

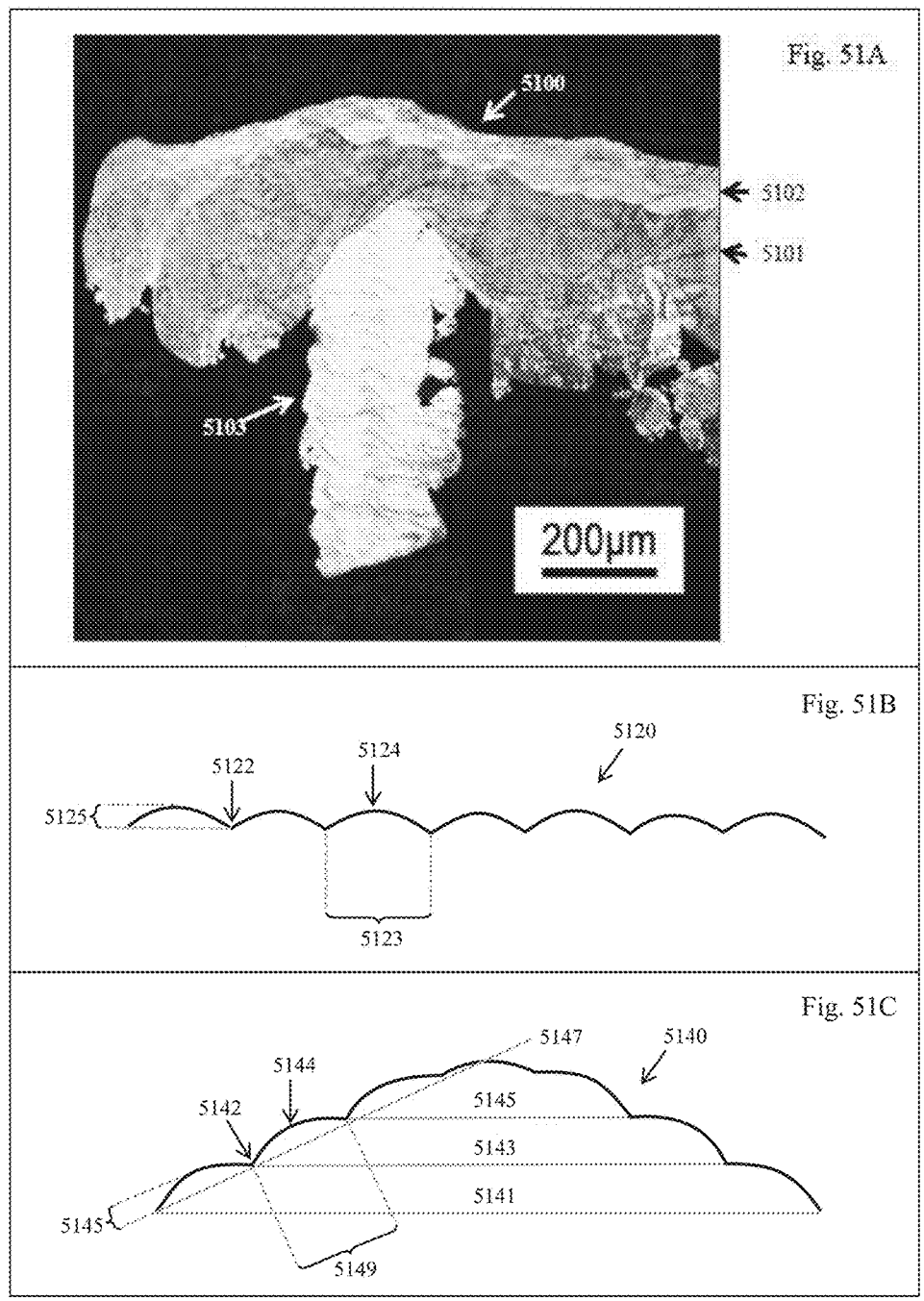

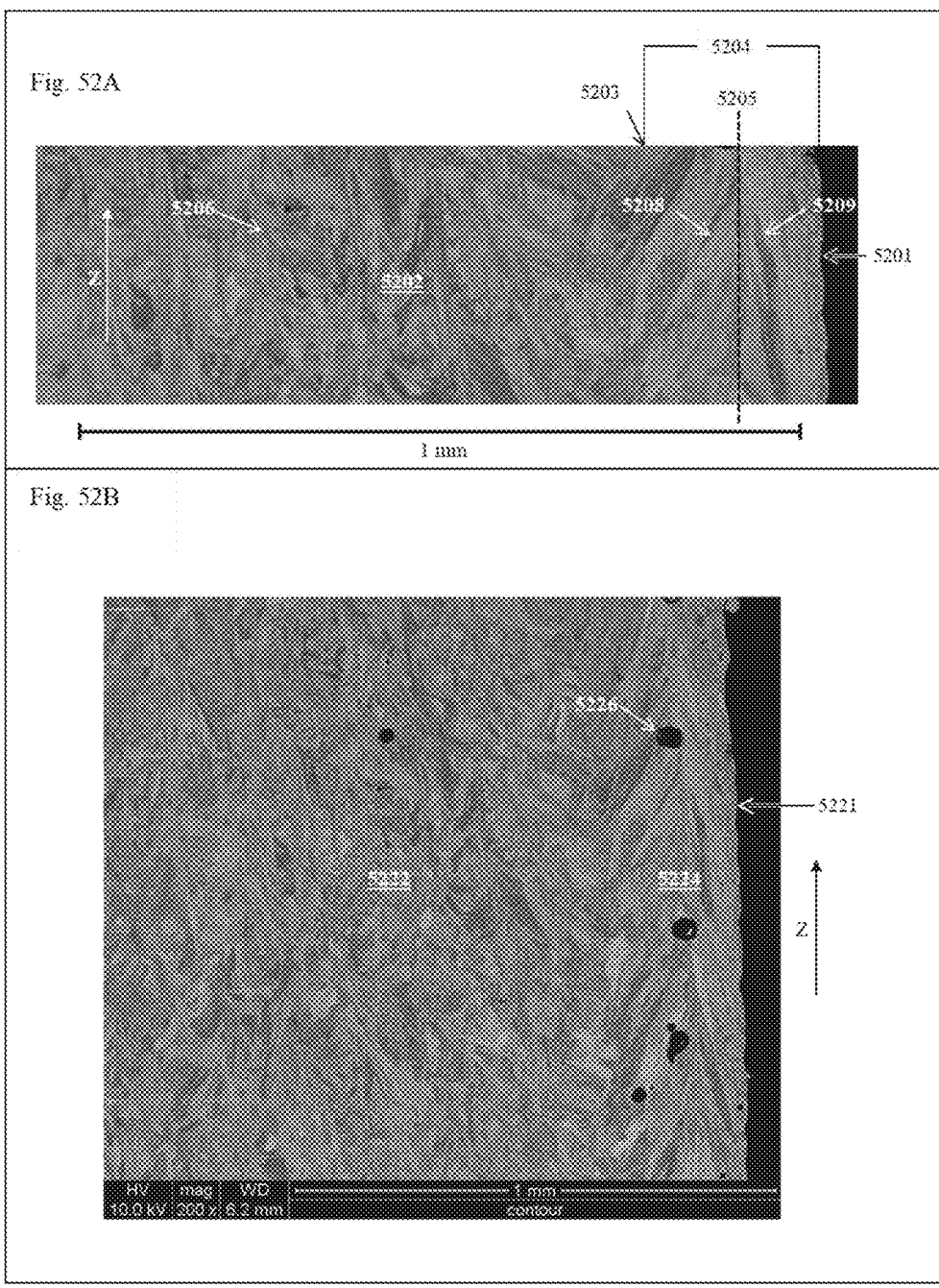

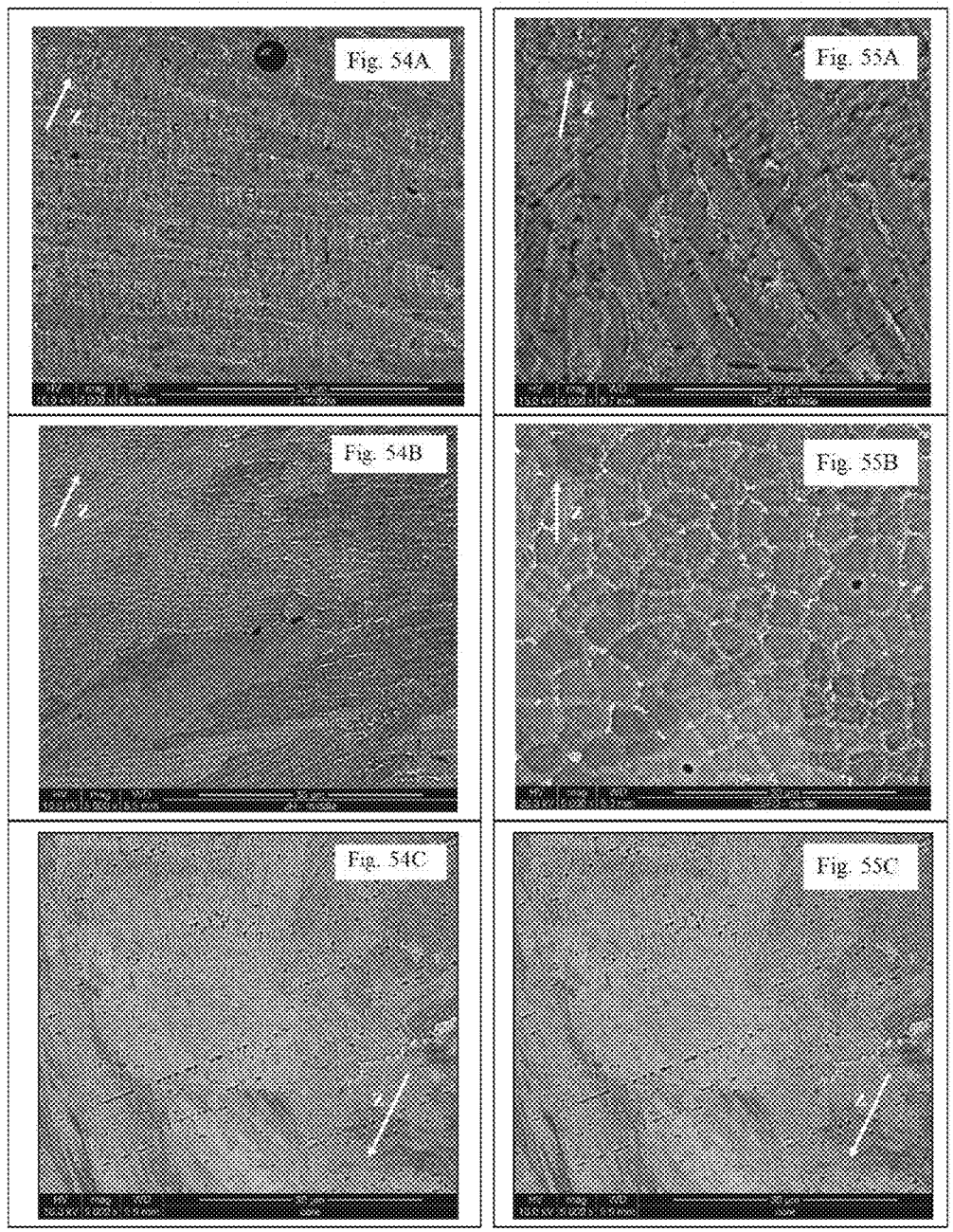

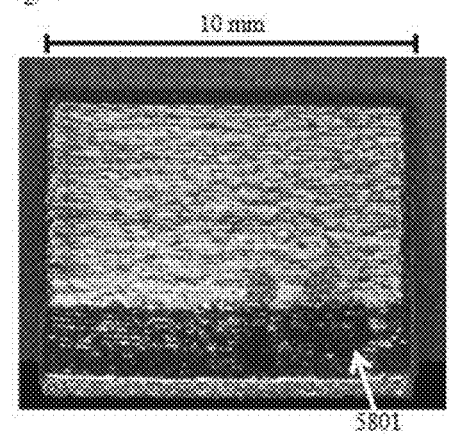
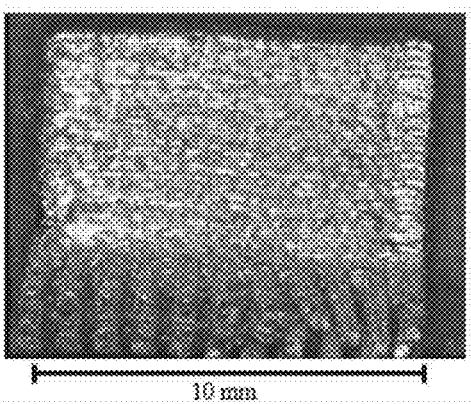
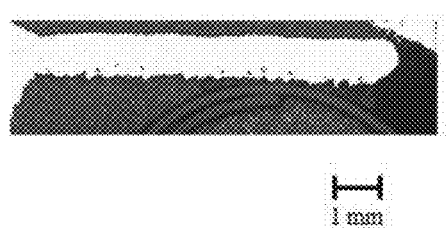
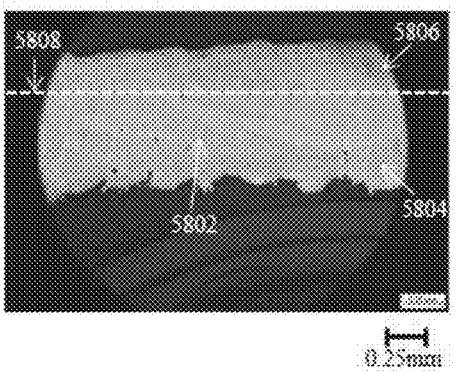

Void 8.24%

3.5 mm

Void 0.04%

3.5 mm

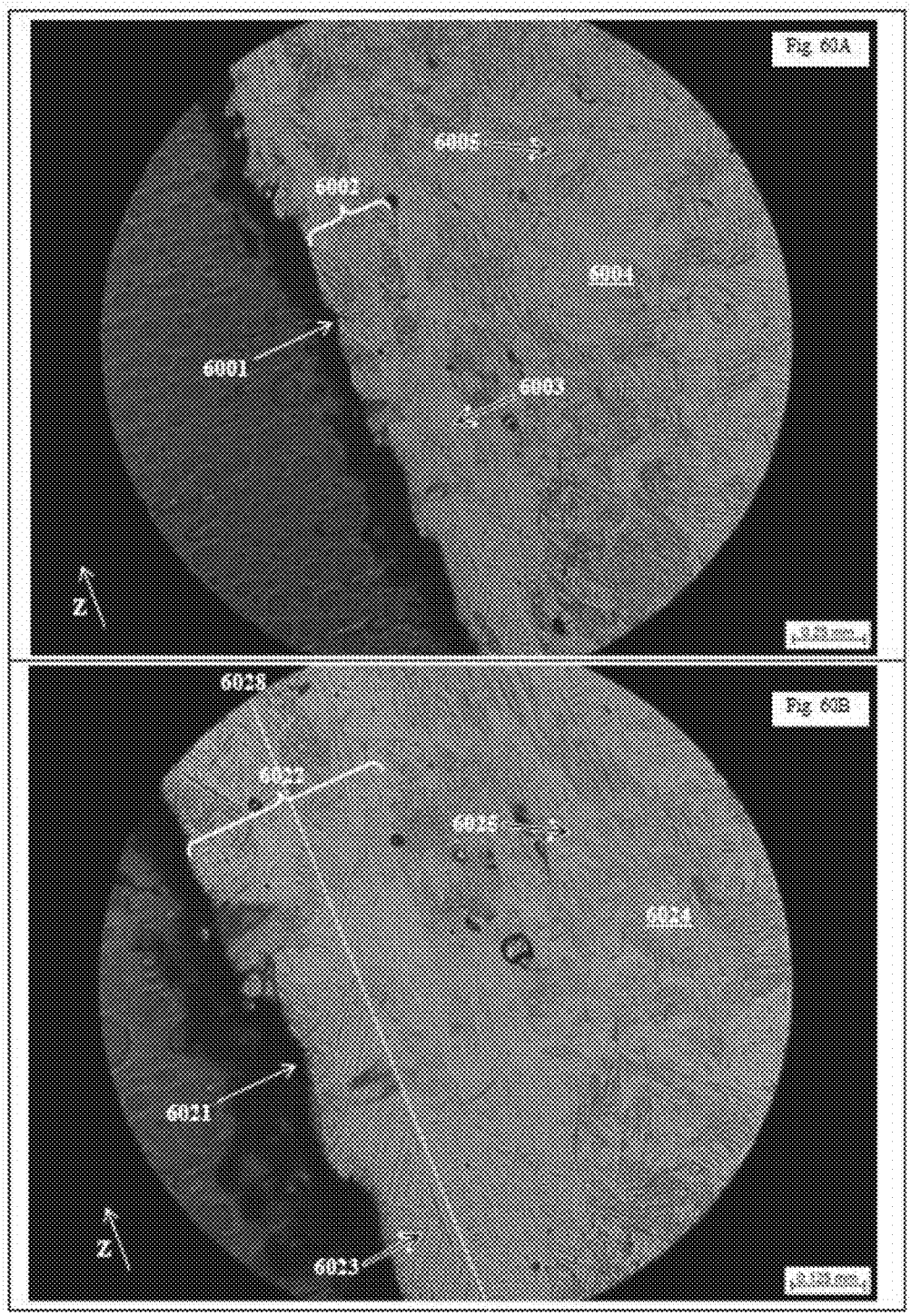

THREE-DIMENSIONAL PRINTING OF THREE-DIMENSIONAL OBJECTS

CROSS REFERENCE TO RELATED APPLICATIONS

This application claims benefit of prior-filed U.S. Provisional Patent Application Ser. No. 62/466,280, filed Mar. 2, 2017, and U.S. Provisional Patent Application Ser. No. 62/539,990, filed Aug. 1, 2017, each of which is entirely incorporated herein by reference.

BACKGROUND

Three-dimensional (3D) printing (e.g., additive manufacturing) is a process for making a three-dimensional (3D) object of any shape from a design. The design may be in the form of a data source such as an electronic data source or may be in the form of a hard copy. The hard copy may be a two-dimensional representation of a 3D object. The data source may be an electronic 3D model. 3D minting may be accomplished through an additive process in which successive layers of material are laid down one on top of each other. This process may be controlled (e.g., computer controlled, manually controlled, or both). A 3D printer can be an industrial robot.

3D printing can generate custom parts quickly and efficiently. A variety of materials can be used in a 3D printing process including elemental metal, metal alloy, ceramic, elemental carbon, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is materialized., 3D models may be created utilizing a computer aided design package or via 3D scanner. The manual modeling process of preparing geometric data for 3D computer graphics may be like plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

A large number of additive processes are currently available. They may differ in the manner layers are deposited to create the materialized structure. They may vary in the material or materials that are used to generate the designed structure. Some methods melt or soften material to produce the layers. Examples for 3D printing methods include selective laser melting (STAY), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (made inter alia of paper, polymer, metal) are cut to shape and joined together.

Sometimes, it is requested to control the microstructure of a 3D object to form a specific type or types of microstructure (e.g., grain (e.g., crystal) structure and/or metallurgical microstructure). At times, it is requested to fabricate a 3D object including complex topology (e.g., intricate, and/or fine microstructures). For example, the 3D object may comprise overhangs (e.g., ledges), and/or cavities. Occasionally, it is requested to fabricate a 3D object with varied materials and/or material structures in specific portions of the 3D object. The present disclosure describes formation of such requested 3D objects. In some instances, it is requested to control the way at least a portion of a layer of hardened material is formed. The layer of hardened material may comprise a multiplicity of melt pools. In some instances, it may be requested to control one or more characteristics of the melt pool that forms the layer of hardened material.

At films, the printed 3D object may bend, warp, roll, cud, or otherwise deform during the 3D printing process. Auxiliary supports may be inserted to circumvent the deformation. These auxiliary supports may be subsequently removed from the printed 3D object to produce a requested 3D product (e.g., 3D object). The presence of auxiliary supports may increase the cost and time required to manufacture the 3D object. At times, the requirement for the presence of auxiliary supports hinders (e.g., prevent) formation of cavities and/or ledges in the requested 3D object. The requirement for the presence of auxiliary supports may place constraints on the design of 3D objects, and/or on their respective materialization. In some embodiments, the inventions in the present disclosure facilitate the generation of 3D objects with reduced degree of deformation. In some embodiments, the inventions in the present disclosure facilitate generation of 3D objects that are fabricated with diminished number (e.g., absence) of auxiliary supports (e.g., without auxiliary supports). In some embodiments, the inventions in the present disclosure facilitate generation of 3D objects with diminished amount of design and/or fabrication constraints (referred to herein as "constraint-less 3D object").

SUMMARY

In an aspect described herein are methods, systems, apparatuses, and/or software for generating a 3D object comprising a metal alloy by diffusion. The diffusion may comprise diffusion of at least a first element into a material deficient in that first element. The diffusion may be controlled. The diffusion may result in a homogenous distribution of crystal phases and/or metallurgical morphologies. The diffusion may result in a 3D object comprising diminished number of defects. The defects may comprise fractures. The fractures may comprise heat cracks.

In another aspect, a method of printing a three-dimensional object comprises: (a) transforming a first pre-transformed material to a first transformed material to print a layer of hardened material as part of the three-dimensional object, which layer comprises a pore; and (b) using an energy beam to density the second transformed material to reduce or eliminate the pore. In some embodiments, using the energy beam comprises re-transforming the transformed material. In some embodiments, transforming comprises melting. In some embodiments, melting is complete melting to a liquid state. In some embodiments, transforming in operation (a) comprises generating a melt pool having one aspect ratio (e.g., globular melt pool). In some embodiments, transforming in operation (b) comprises generating a inch pool of a different aspect ratio than the one aspect ratio. A different aspect ratio may be a higher aspect ratio than the one aspect ratio (e.g., generating a high aspect ratio melt pool). A different aspect ratio may be generating a melt pool that is narrower and/or deeper relative to the one aspect ratio.

In another aspect, printing a three-dimensional object comprises: (a) using a first energy beam to transform one or more layers of pre-transformed material to print one or more layers of transformed material; and (b) using a second energy beam to reduce a porosity of the one or more layers of transformed material, wherein reducing the porosity comprises transforming at least a portion of each of the one or more layers of transformed material.

In some embodiments, the first energy beam moves at a slower speed along its path relative to the second energy beam (e.g., by an order of magnitude). In some embodiments, the first energy beam has a power density that is lower than a power density of the second energy beam (e.g., by an order of magnitude). In some embodiments, the power density profile of the second energy beam during irradiation is different from the power density of the first energy beam during it irradiation. In some embodiments, the power density profile of the first energy beam and/or second energy beam is controlled in real time during their respective irradiation. In some embodiments, (a) comprises forming a first melt pool. In some embodiments, (b) comprises forming a second melt pool. In some embodiments, the second melt pool has a higher aspect ratio than the first melt pool. In some embodiments, (b) comprises forming a melt pool having a depth that is greater than a radius of an exposed surface of the melt pool. In some embodiments, the depth is at least twice the radius of the exposed surface of the melt pool. In some embodiments, forming the melt pool comprises forming well in a central region of the melt pool. In some embodiments, the method further comprises laterally elongating the well by laterally moving the second energy beam. In some embodiments, the method further comprises (e.g., gradually) lowering an intensity of the second energy beam during the lateral movement to allow closure of the well. In some embodiments, using the second energy beam to reduce the porosity comprises alters a microstructure of the or more layers of transformed material. In some embodiments, (b) increases a density of the or more layers of transformed material by at least about 85%, 95.5%, or 110%. In some embodiments, (a) comprises forming at least two layers of transformed material. In some embodiments, (b) comprises reducing a porosity of the at least two layers of transformed material. In some embodiments, (b) comprises reducing a volume percentage porosity and/or an area percentage porosity of the at least two layers of transformed material by at least about one order of magnitude. In some embodiments, (b) comprises reducing an area percentage porosity of the at least two layers of transformed material by at least about one order of magnitude. In some embodiments, (b) comprises melting at least a portion of each of the at least two layers of transformed material. In some embodiments, the one or more layers of transformed material define a layering plane indicative (e.g., characteristic, or typical) of a layerwise printing of the three-dimensional object. In some embodiments, the one or more layers of transformed material are part of an overhang of the three-dimensional object. In some embodiments, a vector normal to a surface at a point on an exterior surface of the overhang forms an angle with respect to (i) the layering plane that intersects the vector or to (ii) a plane parallel to the layering plane that intersects the vector. In some embodiments, at least one characteristic of the first energy beam is different from a respective one of the second energy beam. In some embodiments, the at least one characteristic of the first energy beam comprises a power density, a scanning speed, a dwell time, an intermission time, or a cross-section. In some embodiments, the power density of the second energy beam is greater than the power density of the first energy beam. In some embodiments, the power density of the second energy beam is smaller than the power density of the first energy beam. In some embodiments, a scan speed of the second energy beam is faster than a scan speed of the first energy beam. In some embodiments, a scan speed of the second energy beam scanning speed is slower than a scan speed of the first energy beam. In some embodiments, the first energy beam is stationary or substantially stationary about a point during the dwell time. In some embodiments, transforming in (a) and/or (b) comprises forming a plurality of tiles by: (i) transforming a pre-transformed material to a first transformed material at a first position on a target surface using the first energy beam during a first time period to form a first tile, which first position is along a path-of-tiles, wherein during the first time period, the first energy beam is stationary or substantially stationary (e.g., such that it at most undergoes pendulum and/or circular movement about the first position); (ii) translating the first energy beam to a second position on the target surface along the path-of-tiles, which second position is different from the first position, wherein the first energy beam is translated during an intermission without transforming the pre-transformed material along the path-of-tiles; and (iii) using the first energy beam during a second time period to form a second tile along the path-of-tiles, wherein during the second time period, the first energy beam is stationary or substantially stationary (e.g., such that it at most undergoes pendulum and/or circular movement about the second position). In some embodiments, forming the plurality of tiles comprises moving the first energy beam to a subsequent location of the pre-transformed material (e.g., subsequent location of the exposed surface of the material bed) along a path. In some embodiments, forming the plurality of tiles comprises repeating (ii) and (iii) to an end of the path-of-tiles. In some embodiments, the method further comprises: reducing a power of an energy source that generates the first energy beam during movement of the first energy beam during an intermission between irradiating the different locations such that during the intermission the energy beam does not transform the pre-transformed material. In some embodiments, reducing comprising turning off. In some embodiments, during an irradiation time of the first energy beam and/or of the second energy beam, a power density profile of the first energy beam comprises a period in which the power density profile of the first energy beam is decreasing. In some embodiments, the period in which the power density profile of the first energy beam is decreasing occurs at an end of the irradiation time. In some embodiments, during an irradiation time of the first energy beam, a power density of the first energy beam is constant. In some embodiments, (a) and/or (b) comprises forming a plurality of hatches by continuously moving the first energy beam along the pre-transformed material in accordance with a path. In some embodiments, the first energy beam emits continuous or intermittent (e.g., pulsing) irradiation. In some embodiments, the one or more layers of transformed material printed in (a) comprise one or more pores disposed asymmetrically within a height of a layer of the one or more layers relative to a midline of the layer height. In some embodiments, the one or more pores that are disposed asymmetrically within a height of a layer of the one or more layers, are disposed asymmetrically below the midline of the layer. In some embodiments, the pore is disposed at a location deeper than the height of two layers of the one or more layers (e.g., deeper than six layers of the one or more layers).

In another aspect, printing a three-dimensional object comprises one or more controllers that are individually or collectively programmed to: (a) direct a first energy beam to transform one or more layers of pre-transformed material to one or more layers of transformed material; and (b) direct a second energy beam that reduces a porosity of the one or more layers of transformed material, wherein reducing the porosity comprises transforming at least a portion of the one or more layers of transformed material.

In some embodiments, the one or more controllers are individually or collectively programmed to direct (i) a first energy source to generate the first energy beam, and (ii) direct a second energy source to generate the second energy beam. In some embodiments, the first energy source is the same as the second energy source. In some embodiments, the first energy source is different than the second energy source. In some embodiments, the one or more controllers controls at least one characteristic of the first energy beam, the second energy beam, the first energy source, and/or the second energy source. In some embodiments, the one or more controllers controls at least one characteristic of the first and/or second energy beams at least partially based on data from one or more sensors. In some embodiments, the one or more sensors collect temperature, optical, or spectroscopic data. In some embodiments, the one or more sensors detect electromagnetic radiation that is emitted and/or reflected from an exposed surface of one or more melt pools formed during directing the first energy beam in (a) and/or directing the second energy beam in (b). In some embodiments, directing the first energy beam in (a) and/or directing the second energy beam in (b) comprises forming a bottom skin of an overhang. In some embodiments, the one or more controllers controls at least one characteristic of the first energy beam and/or the second energy beam at least partially based on monitoring a plastic yielding of the bottom skin during printing. In some embodiments, the one or more controllers directs feedback or closed loop control. In some embodiments, the one or more controllers directs feed-forward or open loop control. In some embodiments, the one or more controllers is programmed to direct the same energy source to generate the first and second energy beams. In some embodiments, the one or more controllers is programmed to direct different energy sources to generate the first and second energy beams. In some embodiments, the one or more controllers includes at least two controllers. In some embodiments, one of the at least two controllers is programmed to direct the first energy beam in (a) and/or directing the second energy beam in (b). In some embodiments, at least two of the at least two controllers is programmed to direct the first energy beam in (a) and/or directing the second energy beam in (b). In some embodiments, the one or more controllers is programmed to adjust at least one characteristic of the first energy beam and/or the second energy beam to he different from each other. In some embodiments, the at least one characteristic comprises a speed, a power density, a cross section, a dwell time, or a propagation scheme. In some embodiments, the propagation scheme comprises hatching or tiling. In some embodiments, hatching comprises transformation during a movement. In some embodiments, tiling comprises (I) transforming while being stationary or substantially stationary (e.g., about a first point along a path) followed by (II) propagating along a path to a second point without transforming and GM repeating (I) and (II) until reaching an end of the path. In some embodiments, the one or more controllers is programmed to direct the first and second energy beams to have different power densities. In some embodiments, a power density of the second energy beam is greater than a power density of the first energy beam. In some embodiments, a power density of the second energy beam is less than a power density of the first energy beam. In some embodiments, the one or more controllers is programmed to direct the first energy beam to scan at a first speed, and to direct the second energy beam to scan at a second speed different than the first speed. In some embodiments, the second speed is faster than the first speed. In some embodiments, the second speed is slower than the first speed. In some embodiments, the one or more controllers is programmed to direct the first energy beam and/or the second energy beam to form a plurality of tiles. In some embodiments, each tile of the plurality of tiles is formed by directing the first energy beam at the one or more layers of pre-transformed material for a dwell time of at least about 0.1 milliseconds during a stationary or substantially stationary irradiation (e.g., about a point along a path). In some embodiments, the one or more controllers is programmed to direct an energy source to form a plurality of hatches by continuously moving the first energy beam along the one or more layers of pre-transformed material in accordance with a path. In some embodiments, the one or more controllers is programmed to direct the second energy beam to form at least one high aspect ratio melt pool. In some embodiments, a depth of the at least one high aspect ratio melt pool is greater than a radius of an exposed surface of the at least one high aspect ratio melt pool. In some embodiments, the depth is at least twice the radius of the exposed surface of the high aspect ratio melt pool. In some embodiments, the one or more controllers is programmed to direct the second energy beam to reduce a volume percentage porosity and/or an area percentage porosity of the transformed material by at least about one order of magnitude. In some embodiments, the one or more controllers is programmed to direct adjusting one or more characteristics of the first and/or second energy beams before, during or after directing the first energy beam in (a) and/or directing the second energy beam in (b). In some embodiments, the at least one characteristic of the first and/or second energy beams is adjusted to accomplish a different solidification rate during directing the first energy beam in (a) and/or directing the second energy beam in (b). In some embodiments, the one or more controllers is programmed to direct the second energy beam to form a melt pool comprising a well in a central region of the melt pool. In some embodiments, directing the second energy beam in (b) further comprises laterally elongating the well by laterally moving the second energy beam along a path. In some embodiments, the one or more controllers is programmed to direct (e.g., gradually) lowering an intensity of the second energy beam during formation of the melt pool comprising the well and/or during the lateral movement to allow closure of the well. In some embodiments, using the second energy beam to reduce the porosity comprises alters a microstructure of the or more layers of transformed material. In some embodiments, the one or more controllers is programmed to direct the second energy beam to increase a density of the or more or more layers of transformed material by at least about 85%, 95.5% or 110% which percentage is a volume per volume percentage and/or an area per area percentage. In some embodiments, the one or more controllers is programmed to direct using a tiling energy beam during directing the first energy beam in (a) and/or during directing the second energy beam in (b). In some embodiments, tiling comprises (1) irradiating a first position along a path with a stationary or substantially stationary energy beam to perform a first transformation directly followed by (2) propagation along the path without transformation, directly followed by (3) repeating (1) and (2) until reaching an end of the path.

In another aspect, a method of printing a three-dimensional object comprises: (a) providing a first layer of pre-transformed material above a platform; (b) using a first energy beam to transform at least a portion of the first layer of pre-transformed material to a first porous layer comprising a first portion and an optional second portion, and (c) using a second energy beam to densify the at least the first portion of the first porous layer to form a first layer of denser material that is denser than the first porous layer, wherein the optional second portion is not at least a portion of a scaffold that engulfs the three-dimensional object.

In some embodiments, the scaffold is a lightly sintered pre-transformed material. In some embodiments, the first porous layer is suspended anchorlessly within an enclosure. In some embodiments, the first porous layer is suspended anchorlessly within an enclosure (e.g., wherein the first porous layer is anchored to the enclosure). In some embodiments, the first porous layer is suspended anchorlessly within an enclosure (e.g., wherein the first porous layer is anchored to a platform above which the first layer of pre-transformed material is disposed in the enclosure). In some embodiments, the first porous layer is directly connected to the platform. In some embodiments, the first porous layer is connected to the platform through one or more auxiliary supports. In some embodiments, the first portion and an optional second portion of the first porous layer are transformed to form the first layer of denser material in operation (c). In some embodiments, transforming comprises fusing. In some embodiments, fusing comprises sintering or inciting. In some embodiments, melting comprises completely melting. In some embodiments, the first porous layer is suspended anchorlessly within an enclosure. In some embodiments, the first porous layer has a porosity of at least 40%. In some embodiments, the first porous layer has a porosity of at least 60%. In some embodiments, the first porous layer has a porosity of at least 20%. In some embodiments, a surface of the first layer of denser material has an arithmetic average roughness profile (Ra) of at most 200 micrometers. In some embodiments, the first layer of denser material has an average radius of curvature of at least five centimeters. In some embodiments, the first layer of denser material has an average radius of curvature of at least 50 centimeters. In some embodiments, the first layer of denser material has an average radius of curvature of at least one meter. In some embodiments, the first layer of pre-transformed material is selected from at least one member of the group consisting of an elemental metal, metal alloy, ceramic, an allotrope of elemental carbon, polymer, and resin. In some embodiments, the first layer of pre-transformed material comprises a liquid, solid, or semi-solid. In some embodiments, the first layer of pre-transformed material comprises a particulate material. In some embodiments, the particulate material comprises powder. In some embodiments, the powder comprises solid particles. In some embodiments, the first porous layer comprises one or more pores. In some embodiments, the one or more pores comprises a pore structure. In some embodiments, the pore structure comprises pores distributed in a non-uniform manner across the first porous layer. In some embodiments, the pore structure comprises pores distributed in a uniform manner across the first porous layer. In some embodiments, the first layer of pre-transformed material forms a material bed that is at an ambient temperature during the printing. In some embodiments, the first layer of pre-transformed material forms a material bed that is at an ambient pressure during the printing. In some embodiments, the first layer of pre-transformed material forms a material bed, and wherein during the printing, the material bed is at a constant or at a substantially constant pressure. In some embodiments, the first layer of pre-transformed material forms a material bed, and wherein during the printing the material bed is devoid of a substantial pressure gradient. In some embodiments, the first layer of pre-transformed material comprises a particulate material. In some embodiments, the first layer of pre-transformed material comprises a powder material. In some embodiments, the first energy beam and/or the second energy beam is pulsing during the printing. In some embodiments, the first energy beam and/or the second energy beam is continuous during the printing. In some embodiments, during the printing, the first energy beam and/or the second energy beam has a constant characteristic comprising a velocity, a continuity of movement, a cross section, a power density, a fluence, a duty cycle, a dwell time, a focus, or a delay time. In some embodiments, during the printing, the first energy beam and/or the second energy beam has a varied characteristic comprising a velocity, a continuity of movement, a cross section, a power density, a fluence, a duty cycle, a dwell time, a focus, or a delay time. In some embodiments, the first layer of pre-transformed material forms a material bed, wherein during the delay time the first energy beam and/or the second energy beam is translated from a first position of an exposed surface of the material bed to a second position of the exposed surface of the material bed. In some embodiments, during the printing comprises during operation (b) or during operation (c). In some embodiments, the varied characteristic is controlled in real time by a controller. In some embodiments, during the printing the first energy beam and/or the second energy beam is dithering. In some embodiments, during the printing the first energy beam and/or the second energy beam has a circular footprint. In some embodiments, during the printing the first energy beam and/or the second energy beam has an oval footprint. In some embodiments, the first layer of pre-transformed material forms a material bed, wherein in operation (b), operation (c), or both in operations (b) and (c): a trajectory of the first energy beam and/or a second energy beam on an exposed surface of the material bed comprises vectoral sections that collectively propagate in a first direction, (e.g., wherein the vectoral sections are directed in a second direction that is different from the first direction, wherein the first direction is a direction of growth of the first porous layer and/or the first layer of denser material, or any combination thereof), in some embodiments, the first energy beam and/or the second energy beam is translated along a trajectory. In some embodiments, the trajectory comprises translating in a back and forth motion (e.g., like a pendulum). In some embodiments, transforming comprises forming a melt pool. In some embodiments, using the second energy beam to densify the at least the first portion of the first porous layer comprises forming a melt pool having an aspect ratio. In some embodiments, the aspect ratio is a ratio of a depth of the melt pool to a width (e.g., diameter) of an exposed surface of the melt pool in at least one vertical cross section. In some embodiments, the aspect ratio is a ratio of a depth of the melt pool to a melt pool width at an exposed surface of at least one vertical cross section of the melt pool. In some embodiments, the melt pool has a low aspect ratio. In some embodiments, a low aspect ratio is when the depth of the melt pool is shorter than a width (e.g., diameter) of an exposed surface of the melt pool in at least one vertical cross section. In some embodiments, the melt pool has a high aspect ratio, wherein the depth of the melt pool is larger than a width of the exposed surface of the melt pool in at least one vertical cross section of the melt pool. In some embodiments, the melt pool is hemispherical or substantially hemispherical, wherein the depth of the melt pool is equal or substantially equal to half of the width (e.g., a radius) of an exposed surface of the melt pool in at least one vertical cross section of the melt pool. In some embodiments, forming the melt pool includes using the second energy beam to irradiate in one or more welding modes that comprise a conduction, transition keyhole, penetration keyhole, or drilling. In some embodiments, the method further comprises after operation (b): (i) providing a second layer of pre-transformed material above a platform and (ii) using an energy beam to transform at least a portion of the second layer of pre-transformed material to form a second, porous layer comprising a first portion of the second porous layer and an optional second portion of the second porous layer. In some embodiments, the method further comprises before operation (c): (i) providing a second layer of pre-transformed material above a platform and (ii) using an energy beam to transform at least a portion of the second layer of pre-transformed material to form a second porous layer comprising a first portion of the second porous layer and an optional second portion of the second porous layer. In some embodiments, the method further comprises using the second energy beam to densify the first portion of the second porous layer to form a second layer of denser material as compared to the first portion of the second porous layer, as a part of the three-dimensional object, wherein the optional second portion of the second porous layer is not at least a portion of a scaffold that engulfs the three-dimensional object. In some embodiments, in operation (c) the second energy beam densifies the first portion of the first porous layer and the first portion of the second porous layer to form a first layer of denser material and a second layer of denser material, and wherein the first layer of denser material and the second layer of denser material are the same layer. In some embodiments, the first layer of denser material is different from the second layer of denser material. In some embodiments, operation (b) is after operation (c). In some embodiments, the second porous layer has a porosity of at least 40%. In some embodiments, the second porous layer has a porosity of at least 60%. In some embodiments, the second porous layer has a porosity of at least 20%. In some embodiments, a surface of the second layer of denser material has an arithmetic average of a roughness profile (Ra) of at most 200 micrometers. In some embodiments, the second layer of denser material has an average radius of curvature of at least five centimeters. In some embodiments, the second layer of denser material has an average radius of curvature of at least 50 centimeters. In some embodiments, the second layer of denser material has an average radius of curvature of at least one meter. In some embodiments, the second porous layer comprises one or more pores. In some embodiments, the one or more pores comprises a pore structure. In some embodiments, the pore structure comprises pores distributed in a non-uniform manner across the second porous layer. In some embodiments, the pore structure comprises pores distributed in a uniform or substantially uniform manner across the second porous layer. In some embodiments, the first layer of pre-transformed material is sandwiched between the first porous layer and the second porous layer. In some embodiments, a porosity of the first porous layer is different than a porosity of the second porous layer. In some embodiments, a porosity of the first porous layer is same as a porosity of the second porous layer. In some embodiments, the first energy beam is a type-2 energy beam (e.g., as disclosed herein). In some embodiments, the first energy beam is a type-1 energy beam (e.g., as disclosed herein). In some embodiments, the type-2 energy beam is substantially stationary. In some embodiments, the type-1 energy beam is translating. In some embodiments, the first portion of the first porous layer and the first portion of the second porous layer are densified using the same energy beam. In some embodiments, the first portion of the first porous layer and the first portion of the second porous layer are densified using different energy beams. In some embodiments, the first energy beam used to density the first portion of the first porous layer has at least one characteristic that is different than a characteristic of the second energy beam used to densify the second porous layer.

In another aspect, a system for printing at least one three-dimensional object comprises: an enclosure that is configured to accommodate a material bed that comprises a pre-transformed material; a first energy source that is configured to generate a first energy beam that transforms a portion of the pre-transformed material to form a part of the at least one three-dimensional object; a second energy source that is configured to generate a second energy beam that transforms a portion of the pre-transformed material to form a part of the at least one three-dimensional object; and at least one controller that is configured to direct the first energy beam and time second energy beam, which at least one controller is collectively or separately programmed to direct performance of the following operations: operation (i) direct the first energy beam to transform the portion of the pre-transformed material to form a porous layer comprising a first portion and an optional second portion, and operation (ii) direct the second energy beam to transform and thereby densify the first portion of the porous layer to form a denser layer, wherein the optional second portion does not engulf the first portion.

In some embodiments, time first energy beam and/or second energy beam comprises an electromagnetic or charged particle beam. In some embodiments, the first energy beam comprises a laser beam. In some embodiments, the porous layer is a first porous layer, wherein the at least one controller is programmed to perform the following operations after operation (ii): operation (I) direct providing a second layer of pre-transformed material above a platform and (II) direct the first energy beam to transform at least a portion of the second layer of pre-transformed material to form a second porous layer comprising a first portion of the second porous layer and an optional second portion of the second porous layer. In some embodiments, the porous layer is a first porous layer, wherein the at least one controller is programmed to perform the following operations before operation (ii): operation (I) direct providing a second layer of pre-transformed material above a platform and (II) direct the first energy beam to transform at least a portion of the second layer of pre-transformed material to form a second porous layer comprising a first portion of the second porous layer and an optional second portion of the second porous layer. In some embodiments, the at least one controller is programmed to direct the second energy beam to densify the first portion of the second porous layer to form a second denser layer as compared to the first portion of the second porous layer, which second denser layer forms a part of the at least one three-dimensional object, wherein the second portion of the second porous layer is not at least a portion of a scaffold that engulfs the at least one three-dimensional object. In some embodiments, time at least one controller is programmed to perform the following operations in operation (ii): direct the second energy beam to densify the first portion of the first porous layer when densifying the first portion of the second porous layer to form the first denser layer, and wherein the first denser layer and the second denser layer are the same. In some embodiments, the first denser layer is different from the second denser layer. In some embodiments, after operation (i) is after operation (ii).

In another aspect, an apparatus for three-dimensional printing of at least one three-dimensional object comprises at least one controller that is programmed to perform the following operations: operation (a) provide pre-transformed material to form a material bed, operation (b) direct a first energy beam to transform a portion of material bed to form a porous layer that comprises a first portion and an optional second portion, wherein the first energy beam is operatively coupled to the material bed; and operation (c) direct a second energy beam, to dens a first portion of the porous layer to form a layer of denser material as a part of the at least one three-dimensional object.

In some embodiments, the at least one controller is a multiplicity of controllers and wherein at least two of operation (a), operation (b), and operation (c) are directed by the same controller. In some embodiments, the at least one controller is a multiplicity of controllers and wherein at least two of operation (a), operation (b), and operation (c) are directed by different controllers.

in another aspect, a computer software product for three-dimensional printing of at least one three-dimensional object, comprises a non-transitory computer-readable medium in which program instructions are stored, which instructions, when read by a computer, cause the computer to perform operations comprising: operation (a) direct providing a pre-transformed material to form a material bed; operation (b) directing a first energy beam to transform a portion of the pre-transformed material to form a porous layer comprising a first portion and an optional second portion, wherein the first energy beam is operatively coupled to the material bed; and operation (c) directing a second energy beam, to densify the first portion of the porous layer to form a layer of denser material as a part of the at least one three-dimensional object.

In another aspect, printing a three-dimensional object comprises: (a) transforming a first pre-transformed material to a first transformed material to print one or more layers of hardened material as part of the three-dimensional object that is printed layerwise, which one or more layers define a layering plane indicative (e.g., characteristic, or typical) of the layerwise printing of the three-dimensional object; (b) transforming a second pre-transformed material to a second transformed material to print at least a portion of an overhang of the three-dimensional object, wherein a vector normal to a surface at a point on an exterior surface of the overhang that intersects (i) the layering plane or (ii) a plane parallel to the layering plane, forms an angle with respect to the layering plane, which second transformed material comprises a porous matrix; and (c) using an energy beam to densify the second transformed material.

In some embodiments, the one or more layers defines a Z vector indicative (e.g., characteristic, or typical) of a direction of the layerwise printing of the three-dimensional object. In some embodiments, the Z vector is perpendicular to the layering plane. In some embodiments, the angle is at least about sixty degrees and at most about ninety degrees with respect to (i) the layering plane that intersects the vector or to (ii) the plane parallel to the layering plane that intersects the vector, which vector is directed towards (e.g., into) the second transformed material. In some embodiments, the angle is at least about seventy degrees and at most about ninety degrees with respect to (i) the layering plane that intersects the vector or to (ii) the plane parallel to the layering plane that intersects the vector, which vector is directed towards the second transformed material. In some embodiments, the non-perpendicular angle is at least about eighty degrees and at most about ninety degrees with respect to (i) the layering plane that intersects the vector or to (ii) the plane parallel to the layering plane that intersects the vector, which vector is directed towards the second transformed material. In some embodiments, using the energy beam to densify comprises altering a microstructure of the first transformed material to form the second transformed material. In some embodiments, the porous matrix comprises at least one pore. In some embodiments, (c) comprises forming a high aspect ratio melt pool. In some embodiments, a depth of the high aspect ratio melt pool is greater than a radius of an exposed surface of the high aspect ratio melt pool. In some embodiments, the depth is at least twice the radius of the exposed surface of the high aspect ratio melt pool. In some embodiments, (c) comprises reducing a volume percentage and/or an area percentage porosity of the second transformed material by at least about one order of magnitude. In some embodiments. (c) comprises reducing an area percentage porosity of the second transformed material by at least about one order of magnitude. In some embodiments, the second transformed material comprises a plurality of layers. In some embodiments, (c) comprises transforming at least a fraction of each of the plurality of layers. In some embodiments, (c) comprises using a welding process. In some embodiments, the welding process comprises (e.g., completely) melting at least a fraction of the second transformed material. In some embodiments, the second transformed material corresponds to at least a portion of a skin of the three-dimensional object. In some embodiments, the skin is a bottom skin of the overhang. In some embodiments, the bottom skin has an area surface roughness (Sa) of at most about 100 micrometers. In some embodiments, the bottom skin has an area surface roughness (Sa) of at most about 50 micrometers. In some embodiments, the porous matrix in (b) forms a bottom skin of the overhang. In some embodiments, densification in (c) comprises directing the energy beam in accordance with a path along or parallel to an edge of the first transformed material. In some embodiments, the energy beam in (c) is a second energy beam. In some embodiments, (b) comprises generating a first energy beam from a first energy source. In some embodiments, (c) comprises generating the second energy beam from a second energy source. In some embodiments, the first energy source is the same as the second energy source. In some embodiments, the first energy source is different than the second energy source. In some embodiments, the energy beam in (c) is a third energy beam, wherein the method further comprises using a first energy beam to transform the first pre-transformed material in (a), using a second energy beam to transform the second pre-transformed material in (b), and wherein (i) the first energy beam, the second energy beam, and/or the third energy beam follow a hatching propagation scheme. In some embodiments, the hatching propagation scheme comprises transforming while translating along a path. In some embodiments, the energy beam in (c) is a third energy beam, wherein the method further comprises using a first energy beam to transform the first pre-transformed material in (a), using a second energy beam to transform the second pre-transformed, material in (b), and wherein (i) the first energy beam, the second energy beam, and/or the third energy beam follow a tiling propagation scheme. In some embodiments, the tiling propagation scheme comprises (I) transforming while being stationary or substantially stationary (e.g., about a, first point along a path) followed, by (II) propagating along the path to a second point without transforming and (III) repeating (I) and (II) until reaching an end of the path. In some embodiments, substantially stationary comprises a movement (e.g., that does not exceed a fundamental length scale of a footprint of the energy beam on the second pre-transformed material). The substantially stationary movement may be about a point in a pendulum and/or in a circular motion. In some embodiments, the tiling propagation scheme comprises: (i) transforming the first pre-transformed material to the first transformed material at a first position on a target surface using the energy beam during a first time period to form a first tile, which first position is along a path-of-tiles, wherein during the first time period, the energy beam is stationary or substantially stationary (e.g., such that it at most undergoes a pendulum and/or a circular movement about the first position); (ii) translating the energy beam to a second position on the target surface along the path-of-tiles, which second position is different from the first position, wherein the energy beam is translated during an intermission without transforming the pre-transformed material along the path-of-tiles; and (iii) using the energy beam during a second time period to form a second tile along the path-of-tiles, wherein during the second time period, the energy beam is stationary or substantially stationary (e.g., such that it at most undergoes the pendulum and/or the circular movement about the second position). In some embodiments, the energy beam in (c) is a tiling energy beam. In some embodiments, a spot size of a hatching energy beam is smaller than a spot size of the tiling energy beam. In some embodiments, (c) comprises forming a plurality of tiles. In some embodiments, each tile is formed by directing the energy beam at the second pre-transformed material for a dwell time of at least about 0.1 milliseconds. In some, embodiments, the dwell time is at least about 10 milliseconds. In some embodiments, the energy beam is substantially stationary during the dwell time. In some embodiments, substantially stationary comprises a movement that does not exceed a fundamental length scale of a footprint of the energy beam on the second pre-transformed material. The substantially stationary movement may be about a point in a pendulum and/or in a circular motion. In some embodiments, (c) comprises forming a plurality of tiles by: (i) transforming the first pre-transformed material to the first transformed material at a first position on a target surface using the energy beam during a first time period to form a first tile, which first position is along a path-of-tiles, wherein during the first time period, the energy beam is stationary or substantially stationary (e.g., such that it at most undergoes a pendulum and/or a circular movement about the first position); (ii) translating the energy beam to a second position on the target surface along the path-of-tiles, which second position is different from the first position, wherein the energy beam is translated during an intermission without transforming the first pre-transformed material along the path-of-tiles; and (iii) using the energy beam during a second time period to form a second tile along the path-of-tiles, wherein during the second time period, the energy beam is stationary or substantially stationary (e.g., such that it at most undergoes the pendulum and/or the circular movement about the second position). In some embodiments, forming the plurality of tiles comprises moving the energy beam on the second pre-transformed material in accordance with a path to form a path of tiles. In some embodiments. (b) comprises forming a plurality of layers of the porous matrix. In some embodiments, the energy beam in (c) is a second energy beam. In some embodiments, forming the plurality of layers of the porous matrix comprises using a first energy beam. In some embodiments, the energy beam in (c) is a third energy beam. In some embodiments, (v) comprises forming a first of the plurality of layers of the porous matrix comprises using a first energy beam and forming a second of the plurality of layers of the porous matrix using a second energy beam. In some embodiments, a power density of the first energy beam differs that a power density of the second energy beam. In some, embodiments. (c) comprises transforming a plurality of layers of the porous matrix. In some embodiments, (c) comprises transforming a plurality of layers of the porous matrix and one or more intervening layers of pre-transformed material. In some embodiments, the transforming in (a) is with a first energy beam, the transforming in (b) is with a second energy beam, and the transforming in (c) is with a third energy beam. In some embodiments, at least two of the first energy beam, the second energy beam, and the third energy beam are generated with the same energy source. In some embodiments, the transforming in (a) is with a first energy beam, the transforming in (b) is with a second energy beam, the transforming in (c) is with a third energy beam, wherein at least two of the first energy beam, the second energy beam, and the third energy beam are generated with different energy sources. In some embodiments, the transforming in (a) is with a first energy beam, the transforming in (b) is with a second energy beam, the transforming in (c) is with a third energy beam, wherein at least two of the first energy beam, the second energy beam, and the third energy beam have at least one energy beam characteristic that is the same. In some embodiments, the transforming in (a) is with a first energy beam, the transforming in (b) is with a second energy beam, the transforming in (c) is with a third energy beam, wherein at least two of the first energy beam, the second energy beam, and the third energy beam have at least one different energy beam characteristic. In some embodiments, the at least one different energy beam characteristic comprises wavelength, cross-section, speed, power density, or focal point. In some embodiments, the second transformed material has a horizontally non-overlapping portion with respect to the first transformed material.

In another aspect, printing a three-dimensional object comprises one or more controllers that are individually or collectively programmed to: (a) direct transforming a first pre-transformed material to a first transformed material to print one or more layers of hardened material as part of the three-dimensional object that is printed layerwise, which one or more layers define a layering plane indicative (e.g., characteristic, or typical) of a layerwise printing of the three-dimensional object; (b) direct transforming a second pre-transformed material to a second transformed material to print at least a portion of an overhang of the three-dimensional object, wherein a vector normal to a surface at a point on an exterior surface of the overhang that intersects (i) the layering plane that or (ii) a plane parallel to the layering plane, forms an angle with respect to the layering plane, which second transformed material comprises a porous matrix; and (c) direct an energy beam to densify the second transformed material.

In some embodiments, at least two of (a), (b) and (c) are directed by the same controller of the one or more controllers. In some embodiments, at least two of (a), (b) and (c) are directed by different controllers of the one or more contracts. In some embodiments, the one or more controllers is programed to direct: (I) a first energy source to generate a first energy beam for transforming in (b), and (II) a second energy source to generate a second energy beam for densifying in (c). In some embodiments, the first and second energy sources are the same. In some embodiments, the first and second energy sources are different. In some embodiments, the one or more controllers controls at least one characteristic of the energy beam or of an energy source that generates the energy beam. In some embodiments, the energy beam is a second energy beam. In some embodiments, direct transforming the second pre-transformed material in (b) is by directing a first energy beam to transform the second pre-transformed material. In some embodiments, the energy beam is a third energy beam. In some embodiments, direct transforming the first pre-transformed material in (a) is by directing a first energy beam to transform the first pre-transformed material. In some embodiments, direct transforming the second pre-transformed material in (b) is by directing a second energy beam to transform the second pre-transformed material. In some embodiments, at least two of the first energy beam, the second energy beam and the third energy beam are the same. In some embodiments, at least two of the first energy beam, the second energy beam and the third energy beam are different energy beams. In some embodiments, the one or more controllers further directs: a first energy source to generate the first energy beam, a second energy source to generate the second energy beam, a third energy source to generate the third energy beam. In some embodiments, at least two of the first energy source, the second energy source and the third energy source are different energy sources. In some embodiments, at least two of the first energy source, the second energy source and the third energy source is the same energy source. In some embodiments, at least two of the first energy beam, the second energy beam and the third energy beam are different energy beams. In some embodiments, the one or more controllers controls at least one characteristic of the first energy beam and/or the second energy beam at least partially based on data from one or more sensors. In some embodiments, the one or more sensors collect temperature, optical, or spectroscopic data. In some embodiments, the one or more sensors detect electromagnetic radiation that is emitted and/or reflected from an exposed surface of one or more melt pools formed during transformation in (a), (b) and/or (c). In some embodiments, the energy beam in (c) is a second energy beam. In some embodiments. (b) comprises using a first energy beam, wherein (b) and/or (c) comprise forming a bottom skin of the overhang. In some embodiments, the one or more controllers controls at least one characteristic of the first energy beam and/or the second energy beam at least partially based on monitoring a plastic yielding of the bottom skin during printing. In some embodiments, the one or more controllers include a control scheme comprising feedback, or closed loop. In some embodiments, the one or more controllers include a control scheme comprising feedforward or open loop control. In some embodiments, the one or more controllers is programmed to direct forming a high aspect ratio melt pool during (c). In some embodiments, a depth of the high aspect ratio melt pool is greater than a width of the high aspect ratio melt pool. In some embodiments, the second transformed material comprises a plurality of layers. In some embodiments, the one or more controllers is programmed to direct transforming at least a fraction of each of the plurality of layers during densification in (c). In some embodiments, the first transformed material comprises an edge. In some embodiments, the one or more controllers is programmed to direct the energy beam in accordance with a path along the edge or parallel to the edge (e.g., and away from the first transformed material). In some embodiments, the one or more controllers is programmed to direct the energy beam to propagate via a hatching propagation scheme. In some embodiments, the hatching propagation scheme comprises continuous irradiation during propagation of the energy along a path to perform a transformation. In some embodiments, the one or more controllers is programmed to (i) direct the first energy beam, the second energy beam and/or the third energy beam to propagate via tiling propagation scheme. In some embodiments, tiling comprises (1) irradiating a first position along a path with a stationary or substantially stationary energy beam to perform a first transformation directly followed by (2) propagation along the path without transformation, directly followed by (3) repeating (1) and (2) until reaching an end of the path. In some embodiments, substantially stationary is a pendulum and/or rotational movement about a point along the path. In some embodiments, the movement is of a length scale of at most a cross section and/or an irradiation spot of the energy beam. In some embodiments, the one or more controllers is programmed to direct using a hatching energy beam during (b) and a tiling energy beam during (c). In some embodiments, a spot size anchor a cross section of the hatching energy beam is smaller than a spot size and/or a cross section of the tiling energy beam respectively. In some embodiments, the one or more controllers is programmed to direct forming a plurality of tiles during (c). In some embodiments, each tile is formed by directing the energy beam at the second pre-transformed material for a dwell time of at least about 0.3 milliseconds. In some embodiments, the dwell time is at least about 10 milliseconds. In some embodiments, the energy beam is substantially stationary during the dwell time. In some embodiments, substantially stationary comprises movement about a point that does not exceed a fundamental length scale of a footprint of the energy beam on the second pre-transformed material. In some embodiments, the one or more controllers is programmed to direct moving the energy beam to different locations of the second pre-transformed material in accordance with a path. In some embodiments, the one or more controllers is programmed to direct forming a plurality of layers of the porous matrix during (b). In some embodiments, (b) comprises directing the energy beam to transform the second pre-transformed material to the second transformed material. In some embodiments, the one or more controllers that is programed to direct adjusting one or more characteristics of the energy beam before and/or daring (c). In some embodiments, the one or more characteristics of the energy beam is adjusted to accomplish a different solidification rate during (c) as compared to during (b). In some embodiments, the one or more controllers is programmed to direct (b) such that the second transformed material has a horizontally non-overlapping portion with respect to the first transformed material.

In another aspect, a method of printing a three-dimensional object comprises: (a) providing a material bed that comprises a pre-transformed material and a first hard material that is a first segment of the three-dimensional object; (b) using a first energy beam to transform a portion of the pre-transformed material to a form a porous layer, wherein the porous layer is connected to the first hard material and has a horizontally non-overlapping portion with the first hard material, which first transformed material is formed anchorlessly within an enclosure; and (c) using a second energy beam to transform at least a portion of the porous layer to form a first denser layer that is connected to the first hard material to form at least a second segment of the three-dimensional object that includes the first segment.

In some embodiments, the first hard material is suspended anchorlessly in an enclosure during the printing. In some embodiments, the first hard material is anchored to the enclosure during the printing. In some embodiments, anchored is directly anchored to a base above which the material bed is disposed. In some embodiments, anchored comprises anchored through one or more auxiliary supports. In some embodiments, the horizontally non-overlapping portion forms at least a segment of an overhang or a cavity ceiling. In some embodiments, the overhang or the cavity ceiling form an angle with an exposed surface of the material bed and/or with a platform above which the material bed is disposed, wherein the angle is from zero to thirty degrees. In some embodiments, the angle is from zero to fifteen degrees. In some embodiments, the horizontally non-overlapping portion comprises a bottom skin surface that faces a platform above which the material bed is disposed. In some embodiments, the bottom skin surface has an arithmetic average of a roughness profile of at most 200 micrometers. In some embodiments, the first denser layer has an average radius of curvature of at least five centimeters. In some embodiments, the first denser layer has an average radius of curvature of at least 50 centimeters. In some embodiments, the first denser layer has an average radius of curvature of at least one meter. In some embodiments, the method further comprises (i) providing a layer of pre-transformed material adjacent to the first denser layer, (ii) using the first energy beam to transform a portion of the layer of pre-transformed material to form a second porous layer, wherein the second porous layer is connected to the first denser layer, and (iii) using the second energy beam to densify at least a portion of the second porous layer to form a second denser layer as a part of the three-dimensional object. In some embodiments, the first energy beam is a type-2 energy beam. In some embodiments, the first hard material is a rigid portion of the three-dimensional object. In some embodiments, after its formation, the rigid portion experiences insignificant deformation at least during the printing. In some embodiments, after its formation, the rigid portion is resistant or substantially resistant to deformation at least during the printing. In some embodiments, after its formation, the rigid portion is resistant or substantially resistant to deformation, wherein the deformation comprises stress. In some embodiments, after its formation, the rigid portion does form significant defects at least during the printing. In some embodiments, the defects comprise structural defects. In some embodiments, the defects comprise a crack, ball, droop, or dislocation.

In another aspect, a system for printing at least one three-dimensional object comprises: an enclosure that is configured to accommodate a material bed that comprises a pre-transformed material and a hard material that is a first segment of the at least one three-dimensional object; an energy source that is configured to generate an energy beam that transforms a portion of the pre-transformed material to a form a second segment of the at least one three-dimensional object, wherein the energy beam is operatively coupled to the enclosure; and at least one controller that is configured to direct the energy beam, which the at least one controller is collectively or separately programmed to perform the following operations: (i) direct the energy beam to transform a portion of the pre-transformed material to a form a first porous layer, wherein the first porous layer is connected to the hard material and has a horizontally non-overlapping portion with the hard material, which first transformed material is formed anchorlessly within the enclosure, and operation (ii) direct the energy beam to transform the first porous layer to form a first denser layer that is connected to the hard material to form at least a second segment of the at least one three-dimensional object that includes the first segment.

In some embodiments, the energy beam in operation (i) and in operation (ii) differ by a least one energy beam characteristic. In some embodiments, the energy beam in operation (i) and in operation (ii) differ by a least one energy beam characteristic comprising a velocity, a cross section, a power density, a fluence, a duty cycle, a dwell time, a focus, or a delay time. In some embodiments, the energy beam in operation (i) is configured to emit radiation having a smaller cross section as compared to its configuration in operation (ii). In some embodiments, the energy beam in operation (i) is configured to irradiate at a higher power density as compared to its configuration in operation (ii). In some embodiments, the energy beam in operation (i) is configured to irradiate at a shorter dwell time at a position as compared to its configuration in operation (ii). In some embodiments, the energy beam in operation (i) is configured to continuously move, whereas energy beam in operation (ii) is configured to be stationary and move interchangeably. In some embodiments, the energy beam in operation (i) is configured to be focused, whereas the energy beam in operation (ii) is configured to be de-focused. In some embodiments, the energy beam is a type-2 energy beam that comprises (i) a cross section that is at least 200 micrometers, or (ii) a power density of at most 8000 Watts per millimeter square. In some embodiments, the energy beam is a type-1 energy beam that comprises (i) a cross section that is smaller than 200 micrometers, or (ii) a power density larger than 8000 Watts per millimeter square. In some embodiments, the at least one controller is further programmed to perform the following operations: operation (I) provide a layer of pre-transformed material adjacent to the first denser layer, operation (II) direct the energy beam to transform a portion of the layer of pre-transformed material to form a second porous layer, wherein the second porous layer is connected to the first denser layer, and operation (III) direct the energy beam to densify at least a portion of the second porous layer to form a second dense layer portion as a part of the at least one three-dimensional object. In some embodiments, the energy beam in operation (I) and in operation (II) differ by at least one energy beam characteristic. In some embodiments, the at least one energy beam characteristic comprises a velocity, a cross section, a power density, a fluence, a duty cycle, a dwell time, a focus, a delay time, a continuity of movement. In some embodiments, the energy beam in operation (I) is configured to emit radiation having a smaller cross section as compared to its configuration in operation (II). In some embodiments, the energy beam in operation (I) is configured to irradiate at a higher power density as compared to its configuration in operation (H). In some embodiments, the energy beam in operation (I) is configured to irradiate at a shorter dwell time at a position as compared to its configuration in operation (II). In some embodiments, the energy beam in operation (I) is configured to continuously move, whereas energy beam in operation (II) is configured to be stationary and move interchangeably. In some embodiments, the energy beam in operation (I) is configured to be focused, whereas the energy beam in operation (H) is configured to be de-focused. In some embodiments, the energy beam is a type-2 energy beam that comprises (I) a cross section that is at least 200 micrometers, or (II) a power density of at most 8000 Watts per millimeter square. In some embodiments, the energy beam is a type-1 energy beam that comprises (I) a cross section that is smaller than 200 micrometers, or (II) a power density larger than 8000 Watts per millimeter square.

In another aspect, an apparatus for three-dimensional printing of at least one three-dimensional object comprises at least one controller that is programmed to direct performance of the following operations: operation (a) provide a material bed that comprises a pre-transformed material and a first hardened material that is a first segment of the at least one three-dimensional object; operation (b) direct an energy beam to transform a portion of the pre-transformed material to a form a porous layer, wherein the porous layer is connected to the first hardened material and has a horizontally non-overlapping portion with the first hardened material, which first transformed material is formed anchorlessly within an enclosure, wherein the energy beam is operatively coupled to the material bed; and operation (c) direct the energy beam to transform at least a portion of the porous layer to form a first denser layer portion that is connected to the first hardened material to form at least a second segment of the at least one three-dimensional object that includes the first segment.

In some embodiments, the at least one controller is a multiplicity of controllers and wherein at least two of operation (a), operation (b), and operation (c) are directed by the same controller. In some embodiments, the at least one controller is a multiplicity of controllers and wherein at least two of operation (a), operation (b), and operation (c) are directed by different controllers.

In another aspect, a computer software product for three-dimensional printing of at least one three-dimensional object, comprises a non-transitory computer-readable medium in which program instructions are stored, which instructions, when read by a computer, cause the computer to perform operations comprising: operation (a) directing to provide a material bed that comprises a pre-transformed material and a first hardened material that is a first segment of the at least one three-dimensional object; operation (b) directing an energy beam to transform a portion of the pre-transformed material to a form a porous layer, wherein the porous layer is connected to the first hardened material and has a horizontally non-overlapping portion with the first hardened material, which first transformed material is formed anchorlessly within an enclosure, wherein the energy beam is operatively coupled to the material bed; and operation (c) directing the energy beam to transform at least a portion of the porous layer to form a first denser layer portion that is connected to the hardened material to form at least a second segment of the at least one three-dimensional object that includes the first segment.

In another aspect, forming a three-dimensional object comprises: (a) providing a layer of pre-transformed material on an exposed surface of a material bed that comprises a hard portion that is a segment of the three-dimensional object, which hard portion comprises an edge; and (b) forming a ledge of hardened material along the edge, which forming the ledge comprises: (1) transforming the at least the portion of the layer of pre-transformed material to a transformed material at a position using an energy beam chiming a time period to form a tile, which first position is along a path-of-tiles, wherein during the time period the energy beam is stationary or substantially stationary (e.g., such that it at most undergoes pendulum and/or circular movement about the position on the exposed surface); (2) translating the energy beam to a second position along the path-of-tiles, which second position is different from the first position, wherein the energy beam is translated during an intermission without transforming the pre-transformed material along the path-of-tiles; and (3) repeating (1) and (2) until reaching an end of the path-of-tiles that is parallel to or at the edge, wherein the tile overlaps the hard portion and extends beyond the edge towards the pre-transformed material of the material bed to form the ledge.

In some embodiments, transforming is by using an energy beam that has a power density of at most about 8000 Watts per millimeter squared (W/mm2) at the material bed. In some embodiments, the tile is a deposited transformed material. In some embodiments, the edge is a first edge, and the ledge forms a second edge. In some embodiments, the method further comprises repeating providing the layer of pre-transformed material on the exposed surface of the material bed and transforming the at least the portion of the layer of pre-transformed material in (b) to elongate the ledge. In some embodiments, the method further comprises transforming at least a fraction of the ledge using a high aspect ratio energy beam. In some embodiments, high aspect ratio energy beam forms a melt pool having a greater depth than width. In some embodiments, a depth of the melt pool is greater than a thickness of the tile. In some embodiments, the high aspect ratio energy beam transforms more than two layers of tiles. In some embodiments, transforming at least the fraction of the ledge comprises re-melting at least the fraction of the ledge. In some embodiments, transforming at least the fraction of the ledge reduces a porosity of the ledge. In some embodiments, repeating (1) and (2) results in forming a plurality of tiles. In some embodiments, a first tile and a second tile of the plurality of tiles overlap with each other. In some embodiments, the second tile is successive to the first tile. In some embodiments, (b) comprises forming a first layer of tiles, wherein the method further comprises: forming a second layer of tiles. In some embodiments, centers of adjacent tiles of the plurality of tiles in the first layer are spaced apart by a first distance. In some embodiments, centers of adjacent tiles of the plurality of tiles in the second layer are spaced apart by a second distance. In some embodiments, the first distance is different than the second distance. In some embodiments, the first distance is the same as the second distance. In some embodiments, the first and/or second distance ranges between about 10 micrometers and about 500 micrometers. In some embodiments, (b) comprises forming a bottom skin of the three-dimensional object. In some embodiments, an exterior surface of the bottom skin has an area surface roughness (Sa) of at most about 20 micrometers. In some embodiments, the hard portion is formed by transforming at least a first portion of pre-transformed material to a first transformed material that hardens at a first solidification rate. In some embodiments, forming the ledge of hardened material in (b) is formed by transforming at least a second portion of pre-transformed material to a second transformed material that hardens at a second solidification rate different than the first solidification rate. In some embodiments, an exterior surface of the bottom skin has an area surface roughness (Sa) of at most about 10 micrometers. In some embodiments, the hard portion comprises a plurality of layers that are stacked layerwise to form the hard portion, a layer of the plurality of layers defines a layering plane. In some embodiments, a stacking vector corresponds to a stacking direction of the plurality of layers. In some embodiments, stacking vector is normal to the layering plane. In some embodiments, a ledge vector is normal to a surface at a point on an exterior surface of the ledge and is in a direction of an interior of the ledge. In some embodiments, the ledge vector has a positive projection onto the stacking vector, wherein the stacking direction of the plurality of layers is indicative from (1) any directional melt pool that is included in the plurality of layers, (2) a direction opposite from any auxiliary supports or auxiliary support marks, (3) a direction of a surface comprising hatch decomposition marking, (4) any asymmetric surface roughness indicative of print orientation, or (5) any directionality in grain orientation. In some embodiments, the ledge vector forms an angle with the stacking vector that is at most about forty-five degrees, and at least about zero degrees. In some embodiments, the ledge vector forms an angle with the stacking vector that is at most about thirty degrees, and at least about zero degrees. In some embodiments, the ledge vector forms an angle with the stacking vector that is at most about ten degrees, and at least about zero degrees.

In another aspect, printing a three-dimensional object comprises one or more controllers that is programmed to: (a) direct a layer dispenser to provide a layer of pre-transformed material on an exposed surface of a material bed comprising a hard portion that is a segment of the three-dimensional object, which hard portion comprises an edge; and (b) direct forming a ledge of hardened material along the edge, which direct forming the ledge comprises: (1) direct transforming the at least the portion of the layer of first pre-transformed material to a first transformed material at a first position by directing an energy beam during a first time period to form a first tile, which first position is along a path-of-tiles, wherein during the first time period, the energy beam is stationary or substantially stationary (e.g., such that it at most undergoes pendulum and/or circular movement about the first position on the exposed surface); (2) direct translating the energy beam to a second position along the path-of-tiles, which second position is different from the first position, wherein the energy beam is translated during an intermission without transforming the pre-transformed material along the path-of-tiles; and (3) direct repeating (1) and (2) until reaching an end of the path-of-tiles, wherein the path-of-tiles is parallel to the edge or at the edge, wherein the first tile and the second tile overlap the hard portion and extend beyond the edge towards the pre-transformed material of the material bed to form the ledge.

In some embodiments, the hard portion comprises a plurality of layers that defines a layering plane. In some embodiments, a vector normal to an exterior surface of the ledge that directs into the object that intersects (i) the layering plane or (ii) a plane parallel to the layering plane, forms an angle with respect to the layering plane. In some embodiments, the angle is at least sixty degrees and at most ninety degrees. In some embodiments, the vector is directed towards the ledge. In some embodiments, the one or more controllers controls at least one characteristic of the energy beam or of an energy source that generates the energy beam. In some embodiments, the one or more controllers at least partially consider data from one or more sensors. In some embodiments, the data comprises temperature, optical and/or spectroscopic data. In some embodiments, the one or more controllers at least partially consider a detection of electromagnetic radiation that is emitted and/or reflected from an exposed surface of one or more melt pools formed during forming the ledge. In some embodiments, controlling considers a monitoring of a plastic yielding of a bottom skin formed during forming the ledge. In some embodiments, the controlling considers a threshold value associated with (I) a temperature at the first and/or second position, (II) a power density of the energy beam at the exposed, surface of the material bed, (III) a power of an energy source generating the energy beam, or (IV) any combination of (I), (II) or (III). In some embodiments, the one or more controllers directs feedback or closed loop control. In some embodiments, the one or more controllers directs feed-forward or open loop control. In some embodiments, the one or more controllers directs real time control during (a), (b), (c) and/or (d). In some embodiments, the one or more controllers control at least one characteristic of the energy beam during formation of the ledge. In some embodiments, the at least one characteristic comprises irradiation time, intermission time, power density, speed, cross-section, focus, or power density profile over time. In some embodiments, the one or more controllers control a temperature of an exposed surface of a melt pool formed during formation of the ledge by controlling one or more characteristics of the energy beam, in some embodiments, the at least one characteristic comprises irradiation time, intermission time, power density, speed, cross-section, focus, or power density profile over time. In some embodiments, the one or more controllers controls a temperature of an exposed surface of a melt pool formed during formation of the ledge. In some embodiments, controlling the temperature comprises causing an energy source to alter a power density of the energy beam during at least a portion of forming the ledge. In some embodiments, controlling the temperature comprises causing an energy source to alter a scan speed of the energy beam during at least a portion of forming the ledge in (c). In some embodiments, the one or more controllers control a depth of a melt pool formed during forming the first and/or second tile formed daring formation of the ledge by controlling one or more characteristics of the energy beam. In some embodiments, the one or more controllers controls a depth of one or more melt pools formed daring forming the ledge in (c). In some embodiments, the one or more controllers is programmed to direct adjusting one or more characteristics of the energy beam before, during or after forming the ledge in (c). In some embodiments, the one or more characteristics of the energy beam is adjusted to accomplish a solidification rate during forming the ledge in (c) that is different than a solidification rate used to for the hard portion. In some embodiments, the one or more controllers is programmed to direct performance of an alternate method to (b), namely: direct using a hatching energy beam during forming the ledge in (c). In some embodiments, hatching comprises continuous irradiation of a target surface during movement of the first and/or second energy beam along a path. In some embodiments, the hard portion comprises a plurality of layers that are stacked layerwise to form the hard portion, a layer of the plurality of layers defines a layering plane. In some embodiments, a stacking vector corresponds to a stacking direction of the plurality of layers. In some embodiments, stacking vector is normal to the layering plane. In some embodiments, a ledge vector is normal to a surface at a point on an exterior surface of the ledge and is in a direction of an interior of the ledge. In some embodiments, the ledge vector has a positive projection onto the stacking vector, wherein the stacking direction of the plurality of layers is indicative from (1) any directional melt pool that is included in the plurality of layers, (2) a direction opposite from any auxiliary supports or auxiliary support marks, (3) a direction of a surface comprising hatch decomposition marking, (4) any asymmetric surface roughness indicative of print orientation, or (5) any directionality in grain orientation. In some embodiments, the ledge vector forms an angle with the stacking vector that is at most about forty-five degrees, and at least about zero degrees. In some embodiments, the ledge vector forms an angle with the stacking vector that is at most about thirty degrees, and at least about zero degrees.

In another aspect, a method of forming a three-dimensional object comprises: (a) providing a material bed comprising a pre-transformed material and a hard portion that is a segment of the three-dimensional object, wherein the material bed is disposed on a platform; (b) using a type-2 energy beam to transform at least a portion of the pre-transformed material to a form a first transformed material portion that (i) connects to the hard portion and. (ii) comprises a horizontally non-overlapping section with the hard portion, wherein the type-2 energy beam has a power density of at most 8000 Watts per millimeter squared (W/mm$^2$), (c) providing a layer of pre-transformed material adjacent to an exposed surface of the material bed; and using the type-2 energy beam to transform at least a portion of the layer of pre-transformed material to a form a second transformed material portion that (i) connects to the first transformed material portion and (ii) comprises a horizontally non-overlapping section with the first transformed material portion, wherein the first transformed material portion and the second transformed material portion form (I) an overhang or (II) a cavity ceiling, that form an angle of at most thirty (30) degrees with the exposed surface of the material bed and/or with the platform.

In some embodiments, the type-2 energy beam has a power density of at most about 8000 Watts per millimeter square. In some embodiments, the hard portion is suspended anchorlessly in the material bed during the printing. In some embodiments, the hard portion is anchored to the platform during the printing. In some embodiments, anchored is directly anchored to a base above which the material bed is disposed. In some embodiments, anchored comprises anchored through one or more auxiliary supports. In some embodiments, the horizontally non-overlapping section forms at least a segment of an overhang or a cavity ceiling. In some embodiments, the overhang or cavity ceiling form an angle with the exposed surface of the material bed and/or with the platform above which the material bed is disposed, wherein the angle is from zero to thirty degrees. In some embodiments, the angle is from ten to thirty degrees. In some embodiments, the horizontally non-overlapping section comprises a bottom skin surface that faces the platform above which the material bed is disposed. In some, embodiments, the bottom skin surface has an arithmetic average of a roughness profile of at most 200 micrometers. In some embodiments, the bottom skin surface has an arithmetic average of a roughness profile of at most 50 micrometers. In some embodiments, the method further comprises after operation (c), using an energy beam to transform a portion of the pre-transformed material to form a porous layer portion disposed at least in part above the first transformed material portion to form a part of the three-dimensional object, wherein the energy beam is the same or different from the type-2 energy beam. In some embodiments, the method further comprises using the energy beam to density the porous layer portion to form a denser portion as part of the three-dimensional object. In some embodiments, the denser portion, the porous layer portion, or the denser portion and the porous layer portion, connect to the first transformed material portion. In some embodiments, the first transformed material portion that is connected to the porous layer portion and/or the denser portion forms a thickened overhang structure. In some embodiments, adjacent comprises above. In some embodiments, adjacent comprises overlapping. In some embodiments, adjacent comprises bordering.

In another aspect, a system for printing at least one three-dimensional object comprises: an enclosure that is configured to accommodate a material bed that comprises a pre-transformed material and a hard portion that is a first segment of the at least one three-dimensional object, wherein the material bed is disposed on a platform, an energy source that is configured to generate a type-2 energy beam (e.g., as disclosed herein) that transforms a portion of the pre-transformed material to form a second segment of the at least one three-dimensional object, wherein the type-2 energy beam has a power density of at most 8000 Watts per millimeter squared (W/mm$^7$), wherein the type-2 energy beam is operatively coupled to the enclosure; and at least one controller that is operatively coupled to the type-2 energy beam, which the at least one controller is programmed to perform the following operations: operation (i) direct the type-2 energy beam to transform at least a portion of the pre-transformed material to a form a first transformed material portion that connects to the hard portion and comprises a horizontally non-overlapping section with the hard portion, operation (ii) direct providing a layer of pre-transformed material adjacent to an exposed surface of the material bed, and operation (iii) direct the type-2 energy beam to transform at least a portion of the layer of pre-transformed material to a form a second transformed material portion that connects to the first transformed material portion and comprises a horizontally non-overlapping section with the first transformed material portion, wherein the first transformed material portion and the second transformed material portion generate the second segment that comprises (I) an overhang or (II) a cavity ceiling, which second segment forms an angle of at most thirty (30) degrees with the exposed surface of the material bed and/or with the platform.

In some embodiments, the type-2 energy beam translates in a step and move mode, wherein in the step and move mode (e.g., tiling methodology as disclosed herein), the type-2 energy beam is stationary or substantially stationary. In some embodiments, the type-2 energy beam is a first type-2 energy beam, wherein the at least one controller is programmed to perform the following operations after (iii), operation (iv) direct a second type-2 energy beam to transform a portion of the pre-transformed material to form a porous layer portion disposed at least in part above the first transformed material portion as part of the at least one three-dimensional object, wherein the second type-2 energy beam is the same or different from the first type-2 energy beam. In some embodiments, the at least one controller is programmed to further perform the following operation: direct the first or second type-2 energy beam to densify the porous layer portion to form a denser portion as part of the at least one three-dimensional object. In some embodiments, the denser portion, the porous layer, or the denser portion and the porous layer portion, connect to the first transformed material portion. In some embodiments, the first transformed material portion that is connected to the porous layer and/or denser portion forms a thickened overhang structure. In some embodiments, the at least one controller is a multiplicity of controllers and wherein at least two of operation (i), operation (ii), and operation (iii) are directed by the same controller. In some embodiments, the at least one controller is a multiplicity of controllers and wherein at least two of operation (i), operation (ii), and operation (iii) are directed by different controllers.

In another aspect, an apparatus for three-dimensional printing of at least one three-dimensional object comprises at least one controller that is programmed to perform the following operations: operation (a) direct providing a material bed comprising a pre-transformed material and a hard portion that is a first segment of the at least one three-dimensional object, wherein the material bed is disposed on a platform, operation (b) direct a type-2 energy beam to transform at least a portion of the pre-transformed material to a form a first transformed material portion that (i) connects to the hard portion and (ii) comprises a horizontally non-overlapping section with the hard portion, (e.g., wherein the type-2 energy beam has a power density of at most 8000 Watts per millimeter squared (W/mm$^2$)) wherein the type-2 energy beam is operatively coupled to the material bed: operation (c) provide a layer of pre-transformed material adjacent to an exposed surface of the material bed: and operation (d) direct the type-2 energy beam to transform at least a portion of the layer of pre-transformed material to a form a second transformed material portion that (i) connects to the first transformed material portion and (ii) comprises a horizontally non-overlapping section with the first transformed material portion, wherein the first transformed material portion and the second transformed material portion form (I) an overhang or (II) a cavity ceiling, that forms an angle of at most thirty (30) degrees with the exposed surface of the material bed and/or with the platform.

In some embodiments, the at least one controller is a multiplicity of controllers and wherein at least two of operation (a), operation (b), operation (c), and operation (d) are directed by the same controller. In some embodiments, the at least one controller is a multiplicity of controllers and wherein at least two of operation (a), operation (b), operation (c), and operation (d) are directed by different controllers.

In another aspect, a computer software product for three-dimensional printing of at least one three-dimensional object, comprises a non-transitory computer-readable medium in which program instructions are stored, which instructions, when read by a computer, cause the computer to perform operations comprising: operation (a) providing a material bed comprising a pre-transformed material and a hard portion that is a first segment of the at least one three-dimensional object, wherein the material bed is disposed on a platform; operation (b) directing a type-2 energy beam to transform at least a portion of the pre-transformed material to a form a first transformed material portion that (i) connects to the hard portion and (ii) comprises a horizontally non-overlapping section with the hard portion, (e.g., wherein the type-2 energy beam has a power density of at most 8000 Watts per millimeter squared (W/mm$^2$)) wherein the type-2 energy beam is operatively coupled to the material bed; operation (c) providing a layer of pre-transformed material adjacent to an exposed surface of the material bed.; and operation (d) directing the type-2 energy beam to transform at least a portion of the layer of pre-transformed material to a form a second transformed material portion that (i) connects to the first transformed material portion and (ii) comprises a horizontally non-overlapping section with the first transformed material portion, wherein the first transformed material portion and the second transformed material portion form (I) an overhang or (II) a cavity ceiling, that form an angle of at most thirty (30) degrees with the exposed surface of the material bed and/or with the platform.

In another aspect, a three-dimensional object comprises: a plurality of layers of hard material stacked and bonded together to form a shape of the three-dimensional object, wherein a boundary between two of the plurality of layers defines a layering plane, which plurality of layers comprises: a first section comprising a first microstructure associated with being formed at a first solidification rate; and a second section comprising: (i) a second microstructure associated with being formed at a second solidification rate that is different from the first solidification rate, and (ii) an exterior surface corresponding to at least a fraction of an exterior surface of the three-dimensional object, wherein a vector normal to a point on the exterior surface of the second section that intersects (1) the layering plane or (2) a plane parallel to the layering plane, defines a non-perpendicular angle with respect to the layering plane.

In some embodiments, the plurality of layers defines a stacking vector indicative (e.g., characteristic, or typical) of a direction of layerwise printing of the three-dimensional object. In some embodiments, the vector normal to a surface at the point on the exterior surface of the second section that intersects the stacking vector defines a non-parallel angle with respect to the stacking vector. In some embodiments, the first section is characterized as comprising the first microstructure and wherein the second section is characterized as comprising the second microstructure. In some embodiments, the layering plane is perpendicular to the stacking vector. In some embodiments, a surface of the three-dimensional object includes a support mark region indicative of one or more auxiliary supports used to support the three-dimensional object during its printing. In some embodiments, the support mark region is characterized as having (I) an alteration on a surface of the support mark region, (II) a material variation within a volume of the support mark region, or (III) both (I) and (II). In some embodiments, the first and second sections are coupled with each other. In some embodiments, the first and second sections are (e.g., chemically (e.g., metallically)) bonded with each other. In some embodiments, the second solidification rate is slower than the first solidification rate. In some embodiments, the second solidification rate is faster than the first solidification rate. In some embodiments, the first solidification rate is associated with a first cooling rate. In some embodiments, the second solidification rate is associated with a second cooling rate different than the first cooling rate. In some embodiments, the first microstructure and the second microstructure each comprise a melt pool, or a grain structure. In some embodiments, the grain structure comprises a cell or a dendrite. In some embodiments, the grain structure comprises a crystal. In some embodiments, the grain structure comprises a metal microstructure. In some embodiments, the second section corresponds to a skin of the three-dimensional object. In some embodiments, the skin has a thickness ranging from about 20 micrometers to about 1000 micrometers. In some embodiments, the skin has a thickness ranging from about 20 micrometers to about 400 micrometers. In some embodiments, the second microstructure comprises at least one melt pool. In some embodiments, the second section defines an alignment line that runs through a central portion of the at least one melt pool and/or along the exterior surface of the second section. In some embodiments, the second microstructure comprises grain structures that are aligned with respect to the alignment line. In some embodiments, the second section is characterized by (a) a melt pool that defines an alignment line that runs through a central portion of the melt pool, and (b) a plurality of grain structures that converge along the alignment line. In some embodiments, grains of the plurality of grain structures are aligned towards (e.g., converge or lean towards) at a non-zero angle relative to the alignment line. In some embodiments, the first section comprises a first set of grains. In some embodiments, the second section comprises a second set of grains. In some embodiments, grains of the second set have (e.g., on average) a different property than the first set comprising: a fundamental length scale, a chemical makeup, a crystal structure, a coherence length, a morphology, a metallurgical microstructure, or an alignment. In some embodiments, the fundamental length scale comprises a length or a width. In some embodiments, the first section comprises a first set of dendrites. In some embodiments, the second section comprises a second set of dendrites. In some embodiments, dendrites of the second set are (e.g., on average) thicker than dendrites of the first set. In some embodiments, grains of the second set have a fundamental length scale that is (e.g., on average) about 1.5 times greater than grains of the first set. In some embodiments, grains of the second set have a greater coherence length than grains of the first set. In some embodiments, the three-dimensional object comprises a skin. In some embodiments, an exterior surface of the skin has a plurality of crescent-shaped ridges corresponding to overlapping tiles, In another aspect, a three-dimensional object comprises: a plurality of layers of hardened material stacked and bonded together to form a shape of the three-dimensional object, wherein a boundary between two of the plurality of layers defines a layering plane, which plurality of layers comprises an overhang portion having an exterior surface corresponding to at least a fraction of an exterior surface of the three-dimensional object, wherein a vector normal to a surface at a point on the exterior surface of the overhang portion that intersects (i) the layering plane or (ii) a plane parallel to the layering plane, defines an angle with respect to the layering plane, wherein the overhang portion comprises: a first section of the exterior surface of the overhang portion characterized as having a first surface roughness; and a second section of the exterior surface of the overhang portion characterized as having a second surface roughness.

In some embodiments, the first and second sections are bonded with each other. In some embodiments, the first section is disposed at one side of the overhang. In some embodiments, the second section is disposed at an opposing side of the overhang. In some, embodiments, the exterior surface of the overhang comprises the first section and the second section that are disposed at a side of the overhang. In some embodiments, angle is from about sixty degrees to about ninety degrees. In some embodiments, each of the plurality of layers comprises a melt pool, that has a directionality corresponding to its deposition. In some embodiments, a stacking vector corresponding to a layerwise deposition of the plurality of layers is perpendicular to the layering plane and in the direction of the layerwise deposition as indicative by the directionality of the melt pool. In some embodiments, a positive acute angle between a vector normal to a surface at a point of an exposed surface of the overhang that points towards the overhang, and the stacking vector, is in a range of from zero to at most thirty degrees. In some embodiments, a positive acute angle between the vector normal to a surface at the point of the exposed surface of the overhang that points towards the overhang, and the stacking vector, is in a range of from zero to at most fifteen degrees. In some embodiments, the first surface roughness and the second surface roughness have an arithmetic average of a roughness profile (Ra) value of at most 20 micrometers. In some embodiments, the first surface roughness and/or the second surface roughness have an arithmetic average of a roughness profile (Ra) value of at most 10 micrometers. In some embodiments, the first surface roughness and the second surface roughness are detectably different. In some embodiments, the three-dimensional object has no detectable mark that it underwent further processing after its printing. In some embodiments, the first roughness is at least 2 times rougher than the second roughness. In some embodiments, the first section comprises a first core portion and a first skin portion. In some embodiments, the first and second sections are (e.g., chemically (e.g., metallically)) bonded with each other. In some embodiments, the first section is characterized as being formed at a first solidification rate. In some embodiments, the second section is characterized as being formed at a second solidification rate that is slower than the first solidification rate. In some embodiments, the first section is characterized as being formed at a first solidification rate. In some embodiments, the second section is characterized as being formed at a second solidification rate that is faster than the first solidification rate. In some embodiments, the first section is characterized as being formed at a first solidification rate that is associated with a first cooling rate. In some embodiments, the second section is characterized as being formed at a second solidification rate that is associated with a second cooling rate (e.g., different than the first cooling rate). In some embodiments, the first section comprises first microstructure. In some embodiments, the second section comprises a second microstructure. In some embodiments, the first and second microstructure comprise melt pools or grains. In some embodiments, the grains comprise a cell or a dendrite. In some embodiments, the grains comprise a crystal. In some embodiments, the grains comprise a metallurgical microstructure. In some embodiments, the first section includes a skin portion and a core portion. In some embodiments, the skin portion is characterized by an alignment line that runs through a central portion of a melt pool of the skin portion and/or along the exterior surface of the second section. In some embodiments, the second microstructure comprises grain structures that are aligned with respect to the alignment line. In some embodiments, the first section includes a skin portion and a core portion, wherein the skin portion is characterized by (a) a melt pool that defines an alignment line that runs through a central portion of the melt pool, and (b) a plurality of grain structures of the melt pool that converge along the alignment line. In some embodiments, the grain structures converge at a non-zero angle. In some embodiments, the first section comprises a first set of grains. In some embodiments, the second section comprises a second set of grains. In some embodiments, grains of the second set have a different property than the first set. In some embodiments, the different property comprises: a fundamental length scale, a chemical makeup, a crystal structure, a coherence length, a morphology, a metallurgical microstructure, or an alignment. In some embodiments, the fundamental length scale comprises thickness or length. In some embodiments, the grains of the second set have a greater coherence length than the grains of the first set. In some embodiments, the grain of the second set are (e.g., on average) about 1.5 times thicker than the grain of the first set. In some embodiments, the second section is characterized as having a high aspect ratio melt pool. In some embodiments, the high aspect ratio melt pool is characterized as having a greater depth than width. In some embodiments, the layering plane is perpendicular to a stacking vector of the stacked layer. In some embodiments, the three-dimensional object comprises a skin. In some embodiments, an exterior surface of the skin has a plurality of crescent-shaped ridges corresponding to overlapping tiles. In some embodiments, the first section is disposed at one side of the overhang portion. In some embodiments, the second section is disposed at an opposing side of the overhang portion. In some embodiments, the exterior surface of the overhang portion comprises the first section and the second section that are disposed at a side of the overhang portion. In some embodiments, the first surface roughness is at least 2 times greater than the second surface roughness.

In another aspect, a three-dimensional object comprises: a plurality of layers of hard material stacked layerwise and bonded together to form a shape of the three-dimensional object, wherein a layer of the plurality of layers defines a layering plane, which plurality of layers comprises: a first section comprising a first microstructure associated with being formed at a first solidification rate; and a second section is at least a portion of an overhang comprising: (i) second microstructure associated with being formed at a second solidification rate that is different from the first solidification rate, and (ii) an exterior surface corresponding to at least a fraction of an exterior surface of the three-dimensional object, wherein an overhang vector at a point on the exterior surface of the second section is normal to a surface at the point in a direction towards an interior of the overhang, wherein a stacking vector corresponds to a stacking direction of the plurality of layers, which stacking vector is normal to the layering plane, wherein the overhang vector has a positive projection onto the stacking vector, wherein the stacking direction of the plurality of layers is indicative from (1) any directional melt pool that is included in the plurality of layers, (2) a direction opposite from any auxiliary supports or auxiliary support marks, (3) a direction of a surface comprising hatch decomposition marking, (4) any asymmetric surface roughness, or (5) any directionality in grain orientation, indicative of print orientation.

In some embodiments, the first section is characterized as comprising the first microstructure and wherein the second section is characterized as comprising the second microstructure. In some embodiments, the first and second sections are coupled with each other. In some embodiments, the second solidification rate is slower than the first solidification rate. In some embodiments, the first microstructure and second microstructure each comprise a melt pool, or a grain structures. In some embodiments, the grain structure comprises a crystal. In some embodiments, the second section corresponds to a skin of the three-dimensional object. In some embodiments, the skin has a thickness ranging from about 20 micrometers to about 1000 micrometers. In some embodiments, the skin has corresponding to a fundamental length scale of a melt pool. In some embodiments, the second section is characterized by an alignment line that runs through a central portion of the melt pool and/or along the exterior surface of the second section. In some embodiments, the second microstructure comprises grain structures that are aligned with respect to the alignment line. In some embodiments, the grain structures are aligned at a non-zero angle relative to the alignment line. In some embodiments, the first section comprises a first set of grains. In some embodiments, the second section comprises a second set of grains. In some embodiments, grains of the second set have on average a different property than the first set comprising: a fundamental length scale, a chemical makeup, a crystal structure, a coherence length, a morphology, a metallurgical microstructure, or an alignment. In some embodiments, the grains of the second set have a fundamental length scale that is on average about 1.5 times thicker than the grains of the first set. In some embodiments, the grains of the second set have a greater coherence length, fundamental length scale, and/or alignment. In some embodiments, the overhang vector forms an angle with the stacking vector that is at most about forty-five degrees, and at least about zero degrees. In some embodiments, the overhang vector forms an angle with the stacking vector that is at most about thirty degrees, and at least about zero degrees. In some embodiments, the overhang vector forms an angle with the stacking vector that is at most about ten degrees, and at least about zero degrees. In some embodiments, the first and second sections are bonded with each other. In some embodiments, the first section has a first surface roughness and the second surface has a second surface roughness. In some embodiments, the first surface roughness and the second surface roughness have an arithmetic average of a roughness profile (Ra) value of at most about 20 micrometers. In some embodiments, the first surface roughness and/or the second surface roughness have an arithmetic average of a roughness profile (Ra) value of at most 10 micrometers. In some embodiments, the first section has a first surface roughness and the second surface has a second surface roughness that is delectably different from the first surface roughness. In some embodiments, the first roughness is at least 2 times rougher than the second roughness. In some embodiments, the overhang is a three-dimensional plane. In some embodiments, the overhang is a ledge. In some embodiments, the melt pool comprises a narrow bottom portion and a broader top portion. In some embodiments, the auxiliary support marks comprise a point of discontinuity of layer structure akin a foreign object. In some embodiments, the hatch decomposition marking relates to a hatch strategy that divides a top surface into segments. In some embodiments, two directly adjacent segments differ by at least in a hatching direction from one another. In some embodiments, the asymmetric surface roughness indicative of print orientation is caused by a print process in which the bottom surface has a different roughness than the top surface.

In another aspect, a three-dimensional object comprises: a plurality of layers of hardened material that are metallically bonded together, wherein a layer of the plurality of layers has a layering plane, wherein the plurality of layers comprises: a core portion comprising a first plurality of layers, which core portion comprises a first microstructure associated with being formed at a first solidification rate, and a skin portion that is metallically bonded with the core portion and comprising a second plurality of layers, wherein: (i) an exterior surface of the skin portion corresponds to at least a fraction of an exterior surface of the three-dimensional object, and (ii) the skin portion is characterized as having a second microstructure associated with being formed at a second solidification rate that is different than the first solidification rate, wherein a stacking vector is in a direction in which the plurality of layers were stacked together during formation of the three-dimensional object, wherein the skin portion is at least a portion of an overhang, wherein an overhang vector is normal to a surface at a point on the exterior surface of the skin portion and is in a direction of an inferior of the overhang, wherein the overhang vector has a positive projection onto the stacking vector, wherein a stacking direction of the plurality of layers is indicative from (1) any directional melt pool that is included in the plurality of layers. (2) a direction opposite from any auxiliary supports or auxiliary support marks, (3) a direction of a surface comprising hatch decomposition marking, (4) any asymmetric surface roughness indicative of print orientation, or (5) any directionality in an orientation of grains of the three-dimensional object.

In some embodiments, the exterior surface of the skin portion comprises a plurality of scales corresponding to a plurality of overlapping tiles. In some embodiments, the three-dimensional object comprises an elemental metal, metal alloy, an allotrope of elemental carbon, a polymer, or a resin. In some embodiments, the first plurality of layers is aligned with the second plurality of layers. In some embodiments, a second layer of the second plurality of layers is an extension of a corresponding first layer of the first plurality of layers. In some embodiments, the first solidification rate and the second solidification rate are associated with a first cooling rates and a second cooling rate of molten material. In some embodiments, the first solidification rate is faster than the second solidification rate. In some embodiments, the first solidification rate is slower than the second solidification rate. In some embodiments, the first microstructure comprises a first melt pool and/or a first grain. In some embodiments, the second microstructure comprise a second melt pool and/or a second grain. In some embodiments, the first grain comprises a first constituent and the second grain comprise a second constituent. In some embodiments, the first constituent differs from the second constituent in at least one aspect comprising: fundamental length scale, chemical makeup, crystal structure, metallurgical microstructure, or spatial placement in a melt pool. In some embodiments, the first constituent comprises a first crystal or a first metallurgical microstructure. In some embodiments, the second constituent comprises a second crystal or a second metallurgical microstructure. In some embodiments, the metallurgical microstructure comprises a dendrite or a cell. In some embodiments, the skin portion has a thickness of a melt pool in a layer of the skin portion. In some embodiments, the skin portion has a thickness equal to a fundamental length scale of a melt pool. In some embodiments, the skin portion has a thickness ranging from about 20 micrometers to about 1000 micrometers. In some embodiments, an alignment line runs parallel to an exposed surface of the skin portion, on the skin portion, or through a central portion of a melt pool of the skin portion, and a plurality of grain structures of the skin portion are aligned towards the alignment line or with respect to the alignment line. In some embodiments, the grains converge in a V-shape towards the alignment line. In some embodiments, a top of the V-shape is pointed in accordance with the stacking vector. In some embodiments, the grain structures lean towards the alignment line and form a non-zero angle with respect to the layering plane. In some embodiments, the skin portion comprises dendrites that are oriented substantially parallel to the alignment line. In some embodiments, substantially parallel comprises at an angle of at most about twenty degrees with respect to the alignment line. In some embodiments, the skin portion comprises (i) a melt pool that defines an alignment line that runs through a central portion of the melt pool, and (ii) a plurality of grain structures that converge along the alignment line. In some embodiments, the grain structures in the melt pool converge at a non-zero angle. In some embodiments, the core portion comprises a first set of grains. In some embodiments, the skin portion comprises a second set of grains. In some embodiments, grains of the second set have on average a fundamental length scale that is larger than grains of the first set. In some embodiments, the fundamental length scale comprises a width or a length. In some embodiments, grains of the second set are on average about 1.5 times thicker and/or longer than grains of the first set. In some embodiments, the skin portion is characterized by a plurality of tiles. In some embodiments, centers of two successive tiles are substantially uniformly spaced apart from one another. In some embodiments, at least two adjacent tiles overlap with each other. In some embodiments, the skin portion corresponds to a bottom skin of an overhang structure of the three-dimensional object. In some embodiments, a vector from a surface at a point on the exterior surface of the bottom skin intersects (a) the layering plane or (b) a plane parallel to the layering plane, forms an angle with respect to the layering plane or with a line parallel to the layering plane. In some embodiments, the angle is at least about sixty degrees and at most about ninety degrees. In some embodiments, the vector is directed into the overhang structure. In some embodiments, the exterior surface has a measured area surface roughness (Sa) of at most about 20 micrometers. In some embodiments, the exterior surface has a measured area surface roughness (Sa) of at most about 5 micrometers. In some embodiments, the core portion has substantially the same chemical composition as the skin portion. In some embodiments, the exterior surface of the skin portion has a plurality of crescent-shaped ridges corresponding to overlapping tiles. In some embodiments, the overhang vector forms an angle with the stacking vector that is at most about forty-five degrees, and at least about zero degrees. In some embodiments, the overhang vector forms an angle with the stacking vector that is at most about thirty degrees, and at least about zero degrees. In some embodiments, the overhang vector forms an angle with the stacking vector that is at most about ten degrees, and at least about zero degrees.

In another aspect, a method of printing a three-dimensional object comprises: (a) printing a target surface using a three-dimensional printing methodology in an enclosure; using an energy beam to irradiate in the enclosure a portion of the target surface comprising a material to a form a well comprising first material portion that is in a molten state and a second material portion that is ejected to form a hole of the well, which energy beam irradiates using a first power density profile; and (b) irradiating the well with the energy beam in the enclosure using a second power density profile to close the hole and form a first melt pool that has a high aspect ratio as part of the three-dimensional object.

In some embodiments, the first melt pool comprises a percentage of pores of at most ten (volume of pore per volume of melt pool). In some embodiments, the first melt pool comprises a percentage of pores of at most five (volume of pore per volume of melt pool). In some embodiments, the first melt pool comprises a percentage of pores of at most two (volume of pore per volume of melt pool). In some embodiments, the energy beam is a type-2 energy beam. In some embodiments, the type-2 energy beam progresses along a trajectory in a step and move mode, wherein daring the step, the type-2 energy beam is stationary or substantially stationary. In some embodiments, the type-2 energy beam has a cross section of at least about 200 micrometers. In some embodiments, the type-2 energy beam has a power density of at most about 8000 Watts per millimeter square. In some embodiments, the energy beam is a type-1 energy beam. In some embodiments, the type-1 energy beam is translating along a trajectory. In some embodiments, the type-1 energy beam has a cross section that is below about 200 micrometers. In some embodiments, the type-1 energy beam has a power density above about 80000 Watts per millimeter square. In some embodiments, the method further comprises translating while irradiating the well with the energy beam from a first position located in the well, to a second position on the target surface that is adjacent to the well to subsequently form a laterally elongated melt pool. In some embodiments, translating the energy beam comprises translating in a lateral direction. In some embodiments, comprises expanding the first material portion in the molten state in the lateral direction. In some embodiments, the target surface is an exposed surface of a material bed. In some embodiments, the target surface is an exposed surface of at least a section of the three-dimensional object. In some embodiments, the target surface is an exposed surface of a porous layer. In some embodiments, the target surface is an exposed surface of a densified porous layer. In some embodiments, the high aspect ratio comprises a depth of the first melt pool that is larger than an average radius of an exposed surface of the first melt pool. In some embodiments, a maximum power density of the second power density profile is lower than a maximum power density of the first power density profile. In some embodiments, ejected comprises vaporized. In some embodiments, the second material portion that is ejected comprises plasma, molten spits, or evaporated material. In some embodiments, the three-dimensional printing methodology comprises layerwise material deposition. In some embodiments, the well spans one or more layers of the three-dimensional object. In some embodiments, the well spans a plurality of layers of the three-dimensional object. In some embodiments, the target surface comprises a horizontally narrow portion of the three-dimensional object. In some embodiments, the target surface comprises an overhang tip. In some embodiments, the method further comprises :repeating operations (b) to (c) to form a second melt pool adjacent to the first melt pool. In some embodiments, the second melt pool is identical or substantially identical to the first melt pool. In some embodiments, the second melt pool is different than the first melt pool by at least one fundamental length scale.

In another aspect, a system for printing at least one three-dimensional object comprises: an enclosure that is configured to accommodate a target surface that comprises a pre-transformed material; an energy source that is configured to generate an energy beam that energy beam to irradiate a portion of the target surface to form a part of the at least one three-dimensional object, wherein the energy beam is operatively coupled to the enclosure; and at least one controller that is operatively coupled to the energy beam, which at least one controller is collectively or separately programmed to perform the following operations: operation (i): direct the energy beam to irradiate in the enclosure a portion of the target surface comprising a material to a form a well comprising a first material portion that is molten and a second material portion that is ejected to form a hole of the well, which energy beam irradiates at a first power density profile, and operation (ii) direct the energy beam to irradiate the well in the enclosure at a second power density profile to close the hole and form a first melt pool that has a high aspect ratio as part of the at least one three-dimensional object.

In another aspect, an apparatus for three-dimensional printing of at least one three-dimensional object comprises at least one controller that is programmed to collectively or separately perform the following operations: operation (a) direct printing a target surface using a three-dimensional printing methodology in an enclosure; operation (b) direct an energy beam to irradiate in the enclosure a portion of the target surface comprising a material to a form a well comprising first material portion that is molten and a second material portion that is ejected to form a hole of the well, which energy beam irradiates at a first power density profile, wherein the energy beam is operatively coupled to the enclosure; and operation (c) direct the energy beam to irradiate the well with the energy beam in the enclosure at a second power density profile to close the hole and form a first melt pool that has a high aspect ratio as part of the at least one three-dimensional object.

In another aspect, a computer software product for three-dimensional printing of at least one three-dimensional object, comprises a non-transitory computer-readable medium in which program instructions are stored, which instructions, when read by a computer, cause the computer to perform operations comprising: operation (a) directing printing a target surface using a three-dimensional printing methodology in an enclosure; operation (b) directing an energy beam to irradiate in the enclosure a portion of the target surface comprising a material to a form a well comprising first material portion that is molten and a second material portion that is ejected to form a hole of the well, which energy beam irradiates at a first power density profile, wherein the energy beam is operatively coupled to the target surface; and operation (c) directing the energy beam to irradiate the well with the energy beam in the enclosure at a second power density profile to close the hole and form a first melt pool that has a high aspect ratio as part of the at least one three-dimensional object.

In another aspect, a method of printing a three-dimensional object comprises: (a) providing a material bed comprising a pre-transformed material; and (b) using an energy beam to transform a first portion of the pre-transformed material to a form a layer of transformed material as a part of a sub-structure of the three-dimensional object, which layer transformed material comprises a plurality of melt pools having identical or substantially identical cross-sectional sizes.

In some embodiments, substantially identical comprise within fifteen percent of their fundamental length scale. Iii some embodiments, substantially identical comprise within ten percent of their fundamental length scale. In some embodiments, substantially identical comprise within five percent of their fundamental length scale. In some embodiments, wherein a fundamental length scale of the melt pools comprises their respective (i) depth or (ii) radius of their exposed surfaces. In some embodiments, the method further comprises controlling at least one characteristic of the energy beam or of an energy source that generates the energy beam. In some embodiments, controlling comprises feedback, feed-forward, closed loop, or open loop control. In some embodiments, controlling comprises real time control during (b). In some embodiments, real time comprises during formation of (i) the layer of transformed material, (ii) at least several melt pools of the plurality of melt pools, (iii) a single file of melt pools within the plurality of melt pools, or (iv) a melt pool within the plurality of melt pools. In some embodiments, the controlling comprises controlling a temperature of exposed surfaces of one or more melt pools of the plurality of melt pools. In some embodiments, the controlling comprises controlling a radiation emitted or reflected from exposed surfaces of the one or more melt pools of the plurality of melt pools. In some embodiments, the controlling comprises sensing. In some embodiments, the sensing comprises optically or spectroscopically sensing. In some embodiments, the controlling comprises detecting. In some embodiments, the detecting comprises using at least one single pixel detector. In some embodiments, the detecting comprises priding an electromagnetic radiation that is emitted and/or reflected from the exposed surfaces of the one or more melt pools of the plurality of melt pools, through an optical fiber that is operatively coupled to a detector.

In another aspect, a system for printing a three-dimensional object comprises: an enclosure that is configured to accommodate pre-transformed material; a first energy source that is configured to generate a first energy beam that transforms a first portion of the pre-transformed material to form a first section of the three-dimensional object, which first section comprises a first material characteristic, wherein the first energy beam is operatively coupled to the enclosure; a second energy source that is configured to generate a second energy beam that transforms a second portion of the pre-transformed material to form a second section of the three-dimensional object, which second section comprises a second material characteristic that is different from the first material characteristic, wherein the second energy beam is operatively coupled to the enclosure; and at least one controller that is operatively coupled to the first and second energy beams, which at least one controller is collectively or separately programmed to perform the following operation: operation (i) direct the first energy beam to transform the first portion of the pre-transformed material to a form a first section in a layer of the three-dimensional object, operation (ii) direct the second energy beam to transform the second portion of the pre-transformed material to a form a second section in the layer of the three-dimensional object.

In some embodiments, the first and second material characteristics comprise at least one of density, porosity, or microstructure. In some embodiments, the at least one controller is further programmed to control the material characteristics (I) in the first section, (II) in the second section, or both (III) in the first section and in the second section. In some embodiments, the microstructure comprises metallurgical phase. In some embodiments, the microstructure comprises an average fundamental length scale of melt pools. In some embodiments, the first energy source and the second energy source are the same energy source. In some embodiments, the first energy source and the second energy source are different energy sources. In some embodiments, the first energy source and the second energy source are different energy beams. In some embodiments, the first energy beam and the second energy beam are the same energy beam that differ in at least one energy beam characteristic. In some embodiments, the energy beam characteristic comprises at least one of a velocity, a cross section, a power density, a fluence, a duty cycle, a dwell time, a focus, a delay time, or a continuity of movement. In some embodiments, the first energy beam is configured to emit radiation having a smaller cross section as compared to the second energy beam. In some embodiments, the first energy beam is configured to irradiate at a higher power density as compared to the second energy beam. In some embodiments, the first energy beam is configured to irradiate at a shorter dwell time at a position as compared to the second energy beam. In some embodiments, the first energy beam is configured to continuously move, whereas second energy beam is configured to be stationary and move interchangeably. In some embodiments, the first energy beam is configured to be focused, whereas the second energy beam is configured to be de-focused.

In another aspect, an apparatus for three-dimensional printing of at least one three-dimensional object comprises at least one controller that is collectively or separately programmed to perform the following operations: operation (i) direct a first enemy beam to transform a first portion of a pre-transformed material to a form a first section in a layer of the at least one three-dimensional object, which first section comprises a first material characteristic, wherein the pre-transformed material is disposed in an enclosure, and; and operation (ii) direct a second energy beam to transform a second portion of the pre-transformed material to a form a second section in the layer of the at least one three-dimensional object, which second section comprises a second material characteristic that is different from the first material characteristic, wherein the second energy beam is operatively coupled to the enclosure.

In another aspect, printing a three-dimensional object comprises: printing a plurality of layers of transformed material as part of the three-dimensional object, wherein printing at least one of the plurality of layers of transformed material comprises: (a) forming a core portion using a first energy beam that transforms a first pre-transformed material to a first transformed material that hardens into a first hardened material at a first hardening rate; and (b) forming a skin portion using a second energy beam that transforms a second pre-transformed material to a second transformed material that hardens into a second hardened material at a second hardening rate that is slower than the first hardening rate.

In some embodiments, one or more of the plurality of layers of transformed material defines a layering plane. In some embodiments, an alignment line is substantially orthogonal to the layering plane and/or is parallel to an exposed surface of the skirt. In some embodiments, grains of the second set of grains are aligned and/or lean towards the alignment line. In some embodiments, the first hardening rate results in formation of a first set of grains. In some embodiments, the second hardening rate results in formation of a second set of grains having at least one varied grain characteristic as compared to the first set of grains. In some embodiments, the first and second set of grains comprise metallurgical microstructures, or crystals. In some embodiments, the at least one varied grain characteristic comprises an organization of crystal structure, crystal phase, grain types, material makeup, or average fundamental length scale (e.g., width or length) of the first and second set of grains. In some embodiments, the second hardened material comprises a surface, wherein a plurality of grain structures in the second set of grains are directed to an alignment line that is parallel to the surface and/or to the surface. In some embodiments, the second hardened material comprises a melt pool. In some embodiments, the melt pool defines an alignment line that runs through a central portion of the melt pool. In some embodiments, a plurality of grain structures in the second set of grains converge along the alignment line. In some embodiments, one or more of the plurality of layers of transformed material defines a layering plane. In some embodiments, the alignment line is (e.g., substantially) orthogonal to the layering plane. In some embodiments, the second set of grains has (i) more organized grains, and/or (ii) grains with a larger average fundamental length scale (e.g., width or length), as compared to respective ones of the first set of grains. In some embodiments, the more organized grains comprise larger coherence length or larger crystals. In some embodiments, the skin portion comprises an exterior surface corresponding to at least a fraction of an exterior surface of the three-dimensional object. In some embodiments, (b) comprises forming at least one tile. In some embodiments, the second energy beam is substantially stationary during a dwell time. In some embodiments, (b) comprises forming a plurality of tiles by: (I) transforming the second pre-transformed material to the second transformed material at a first position on a target surface using the second energy beam during a first time period to form a first tile, which first position is along a path-of-tiles, wherein during the first time period, the second energy beam is stationary or substantially stationary (e.g., such that it at most undergoes pendulum and/or circular movement about the first position); (II) translating the second energy beam to a second position on the target surface along the path-of-tiles, which second position is different from the first position, wherein the second energy beam is translated during an intermission without transforming the second pre-transformed material along the path-of-tiles; and (III) repeating (I) and (II) to an end of the path-of-tiles. In some embodiments, the energy beam is irradiated in accordance with a power density profile characterized as having a (e.g., substantially) constant power density period followed by a decreasing power density period. In some embodiments, the period in which the power density of the energy beam is decreasing occurs at an end of an irradiation time. In some embodiments, during an irradiation time of the second energy beam, a power density of the second energy beam is constant or pulsing. In some embodiments, the method further comprises forming a plurality of tiles by moving the second energy beam to different locations of the second pre-transformed material in accordance with a path. In some embodiments, the method further comprises turning off an energy source that generates the first energy beam during moving of the first energy beam between the different locations. In some embodiments, the tiles of the plurality of tiles overlap with each other. In some embodiments, (a) comprises forming a plurality of hatches by continuously moving the first energy beam along a pre-transformed material in accordance with a path. In some embodiments, the plurality of layers of transformed material comprises a first and second layer. In some embodiments, the first layer is characterized by a first melt pool that defines a first alignment line. In some embodiments, a second layer is characterized by a second melt pool that defines a second alignment line. In some embodiments, the first alignment line is (e.g., substantially) parallel to the second alignment line. In some embodiments, the alignment line is (e.g., substantially) parallel to a growth direction of the three-dimensional object during printing. In some embodiments, the core portion comprises a first grain. In some embodiments, the skin portion comprises a second grain that is longer than the first grain. In some embodiments, core portion comprises a plurality of first grains characterized as having a first average grain fundamental length scale. In some embodiments, the skin portion comprises a plurality of second grains characterized as having a second average grain fundamental length scale different than the first average grain fundamental length scale. In some embodiments, the first and second energy beams are generated by the same energy source. In some embodiments, the first and second energy beams are generated by different energy sources. In some embodiments, printing the plurality of layers of transformed material comprises forming a plurality of skin portions in accordance with the exterior surface of a three-dimensional object. In some embodiments, at least one characteristic of the first energy beam is different than a respective at least one characteristic of the second energy beam. In some embodiments, the at least one characteristic of the first or second energy beam comprises translational speed, cross section, dwell time, intermission time, pulsing frequency, power density, power density profile over time, or translational scheme (e.g., tiling or hatching). In some embodiments, a power density of the first energy beam is greater than a power density of the second energy beam. In some embodiments, a scan speed of the second energy beam slower than a scan speed of the first energy beam.

In another aspect, printing a three-dimensional object comprises one or more controllers that are individually or collectively programmed to: direct a first energy beam and a second energy beam to print a plurality of layers of transformed material as part of the three-dimensional object, wherein the one or more controllers is programmed to: (a) direct the first energy beam to transforms a first pre-transformed material to a first transformed material that hardens into a first hardened material at a first hardening rate to form a core portion; and (b) direct the second energy beam to transform a second pre-transformed material to a second transformed material that hardens into a second hardened material at a second hardening rate that is slower than the first hardening rate to form a skin portion.

In some embodiments, the one or more controllers is programmed to direct the first energy beam to form the first transformed material having the first hardening rate that results in formation of a first set of grains. In some embodiments, the at least one controller is programmed to direct the second energy beam to form the second transformed material having the second hardening rate results in formation of a second set of grains having at least one varied grain characteristic as compared to the first set of grains. In some embodiments, grains of the first and second set of grains comprise metallurgical microstructures, or crystals. In some embodiments, the at least one varied grain characteristic comprises an organization of crystal structure, crystal phase, grain types, material makeup, or average fundamental length scale (e.g., width or length) of grains of the first and second set of grains. In some embodiments, the one or more controllers is programmed to direct (i) a first energy source to generate the first energy beam, and (ii) direct a second energy source to generate the second energy beam. In some embodiments, the first energy source is the same as the second energy source. In some embodiments, the first energy source is different than the second energy source. In some embodiments, the one or more controllers controls at least one characteristic of the first energy beam, the second energy beam, the first energy source and/or the second energy source. In some embodiments, the one or more controllers controls at least one characteristic of the first energy beam and/or the second energy beam at least partially based on data from one or more sensors. In some embodiments, the one or more sensors collect temperature, optical, or spectroscopic data. In some embodiments, the one or more sensors detect electromagnetic radiation that is emitted and/or reflected from an exposed surface of one or more melt pools formed during (a) and/or (b). In some embodiments, the one or more controllers directs feedback or closed loop control. In some embodiments, the one or more controllers directs feed-forward or open loop control. In some embodiments, the one or more controllers is programmed to direct the second energy beam to form at least one tile during directing the second energy beam in (b). In some embodiments, forming the at least one tile comprises directing the second energy beam at the second pre-transformed material for a dwell time of at least about 0.1 milliseconds. In some embodiments, the one or more controllers is programed to direct a substantially stationary energy beam during the dwell time (e.g., wherein substantially stationary comprises movement (e.g., circular or pendulum) that does not exceed a fundamental length scale of a footprint of the second energy beam on time second pre-transformed material about a point). In some embodiments, the one or more controllers is programmed to direct the second energy beam to form a plurality of tiles by moving the second energy beam to different locations of a pre-transformed material in accordance with a path. In some embodiments, the one or more controllers is programmed to direct turning off an energy source that generates the second energy beam during moving of the second energy beam between the different locations. In some embodiments, the one or more controllers is programmed to direct the same energy source to generate the first and second energy beams. In some embodiments, the one or more controllers is programmed to direct different energy sources to generate the first and second energy beams. In some embodiments, the one or more controllers includes at least two controllers. In some embodiments, the one or more controllers is programmed to direct the first and second energy beams to have different power densities. In some embodiments, a power density of the second energy beam is greater than a power density of the first energy beam. In some embodiments, a power density of the second energy beam is lower than a power density of the first energy beam. In some embodiments, the one or more controllers is programmed to direct adjusting one or more characteristics of the first energy beam and/or the second energy beam before, during or after directing the first energy beam in (a) and/or directing the second energy beam in (b). In some embodiments, the one or more characteristics comprise translational speed, cross section, dwell time, intermission time, pulsing frequency, power density, power density profile over time, or translational scheme (e.g., tiling or hatching). In some embodiments, the one or more characteristics of the first energy beam and/or the second energy beam is adjusted to accomplish a different solidification rate during directing the second energy beam in (b) compared to during directing the first energy beam in (a).

In another aspect, a method for printing a three-dimensional object comprises: (a) using a first energy beam to transform a first portion of a pre-transformed material to a form a first section in a layer of the three-dimensional object, which first section comprises a first material characteristic, wherein the pre-transformed material is disposed in an enclosure, and wherein the first energy beam is operatively coupled to the enclosure; and (b) using a second energy beam to transform a second portion of the pre-transformed material to a form a second section in the layer of the three-dimensional object, which second section comprises a second material characteristic that is different from the first material characteristic, wherein the second energy beam is operatively coupled to the enclosure.

In another aspect, a computer software product for three-dimensional printing of at least one three-dimensional object, comprises a non-transitory computer-readable medium in which program instructions are stored, which instructions, when read by a computer, cause the computer to perform operations comprising: operation (a) directing a first energy beam to transform a first portion of a pre-transformed material to a form a first section in a layer of the at least one three-dimensional object, which first section comprises a first material characteristic, wherein the pre-transformed material is disposed in an enclosure, and wherein the first energy beam is operatively coupled to the enclosure; and operation (b) directing a second energy beam to transform a second portion of the pre-transformed material to a form a second section in the layer of the at least one three-dimensional object, which second section comprises a second material characteristic that is different from the first material characteristic, wherein the second energy beam is operatively coupled to the enclosure.

In another aspect, a method for printing a three-dimensional object, the method comprises: transforming at least a portion of a first hardened material to a second hardened material by directing an energy beam along a path on an exposed surface of the first hardened material, the at least a portion of the first hardened material having a first density, wherein transforming comprises generating one or more melt pools in the at least a portion of the first hardened material, wherein the second hardened material has a second density greater than the first density of the first hardened material.

In some embodiments, the first hardened material is generated by transforming a pre-transformed material to one or more layers of a transformed material as part of the first hardened material. In some embodiments, the pre-transformed material comprises elemental metal, metal alloy, ceramic, or an allotrope of elemental metal. In some embodiments, the pre-transformed material comprises a particulate material. In some embodiments, the energy beam is a second energy beam, the method further comprises, prior to directing the second energy beam, using a first energy beam to transform a pre-transformed material to a transformed material as part of the first hardened material. In some embodiments, the method further comprises prior to directing the second energy beam, forming the first hardened material by directing a first energy beam on an exposed surface of a material bed that includes the pre-transformed material. In some embodiments, the first energy beam has the same energy density as the second energy beam. In some embodiments, the first energy beam has different energy density than the second energy beam. In some embodiments, the at least a portion comprises one or more layers of hardened material. In some embodiments, the at least a portion comprises a plurality of layers. In some embodiments, the plurality of layers comprises successive layers. In some embodiments, the one or more melt pools are successively formed. In some embodiments, the one or more melt pools is characterized as having an isotropic aspect ratio or a non-isotropic aspect ratio, in some embodiments, the non-isotropic aspect ratio is a high aspect ratio. In some embodiments, the first density is at most about 94.5%. In some embodiments, the second density is at least about 95%. In some embodiments, the second density is at least about 99.5%. In some embodiments, the second density is at least about 99.9%. In some embodiments, the first hardened material has a first surface roughness and the second hardened material has a second surface roughness that is lower than the first surface roughness of the first hardened material. In some embodiments, the second surface roughness is measured as having an Ra of less than about 40 μm. In some embodiments, the second surface toughness is measured at having an Ra of less than about 20 μm. In some embodiments, the method further comprises: before directing the energy beam, placing a pre-transformed material on the first hardened material. In some embodiments, the pre-transformed material is (i) transformed during transformation of the at least a portion of a first hardened material to a second hardened material, and (ii) contacts the at least a portion of the first hardened material to form the second hardened material. In some embodiments, the portion of the first hardened material comprises from 2 to 15 layers. In some embodiments, prior to directing the energy beam, the at least a portion of the first hardened material has a vertical height of at least about 500 micrometers. In some embodiments, an average depth of the one or more melt pools is at least about 1.5 times larger than an average width of a vertical cross section of the one or more melt pools. In some embodiments, the method further comprises after directing the energy beam, forming one or more additional layers of a third hardened material on the second hardened material. In some embodiments, the at least a portion of the first hardened material is part of a horizontally non-overlapping portion of the part. In some embodiments, the horizontally non-overlapping portion forms at least a segment of an overhang or a cavity ceiling as part of the three-dimensional object. In some embodiments, the overhang or cavity ceiling forms an angle with respect to a platform adjacent to which a material bed is disposed, wherein the angle is (i) from zero to thirty degrees or (ii) from 150 to 180 degrees. In some embodiments, the angle is (i) from zero to fifteen degrees or (ii) from 175 to 180 degrees. In some embodiments, the first hardened material comprises an elemental metal, metal alloy, ceramic, or an allotrope of elemental metal.

In another aspect, an apparatus for three-dimensional printing of at least one three-dimensional object comprises at least one controller that is collectively or separately programmed to direct an energy beam to transform at least a portion of a first hardened material to a second hardened material, the at least a portion of the first hardened material having a first density, wherein transforming comprises generating one or more melt pools in the at least a portion of the first hardened material, wherein directing the energy beam to transform comprises directing the energy beam along a path on an exposed surface of the first hardened material, and wherein the second hardened material has a second density greater than the first density of the first hardened material.

In some embodiments, the energy beam comprises an electromagnetic or charged particle beam. In some embodiments, the energy beam comprises a laser beam. In some embodiments, the first density is at most about 94%. In some embodiments, the second density is at least about 95%. In some embodiments, the at least a portion of the first hardened material has a first surface roughness, and wherein the second hardened material has a second surface roughness that is less than the first surface roughness of the first hardened material. In some embodiments, the second surface roughness is measured as having an Ra of less than about 40 micrometers. In some embodiments, the second surface roughness is measured at having an Ra of less than about 20 micrometers. In some embodiments, the at least one controller is further configured to direct disposal of a pre-transformed material layer on the first hardened material prior to directing the energy beam to transform the at least the portion of the first hardened material to the second hardened material. In some embodiments, during transformation of the at least the portion of the first hardened material to the second hardened material, the at least one controller further directs the energy beam to transform the pre-transformed material to a transformed material that forms a part of the second hardened material. In some embodiments, the energy beam is a second energy beam, and wherein at least one controller is further configured to direct a first energy beam to transform a pre-transformed material to a transformed material to form the first hardened material. In some embodiments, the first hardened material is formed in a layerwise fashion. In some embodiments, the first energy beam and the second energy beam are different. In some embodiments, the first energy beam and the second energy beam are the same energy beam. In some embodiments, the first energy beam and the second energy beam originate from the same energy source. In some embodiments, the first energy beam and the second energy beam originate from the different energy sources. In some embodiments, the first hardened material has an average density of at most about 60%. In some embodiments, the first hardened material has an average density of at most about 90%. In some embodiments, the first hardened material comprises between 2 and 15 layers. In some embodiments, the first hardened material (e.g., a layer of hardened material) has a thickness of about 100 micrometers and 800 micrometers. In some embodiments, an average depth of the one or more melt pools is larger than an average width of a vertical cross section of the one or more melt pools, which larger is by at least about 1.5 times. In some embodiments, the at least one controller is further configured to direct formation of one or more layers of additional hardened material on the second hardened material. In some embodiments, the one or more layers of additional hardened material are part of a horizontally non-overlapping portion as part of the at least one three-dimensional object. In some embodiments, the horizontally non-overlapping portion forms at least a segment of an overhang or a cavity ceiling. In some embodiments, the overhang or cavity ceiling form an angle with an exposed surface of a material bed and/or with a platform above which the material bed is disposed, wherein the angle is from zero to thirty degrees. In some embodiments, the angle is from zero to fifteen degrees. In some embodiments, the overhang or cavity ceiling forms an angle with respect to a platform adjacent to which a material bed is disposed, wherein the angle is (i) from zero to thirty degrees or (ii) from 150 to 180 degrees. In some embodiments, the angle is (i) from zero to fifteen degrees or (ii) from 175 to 180 degrees. In some embodiments, the at least one controller comprise a control scheme. In some embodiments, the at least one controller comprise a control scheme, wherein the control scheme comprises open loop or closed loop control. In some embodiments, the at least one controller comprise a control scheme, wherein the control scheme comprises feedback or feed forward control. In some embodiments, the at least one controller comprise a control scheme, wherein the control scheme uses a signal from at least one sensor. In some embodiments, the at least one controller comprise a control scheme, wherein the control scheme uses a signal from at least one sensor, wherein the sensor measures one or more properties of a surface portion that is irradiated by the first and/or second energy beam or a vicinity of that surface portion. In some embodiments, the at least one controller comprise a control scheme, wherein the control scheme uses a signal from at least one sensor, wherein the sensor measures one or more properties of a surface portion that is irradiated by the first and/or second energy beam or a vicinity of that surface portion, wherein the vicinity is at most about six diameters of a cross section of the first and/or second energy beam. In some embodiments, the at least one controller comprise a control scheme, wherein the control scheme uses a signal from at least one sensor, wherein the sensor measures one or more properties of a surface portion that is irradiated by the first and/or second energy beam or a vicinity of that surface portion, wherein the vicinity is at most about six FLS of the surface portion that is irradiated by the first and/or second energy beam. In some embodiments, the at least one controller comprise a control scheme, wherein the control scheme comprises an algorithm. In some embodiments, the at least one controller comprise a control scheme, wherein the control scheme comprises an algorithm, wherein the algorithm includes thermo-mechanical, or geometric properties of the at least the portion of the first hardened material and/or the second hardened material. In some embodiments, the at least one controller comprise a control scheme, wherein the control scheme comprises an algorithm, wherein the algorithm includes material properties of the at least the portion of the first hardened material and/or the second hardened material. In some embodiments, the at least one controller comprise a control scheme, wherein the control scheme comprises an algorithm, wherein the algorithm includes material properties of the at least the portion of the first hardened material and/or the second hardened material, In another aspect, a three-dimensional object comprises: a plurality of layers of hard material that are stacked and bonded together to form a shape of the three-dimensional object, which plurality of layers of hardened material comprises: a core characterized as having a first microstructure comprising a first plurality of grains associated with being formed at a first solidification rate; and a skin portion coupled with the core, which skin portion comprises: (i) a second microstructure comprising a second plurality of grains associated with being formed at a second solidification rate that is different than the first solidification rate, and (ii) an exterior surface corresponding to at least a fraction of an exterior surface of the three-dimensional object.

In some embodiments, a layer of the skin portion comprises a melt pool which is a width of the skin. In some embodiments, the skin portion is at least a fraction of the skin of the three-dimensional object. In some embodiments, grains of the second plurality of grains are aligned and grains of the first plurality of grains are misaligned. In some embodiments, the skin comprises at least one melt pool that defines an alignment line that runs through a central portion of the at least one melt pool. In some embodiments, the alignment line is parallel to or at the exterior surface. In some embodiments, with respect to the alignment line: the second plurality of grains are aligned, and the first plurality of grains are misaligned. In some embodiments, the first or second plurality of grains comprises a crystal. In some embodiments, the first or second plurality of grains comprises a metallurgical microstructure. In some embodiments, the metallurgical microstructure comprises a dendrite or a cell. In some embodiments, the first or second plurality of grains align at a non-zero angle along, the alignment line. In some embodiments, the first plurality of grains is different from the second plurality of grains by at least one aspect comprising a fundamental length scale, chemical makeup, crystal structure, metallurgical microstructure:, coherence length, grain size, or spatial placement relative to the alignment line. In some embodiments, the second plurality of grains have a larger fundamental length scale, coherence length, grain size, and/or more organized spatial placement relative to the alignment line compared to the first plurality of grains. In some embodiments, the first microstructure is characterized by a first grain. In some embodiments, the second microstructure is characterized by a second grain that has at least one aspect that is different from the first grain. In some embodiments, the aspect comprises a fundamental length scale, chemical makeup, crystal structure, metallurgical microstructure, or spatial placement in a melt pool relative to the alignment line. In some embodiments, the fundamental length scale comprises a length or a width. In some embodiments, the first microstructure is characterized by a first set of grains. In some embodiments, the second microstructure is characterized by a second set of grains. In some embodiments, an average length and/or width of the second set of grains that is longer and/or wider respectively than an average length of the first set of grains. In some embodiments, an average fundamental length scale of the second set of grains is about 1.5 times greater than an average fundamental length scale of the first set of grains. In some embodiments, the core is an interior of the three-dimensional object. In some embodiments, the skin is (e.g., chemically (e.g., metallically)) bonded with the core. In some embodiments, the skin has a thickness ranging from about 20 micrometers to about 1000 micrometers. In some embodiments, the thickness ranges from about 20 micrometers to about 400 micrometers. In some embodiments, the skin comprises at least one melt pool. In some embodiments, the skin has a thickness of at most about twice a width of the at least one melt pool. In some embodiments, the second solidification rate is slower than the first solidification rate. In some embodiments, second solidification rate is faster than the first solidification rate. In some embodiments, the first solidification rate is associated with a first cooling rate. In some embodiments, the second solidification rate is associated with a second cooling rate different than the first cooling rate. In some embodiments, the core comprises a first set of melt pools. In some embodiments, the skin comprises a second set of melt pools. In some embodiments, an orientation of the second set of grains is with respect to the second set of melt pools and/or the exterior surface of the skin. In some embodiments, melt pools of the second set of melt pools are aligned with the exterior surface of the skin. In some embodiments, the exterior surface of the skin has an area surface roughness (Sa) of at most about 50 micrometers. In some embodiments, the exterior surface of the skin has an area surface roughness (Sa) of at most about 20 micrometers. In some embodiments, the exterior surface of the skin has an area surface roughness (Sa) of at most about 10 micrometers. In some embodiments, the skin is characterized by a plurality of tiles. In some embodiments, centers of adjacent (e.g., successive) tiles are (e.g., substantially) uniformly spaced apart from one another. In some embodiments, at least two adjacent (e.g., successive) tiles overlap with each other. In some embodiments, the centers of adjacent tiles are spaced apart a distance ranging between about 10 micrometers and about 500 micrometers. In some embodiments, the skin comprises a melt pool comprising a curved bottom portion indicative of a stacking vector in which the plurality of layers are bonded together. In some embodiments, the stacking vector is (e.g., substantially) perpendicular to a layering plane of the three-dimensional object. In some embodiments, the melt pool defines an alignment line that runs through a central portion of the melt pool. In some embodiments, the stacking vector is (e.g., substantially) parallel to the alignment line. In some embodiments, crystal structures of the melt pool converge in a V-shape. In some embodiments, a top of the V-shape is pointed in accordance with the stacking vector. In some embodiments, the exterior surface of the skin has a plurality of crescent-shaped ridges corresponding to overlapping tiles.

In another aspect, a three-dimensional object comprises: a core comprising a first plurality of layers of hardened material characterized as having a first microstructure associated with being formed at a first solidification rate; and a skin coupled with the core and comprising a second plurality of layers of hardened material, wherein: (i) an exterior surface of the skin corresponds to at least a fraction of an exterior surface of the three-dimensional object, and (ii) the second, plurality of layers of hardened material is characterized as having a second microstructure associated with being formed at a second, solidification rate that is different than the first solidification rate.

In some embodiments, the first solidification rate is associated with a cooling rate of the first hardened material. In some embodiments, the second solidification rate is associated with a cooling rate of the second hardened material. In some embodiments, the first solidification rate is slower than the second solidification rate. In some embodiments, the first solidification rate is faster than the second solidification rate. In some embodiments, the first microstructure comprises a first melt pool or a first grain. In some embodiments, the second microstructure comprise a second melt pool or a second grain. In some embodiments, the first grain comprises a first constituent and wherein the second grain comprises a second constituent. In some embodiments, the first constituent differs from the second constituent in at least one aspect comprising: fundamental length scale, chemical makeup, crystal structure, metallurgical microstructure, or spatial placement in a melt pool. In some embodiments, the first constituent comprises a first crystal or a first metallurgical microstructure. In some embodiments, the second constituent comprises a second crystal or a second metallurgical microstructure. In some embodiments, the metallurgical microstructure comprises a dendrite, or a cell. In some embodiments, the skin has a thickness ranging from about 20 micrometers to about 1000 micrometers. In some embodiments, grains of the second microstructure of the skin are more organized as compared to grains of the first microstructure of the core. In some embodiments, grains of the second microstructure of the skin aligned with respect to (i) the exterior surface of the skin and/or (ii) an interior of a melt pool. In some embodiments, the skin comprises (i) a melt pool that defines an alignment line that runs parallel to the exterior surface of the skin and/or through a central portion of the melt pool, and (ii) a plurality of grain structures that are directed to (e.g., converge towards) the alignment line. In some embodiments, grains of the second microstructure are aligned at an angle with respect to the alignment line. In some embodiments, the first or second grain comprises dendrite, or cell. In some embodiments, adjacent layers of the first and second plurality of layers are chemically (e.g., metallically) bonded with one another. In some embodiments, the skin has a thickness ranging from about 20 micrometers to about 400 micrometers. In some embodiments, the skin is characterized by (i) a melt pool that defines an alignment line that runs through a central portion of the melt pool, and (ii) a plurality of grain strictures that converge along the alignment line. In some embodiments, at least two of the plurality of grain structures in the melt pool converge at a non-zero angle. In some embodiments, the core comprises a first set of grains. In some embodiments, the skin comprises a second set of grains. In some embodiments, grains of the second set have a larger fundamental length scale (e.g., on average) than grains of the first set. In some embodiments, the fundamental length scale comprises a width or a length. In some embodiments, the skin is (e.g., chemically (e.g., metallically)) bonded with the core. In some embodiments, the skin comprises dendrites that are oriented substantially parallel to the alignment line. In some embodiments, substantially parallel comprises at an angle of at most about twenty degrees with respect to the alignment line. In some embodiments, grains of the second set are (e.g., on average) about 1.5 times thicker than grains of the first set. In some embodiments, the first and second plurality of layers comprise a metal. In some embodiments, the metal comprises an elemental metal or a metal alloy. In some embodiments, the metal alloy is an iron comprising alloy, a nickel comprising alloy, a cobalt comprising allow, a chrome comprising alloy, a cobalt chrome comprising alloy, a titanium comprising alloy, a magnesium comprising alloy, or a copper comprising alloy. In some embodiments, the three-dimensional object comprises a plurality of stacked layers of hardened material. In some embodiments, stacked layers are bound together to form a shape of the three-dimensional object. In some embodiments, the skin is characterized by a plurality of tiles. In some embodiments, centers of adjacent tiles are (e.g., substantially) uniformly spaced apart from one another. In some embodiments, at least two adjacent tiles overlap with each other. In some embodiments, the centers of adjacent tiles are spaced apart a distance ranging between about 10 micrometers and about 500 micrometers. In some embodiments, the centers of adjacent tiles are spaced apart a distance ranging between about 50 micrometers and about 500 micrometers. In some embodiments, a layering, plane is defined between two successive layers of the first and/or second plurality of layers. In some embodiments, the skin is a bottom skin of an overhang structure of the three-dimensional object. In some embodiments, a vector normal to a the exterior surface of the bottom skin that intersects (1) the layering plane or to (2) a plane parallel to the layering plane, forms an angle with respect to the layering plane or with a line parallel to the layering plane that intersects with the vector. In some embodiments, the angle is at least about sixty degrees at most about ninety degrees, wherein the vector is directed towards the skin. In some embodiments, angle is no greater than about ten degrees. In some embodiments, the exterior surface has a measured area surface roughness (Sa) at most about 20 micrometers. In some embodiments, the exterior surface has a measured area surface roughness (Sa) at most about 5 micrometers. In some embodiments, the core has the same or substantially the same chemical composition as the skin. In some embodiments, the exterior surface of the skin has a plurality of crescent-shaped ridges corresponding to overlapping tiles.

In another aspect, a three-dimensional object comprises: a plurality of layers of hardened material that are bonded together to form a shape of the three-dimensional object, wherein the plurality of layers comprises: an interior (e.g., core) portion of the three-dimensional object; and a skin portion that is bonded with the interior portion and comprising a second plurality of layers, wherein: (i) an exterior surface of the skin portion corresponds to at least a fraction of an exterior surface of the three-dimensional object, and (ii) the exterior surface of the skin portion comprises a repetitive microstructure (e.g., a micro-texture of two-dimensional array of periodic peaks and valleys).

In some embodiments, the repetitive microstructure is repetitive in a layer of hardened material. In some embodiments, the array is periodic in at least one dimension. In some embodiments, the array is periodic along a layer of the hard material. In some embodiments, the repetitive microstructure comprises a series of peaks and valleys. In some embodiments, the array is locally repetitive on the exterior surface of the skin. In some embodiments the array is repetitive in both of its two-dimensions. In some embodiments, a depth of a valley (e.g., or an average depth of a number of valleys) is at most about 20 micrometers. In some embodiments, the two-dimensional array comprises overlapping tiles of deposited material. In some embodiments, the overlapping tiles appear as crescent shapes. In some embodiments, the valley immediately follows a peak. In some embodiments, the repetitive microstructure is sequentially repetitive. In some embodiments, the repetitive microstructure corresponds to scales. In some embodiments, the scales are overlapping and appear as crescent shapes. In some embodiments, the overlapping tiles are arranged in rows of tiles. In some embodiments, adjacent tiles in a row overlap by at least about five percent. In some embodiments, adjacent tiles in a row overlap by at most about 98 percent. In some embodiments, centers of adjacent tiles in a row are a distance of at least about 5 micrometers. In some embodiments, centers of adjacent tiles in a row are at a distance of at most about 1000 micrometers. In some embodiments, a first row of tiles overlaps with tiles of a second row of tiles that is successive to the first row of tiles. In some embodiments, the first row of tiles overlaps with the second row of tiles by at least about five percent. In some embodiments, the first row of tiles overlaps with the second row of tiles by at most about 98 percent. In some embodiments, a distance between a center of a first tile of the first row of tiles and a center of a second tile of the second row of tiles is at least about 5 micrometers. In some embodiments, a distance between a center of a first tile of the first row of tiles and a center of a second tile of the second row of tiles is at most about 1000 micrometers. In some embodiments, tiles within the first row of tiles overlap by a first distance. In some embodiments, tiles of the first row of tiles overlap with tiles of the second row of tiles by a second distance greater than the first distance. In some embodiments, tiles within the first row of tiles overlap by a first distance. In some embodiments, tiles of the first row of tiles overlap with tiles of the second row of tiles by a second distance less than the first distance. In some embodiments, the overlapping tiles have an average fundamental length scale of a least about 50 micrometers. In some embodiments, the overlapping tiles have an average fundamental length scale of a most about 1000 micrometers. In some embodiments, the interior portion is characterized as having a first grain structure associated with being formed at a first solidification rate. In some embodiments, the skin portion is characterized as having a second grain structure associated with being formed at a second solidification rate that is different than the first solidification rate. In some embodiments, the first solidification rate is greater than the second solidification rate. In some embodiments, the first solidification rate is less than the second solidification rate. In some embodiments, the exterior surface of the skin portion has an area surface roughness (Sa) of at most about 30 micrometers. In some embodiments, the exterior surface of the skin portion has an area surface roughness (Sa) of at most about 10 micrometers, in some embodiments, the skin portion and the interior portion are metallically bonded with each other. In some embodiments, the skin portion comprises a melt pool that defines an alignment line that runs through a central portion of the melt pool. In some embodiments, the melt pool comprises grain structures that converge along the alignment line in the melt pool. In some embodiments, the grain structures comprise at least one crystal. In some embodiments, the grain structures converge at a non-zero angle along the alignment line. In some embodiments, the melt pool comprises a curved bottom portion indicative of a stacking vector in which the plurality of layers are bonded together. In some embodiments, the grain structures converge in a V-shape such that a top of the V-shape is pointed in accordance with the stacking vector. In some embodiments, the interior portion comprises a first plurality of grains and wherein the skin portion comprises a second plurality of grains. In some embodiments, grains of the second plurality of grains are aligned and grains of the first plurality of grains are misaligned. In some embodiments, the interior portion comprises a first plurality of grains and wherein the skin portion comprises a second plurality of grains. In some embodiments, an alignment line that runs through a central portion of a melt pool of the skin, or is parallel to, or at, the exterior surface of the skin. In some embodiments, with respect to the alignment line: the second plurality of grains are aligned, and the first plurality of grains are misaligned. In some embodiments, the second plurality of grains align at a non-zero angle along the alignment line. In some embodiments, the first plurality of grains is different from the second plurality of grains by at least one aspect comprising a fundamental length scale, chemical makeup, crystal structure, metallurgical microstructure, coherence length, grain size, or spatial placement relative to the alignment line. In some embodiments, the second plurality of grains have a larger:fundamental length scale, coherence length, grain size, and/or more organized spatial placement relative to the alignment line. In some embodiments, the interior portion comprises a first grain. In some embodiments, the skin portion comprises a second grain that has at least one aspect that is different from the first grain. In some embodiments, the aspect comprises a fundamental length scale, chemical makeup, crystal structure, metallurgical microstructure, or spatial placement in a melt pool relative to the alignment line.

In another aspect, an apparatus for printing one or more 3D objects comprises a controller that is programmed to direct a mechanism used in a three-dimensional priming methodology to implement (e.g., effectuate) the method disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the three-dimensional priming process to implement (e.g., effectuate) any of the method disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods disclosed herein.

Another aspect of the present disclosure provides a computer system comprising one or more computer processors and a non-transitory, computer-readable medium coupled thereto. The non-transitory computer-readable medium comprises machine-executable code that, upon execution by the one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference,

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

FIGS. 6A-6C schematically illustrate a cross section in portion of a 3D object;

FIGS. 15A-15D schematically illustrate operations in forming a 3D object;

FIGS. 16A-16F schematically illustrate operations in forming a 3D object;

FIGS. 17A-17F schematically illustrate operations in forming a 3D object;

FIGS. 19A-19F schematically illustrate operations in forming a 3D object;

FIGS. 22A-22D schematically illustrates an energy beam and components used in the formation of one or more 3D objects; FIG. 22E schematically illustrates a graph associated with a 3D printing process;

FIGS. 26A-26B schematically illustrate forming at least a portion of a 3D object;

FIG. 27 schematically illustrates a graph of power as a function of time;

FIGS. 28A-28D show schematic top views of various 3D objects;

FIGS. 29A-29E schematically illustrate operations in forming a 3D object;

FIGS. 30A-30E schematically illustrate operations in forming a 3D object;

FIGS. 31A-31C schematically illustrate graphs depicting power (e.g., density) as a function of time;

FIGS. 34A-34B show vertical cross section images of 3D objects;

FIGS. 35A-35D show various images of 3D objects;

FIGS. 36A-36D show schematic horizontal views of various 3D objects;

FIGS. 37A and 37B schematically illustrate cross section views of irradiated portions of various 3D objects;

FIG. 39A schematically shows top views of various irradiated portions of a target surface; and FIGS. 39B and 39C schematically show vertical cross sections in 3D objects;

FIGS. 42A and 42B show cross section views of various 3D objects; and FIGS. 42C and 42D schematically illustrate overhang portions of 3D objects;

FIG. 49 shows a cross section view of a 3D object;

FIG. 50 shows a cross section view of a 3D object;

FIG. 51A shows a cross section view of a 3D object with a support member, and FIGS. 51B and 51C schematically illustrate different cross section profiles of a 3D object;

FIGS. 52A and 52B show cross section views of a 3D object;

FIGS. 54A-54C show cross section views of 3D objects;

FIGS. 55A-55C show cross section views of 3D objects;

FIGS. 58A-58D show various views of a 3D object;

FIGS. 60A and 60B show cross section views of a 3D object.

Figure 1:
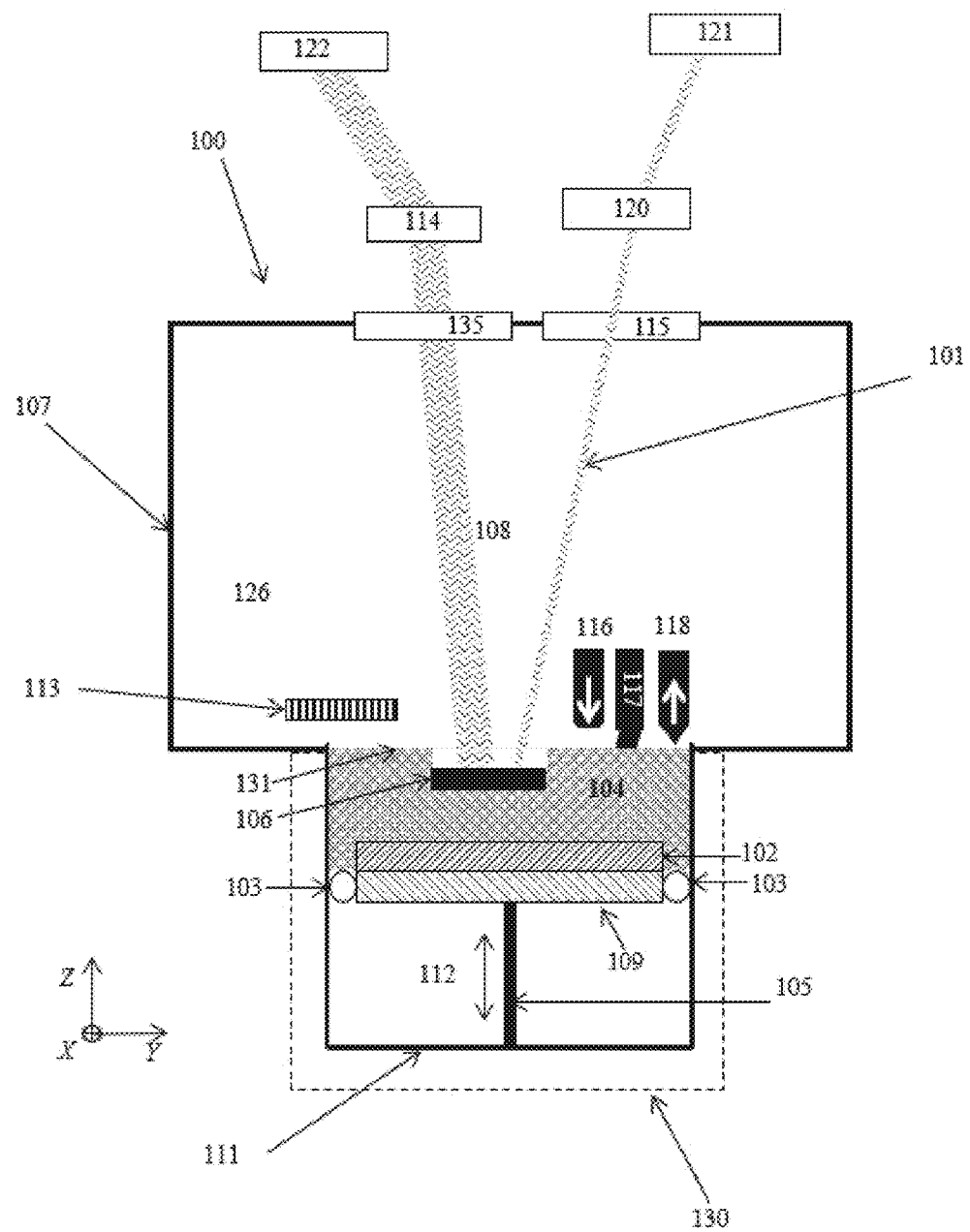
FIG. 1 shows a schematic side view of a 3D printing system and apparatuses.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided, by way of example only. Numerous variations, changes, and substitutions may occur to those skilled in the art without departing from the invention. It should be understood that various alternatives to the embodiments of the invention described herein might be employed.

Terms such as "a," "an" and "the" are not intended to refer to only a singular entity, but include the general class of which a specific example may be used for illustration. The terminology herein is used to describe specific embodiments of the invention, but their usage does not delimit the invention.

When ranges are mentioned, the ranges are meant to be inclusive, unless otherwise specified. For example, a range between value1 and value2 is meant to be inclusive and include value1 and value2. The inclusive range will span any value from about value1 to about value2. The term "between" as used herein is meant to be inclusive unless otherwise specified. For example, between X and Y is understood herein to mean from X to Y. The term "adjacent"

or "adjacent to," as used herein, includes 'next to,' adjoining, "in contact with,' and 'in proximity to.' In some instances, adjacent to may be 'above' or 'below.' The term "operatively coupled" or "operatively connected" refers to a first mechanism that is coupled (or connected) to a second mechanism to allow the intended operation of the second and/or first mechanism.

Fundamental length scale (abbreviated herein as "FLS") can refer herein as to any suitable scale (e.g., dimension) of an object. For example, a FLS of an object may comprise a length, a width, a height, a diameter, a spherical equivalent diameter, or a diameter of a bounding sphere.

The methods, systems, apparatuses, and/or software may effectuate the formation of one or more objects (e.g., 3D objects). In some cases, the one or more objects comprise elemental metal or metal alloys. In some embodiments, the 3D object includes an overhang structure. An overhang structure (also referred to herein as "overhang" or "overhang region") can refer to a structure of a 3D object that protrudes a distance from another structure (e.g., a core structure). An overhang structure may comprise (e.g., correspond to) a ceiling (e.g., cavity ceiling), bottom (e.g., cavity bottom), protrusion, ledge, blade, hanging structure, undercut, projection, protuberance, balcony, wing, leaf, extension, shelf, jut, hook or step of a 3D object. The overhang may be free of auxiliary supports during the printing of the overhang. For example, the overhang may be formed on (e.g., attached to) a previously formed (e.g., already hardened) portion of the 3D object. A surface (e.g., bottom surface) of an overhang may have a surface roughness at or below a prescribed roughness measurement.

In some embodiments, the 3D object includes a skin, which can correspond to a portion of the 3D object that includes an exterior surface of the 3D object. The skin is sometimes referred to herein as a "rim." "contour," "contour portion," "perimeter," "perimeter portion," "outer portion," or "exterior portion." In some embodiments, the skin is a "bottom" skin, which can correspond to a skin on a bottom of overhang with respect to a platform surface during a printing operation.

At times, when forming an overhang structure, and/or other portions of the 3D object, adjacent (e.g., two) melt pools may not assume similar (e.g. (e.g., substantially) identical) volume and/or shape due to different temperature profiles across the forming melt pool. Such dissimilarity may lead to the formation of irregular melt pools. The difference in volume and/or shape of (e.g., two) adjacent melt pools may be in the vertical direction. The difference in the volume and/or shape of the adjacent melt pool may form a stalactite like structure when extending downwards past the average surface of a bottom skin. Without wishing to be bound to theory, several factors may contribute to the irregular melt pools, which factors comprise: gravity, variations in solidification rate of different melt pools, variation in thermal in different melt pools, or different mass transfer rate in different melt pools. Dissimilar and/or irregular melt pools may lead to rough, cracked, or balled surfaces (e.g., bottom skin surfaces). Dissimilar and/or irregular melt pools may lead to a deformed hardened material. Dissimilar and/or irregular melt pools may lead to a printed 3D object that deviates from its intended purpose.

In some embodiments, at least a portion 4a transformed material (e.g., that forms a hardened material) is being re-melted, during the fabrication of the 3D object. The transformed material may be formed by a 3D printing methodology. In some embodiments, at least a (e.g., hardened material) melt pool is re-melted during the fabrication of the 3D object. The re-melting may be after the melt pool has been at least partially hardened (e.g., solidified). In some examples, the re-melting reduces (e.g., overcomes) formation of irregular and/or dissimilar melt pools (e.g., in the vertical and/or horizontal direction). In some examples, the re-melting reduces deformation of the 3D object (e.g., as it hardens). In some examples, such re-melting results in a smoother (e.g., bottom skin) surface. Smoother may be of an Ra or Sa value of at most about 30 μm, 40 μm, 50 μm, 75 μm, or 100 μm. Ra is the arithmetic average of a roughness profile. Sa is the arithmetic average of a 3D roughness.

Three-dimensional printing (also referred to herein as "3D printing") generally refers to a process for generating a 3D object. For example, 3D printing may refer to sequential addition of material layer or joining of material layers (or parts of material layers) to form a 3D structure, in a controlled manner. The controlled manner may include automated control. In the 3D printing process, the deposited material can be transformed (e.g., fused, sintered, melted, bound, or otherwise connected) to subsequently harden and form at least a part of the 3D object. Fusing (e.g., sintering or melting), binding, or otherwise connecting the material is collectively referred to herein as transforming the material (e.g., from a powder material). Fusing the material may include melting or sintering the material. Binding can comprise chemical bonding. Chemical bonding can comprise covalent bonding. Examples of 3D printing include additive printing (e.g., layer by layer printing, or additive manufacturing). 3D printing may include layered manufacturing. 3D printing may include rapid prototyping. 3D printing may include solid freeform fabrication. 3D printing may include direct material deposition. The 3D printing may further comprise subtractive printing.

3D printing methodologies can comprise extrusion, wire, granular, or powder bed and inkjet head 3D printing. Extrusion 3D printing can comprise roto-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), laser engineered net shaping (LENS), laser metal deposition (LMD), direct metal deposition (DMD), direct energy deposition (DED), or selective laser sintering (SLS). Powder bed and inkjet head 3D printing can comprise plaster-based 3D printing (PP). 3D printing methodologies may differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

The methods, apparatuses, systems, and/or software of the present disclosure can be used to form 3D objects for various uses and applications. Such uses and applications can include, without limitation, electronics, components of electronics (e.g., casings), machines, parts of machines, tools, implants, prosthetics, fashion items, clothing, shoes, or jewelry. The implants may be directed (e.g., integrated) to a hard, a soft tissue, or to a combination of hard and soft tissues. The implants may form adhesion with hard and/or soft tissue. The machines may include a motor or motor part. The machines may include a vehicle. The machines may comprise aerospace related machines. The machines may comprise airborne machines. The vehicle may include an airplane, drone, car, train, bicycle, boat, or shuttle (e.g., space shuttle). The machine may include a satellite or a missile. The uses and applications may include 3D objects relating to the industries and/or products listed herein.

The present disclosure provides systems, apparatuses, software, and/or methods for 3D printing of a requested 3D object from a pre-transformed (e.g., powder) material. The object call be pre-ordered, pre-designed, pre-modeled, or designed in real time (i.e., during the process of 3D printing). The 3D printing method can be an additive method in which a first layer is printed, and thereafter a volume of a material is added to the first layer as separate sequential layer (or parts thereof). An additional sequential layer (or part thereof) can be added to the previous layer by transforming (e.g., fusing (e.g., melting)) a fraction of the pre-transformed material. The transformed (e.g., molten) material may harden to form at least a portion of the (hard) 3D object. The hardening (e.g., solidification) can be actively induced (e.g., by cooling) or can occur without intervention (e.g., naturally). Real time may be, for example, during the formation of a layer of transformed material, during the formation of a layer of hardened material, during formation of a portion of a 3D object, during formation of a melt pool, during formation of an entire 3D object, or any combination thereof.

The 3D printing may be performed in an enclosure. During the 3D printing (e.g., during the transformation stage) a pressure of an atmosphere within the enclosure (e.g., comprising at least one gas) may be an ambient pressure. During the formation of the 3D object (e.g., during the formation of the layer of hardened material or a portion thereof), a remainder of the material (e.g., powder) bed that did not transform, may be at an ambient temperature. The ambient temperature may be an average or mean temperature of the remainder. During the formation of the 3D object (e.g., during the formation of the layer of hardened material or a portion thereof), a remainder of the material bed that did not transform, may not be heated (e.g., actively heated). For example, the remainder may not be heated beyond an (e.g., average or mean) ambient temperature. During the formation of the 3D object (e.g., during the formation of the layer of hardened material or a portion thereof), a remainder of the material bed that did not transform, may be at a temperature of at most about 10 degrees Celsius (° C.), 20° C., 25° C., 30° C., 40° C., 50° C., 60° C., 70° C., 80° C., 90° C., 100° C., 150° C., 200° C., 250° C., 300° C., 350° C., 400° C., 450° C., 500° C., 550° C., 600° C., 650° C., 700° C., 750° C., 800° C., 850° C., 900° C., or 1000° C. During the formation of the 3D object (e.g., during the formation of the layer of hardened material or a portion thereof), a remainder of the material bed that did not transform, may be at a temperature between any of the above-mentioned temperature values (e.g., from about 10° C. to about 1000° C., from about 100° C. to about 600° C., from about 200° C. to about 500° C. or from about 300° C. to about 450° C.). During the formation of the 3D object (e.g., during the formation of the layer of hardened material or a portion thereof), a remainder of the material bed that did not transform, may be at an ambient temperature. For example, the average or mean temperature of the remainder may be an ambient temperature.

In some embodiments, the 3D printing comprises at least one 3D printing methodology. In some embodiments, the 3D printing comprises a plurality of different 3D printing methodologies. In some embodiments, the 3D printing comprises a plurality of 3D object portions, at least two of which are formed by different 3D printing methodologies. The 3D printing methodology may depend on the type of portion primed. For example, the 3D printing methodology may depend on the geometry of the 3D portion. For example, the 3D printing methodology may depend on the position of the 3D portion (e.g., with respect to the platform and/or requested 3D portion). The at least one 3D object portion (e.g., that is characteristic of a 3D printing methodology) comprises forming a (i) porous matrix using a transforming energy beam, (ii) anchorlessly suspended (e.g., floating) bottom skin layer, (iii) rigid-portion (iv) multi transformation overhang, (v) single-transformation overhang, (vi) thickened overhang, or (vii) high aspect ratio melt pool. A high aspect ratio of a melt pool (e.g., FIG. 25A, 2510) may be described as a ratio of a depth of the melt pool (e.g., 2510 "h") over a radius of the exposed surface of the melt pool (e.g., 2510 "r"). A high aspect ratio of a melt pool (e.g., FIG. 25A, 2510) may be described as a ratio of a depth of the melt pool (e.g., 2510 "h") over a width of the exposed surface of the melt pool (e.g., $d_3$ of 2520). High aspect ratio may be described as a ratio of at least about 1.5. High aspect ratio may be at least about 1.5, 1.7, 2.0, 2.2, 2.4, 2.5, 2.7, 3.0, 3.2, 3.5, 3.7, 4.0, 4.2, 4.5, 4.7, 5.0, 5.5, 6.0, 6.5, 7.0, 7.5, 8.0, 8.5, 9.0, 9.5,or 10.0. High aspect ratio may be in any range between the afore-mentioned values (e.g., from about 1.5 to about 10.0,from about 1.5 to about 3.0,from about 3.0 to about 4.0,from about 4.0 to about 5.0,from about 3.0 to about 8.0,or from about 5.0 to about 10.0). The different optional 3D printing methodologies are described in detail herein. The 3D printing methodology may comprise (a) directly transforming a pre-transformed material into a transformed material, or (b) re-transforming a first transformed material (e.g., that forms a hardened material directly or indirectly) into a second transformed material. The second transformed material may be denser than the first transformed material. The second transformed material may have at least one different microstructure than the first transformed material. The second transformed material may have a different distribution of microstructures as compared to the first transformed material. The second transformed material may have a different number of melt pools as compared to the first transformed material. The first transformed material may have a first melt pool of a different fundamental length scale (abbreviated as "FLS") (e.g., aspect ratio of its radius to its depth) as compared to the second melt pool of the second transformed material. The first transformed material may be more porous than the second transformed material. The 3D priming methodology may comprise densifying a transformed (e.g., porous) structure (e.g., by re-transforming the transformed structure).

In some embodiments, a 3D object portion is generated by forming a hard (e.g., solid) material that is porous. The porous material is referred to herein as a "porous matrix" (abbreviated as "PMX"). The 3D object may be generated by (i) providing a pre-transformed material to a target surface; (ii) transforming at least a portion of the pre-transformed material into a transformed material. The transformation may include using a transforming energy beam, such as a laser beam, an electron beam, and/or other suitable type of energy beam. The transformation may comprise fusing. The fusing may comprise sintering or melting (e.g., completely melting). The transformed material may (e.g., subsequently) form a hard (e.g., solid) material that is porous (e.g., a porous matrix). The pre-transformed material may be provided by streaming it to (e.g., towards) a target surface. The transformation may be at the target surface, or adjacent (e.g., directly adjacent) to the target surface. The 3D object may be generated by providing a first layer of pre-transformed material (e.g., powder) in an enclosure; transforming (e.g., hardening) at least a portion of the pre-transformed material to form a first porous matrix layer (e.g., a partially densified layer). The transforming may be effectuated (e.g. conducted) with the aid of a transforming energy beam. The energy beam may travel along a path. The porous matrix layer may be formed anchorlessly within the enclosure. The PMX layer may be anchored to the platform. For example, the PMX layer may be formed directly on the platform. For example, the PMX layer may be anchored using one or more auxiliary support to the platform. The method may further comprise forming a second porous matrix layer (e.g., directly) above the first PMX layer. The second PMX layer may contact the first PMX layer at one or more positions. A 3D structure comprising a plurality of porous matrix layers may be referred to herein as a "porous matrix structure" (also herein "PMX structure"). In a PMX structure, at least a first PMX layer and a second PMX layer(s) may have different porosity percentages (e.g., calculated as volume per volume percentages, or as area per area percentage). In a PMX structure, at least a first PMX layer and a second PMX layer(s) may have (e.g., substantially) porosity percentages (e.g., volume per volume percentages or as area per area percentage). In a PMX structure, at least a first PMX layer and a second PMX layer(s) may have (e.g., substantially) identical pore structures (e.g., geometries). In a PMX structure, at least a first PMX layer and a second PMX layer(s) may have (e.g., substantially) different pore structures. At times, the PMX layer may be supplemented with pre-transformed material before its re-transformation and/or densification (e.g., by the transforming energy beam). At times, the PMX layer may not be supplemented with pre-transformed material before its re-transformation and/or densification. The method may further comprise transforming the PMX structure to form a hard material as part of the 3D object. The method may further comprise transforming the PMX structure to form a denser material as compared to the PMX structure. The denser (hard) material can be again transformed by a third transformation operation to form an even denser (hard) material. The transformation operations on the porous matrix may repeat until a desired and/or requested density of the hard material is obtained. Hard may comprise solid. Transforming may comprise re-transforming (e.g., re-sintering and/or re-melting (e.g., complete re-melting)) the one or more porous layers. Transforming may comprise forming one or more melt pools within the (e.g., entire) porous matrix. The method may further comprise providing a PMX on the previously transformed layers and re-transforming the PMX along with one or more transformed material layers. The PMX printing methodology may be used in forming a porous matrix ("PMX") structure, multi-transformation overhang, anchorlessly suspended bottom skin, and a rigid structure. The PMX 3D printing methodology may comprise forming one or more PMX layers by transforming a pre-transformed material, and subsequently densifying the one or more PMX layers to form respective denser one or more layers. For example, a porous layer may have a porosity of at most about 30%, 40%, 50%, 60%, 70%, 70%, or 80% (volume/volume, or area/area porosity relating to an area of a cross-section plane of maximum porosity). For example, a porous layer may have a porosity of at least about 20%, 30%, 40%, 50%, 60%, 70%, or 70%. The porous layer may have a porosity of any value between the afore-mentioned values (e.g from about 20% to about 80%, from about 20% to about 60%, from about 50% to about 80%, or from about 30% to about 60%). The PMX 3D printing methodology may use the type-1 energy beam (also referred to herein as "hatching energy beam") and/or type-2 energy beam (also referred to herein as "tiling energy beam"), as described herein. In some embodiments, the formation of the PMX and its densification are performed using the same (e.g., type of) energy beam. In some embodiments, the formation of the PMX is performed using a different (e.g., types of) energy beam as the one used for its densification.

Figure 9:
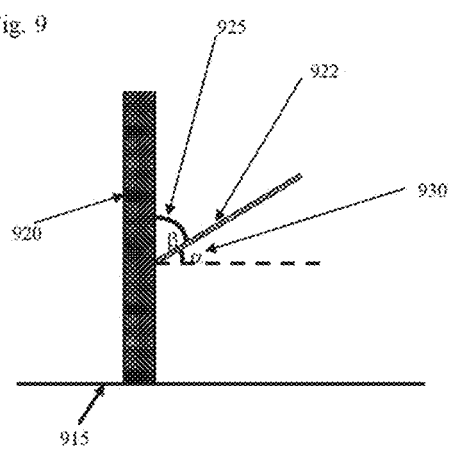
FIG. 9 schematically illustrates a cross section of a 3D object.

In some cases, a porosity of a 3D object (or a porosity of portion of a 3D object) is determined. In some embodiments, the porosity is determined by imaging the object (or a portion of the object) using an imaging instrument. In some cases, the imaging instrument uses X-ray (e.g., X-ray photography). In some cases, the imaging instrument comprises an optical microscope, scanning electron microscope and/or tunneling electron microscope. In some embodiments, one or more sections (e.g., cross-sections) of the object (or a portion of the object) are imaged. The image(s) can be used to identify pores (e.g., voids) in the object and/or on a surface of the object. A porosity (or density) can be determined by measuring (e.g., and/or estimating) a relative volume of the pores compared to a fully dense solid material (e.g., metal). The porosity can be quantified manually or automatically (e.g., using a processor such as a computer). In some embodiments, the porosity is determined as a percentage by a volume per volume basis (e.g., volume of pores versus volume of fully dense solid material). In some embodiments, the porosity is determined as a percentage by an area basis (e.g., area of pores versus area of fully dense solid material). In some embodiments, the porosity is determined in certain regions of an object. For example, in some case, the porosity of a skin portion of the object is determined. In some cases, the area porosity is determined along a cross-section plane. FIG. 39B shows an example cross-section view of a 3D object 3950 having a skin portion 3954 and an interior portion (core) 3952. In some embodiments, the transformation process(es) for forming a skin portion causes formation of a partially dense material that includes one or more pores (e.g., 3957). For example, a first transformation operation of a MTO process may cause pores to form within a skin. For example, the operation of a STO process may cause pores to form within a skin. In some cases, a melt pool (e.g., of a tile) may include a pore. The interior portion may have a plurality of layers, each of which has a height (e.g., layer thickness). In some cases, the pores are formed deep within the skin portion (e.g., at least about 2, 3, 4, 5, 6, or 7 average layer thicknesses from the top of the skin (e.g., skin boundary 3955)) during the printing. In some cases, the pores are formed deep within the melt pool (e.g., at least about 2, 3, 4, 5, 6, or 7 average layer thicknesses from the top of the melt pool) during the printing. The depth of the pores can be attributed to by remelting of at least one or more previously hardened layers of material. For example, the pores can be formed at least about 100 micrometers (μm), 200 μm, 300 μm, 400 μm, 500 μm or 1000 μm below a target surface during printing. In some embodiments, a portion (e.g., a majority (e.g., greater than about 50%)) of the pores in the skin portion are situated closer to the exterior surface of the 3D object portion (e.g., of a skin) than a boundary (e.g., 3955) between the interior and skin portions. In some cases, a portion (e.g., a majority (e.g., greater than about 50%)) of the pores are formed below a midline (e.g., 3951) (e.g., in an outermost half thickness) of the skin portion, e.g., and towards an external bottom surface of the skin. In some embodiments, the interior portion (e.g., 3952) does not border to the portion comprising the pores at its top boundary layer (e.g., in a ledge portion that is made up of skin, e.g., FIG. 9, 922). In some embodiments, a portion (e.g., a majority (e.g., greater than about 50%)) of the pores in the skin portion are arranged in a plane (e.g., 3958) that is (e.g., substantially) parallel to at least a portion of the exterior surface. In some embodiments, an area porosity of the cross-section plane (e.g., 3958) can correspond to a maximum area porosity of the skin portion. FIG. 39C shows an example cross-section view of a 3D object 3960 having a skin portion 3964 and an interior portion (core) 3962. The exterior surface (e.g., 3966) of the object (e.g., skin portion) can include a series of peaks and valleys. The series of peaks and valleys may correspond to the outer surfaces of tiles (e.g., overlapping tiles). Pores (e.g., 3967) within the skin portion may be aligned with a cross-section plane (e.g., 3968) that is (e.g., substantially) parallel to the exterior surface (e.g., 3966). In some cases, at least one (e.g., each) melt pool may include a pore. In some embodiments, some (e.g., a majority (e.g., greater than about 50%)) of the pores in the skin portion are situated closer to the exterior surface than a boundary (e.g., 3965) between the interior and skin portions. The melt pool may be asymmetric, e.g., having a narrower and/or curved bottom portion. In some cases, a portion (e.g., a majority (e.g., greater than about 50%)) of the pores are formed below a midline (e.g., 3961) (e.g., in an outermost half thickness) of the skin portion, e.g., towards the bottom of the melt pool(s). In some embodiments, an area porosity of the cross-section plane (e.g., 3968) can correspond to a cross section of the skin portion having maximum area porosity. In some embodiments, the porosity in the skin portion can be reduced (e.g., (substantially) eliminated) using one or more re-transformation operations described herein. For example, in some embodiments, a second transformation operation of a MTO process reduces the porosity of the skin portion to a target porosity. For example, in some embodiments, a second transformation operation using the HARMP process reduces the porosity of the skin portion to a target porosity.

In some embodiments, the 3D object is devoid of a sacrificial PMX that (e.g., completely) engulfs and/or supports at least a portion of a 3D object, wherein the sacrificial PMX is not part of the requested 3D object. The PMX may reduce the deformation and/or deformability of the at least a portion of a 3D object. The PMX may support at least a portion of the 3D object from 1, 2, 3, 4, 5,or 6 spatial directions. The PMX may engulf and/or support at least a portion of a 3D object. The PMX may (e.g., entirely, or substantially entirely) be incorporated within the 3D object upon the completion of the 3D printing.

In some embodiments, the transforming energy beam utilized in forming the PMX layer (e.g., in its optional re-transformation) travels along a path. The path may comprise hatches. The path may comprise tiles. A hatch may be formed using a (e.g., constantly) moving energy beam. The energy beam may comprise a continuous or dis-continuous (e.g., pulsing) energy beam. The energy beam may be any energy beam described herein (e.g., type-1 and/or type-2 energy beam).

In some embodiments, the energy beam forms a tile while irradiating a target surface. A tile may be formed using a (e.g., substantially) stationary energy beam, for example, to form a tile having a (e.g., substantially) circular cross section. FIG. 39 shows an example of a tile having circumference 3925 formed by an energy beam that irradiates a portion of a target surface, which energy beam footprint (also referred to herein as an irradiation spot) centers on position 3921 during formation of the tile. Substantially stationary may be relative to the speed and/or propagation direction of the transforming energy beam along the path. For example, a substantially stationary energy beam may move slightly (e.g., oscillate, move back and forth, or dither). The length of the movement may be less than a FLS of a footprint of the energy beam (e.g., around a point). The movement can be with respect to (e.g., around) a point. The point may correspond to a center of the energy beam or center of the footprint of the energy beam on the target surface. The movement may not include a spatial (e.g., lateral) movement greater than a diameter of the energy beam (e.g., cross section and/or footprint on the target surface). FIG. 39 shows an example of a tile having a circumference resembling oval 3935, formed by an energy beam that irradiates a portion of a target surface, which energy beam footprint centers on linear path 3931 and moves in a back and forth movement along path 3931 during formation of the tile; circumference 3937 shows an example of the energy beam circumference when the energy beam is centered in the middle of path 3931. The manner of tile formation may cause different temperature gradient profile along the horizontal cross section of the tile. For example, when a tile is formed by one spot irradiation using a gaussian beam, the center of the tile may be hotter than its edges. A tile may be formed using an energy beam that propagates along a circling or spiraling path, for example, to form a tile having a (e.g., substantially) circular cross section. FIG. 39 shows an example of a tile having circumference 3926 formed by an energy beam that irradiates a portion of a target surface, which energy beam footprint centers on an internal circular path having an arch 3922, and moves along the circular path during formation of the tile. During its formation, the center of the tile 3926 may be hotter than an are close to a circumference 3924 of tile 3926. FIG. 39 shows an example of a tile having circumference 3927 formed by an energy beam that irradiates a portion of a target surface, which energy beam footprint centers on a spiraling path that begins in position 3923 and ends in position 3929, and moves along the spiraling path during formation of the tile. In that manner, the center of the tile 3927 in position 3929 may be hotter than the circumference of the tile 3927, during its formation. A tile may be formed using a slow-moving energy beam (e.g., moving in slow speed), for example, to form a tile having a horizontally elongated cross section (e.g., that is different from a horizontally circular cross-sectional tile). At times, the energy beam moves along the path of time during tile formation along the path-of-tiles at a slow speed. The slow speed may be of at most about 5000 micrometers per second (μm/s), 1000 μm/s, 500 μm/s, 250 μm/s, 100 μm/s, 50 μm/s, 25 μm/s, 10 μm/s, or 5 μm/s. The slow speed may be of any value between the afore-mentioned values (e.g., from about 5000 μm/s to about 5 μm/s, from about 5000 μm/s to about 100 or from about 500 μm/s to about 5 μm/s. FIG. 39 shows an example of a tile having a circumference resembling oval 3936 formed by an energy beam that irradiates a portion of a target surface, which energy beam footprint centers on line 3932 and moves in a direction along line 3932 during formation of the tile; circumference 3934 shows an example of the energy beam circumference at the center of line 3931. The movement of the energy beam (e.g., along the circular, dithering, slow moving, or spiraling path) may be during a dwell time on the target surface (e.g., during a period of melt pool formation) to form the tile.

In some embodiments, a movement of the energy beam may be during a dwell time on the target surface to form the tile or a hatch. The dwell time may result in transformation of a target surface (e.g., pre-transformed material), for example, during tile formation and/or during hatching. The path may comprise a vector or a raster path. The method may further comprise hardening the transformed material to form a hard material as part of the 3D object. In some embodiments, the transformed material may be the hard (e.g., solid) material as part of the 3D object.

In some embodiments, successively formed melt pools (e.g., tiles) are formed using a tiling or hatching methodology using an energy beam configured to transform at least a portion of the target surface (e.g., the irradiated portion of the target surface). The energy beam may be a pulsing energy beam or a continuous energy beam. The tiling methodology may employ a type-2 energy beam (or at times, a type-1 energy beam) as disclosed herein. The hatching methodology may employ a type-1 energy beam (or at times, a type-2 energy beam) as disclosed herein. In some embodiments of the hatching methodology, the energy beam (e.g., a pulsing, or a continuous wave) can be continuously moving along a path (e.g., to form a hatch). When a pulsing energy is used, the distance between the formed melt pools may relate to the relative speed of the energy beam along a path. A melt pool may be formed during a pulse of the pulsing energy beam. For example, when the pulsing frequency is constant, a first distance between formed melt pools is larger when their forming energy beam speed is high (e.g., when progressing on a straight path portion), relative to a second distance between formed melt pools that is smaller when their forming energy beam speed is low (e.g., when progressing on a curved or winding path), which forming energy beam of the melt pools is the same forming energy beam.

In some embodiments of the tiling methodology, the energy beam moves along the path intermittently (e.g., in a stop and repeat mode). In some embodiments of the tiling methodology, the distance between tiles (e.g., melt pools forming the tiles) remains the same, e.g., regardless of the path section geometry (e.g., straight line, curved, and/or winding path). In some embodiments of the tiling methodology, the speed of the energy beam along the path (e.g., which energy movement comprises a dwell time and an intermission time) remains the same, e.g., regardless of the path section geometry (e.g., straight line, curved, and/or winding path). In some embodiments of the tiling methodology, the energy beam (i) irradiates a portion along a path (e.g., while being stationary, substantially stationary, or slow moving) with an energy density (profile) sufficient to transform the material included in the portion (e.g., to form a melt pool), (ii) reduce the power density of the energy beam along the path such that no transformation occurs along the path, and (iii) repeats steps (i) and (ii) until the path is completed. Operation (i) is designated herein as "dwell time" along the path. Operation (ii) is designated herein as "intermission time" along the path. During the intermission time, the power density can be zero, or substantially zero. During the intermission-time the power density may be sufficient to heat and not transform the material along the path. During the intermission time, the energy beam may travel elsewhere and irradiate (e.g., heat and/or transform) portions that are outside of the path (e.g., along a different path). The energy beam may form a plurality of paths in parallel, e.g., by irradiating a first portion during a first dwell time along a first path while ceasing its irradiation of a second path (during a first intermission); followed by irradiating a second portion during a second dwell time along a second path while ceasing the irradiation of a first path (during a second intermission). A pulse and/or intermission of the transforming energy beam during a tile formation along the path of tiles may last at least about 0.1 milliseconds (msec), 0.5 ms, 1 ms, 5 ms, 10 msc, 30 msec, 50 msec, 100 msec, 500 msec, or 1000 msec. A pulse and/or intermission of the transforming energy beam during a tile formation may last at most 0.5 ms, 1 ms, 5 ms, 10 msc, 30 msec, 50 msec, 100 msec, 500 msec, or 1000 msec. A pulse and/or intermission of the transforming energy beam during a tile formation along the path of tiles may any time span between the afore-mentioned time values (e.g., from about 0.1 msec to about 1000 msec, from about 0.5 msec to about 50 msec, from about 30 msec to about 500 msec, or from about 100 msec to about 1000 msec).

In some embodiments, the 3D object portion comprises an anchorlessly suspended bottom skin layer (abbreviated herein as "ASBS" layer). The ASBS layer formation methodology may comprise (i) forming one PMX layer and (ii) densifying the PMX layer into a denser layer. In some embodiments, operations (i) and (ii) are performed using the same (e.g., type of) energy beam. In some embodiments, operations (i) and (ii) are performed using different (e.g., types of) energy beams. The ASBS layer formation methodology may further comprise densifying the denser layer at least once (e.g., as described herein regarding PMX structure densification). The PMX layer may be formed by any suitable methodologies mentioned herein. The ASBS layer formation methodology may comprise (i) forming one PMX layer and (ii) re-transforming the PMX layer (e.g., into a denser layer and/or into a layer comprising at least one different microstructure) to form a transformed PMX layer. The ASBS layer formation methodology may further comprise re-transforming the transformed PMX layer at least once (e.g., as described herein regarding PMX structure densification) to form a multi-transformed PMX layer. The formed layer of the 3D object may be floating anchorlessly within the material bed during its formation (e.g., 3D printing). For example, the PMX layer may be suspended anchorlessly in the material bed during its formation, during its transformation, or any combination thereof. The "bottom skin layer" as used herein comprises the first formed (hard) layer of a 3D object. The ASBS printing methodology may be used to form an anchorlessly floating bottom skin layer of the 3D object, which ASBS anchorlessly floats in the material bed during its 3D printing. The material bed may be devoid of a pressure gradient during the formation of the ASBS. The material bed may be at ambient temperature and/or pressure during the formation of the ASBS. The pre-transformed material in the material bed may be flowable during the formation of the ABS. The ASBS may be (e.g., substantially) planar. The ASBS may comprise a large radius of curvature (e.g., as disclosed herein). The height (e.g., thickness) of the ASBS may be larger than the average height of the subsequent layer of the 3D object. Larger may be by at least about 1.1 times (*), 1.2*, 1.3*, 1.4*, 1.5*, 1.6*, 1.7*, 1.8*, 1.9*, 2.0*, 2.2*, 2.5*, 2.8*, 3.0*, 3.2*, 3.4*, 3.5*, 3.8*, 4.0*, 4.2*, 4.4*, 4.6*, 4.8*,or 5.0* thicker than the average height of the succeeding layer of the 3D object. Larger may be between any range between the afore-mentioned values (e.g., from about 1.1* to about 5.0*,from about 1.2* to about 2.0*,from about 2.0* to about 4.0*,or from about 4.0* to about 5.0*) thicker than the average height of the succeeding layer of the 3D object.

Figure 4:
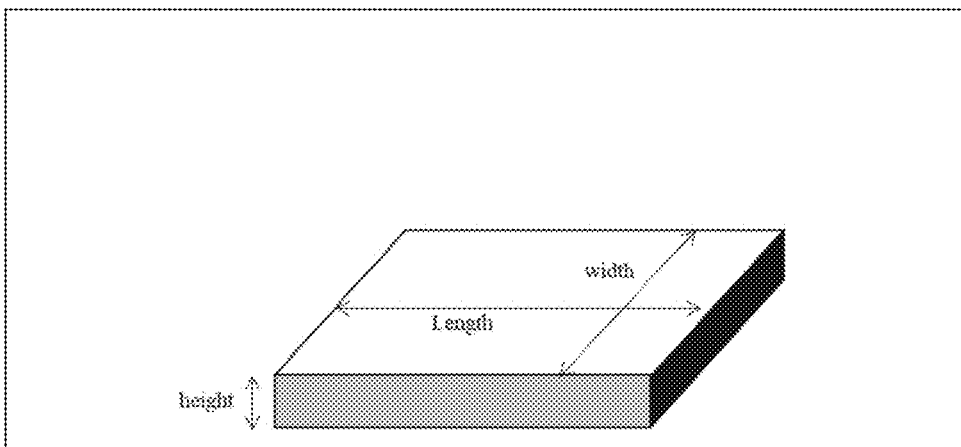
FIG. 4 schematically illustrates an example of a 3D plane.

In some embodiments, the 3D object portion comprises a rigid-portion using a transforming energy beam. The 3D object can be formed in a 3D printing system (e.g., FIG. 1, 100) whereby rigid-portion may be anchored to (e.g., a portion of) the platform, which may include a base (e.g., FIG. 1, 102) anchor a substrate (e.g., FIG. 1, 109), within the enclosure having an atmosphere (e.g., in a volume 126). The platform may comprise a support surface that supports at least a portion of one or more 3D objects. The support surface may be a surface of the base (e.g., 102). In some embodiments, the support surface is (e.g., substantially) orthogonal (e.g., normal and/or perpendicular) to the gravitational field vector. In some embodiments, the one or more 3D objects are printed directly on the support surface of the platform (e.g., directly on the base). The base may also be referred to herein as the build plate. The enclosure and/or platform may comprise an elemental metal, metal alloy, ceramic, or an allotrope of elemental carbon. The enclosure wall may comprise a non-transparent (e.g., opaque) material. The rigid portion may not yield (e.g., not substantially, e.g., not detectably yield), for example, to a force exerted upon by depositing an additional (e.g., layer of) transformed material on the rigid-portion. The rigid portion may not deform (e.g., not substantially or not detectably deform), for example, upon deposition of an additional (e.g., layer of) transformed material on the rigid portion. The rigid portion may not form one or more defects (e.g., not substantially or not detectably form defects), for example, upon deposition of an additional (e.g., layer of) transformed material on the rigid portion. Substantially may be relative to the intended purpose of the 3D object. In some embodiments, the rigid-portion may be thick enough to resist stress (e.g., upon depositing an additional (e.g., layer of) transformed material on the rigid-portion). The rigid portion may be thick enough to resist deformation (e.g., upon depositing an additional (e.g., layer of) transformed material on the rigid-portion). In some embodiments, the rigid-portion may be thick enough to resist formation of defects therein (e.g., upon depositing an additional (e.g., layer of) transformed material on the rigid-portion). The rigid portion may have a thickness (e.g., height or depth, e.g., as shown in FIG. 4) of at least about 0.6 millimeters (mm), 0.8 mm, 1.0 mm, 1.1 mm, 1.2 mm, 1.3 mm, 1.4 mm, 1.5 mm, 1.6 mm, 1.8 mm, 2.0 mm, 2.2 mm, 2.6 mm, 5.0 mm, 10 mm, 20 mm, 50 mm, or 100 mm. Thickness of the rigid-portion may be in a range between any of the afore-mentioned values (e.g., from about 1.0 mm to about 100 mm, from about 0.6 mm to about 2.6 mm, from about 0.8 mm to about 2.0 m, from about 1 mm, to about 1.8 mm, from about 1.2 mm to about 1.6 mm, from about 1.2 mm to about 5.0 mm, from about 5.0 mm to about 20 mm, or from about 20 mm to about 100 mm). The rigid-portion may provide support for formation of an additional portion of the 3D object (e.g., an overhang structure). The rigid-portion may be a part of the forming 3D object.

In some embodiments, the rigid portion does not respond to stress deformation on adding a transformed material (e.g., layer of transformed material) thereon. The rigid-portion may comprise shallow melt pools. The rigid-portion may have a (e.g., substantially) homogenously sized (e.g., hemispherical) melt pools. The shallow to hemisphetical melt pools may have an aspect ratio (e.g., depth of the melt pool to the radius of the exposed surface of the melt pool) of at most about 0.01, 0.05, 0.1, 0.2, 0.3, 0.4, 0.5, 0.75,1, 1.2, 1.3,or 1.4. The shallow to hemispherical inch pools may have an aspect ratio of the depth of the melt pool to the radius of the exposed surface of the melt pool, of any value between the afore-mentioned values (e.g., from about 0.01 to about 1.4,from about 0.01 to about 0.75,or from about 0.75 to about 1.4). The rigid-portion may be formed using a transforming energy beam (e.g., type-2 energy beam or type-1 energy beam).

In some embodiments, at least one layer of the rigid portion is formed by (e.g., a repetition of) a single transformation procedure or operation (abbreviated as "STO"). The single transformation procedure may comprise (i) depositing a pre-transformed material on a target surface (e.g., a platform or an exposed surface of a material bed), and (ii) using a transforming energy beam to transform the pre-transformed material to form a transformed material that forms at least a part of the 3D object. Operations (i) to (ii) may be repeated until a desired 3D shape and/or FLS of the rigid portion is reached. The transforming energy beam may follow a path to form a layer of transformed material. The pre-transformed material may be deposited to the target surface layerwise (e.g., layerwise deposition of particulate material such as powder). The layerwise deposition may comprise depositing planar layers of pre-transformed material (e.g., of a predetermined height). The pre-transformed material may be deposited towards the target surface in a stream of pre-transformed material, and is transformed by the transforming energy beam at or closely adjacent to, the target surface (e.g., direct material deposition).

The rigid-portion may be generated by layerwise deposition. The layerwise deposition may comprise providing a first layer of pre-transformed material as part of a material bed (e.g., FIG. 1, 104) in an enclosure above a platform; and transforming at least a portion of the pre-transformed material to form a transformed material as part of the rigid-portion. The transformation may be effectuated (e.g. conducted) with the aid of a transforming energy beam (e.g., a type-1 energy beam (e.g., 101) or a type-2 energy beam (e.g., 108)). The transforming energy beam(s) may travel along a path. The method may further comprise providing a second layer of pre-transformed material adjacent to (e.g., above) the first layer, and repeating the transformation process (e.g., as delineated herein), to form at least a piece of the rigid-portion. Repeating operation (i) to provide a subsequent layer of pre-transformed material above the layer of transformed material and (ii) transforming (e.g., hardening) the pre-transformed material in the subsequent layer. The repetition may be done at least until the rigid-portion reaches a thickness that would allow it not to respond to a stress deformation upon adding, a transformed material.

In some embodiments, at least one layer of the rigid portion may be formed by multiple transformation. The multiple transformation may be of at least a portion of the material bed. The multiple transformation may comprise forming a PMX layer (e.g., as described herein). The PMX layer may be formed using a first transformation operation in which pre-transformed material is transformed into a (porous) first transformed material (that is hard or that hardens). The porous transformed material may form a hard (e.g., solid) porous material that is referred to herein as a "PMX material." The PMX may be (e.g., subsequently) supplemented with pre-transformed material, or not supplemented with pre-transformed material prior to a second transformation operation. In the second transformation, at least a portion of the PMX may be re-transformed into a second transformed material that forms a denser hard material as compared to the PMX. The denser hard material can be transformed again by a third transformation operation to form an even denser hard material. The transformation operations on the PMX may repeat until a desired and/or requested density of the hard material is obtained.

In some embodiments, the 3D object portion is generated using a multi-transformation process or operation (abbreviated as "MTO" process) to form an overhang. The overhang may be a 3D plane (e.g., that is connected it at least one, two, or three direction to a rigid portion (e.g., core) structure. The overhang may comprise a shelf, or a blade. The overhang may comprise (e.g., correspond to) a ceiling of a cavity (e.g., that is connected to the core at all its sides) or a bottom of a cavity. The 3D object portion may be generated by (i) providing a first layer of pre-transformed material that is adjacent to (e.g., above) a rigid-portion, within an enclosure (e.g., in a material bed); (ii) forming a first PMX layer from at least a portion of the first layer of the pre-transformed material; and (iii) transforming the PMX layer to form a first dense layer (e.g., that is denser than the first PMX layer). The MTO process may be used to form the first formed layer of the overhang. For example, the MTO process may be used to form the bottom skin of the overhang structure. The MTO process may be used to form the bottom skin of at least a portion of an overhang (e.g., cavity ceiling or bottom). The MTO method may further comprise repeating operations (i) to (iii). For example, by (iv) providing a second layer of pre-transformed material that is adjacent to (e.g., above) the first dense layer; (v) forming a second PMX layer from at least a portion of the second layer of pre-transformed material, which second PMX layer partially overlaps or contacts the first dense layer; and (vi) transforming the second PMX layer to form a second dense layer (e.g., that is denser than the second PMX layer). The first dense structure may connect (e.g., weld) to the rigid-portion in at least one position (e.g., and otherwise be devoid of an auxiliary support). The second dense structure may connect (e.g., weld) to the first dense structure in at least one position (e.g., and otherwise be devoid of auxiliary support). The non-overlapping portion of the second dense structure may extend in the direction away from the rigid-portion (e.g., in the direction towards the overhang extension). The overhang may form an angle with respect to the rigid portion and/or platform. The MTO methodology maybe used to form an overhang having an angle with respect to a direction parallel to the platform, or with a direction perpendicular to the platform. In some embodiments, the MTO methodology may be used to form an overhang with a shallow angle. The angle may be shallow to a prescribed degree. Shallow may be an angle of at most about 40°, 35°, 30°, 25°, 20°, 15°, 10°, 8°, 5°, 4°, 3°, 2°, 1°, 0.5° or 0°, with respect to a direction parallel to the platform. Shallow may be any angle between the afore-mentioned angles, with respect to a direction parallel to the platform (e.g., from about 0° to about 40°, from about 30° to 0°, from about 20° to 0°, from about 10° to 0°, or from about 5° to 0°). In some embodiments, the MID methodology may be used to form an overhang with a steep angle (e.g., above 40 degrees with respect to a direction parallel to the platform). Steep may be an angle of at most about 50°, 40°, 35°, 30°, 25°, 20°, 15°, 10°, 8°, 5°, 4°, 3°, 2°, 1°, 0.5° or 0°, with respect to a direction perpendicular to the platform. Steep may be any angle between the afore-mentioned angles, with respect to a direction perpendicular to the platform (e.g., from about 0 to about 40°, from about 30° to 0°, from about 20° to 0°, from about 10° to 0°, or from about 5° to 0°). In some embodiments, the MTO methodology may be used to form an overhang with an obtuse angle (e.g., above 90 degrees with respect to a direction perpendicular to the platform). Obtuse may be an angle of at least about 91°, 100°, 110°, 120°, 130°, 140°, 150°, 60°, 170°, or 179° with respect to direction perpendicular to the platform. Obtuse may be any angle between the afore-mentioned angles, with respect to a direction perpendicular to the platform (e.g., from about 91° to about 179°, from about 91° to 120°, from about 120° to 150°, from about 150° to 179°, or from about 100° to 179°). The MTO printing methodology may be used for forming a (e.g., complex) portion of a 3D object (e.g., a shallow angled structure or a wedge). The transformation may be done using the transforming energy beam (e.g., the type-2 energy beam). In some embodiments, at least two of the operations (ii)-(iii) and (v)-(vi) are performed using the same e.g., type of) energy beam. In some embodiments, at least two of the operations (ii)-(iii) and (v)-(vi) are performed using different (e.g., types o iergy beams (at least two of the operations comprises all the operations delineated).

In some embodiments, a PMX layer is used (e.g., directly) to support a rigid structure. For example, the 3D object portion may be generated by (i) providing a first layer of pre-transformed material in an enclosure (e.g., in a material bed); (ii) forming a PMX layer from at least a portion of the first layer of the pre-transformed material; (iii) depositing a second layer of pre-transformed material that is adjacent to (e.g., above) the first PMX layer; and (iv) forming a rigid-portion on the first layer. The PMX layer may be sufficient to support the rigid-portion, for example, when the requested rigid portion is small, when the PMX layer is small, or any combination thereof. In some embodiments, a sufficiently small rigid portion has a FLS (e.g., length and/or width) of at most about 20 millimeters (mm), 15 mm, 10 mm, 5 mm, 4 mm, 3 mm, 2 mm or 1 mm. A sufficiently small rigid portion can have a FLS between any of the afore-mentioned values (e.g., from about 1 mm to about 20 mm, from about 1 mm to about 10 mm, or from about 10 mm to about 20 mm). In some embodiments, a sufficiently small rigid portion has a radius of curvature of at least about 35 mm, 30 mm, 25 mm, 20 mm, 15 mm, 10 mm, 5 mm or 1 mm. A sufficiently small rigid portion can have a radius of curvature mentioned herein.

In some embodiments, the 3D object is generated using a single transformation process (abbreviated as "STO" process) to form an overhang. The 3D object may be generated by (i) providing a first layer of pre-transformed material (e.g., to form a material bed) in an enclosure above a platform, which material bed comprises a rigid-portion; and (ii) transforming at least a portion of the pre-transformed material to form a first layer of transformed material (e.g., that subsequently hardens into a hard material), which transformed material contacts and/or overlaps the rigid-portion. The transforming may be effectuated with the aid of a transforming energy beam (e.g., the type-2 energy beam). The energy beam may travel along a path. The STO printing methodology may be used for forming a (e.g., complex) portion of a 3D object (e.g., an overhang structure, a bottom skin layer, an (e.g., shallow) angled structure, or a wedge). The method may further comprise repeating operations (i) and (ii). For example, the method may further comprise (iii) dispensing a second layer of pre-transformed material above the first transformed material, and (iv) transforming at least a portion of the second pre-transformed layer to form a second layer of transformed material as part of an overhang structure that is a portion of the 3D object. The STO process may be used to form the first formed layer of the overhang. For example, the STO process may be used to form the bottom skin of the overhang structure. The STO process may be used to form the bottom skin of at least a portion of an overhang (e.g., cavity ceiling or bottom). The first may connect (e.g., weld) to the rigid-portion in at least one position (e.g., and otherwise be devoid of auxiliary support). The second layer of transformed material may connect (e.g., weld) to the first layer of transformed material in at least one position (e.g., and otherwise be devoid of auxiliary support). The non-overlapping portion of the second layer of transformed material may extend in the direction away from the rigid-portion (e.g., in the direction towards the overhang extension). The overhang may form an angle with respect to the rigid structure and/or platform. The STO methodology may be used to form an overhang having an angle with respect to a direction parallel to the platform, or with a direction perpendicular to the platform. In some embodiments, the STO methodology may be used to form an overhang with a shallow angle. The angle may be shallow to a prescribed degree. Shallow may be an angle of at most about 40°, 35°, 30°, 25°, 20°, 15°, 10°, 8°, 5°, 4°, 3°, 2°, 1°, 0.5° or 0°, with respect to a direction parallel to the platform. Shallow may be any angle between the afore-mentioned angles, with respect to a direction parallel to the platform (e.g., from about 0° to about 40°, from about 30° to 0°, from about 20° to 0°, from about 10° to 0°, or from about 5° to 0°). In some embodiments, the STO methodology may be used to form an overhang with a steep angle (e.g., above 40 degrees with respect to a direction parallel to the platform). Steep may be an angle of at most about 50°, 40°, 35°, 30°, 25°, 20°, 15°, 10°, 8°, 5°, 4°, 3°, 2°, 1°, 0.5° or 0°, with respect to a direction perpendicular to the platform. Steep may be any angle between the afore-mentioned angles, with respect to a direction perpendicular to the platform (e.g., from about 0° to about 40°, from about 30° to 0°, from about 20° to 0°, from about 10° to 0°, or from about 5° to 0°). In some embodiments, the STO methodology may be used to form an overhang with an obtuse angle (e.g., above 90 degrees with respect to a direction perpendicular to the platform). Obtuse may be an angle of at least about 91°, 100°0 , 110°, 120°, 130°, 140°, 150°, 160°, 170°, or 179° with respect to a direction perpendicular to the platform. Obtuse may be any angle between the afore-mentioned angles, with respect to a direction perpendicular to the platform (e.g., from about 91° to about 179°, from about 91° to 120°, from about 120° to 150°, from about 150° to 179°, or from about 100° to 179°). The transformation may be done using the transforming energy beam (e.g., the type-2 energy beam). In some embodiments, operations (ii) and (iv) are performed using the same (e.g., type of) energy beam. In some embodiments, operations (ii) and (iv) are performed using different (e.g., types of) energy beams.

In some embodiments, the 3D object is generated using an STO process and/or an MTO process in combination with a porous matrix (PMX) structure, to form a thickened overhang. The 3D object may be generated by (i) providing a first layer of pre-transformed material (e.g., to form a material bed) in an enclosure above a platform, (ii) generating a rigid-portion (e.g., that is or is not anchored to the platform), (iii) performing an STO or an MTO process to form a first overhang structure that is anchored to the rigid portion. The first overhang structure may be a part of an elongated overhang structure. The first overhang structure may be elongated in subsequent layers. For example, a second overhang structure can be formed by depositing a second layer of pre-transformed material, performing an STO or MTO process to form a second overhang structure, wherein the second overhang structure anchors (e.g., connects to) the first overhang structure. The first overhang structure may partially overlap the second overhang structure. The overhang elongation process may be repeated in a plurality of layers until the desired overhang skin is formed. To thicken the skin of the overhang (e.g., which skin is made using the STO or MTO process), a portion of a layer of pre-transformed material disposed above the previously formed overhang, is transformed into a porous matrix (PMX). For example, the method may further comprise providing a second layer of pre-transformed material above the first overhang structure, performing an STO or MTO process to form the second overhang structure, and adjacent second overhang structure, performing an PMX process to form a porous matrix above at least a portion of the first overhang structure, which porous layer connects to the first overhang structure. At least a portion of the first overhang structure may be connected (e.g., in a subsequent layer) with a porous material (e.g., formed by the PMX process) to thicken the first overhang structure. The overhang structure and/or the porous matrix may be transformed to form a transformed material as a part of the thickened overhang structure of a forming 3D object, which transformed material is denser than the PMX. At times, the thickened overhang structure may not be transformed (e.g., re-transformed). At times, the overhang structure may be thickened using the type-2 energy beam.

In some embodiments, the 3D object portion is generated by forming one or more high aspect ratio melt pools (abbreviated as HARMP). The HARMP may be utilized in a tiling or hatching methodology. For example, the HARMP may be formed by a continuously moving energy beam, or by an alternatingly moving energy beam (e.g., stop and repeat mode). In some examples, the HARMP in at least a portion of a layer of hardened material may be formed by a continuously moving energy beam. The high aspect ratio melt pool may (e.g., substantially) have a parabolic vertical cross section (e.g., with its extremum at the bottom of the melt pool). Aspect ratio may be described as a relation (e.g., a ratio) of a depth (or height) of the melt pool (e.g., FIG. 25A, 2510 "h") to the radius of the exposed surface of the melt pool (e.g., 2510 "r"). The radius of a high aspect ratio melt pool may be shorter (e.g., substantially) than the depth of the melt pool. For example, for a high aspect ratio melt pool, if the melt pool has a radius "r", the depth of the melt pool may be at least "2r", forming an aspect ratio of 2.0. The high aspect ratio melt pool may have a narrow, elongated structure (e.g., having an aspect ratio of at least about 1.5, 2.0, 2.5, 3.0, 4.0, 4.5 or 5.0) The HARMP process may comprise (i) irradiating a position of a target surface in a (e.g., substantially) stationary position with a transforming energy beam that is configured to form a high aspect ratio well comprising the irradiated position, and extending below the target surface; (ii) optionally elongating the well laterally (e.g., by extending the amount of transformed (e.g., molten) material) by moving the transforming energy beam laterally (e.g., horizontally), and (iii) gradually lowering the intensity of the transforming energy beam to allow closure of the formed well to form a melt pool. The gradual lowering of the intensity may allow the melt pool to form with a diminished formation of pores. The pores may comprise at most about 20%, 15%, 10%, 5%, 2%, 1%, 0.5%, 0.1%, or 0% of the melt pool. The percentage may be calculated volume per volume, or area per area (e.g., which area is a cross-sectional plane of maximum porosity in the 3D object). The pores may comprise a percentage of the melt pool that is between any of the afore-mentioned values (e.g., from about 20% to about 0%, from about 10% to about 0%, from about 5% to about 0%, or from about 2% to about 0%). Forming the well may comprise vaporizing the (e.g., transformed) material. Forming the well may comprise irradiating such that the (e.g., transformed) material may be form plasma. At times, the 3D object may comprise a complex structure (e.g., a wedge or a small horizontal cross section area). The transforming energy beam may be a high-power energy beam. The transforming energy beam may be a focused energy beam. The transforming energy beam may have a small FLS (e.g., cross section). The complex portion of the 3D object may be formed using the HARMP printing methodology. Substantially may be relative to the intended purpose of the 3D object. Substantially may be relative to the effect on the forming melt pool. Substantially stationary may result in a melt pool that has a homogenous (e.g., round) horizontal cross section. The target surface may comprise a portion of a 3D object. The portion may have been formed using any 3D printing methodology described herein. The portion may comprise a fine structure. The target surface may comprise a structure formed by a methodology other than 3D printing (e.g., welding, machining, or sculpting). The target surface may comprise the exposed surface of a material bed.

In some embodiments, in situ and/or real-time processing is implemented during a 3D printing operation. A first hardened material may be formed by transforming a pre-transformed material. The first hardened material may subsequently be transformed to a second hardened material (e.g., in situ during the 3D printing). For example, an energy beam can be used in a second transformation (e.g., second melting) to transform a hardened material that was formed by a first transformation (e.g., first melting) of a pre-transformed material (e.g., powder). In some embodiments, the process comprises re-transforming a hardened material to control one or more of its (e.g., material) characteristics. The control may be in situ, and in some cases in real-time during the 3D printing. The in situ and/or real-time processing can be implemented by a controller of the 3D printing system that is configured to send instructions to the energy beam source (e.g., laser) to perform specified in situ and/or real-time processing operations. The one or more characteristics may comprise surface roughness or density (or conversely porosity). The second transformation can be subsequent (e.g., immediately subsequent) to the first transformation. The second transformation of at least a portion of the hardened material can follow the first transformation, e.g., without an intermediate transformation operation performed on the hardened material. The second transformation can be used to, for example, alter at least one characteristic of the hardened material formed by the first transformation. The hardened material formed by the first transformation may have a first density. The second transformation can be used, e.g., (i) to alter the first density of the hardened material to form a hardened material of a second density, and/or (ii) to alter the surface roughness of the hardened material after the first transformation. For example, the second transformation can be used to increase the first density of the hardened material to form a hardened material of a second density (that is denser than the first density), and/or to reduce the surface roughness of the hardened material after the first transformation. In some embodiments, the first density is at most about 30%, 40%, 50%, 60%, 70%, 80% or 90% dense (measured as volume by volume, designated herein as "v/v", or area/ area porosity, e.g., of a cross-sectional plane of maximum porosity). In some embodiments, the second density is at least about 85% or 90%, 95%, 98%, 99%, 99.5%, 99.8% dense (v/v, or area/area porosity, e.g., of a cross-sectional plane of maximum porosity). The second transformation operation can increase the first density of the hardened material by about 110%, 120%, 130%, 140%, 150% to form the second density of the hardened material (v/v, area/area porosity, e.g., of a cross-sectional plane of maximum porosity). The second transformation operation can increase the first density by any percentage between the afore-mentioned percentages (e.g., from about 110% to about 150%, or from about 130% to about 150%). The second transformation operation can be controlled to decrease the density of the first density of the hardened material. In some embodiments, the second transformation operation can reduce a measured roughness of an exposed surface of the hardened material (i.e., smooth the exposed surface) by; a multiplier (e.g., by at least about ½, ¼, ⅙, ⅛, or 1/10). For example, a measured roughness (e.g., profile roughness Ra, or area roughness Sa) of the exposed surface of the second hardened material (that underwent the second transformation) can be reduced to have an Ra or Sa value of at most about 80 µm, 70 µm, 60 µm, 50 µm, 40 µm, 30 µm, 20 µm, 10 µm, or 5 µm. The measured roughness of the exposed surface of the second hardened material can have an Ra value between any of the afore-mentioned values (e.g., from about 80 µm to about 5 µm, from about 60 µm to about 5 µm, from about 40 µm to about 20 µm, from about 30 µm to about 5 µm). In some embodiments, the second transformation operation is controlled to increase the surface roughness of the hardened material after the first transformation.

In some embodiments, during a first transformation and a second transformation, the same type of energy beam movement methodology is used, whether tilling methodology or hatching methodology. In some embodiments, during the first transformation and the second transformation, a different type of energy beam movement methodology is used. For example, the first transformation can use a tiling movement methodology (e.g., stop and repeat), and the second transformation can use a hatching movement methodology (e.g., continuous movement). The hatching movement methodology may comprise an energy beam that constantly moves (e.g., at the same speed) during formation of a path, or during formation of a layer of hardened material.

In some embodiments, during a first transformation and a second transformation, the same type of transformation process is used, whether core, PMX, MTO, STO, or HARMP processes described herein. In some embodiments, during the first transformation and the second transformation, a different transformation process is used. For example, the first transformation can use a STO process, and the second transformation can use a HARMP process.

The second transformation operation can be any suitable type of transformation operation described herein. For example, the second transformation operation can involve one or more core, PMX, MTO, STO, or HARMP processes described herein. In some cases, the type of second transformation process implemented is chosen based on the aspect ratio and/or shape of the melt pools achieved by the second transformation process. For example, the second transformation process can involve a low aspect ratio (e.g., shallow), how genously dimensioned (e.g., hemispherical), or high aspect ratio (e.g., deep) melt pools. In son implementations, a high-aspect-ratio-melt-pool (HARMP) process is used to transform at least one layer of material that is at least partially hardened (e, g., which at least one layer was :formed using one or more of core, PMX, MTO, STO, or HARMP processes described herein). That is, the second transformation operation can transform the at least one hardened or partially hardened layer of material. For example, the second transformation operation can transform a plurality of hardened or partially hardened layers of material. In some cases, the second transformation process can process at most 2, 3, 4, 5, 6, 8, or 10 layers of hardened or partially hardened material. In some embodiments, the second transformation process transforms a particular height of hardened or partially hardened material. For example, in some embodiments the second transformation process transforms a hardened or partially hardened material having a height of at least about 300 µm, 400 µm, 500 µm, 600 µm, 700 µm, 800 µm, 900 µm, or 1000 µm (e.g., depending on the nature of material and the power density of the energy beam). The second transformation process may transform a hardened or partially hardened material having a height between any of the above-mentioned heights (e.g., from about 300 µm to about 1000 µm, from about 400 µm to about 800 µm, or from about 500 µm to about 700 µm).

In some embodiments, the 3D object is an extensive 3D object. The 3D object can be a large 3D object. The 3D object may comprise a hanging structure (e.g., wire, ledge, shelf, or 3D plane). In some embodiments, the 3D object includes a geometry that comprises an overhang structure connected to at least one rigid-portion (also referred herein as "core") that may be a part of the 3D object. The rigid-portion may provide support to a second portion (e.g., an overhang structure such as a structure comprising a ledge having a constant or varying angle with respect to the rigid-portion and/or platform) of the 3D object. The angle may be acute (e.g., steep, or shallow), or obtuse (e.g., as indicated herein). Examples of such an overhang 3D structure may comprise an arch, dome, ledge, or blade. For example, the :3D object may comprise a ledge having a constant or varying angle (e.g., with respect to a platform). FIG: 9 shows an example of an overhang structure (e.g., 922) connected to a rigid-portion (e.g., 920). The overhang structure may be formed within a material bed. At times, the overhang structure may be formed on a target surface (e.g., on an exposed surface of the material bed, on a platform, or connected to a rigid-portion (e.g., that is formed on a platform)). The rigid-portion may be connected (e.g., anchored) to a build plane (also referred to as a build plate) or a platform (e.g., 915). The overhang (e.g., the hanging ledge stricture) may be printed without auxiliary supports other than the connection to the one or more rigid-portions (that are part of the requested 3D object). The overhang may be formed at an angle (e.g., 930) with respect to the build plane and/or platform (e.g., 915). The overhang and/or the rigid-portion may be formed from the same or different pre-transformed material (e.g., powder).

In some embodiments, the 3D object is a large object. In some embodiments, the 3D object is a small object. Small is an object that is not large. The 3D object may be described as having a fundamental length scale of at least about 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. In some instances, the fundamental length scale (e.g., the diameter, spherical equivalent diameter, diameter of a hounding circle, or largest of height, width and length; abbreviated herein as "FLS") of the printed 3D object can be at least about 50 micrometers (µm), 80 µm, 100 µm, 120 µm, 150 µm, 170 µm, 200 µm, 230 µm, 250 µm, 270 µm, 300 µm, 400 µm, 500 µm, 600 µm, 700 µm, 800 µm, 1 millimeter (mm), 1.5 mm, 2 mm, 5 mm, 1 centimeter (cm), 1.5 cm, 2 cm, 10 cm, 20 cm, 30 cm, 40 cm, 50 cm, 60 cm, 70 cm, 80 cm, 90 cm, 1 meter (m), 2 m, 3 m, 4 m, 5 m, 10 m, 50 m, 80 m, or 100 m. The FLS of the printed 3D object can be at most about 1000 m, 500 m, 100 m, 80 m, 50 m, 10 m, 5 m, 4 m, 3 m, 2 m, 1 m, 90 cm, 80 cm, 60 cm, 50 cm, 40 cm, 30 cm, 20 cm, 10 cm, or 5 cm. In some cases, the FLS of the printed 3D object may be in between any of the afore-mentioned FLSs (e.g., from about 50 µm to about 1000 m, from about 120 µm to about 1000 m, from about 120 µm to about 10 m, from about 200 µm to about 1 m, from about 1 cm to about 100 m, from about 1 cm to about 1 m, from about 1 m to about 100 m, or from about 150 µm to about 10 m). The FLS (e.g., horizontal FLS) of the layer of hardened material may have any value listed herein for the FLS of the 3D object.

In some embodiments, the material (e.g., pre-transformed material, transformed material, or solid material) comprises an elemental metal, metal alloy, ceramic, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene: The fullerene may comprise a buckyball or a carbon nanotube. The ceramic material may comprise cement. The ceramic material may comprise alumina. The material may comprise sand, glass, or stone. In some embodiments, the material may be devoid of an organic material, for example, a polymer or a resin. In some embodiments, the material may exclude an organic material (e.g., polymer). At times, the material may comprise an organic material (e.g., a polymer or a resin). In some embodiments, the term "particulate material" may be exchanged by a "pre-transformed" material. The pre-transformed material may comprise a particulate material. The pre-transformed material may comprise a liquid, solid, or semi-solid. Pre-transformed material as understood herein is a material before it has been transformed by an energy beam during the 3D printing process. The pre-transformed material may be a material that was, or was not, transformed prior to its use in the 3D printing process.

At times, the pre-transformed material comprises a particulate material. The particulate material may comprise powder. The pre-transformed (e.g., powder) material may comprise a solid material. The particulate material may comprise one or more particles or clusters. The term "powder," as used herein, generally refers to a solid having fine particles. The "particulate material" may comprise powder material, or particles made of another material (e.g., liquid, or semi-liquid containing vesicles). The semi-liquid material may be a gel. The particulate material may comprise semi-liquid particles. Powders may be granular materials. The powder particles may comprise nanoparticles or microparticies. In some examples, a powder comprising particles having an average FLS (e.g., the diameter, spherical equivalent diameter, diameter of a bounding circle, or the largest of height, width and length; herein designated as "FLS") of at least about 5 nanometers (nm), 10 nm, 20 nm, 30 nm, 40 nm, 50 nm, 100 nm, 200 nm, 300 nm, 400 nm, 500 nm, 1 µm, 5 µm, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, or 100 µm. The particles comprising the powder may have an average FLS of at most about 100 µm, 80 µm, 75 µm, 70 µm, 65 µm, 60 µm, 55 µm, 50 µm, 45 µm, 40 µm, 35 µm, 30 µm, 25 µm, 20 µm, 15 µm, 10 µm, 5 µm, 1 µm, 500 nm, 400 nm, 300 nm, 200 nm, 100 nm, 50 nm, 40 nm, 30 nm, 20 nm, 10 nm, or 5 nm. In some cases, the powder may have an average FLS between any of the values of the average particle FLS listed above (e.g., from about 5 nm to about 100 µm, from about 1 µm to about 100 µm, from about 15 µm to about 45 µm, from about 5 µm to about 80 µm, from about 20 µm to about 80 µm, or from about 500 nm to about 50 µm).

In some embodiments, at least parts of the layer of pre-transformed material are transformed to a transformed material (e.g., using an energy beam) that subsequently form at least a fraction (also used herein "a portion," or "a part") of a hardened (e.g., solidified) 3D object. At times a layer of transformed and/or hardened material may comprise a cross section of a 3D object (e.g., a horizontal cross section). The layer may correspond to a cross section of a requested 3D object (e.g., a model). At times a layer of transformed or hardened material may comprise a deviation from a cross section of a model of a 3D object. The deviation may include vertical or horizontal deviation. A pre-transformed material layer (or a portion there can have a thickness (e.g., layer height) of at least about 0.1 micrometer (µm), 0.5 µm, 1.0 µm, 10 µm, 50 µm, 100 µm, 150 µm, 200 µm, 300 µm, 400 µm, 500 µm, 600 µm, 700 µm, 800 µm, 900 µm, or 1000 µm. A pre-transformed material layer (or a portion thereof) can have a thickness of at most about 1000 µm, 900 µm, 800 µm, 700 µm, 60 µm, 500 µm, 450 µm, 400 µm, 350 µm, 300 µm, 250 µm, 200 µm, 150 µm, 100 µm, 75 µm, 50 µm, 40 µm, 30 µm, 20 µm, 10 µm, 5 µm, 1 µm, or 0.5 µm. A pre-transformed material layer (or a portion thereof) may have any value in between the afore-mentioned layer thickness values (e.g., from about 1000 µm to about 0.1 µm, 800 µm to about 1 µm, from about 600 µm to about 20 µm, from about 300 µm to about 30 µm, or from about 1000 µm to about 10 µm). In some embodiments, the FLS (e.g., height or length) of the bottom skin layer (e.g., the first formed layer of the 3D object) is greater than the average or mean FLS of subsequent layers. The layer can be of particulate, transformed, and/or hardened material. Greater can be by at least about 1.25*, 1.5*, 2*, 2.5*, 3*, 3.5*, 4*, 4.5*, 5*, 5.5*, 6*, 7*, 8*, 9*, 10* or 11 times (*). Greater can be by at most about 1.25*, 1.5*, 2*, 2.5*, 3*, 3.5*, 4*, 4.5*, 5*, 5.5*, 6*, 7*, 8*, 9*, 10* or 11 times (*). Greater can be by any value between the afore-mentioned values (e.g., from about 1.25* to about 10*, from about 5* to about 11*, or from about 1.25* to about 5*). In some embodiments, a subsequent transformation (e.g., tiling) operation may cause a portion of the bottom skin to be consumed by (e.g., coalesce with) the subsequently transformed material (e.g., tiles). In some cases, this causes the tile to draw in the bottom skin. In some cases, a bottom skin having a FLS (e.g., height or length) of a least a prescribed FLS may assure that the bottom skin is not (e.g., substantially) drawn in by the subsequent transformed material (e.g., tiles).

In some embodiments, the material composition of at least two of a plurality of layers in the material bed is different. The material composition of at least one layer within the material bed may differ from the material composition within at least one other layer in the material bed. The material composition of at least one layer within the 3D object may differ from the material composition within at least one other layer in the 3D object. The difference (e.g., variation) may comprise difference in grain (e.g., crystal) structure. The variation may comprise variation in grain orientation, material density, degree of compound segregation to grain boundaries, degree of element segregation to grain boundaries, material phase, metallurgical phase, material porosity, crystal phase, crystal structure, or material type. The microstructure of the printed object may comprise planar structure, cellular structure, columnar dendritic structure, or equiaxed dendritic structure.

At times, the pre-transformed material of at least one layer in the material bed differs in the FLS of its particles (e.g., powder particles) from the FLS of the pre-transformed material within at least one other layer in the material bed. A layer may comprise two or more material types at any combination. For example, two or more elemental metals, at least one elemental metal and at least one alloy; two or more metal alloys. All the layers of pre-transformed material deposited during the 3D printing process may be of the same (e.g., substantially the same) material composition. In some instances, a metal alloy is formed in situ during the process of transforming at least a portion of the material bed. In some instances, a metal alloy is not formed in situ during the process of transforming at least a portion of the material bed. In some instances, a metal alloy is formed prior to the process of transforming at least a portion of the material bed. In some instances, a first metal alloy is formed prior to the process of transforming at least a portion of the material bed and a second (e.g., requested) metal alloy is formed during the transforming of at least a portion of the material bed. In the case of a multiplicity (e.g., mixture) of pre-transformed materials, one pre-transformed material may be used as support (i.e., supportive powder), as an insulator, as a cooling member (e.g., heat sink), as a precursor in the requested alloy formation, or as any combination thereof.

In some instances, adjacent components in the material bed are separated from one another by one or more intervening layers. In an example, a first layer is adjacent to a second layer when the first layer is in direct contact with the second layer. In another example, a first layer is adjacent to a second layer when the first layer is separated from the second layer by at least one layer (e.g., a third layer). The intervening layer may be of any layer size.

At times, the pre-transformed material is requested and/or pre-determined for the 3D object. The pre-transformed material can be chosen such that the material is the requested and/or otherwise predetermined material for the 3D object. A layer of the 3D object may comprise a single type of material. For example, a layer of the 3D object may comprise a single metal alloy type. In some examples, a layer within the 3D object may comprise several types of material (e.g., an elemental metal and an alloy, several ally types, several alloy phases, or any combination thereof). In certain embodiments, each type of material comprises only a single member of that type. For example: a single member of metal alloy (e.g., Aluminum Copper alloy). In some cases, a layer of the 3D object comprises more than one type of material. In some cases, a layer of the 3D object comprises more than one member of a material type.

In some instances, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium, or Osmium. The transition metal can be mercury. The rare-earth metal can be a lanthanide, or an actinide. The lanthanide metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Califonnum, Einsteinium, Fermium, Mendelevium, Nobelium, or Lawrencium. The other metal can be Aluminum, Gallium, Indium, Tin, Thallium, Lead, or Bismuth.

In some instances, the metal alloy comprises an iron based alloy, nickel based alloy, cobalt based allow, chrome based alloy, cobalt chrome based alloy, titanium based alloy, magnesium based alloy, copper based alloy, or any combination thereof. The alloy may comprise an oxidation or corrosion resistant alloy. The alloy may comprise a super alloy (e.g., Inconel). The super alloy may comprise Inconel 600, 617, 625, 690, 718,or X-750. The metal (e.g., alloy or elemental) may comprise an alloy used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The metal (e.g., alloy or elemental) may comprise an alloy used for products comprising a device, medical device (human & veterinary), machinery, cell phone, semiconductor equipment, generators, turbine, stator, motor, rotor, impeller, engine, piston, electronics (e.g., circuits), electronic equipment, agriculture equipment, gear, transmission, communication equipment, computing equipment (e.g., laptop, cell phone, i-pad), air conditioning, generators, furniture, musical equipment, art, jewelry, cooking equipment, or sport gear. The impeller may be a shrouded (e.g., covered) impeller that is produced as one piece (e.g., comprising blades and cover) during one 3D printing process. The 3D object may comprise a blade. The impeller may be used for pumps (e.g., turbo pumps). The impeller and/or blade may be any of the ones described in U.S. patent application Ser. No. 15/435,128,tiled on Feb. 16, 2017; PCT patent application number PCT/US17/18191,tiled on Feb. 16, 2017; or European patent application number. EP17156707.6,filed on Feb. 17, 2017,all titled "ACCURATE THREE-DIMENSIONAL PRINTING," each of which is incorporated herein by reference in its entirety where non-contradictory. The metal (e.g., alloy or elemental) may comprise an alloy used for products for human and/or veterinary applications comprising implants, or prosthetics. The metal alloy may comprise an alloy used for applications in the fields comprising human and/or veterinary surgery, implants (e.g., dental), or prosthetics.

In some instances, the alloy includes a superalloy. The alloy may include a high-performance alloy. The alloy may include an alloy exhibiting at least one of: excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80,Rene-77,Rene-220,or Rene-41), Haynes alloy, Incoloy, MP98T, TMS alloy, MTEK (e.g., MTEK grade MAR-M-247,MAR-M-509,MAR-M-R41, or MAR-M-X-45), or CMSX (e.g., CMSX-3,or CMSX-4). The alloy can be a single crystal alloy.

In some instances, the iron alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranimn, or Ferrovanadimn. The iron alloy may comprise cast iron, or pig iron. The steel may comprise Bulat steel, Chromoly, Crucible steel, Damascus steel, Hadfield steel, High speed steel, HSLA steel, Maraging steel, Managing steel (M300), Reynolds 531,Silicon steel, Spring steel, Stainless steel, Tool steel, Weathering steel, or Wootz steel. The high-speed steel may comprise Mushet steel. The stainless steel may comprise AL-6XN, Alloy 20,celestrium, marine grade stainless, Martensitic stainless steel, surgical stainless steel, or Zeron 100. The tool steel may comprise Silver steel. The steel may comprise stainless steel. Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade steel such as 440F, 410, 312, 430, 440A, 440B, 440C, 304, 305, 304L, 304L, 301, 304LN, 301LN, 2304, 316, 316L, 316LN, 316, 316LN, 316L, 316L, 316, 317L, 2205, 409, 904L, 321, 254SMO, 316Ti, 321H, or 304H. The steel may comprise stainless steel of at least one crystalline structure selected from the group consisting of austenitic, superaustenitic, ferritic, martensitic, duplex, and precipitation-hardening martensitic. Duplex stainless steel may be lean duplex, standard duplex, super duplex, or hyper duplex. The stainless steel may comprise surgical grade stainless steel (e.g., austenitic 316,martensitic 420,or martensitic 440). The austenitic 316 stainless steel may comprise 316L, or 316LVM. The steel may comprise 17-4 Precipitation Hardening steel (e.g., type 630,a chromium-copper precipitation hardening stainless steel, 17-4PH steel).

In some instances, the titanium-based alloy comprises alpha alloy, near alpha alloy, alpha and beta alloy, or beta alloy. The titanium alloy may comprise grade 1, 2, 2H, 3, 4, 5, 6, 7.7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38,or higher. In some instances, the titanium base alloy comprises Ti-6Al-4V or Ti-6Al-7Nb.

In some instances, the Nickel alloy comprises Alnico, Alumel, Chromel, Cupronickel, Ferronickel, German silver, Hastelloy, Inconel, Monel metal, Nichrome, Nickel-carbon, Nicrosil, Nisil, Nitinol, or Magnetically "soft" alloys. The magnetically "soft" alloys may comprise Mu-metal, Pumalloy, Supemralloy, or Brass. The brass may comprise Nickel hydride, Stainless or Coin silver. The cobalt alloy may comprise Megallium, Stellite (e.g. Talonite), Ultima, or Vitallium. The chromium alloy may comprise chromium hydroxide, or Nichrome, In some instances, the aluminum alloy comprises AA-8000,Al-Li (aluminum-lithiunt), Alnico, Duralumin, Hidumiuium, Kryron Magnalium, Nantbe, Scandium-aluminum, or Y alloy. The magnesium alloy may comprise Elektron, Magnox, or T-Mg—Al—Zn (Bergman phase) alloy.

In some instances, the copper alloy comprises Arsenical copper, Beryllium copper, Billon, Brass, Bronze, Constantin, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo, or Tumbaga. The Brass may comprise Calamine brass, Chinese silver, Dutch metal, Gilding metal, Muntz metal, Pinchbeck, Prince's metal, or Tombac. The Bronze may comprise Aluminum bronze, Arsenical bronze, Bell metal, Florentine bronze, Guanin, Gunmetal, Glucydur, Phosphor bronze, Ormolu, or Speculum metal. The copper alloy may be a high-temperature copper alloy (e.g., GRCop-84).

In some instances, the metal alloys are Refractory Alloys. The refractory metals and alloys may be used for heat coils, heat exchangers, furnace components, or welding electrodes. The Refractory Alloys may comprise a high melting points, low coefficient of expansion, mechanically strong, low vapor pressure at elevated temperatures, high thermal conductivity, or high electrical conductivity.

In some examples, the material (e.g., pre-transformed material) comprises a material wherein its constituents (e.g., atoms or molecules) readily lose their outer shell electrons, resulting in a free-flowing cloud of electrons within their otherwise solid arrangement. In some examples the material is characterized in having high electrical conductivity, low electrical resistivity, high thermal conductivity, or high density (e.g., as measured at ambient temperature (e.g., R.T., or 20° C.)). The high electrical conductivity can be at least about $1*10^5$ Siemens per meter (S/m), $5*10^5$ S/m, $1*10^6$ S/m, $5*10^6$ S/mm, $1*10^7$ S/m, $5*10^7$ S/m, or $1*10^8$ S/m. The symbol "*" designates the mathematical operation "times," or "multiplied by." The high electrical conductivity can be any value between the afore-mentioned electrical conductivity values e.g., from about $1*10^5$ S/m to about $1*10^8$ S/m). The low electrical resistivity may be at most about $1*10^{-5}$ ohm times meter ($\Omega$*m), $5*10^{-6}$ $\Omega$*m, $1*10^{-6}$ $\Omega$*m, $5*10^{-7}$ $\Omega$*m, $1*10^{-7}$ $\Omega$*m, $5*10^{-8}$, or $1*10^{-8}$ $\Omega$*m. The low electrical resistivity can be any value between the afore-mentioned electrical resistivity values (e.g., from about $1\times10^{-5}$ $\Omega$*m to about $1\times10^{-8}$ $\Omega$*m). The high thermal conductivity may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be any value between the afore-mentioned thermal conductivity values (e.g., from about 20 W/mK to about 1000 W/mK). The high density may be at least about 1.5 grams per cubic centimeter (g/cm$^3$), 2 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore-mentioned density values (e.g., from about 1 g/cm$^3$ to about 25 g/cm$^3$).

At times, a metallic material (e.g., elemental metal or metal alloy) comprises small amounts of non-metallic materials, such as, for example, oxygen, sulfur, or nitrogen. In some cases, the metallic material can comprise the non-metallic material in a trace amount. A trace amount can be at most about 100000 parts per million (ppm), 10000 ppm, 1000 ppm, 500 ppm, 400 ppm, 200 ppm, 100 ppm, 50 ppm, 10 ppm, 5 ppm, or 1 ppm (based on weight, w/w) of non-metallic material. A trace amount can comprise at least about 10 ppt, 100 ppt, 1 ppb, 5 ppb, 10 ppb, 50 ppb, 100 ppb, 200 ppb, 400 ppb, 500 ppb, 1000 ppb, 1 ppm, 10 ppm, 100 ppm, 500 ppm, 1000 ppm, or 10000 ppm (based on weight, w/w) of non-metallic material. A trace amount can be any value between the afore-mentioned trace amounts (e.g., from about 10 parts per trillion (ppt) to about 100000 ppm, from about 1 ppb to about 100000 ppm, from about 1 ppm to about 10000 ppm, or from about 1 ppb to about 1000 ppm).

Figure 48:
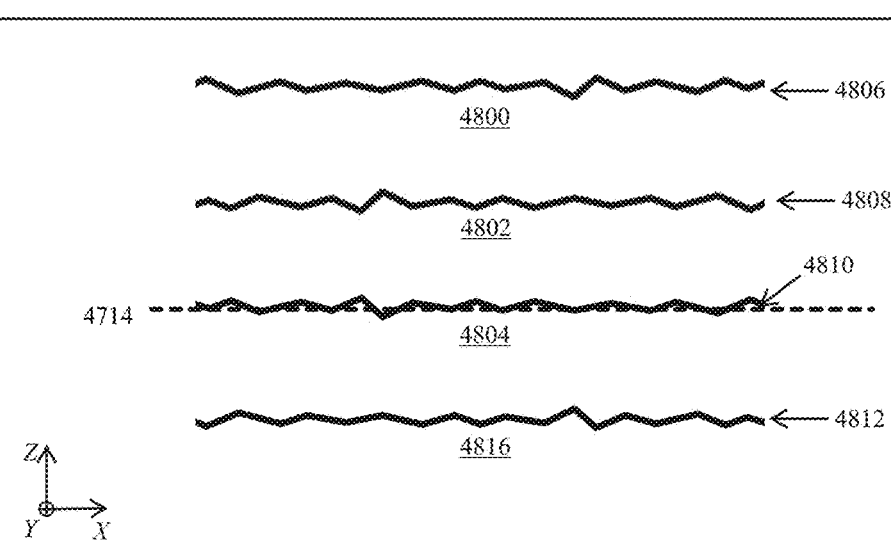
FIG. 48 schematically illustrates a cross section in various layering planes.

In some embodiments, 3D printing methodologies are employed for printing an object that is substantially two-dimensional, such as a wire or a planar object. The 3D object may comprise a plane like structure (referred to herein as "planar object," "three-dimensional plane," or "3D plane"). The 3D plane may have a relatively small width as opposed to a relatively large surface area. The 3D plane may have a relatively small height relative to its width and length. For example, the 3D plane may have a small height relative to a large horizontal plane. FIG. 4 shows an example of a 3D plane that is substantially planar (e.g., flat). The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf. The term "3D plane" is understood herein to be a generic (e.g., curved) 3D surface. For example, the 3D plane may be a curved 3D surface. The one or more layers within the 3D object may be substantially planar (e.g., flat). The planarity of a surface or a boundary the layer may be (e.g., substantially) uniform Substantially uniform may be relative to the intended purpose of the 3D object The height of the layer at a particular position may be compared to an average layering plane. The layering plane can refer to a plane that a layer of the 3D object is (e.g., substantially) oriented during printing. A boundary between two adjacent (printed) layers of hardened material of the 3D object may define a layering plane. The boundary may be apparent by, for example, one or more melt pool terminuses (e.g., bottom or top). A 3D object may include multiple layering planes (e.g., corresponding to each layer). In some embodiments, the layering planes are (e.g., substantially) parallel to one another. An average layering plane may be defined by a linear regression analysis (e.g., least squares planar fit of the top-most part of the surface of the layer of hardened material). An average layering plane may be a plane calculated by averaging the material height at each selected point on the top surface of the layer of hardened material. The selected points may be within a specified region of the 3D object. The deviation from any point at the surface of the planar layer of hardened material may be at most 20%, 15%, 10%, 5%, 3%, 1%, or 0.5% of the height (e.g., thickness) of the layer of hardened material. FIG. 48 shows a schematic example of a vertical cross section of a portion of a 3D object having layers 4800, 4802 4804 and 4816 of hardened material, with each layer sequentially formed during the 3D printing process. Boundaries (e.g., 4806, 4808, 4810 and 4812) between the layers may be (e.g., substantially) planar. The boundaries between the layers may have some irregularity (e.g., roughness) due to the transformation (e.g., melting) process. An average layering plane (e.g., 4814) may correspond to a (e.g., imaginary) plane that is calculated or estimated as an average layering plane thereof.

Figure 7:
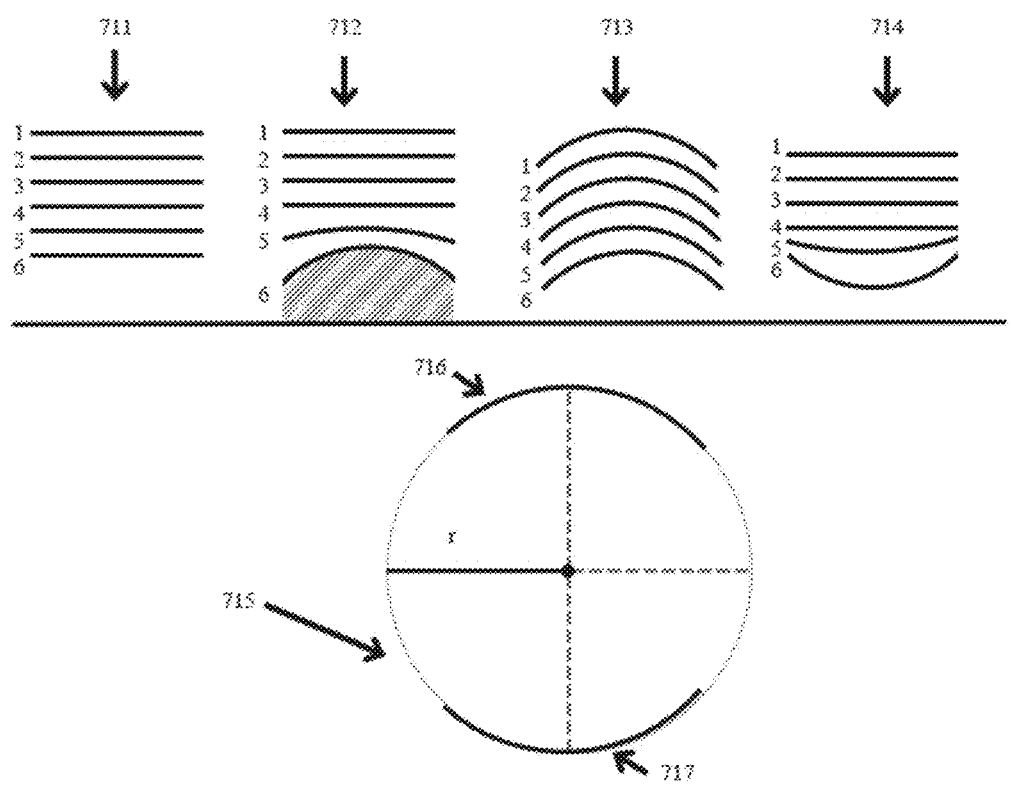
FIG. 7 schematically illustrates various vertical cross-sectional views of various 3D objects.

The substantially planar one or more layers may have a large radius of curvature. FIG. 7 shows an example of a vertical cross section of a 3D object (e.g., 712, 713, 714) comprising (e.g., substantially) planar layers (e.g., 712, layers numbers 1-4) and non-planar layers (e.g., 712 layers number 5-6; 713 layers number 1-6; or 714 layers number 5-6) that have a radius of curvature. An average layering plane of layers that are non-planar (e.g., 712, layers number 5-6; 713, layers number 1-6; or 714, layers number 5-6) may correspond to a plane that is calculated (e.g., by linear regression analysis) from the non-planar layer. FIGS. 7, 716 and 717 are super-positions of curved layer on a circle 715 having a radius of curvature "r." The one or more layers may have a radius of curvature equal to the radius of curvature of the layer surface. The radius of curvature may equal infinity (e.g., when the layer is (e.g., substantially) planar). The radius of curvature of at least one the layer of the 3D object (e.g., all the layers of the 3D object, the bottom skin layer, and/or the overhang) may have a value of at least about 0.1 centimeter (cm), 0.2 cm, 0.3 cm, 0.4 cm, 0.5 cm, 0.6 cm, 0.7 cm, 0.8 cm, 0.9 cm, 1 cm, 3 cm, 5 cm, 10 cm, 20 cm, 30 cm, 40 cm, 50 cm, 60 cm, 70 cm, 80 cm, 90 cm, 1 meter (m), 1.5 m, 2 m, 2.5 m, 3 m, 3.5 m, 4 m, 4.5 m, 5 m, 10 m, 15 m, 20 m, 25 m, 30 m, 50 m, or 100 m. The radius of curvature of at least one layer of the 3D object (e.g., all the layers of the 3D object) may have any value between any of the afore-mentioned values of the radius of curvature (e.g., from about 10 cm to about 90 m, from about 50 cm to about 10 m, from about 5 cm to about 1 m, from about 50 cm to about 5 m, from about 5 cm to infinity, or from about 40 cm to about 50 m). In some embodiments, a layer with an infinite radius of curvature is a layer that is planar. In some examples, the one or more layers may be included in a planar section of the 3D object, or may be a planar 3D object (e.g., a flat plane, or 3D plane). In some instances, part of at least one layer within the 3D object may have any of the radii of curvature mentioned herein, which will designate the radius of curvature of that layer portion. The 3D object may comprise a hanging structure. The hanging structure may be a plane like structure (e.g., a 3D plane).

Figure 10:
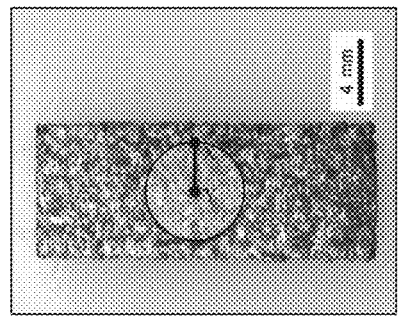
FIG. 10 illustrates a horizontal view of a 3D object.
Figures 25A, 25B:
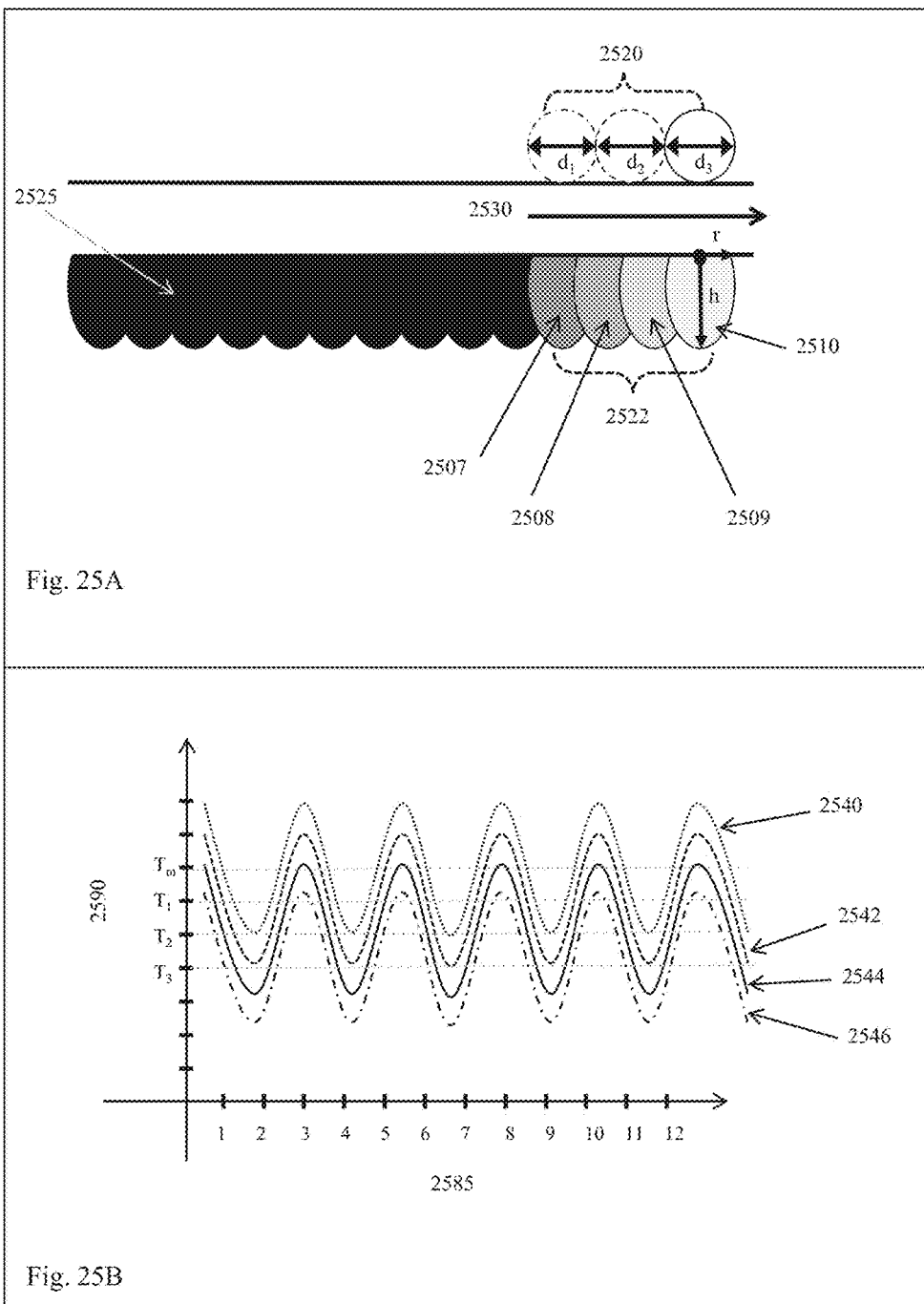
FIG. 25A schematically illustrates a side view of a forming 3D object.
FIG. 25B schematically illustrates a temperature profile as a function of time.

The radius of curvature, "r," of a curve at a point can be a measure of the radius of the circular arc (e.g., FIG. 7, 716) which best approximates the curve at that position. The radius of curvature can be the inverse of the curvature. In the case of a 3D curve (also herein a "space curve"), the radius of curvature may be the length of the curvature vector. The curvature vector can comprise of a curvature (e.g., the inverse of the radius of curvature) having a particular direction. For example, the particular direction can be the direction towards the platform (e.g., designated herein as negative curvature), or away from the platform (e.g., designated herein as positive curvature). For example, the particular direction can be the direction towards the direction of the gravitational field (e.g., designated herein as negative curvature), or opposite to the direction of the gravitational field (e.g., designated herein as positive curvature). A curve (also herein a "curved line") can be an object similar to a line that is not required to be straight. A straight line can be a special case of curved line wherein the curvature is (e.g., substantially) zero. A line of (e.g., substantially) zero curvature has an (e.g., substantially) infinite radius of curvature. A curve can be in two-dimensions (e.g., vertical cross section of a plane), or in three-dimension (e.g., curvature of a plane). The curve may represent a cross section of a curved plane. A straight line may represent a cross section of a flat (e.g., planar) plane. The platform may be a building platform. The platform may comprise the substrate, base, or bottom of the enclosure. The material bed may be operatively coupled and/or disposed adjacent to (e.g., on) the platform In some embodiments, the 3D object comprises one or more layering planes N of the layered structure. A layering plane can be used to refer to an orientation of a layer of the 3D object during its printing. In some embodiments, a layering plane is (e.g., substantially) parallel to the support surface of the platform, (e.g., substantially) parallel to the exposed surface of the material bed, and/or (e.g., substantially) orthogonal (e.g., perpendicular) to the gravitational field vector. The layering plane may be the average or mean plane of a layer of hardened material (as part of the 3D object). The 3D object may comprise points X and Y, which reside on the surface of the 3D object. FIG. 10 shows an example of points X and Y on the surface of a 3D object. In some embodiments, X is spaced apart from Y by the auxiliary feature spacing distance. A sphere of radius XY that is centered at X lacks one or more auxiliary supports or one or more auxiliary support marks that are indicative of a presence or removal of the one or more auxiliary support features. An acute angle between the straight line XY and the direction normal to N may be from about 45 degrees to about 90 degrees. The acute angle between the straight line XY and the direction normal to the layering plane may be of the value of the acute angle alpha. When the angle between the straight line XY and the direction of normal to N is greater than 90 degrees, one can consider the complementary acute angle. The layer structure may comprise any material(s) used for 3D printing. Each layer of the 3D structure (e.g., 3D object) can be made of a single material or of multiple materials. Sometimes one part of the 3D object (e.g., one layer of the 3D object) may comprise one material, and another part may comprise a second material different than the first material. A layer of the 3D object may be composed of a composite material. The 3D object may be composed of a composite material. The 3D object may comprise a functionally graded material. In some cases, the orientation of the layering plane can be identified in a 3D object by inspection (e.g., using X-ray, optical microscopy, scanning electron microscopy and/or tunneling electron microscopy). For example, a surface of the object may include ridges (also referred to as steps) (e.g., FIG. 58A, 5801), with each ridge corresponding to a layer of hardened material. In some cases, successively deposited melt pools may form the layer of hardened material. In some cases, a series of melt pools (e.g., successively deposited melt pools) within a layer of the 3D object may be oriented in accordance (e.g., (e.g., substantially) parallel) with respect to a layering plane. FIG. 25A shows an example of melt pools 2507, 2508 and 2509 as part of a layer 2525 formed in accordance with (e.g., (e.g., substantially) parallel to) a layering plane (e.g., parallel to trajectory 2530). The layering plane may be (e.g., substantially) perpendicular to the build direction of the object during its printing.

Figure 47A:
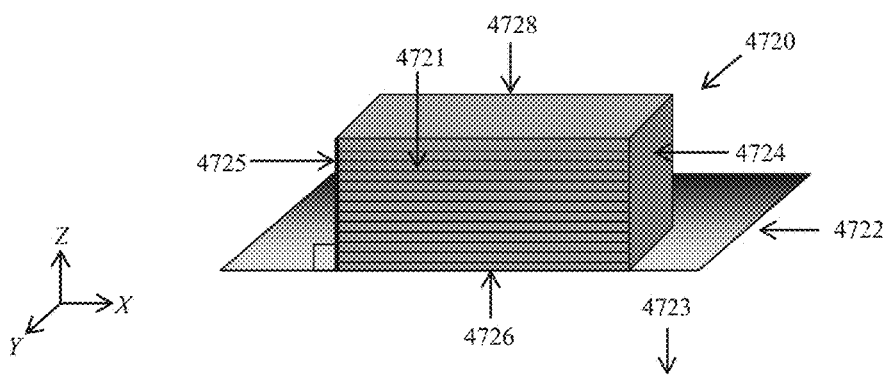
FIGS. 47A and 47B show vertical cross sections of 3D objects.
Figure 47B:
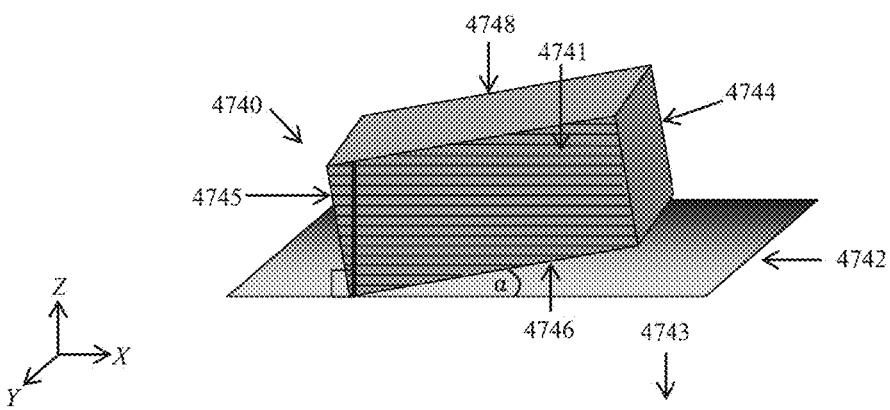

A layering plane of a 3D object may be at any angle with respect to a surface of the build platform surface and/or a surface of the 3D object. The angle may reveal the angle at which the object (or a portion of the object) was oriented with respect to the surface of the build platform. FIG. 47A shows an example 3D object 4720 that is formed (e.g., substantially) horizontally on a platform 4722 and/or (e.g., substantially) vertically with respect to the gravity vector 4723. The resulting layers (e.g., 4721) of hardened material can be (e.g., substantially) parallel with respect to each other (e.g., in accordance with an average layering plane). Adjacent layers may be integrally coupled with (e.g., chemically (e.g., metallically) bonded) with each other during the transformation (e.g., melting) process. The layers may be oriented (e.g., substantially) horizontally with respect to a bottom surface (e.g., 4726) and/or a top surface (e.g., 4728) of the 3D object. The layers may be oriented (e.g., substantially) vertically with respect to a side surface (e.g., 4724 or 4725) of the 3D object. FIG. 47B shows an example of a 3D object 4740 that is formed at an angle alpha (α) relative to the surface of a platform 4742 and/or an angle of 90 degrees plus alpha (α) with respect to the gravity vector 4743. The resulting layers (e.g., 4741) of hardened material may be at the angle alpha (α) with respect to a bottom surface (e.g., 4746) and/or top surface (e.g., 4748) of the 3D object. The layers may be oriented an angle of 90 degrees plus alpha (a) with respect to a side surface (e.g., 4744 or 4745) of the 3D object.

In some embodiments, the 3D object is generated with respect to a (e.g., virtual) model of a requested 3D object. The 3D object model may comprise a simulated model. The model may be a computer-generated model. In some embodiments, the generated 3D object may be generated with the accuracy of at least about 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 400 μm, 500 μm, 600 μm, 700 μm, 800 μm, 900 μm, 1000 μm, 1100 μm, or 1500 μm with respect to a model of the requested 3D object. With respect to a model of the requested 3D object, the generated 3D object may be generated with the accuracy of any accuracy value between the afore-mentioned values (e.g., from about 5 μm to about 100 μm, from about 15 μm to about 35 µm, from about 100 µm to about 1500 µm, from about 5 µm to about 1500 µm, or from about 400 µm to about 600 µm).

In some embodiments, the hardened layer of transformed material deforms the 3D printing and/or upon hardening). The deformation may cause a horizontal (e.g., height) and/or vertical g, width and/or length) deviation from a requested uniformly planar layer of hardened material. The horizontal and/or lateral deviation of the planar surface of the layer of hardened material may be of at most about 100 µm, 90 µm, 80, 70 µm, 60 µm, 50 µm, 40 µm, 30 µm, 20 µm, 10 µm, or 5 µm. The horizontal and/or vertical deviation of the planar surface of the layer of hardened material may be any value between the afore-mentioned height deviation values (e.g., from about 100 µm to about 5 µm, from about 50 µm to about 5 µm, from about 30 µm to about 5 µm, or from about 20 µm to about 5 µm). The height uniformity (e.g., of the uniformly planar layer) may comprise high precision uniformity. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dpi. The resolution of the 3D object may be any value between the afore-mentioned values (e.g., from 100 dpi to 4800 dpi, from 300 dpi to 2400 dpi, or from 600 dpi to 4800 dpi). A dot may be a melt pool. A dot may be a (e.g., vertical) step. A dot may be a height of the layer of hardened material. A step may have a value of at most the height of the layer of hardened material. The vertical (e.g., height) uniformity of a layer of hardened material may persist across a portion of the layer surface that has a FLS (e.g., a width and/or a length) of at least about 1 mm, 2 mm, 3 mm, 4 mm, 5 mm, or 10 mm, have a height deviation of at least about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80 µm, 70 µm, 60 µm, 50 µm, 40 µm, 30 µm, 20 µm, or 10 µm. The height uniformity of a layer of hardened material may persist across a portion of the target surface that has a FLS (e.g., a width and/or a length) of most about 10 mm, 9 mm, 8 mm, 7 mm, 6 mm, 5 mm, 4 mm, 3 mm, 2 mm, 1 mm, 500 µm, 400 µm, 300 µm, 200 µm, 100 µm, 90 µm, 80, 70 µm, 60 µm, 50 µm, 40 µm, 30 µm, 20 µm, or 10 µm. The height uniformity of a layer of hardened material may persist across a portion of the target surface that has a FLS (e.g., a width and/or a length) of any value between the afore-mentioned width or length values (e.g., from about 10 mm to about 10 µm, from about 10 mm to about 100 µm, or from about 5 mm to about 500 µm). A target surface may be a layer of hardened material (e.g., as part of the 3D object).

In an aspect, a 3D object (e.g., FIG. 1, 106) is generated from a pre-transformed material by irradiating a portion of a material bed (e.g., 104) comprising the pre-transformed material (e.g., by using an energy beam, e.g., 101 or 108). The irradiation may transform a portion of the irradiated material bed into a transformed material. The energy beam may be directed at a target surface, such as an exposed surface (e.g., FIG. 1, 131) of the material bed. The transformed material may form at least a portion of the 3D object. In some examples, the transformed material may harden to form a hardened material that is at least a portion of the 3D object. In some examples, the transformed material forms the hardened material that is at least a portion of the 3D object. The target surface may include a surface of the pre-transformed material (e.g., a layer of powder) and/or a surface of an already transformed material (e.g., a hardened portion of the 3D object (e.g., FIG. 1, 106)). The area of the target surface that the energy beam impinges on can be referred to as the spot size or footprint of the energy beam at the target surface.

In some embodiments, at least a portion of the 3D object is dense (e.g., substantially fully dense, e.g., FIG. 15D, 1535). Substantially is relative to the intended purpose of the 3D object. In embodiments, the 3D object comprises pores (e.g., FIG. 15B, 1515). In some embodiments, a portion of the 3D object may be dense and another portion may be porous. The pores may be random or systematic. The porous portion of the 3D object (e.g., PMX) may be permeable. One or more porous portions of the 3D object may have a different amount of porosity (e.g., at least about 30%, 40% porosity v/v, or arm/area porosity, e.g., of a cross-sectional plane of maximum porosity). One or more porous portions may have (e.g., substantially) the same amount of porosity. Dense portion of the 3D object may comprise a greater amount of transformed material than a porous portion of the 3D object. Dense may comprise heavily packed transformed material than a porous portion of the 3D object. Dense may comprise less permeable transformed matter than a porous portion of the 3D object. In some examples, the at least a portion of the 3D object may form a porous matrix (e.g., 1515). The porous matrix may be formed by at least one 3D printing process e.g., additive manufacturing, or direct material deposition). For example, the porous matrix layer may be formed by sintering and/or melting a pre-transformed material to form a transformed material. The porous matrix may be formed by heating, pressurizing a pre-transformed material to form a transformed material. A transforming energy beam (e.g., type-1 energy beam or type-2 energy bean), e.g., FIG. 15B, 1510) may be used to form the porous matrix (e.g., 1515). The pre-transformed material (e.g., FIG. 15A, 1505) may be flowable during the formation of the 3D object (e.g., during the transformation and/or hardening operations). The 3D object (e.g., porous 3D object) may be comprise a rigid structure that is not flowable. For example, the porous 3D object portion may be a porous matrix. In some examples, formation of the porous matrix portion may be a stage in the formation of a dense 3D object portion. For example, the porous matrix may comprise a hardened material. The porous matrix may further comprise pre-transformed material. In some examples, pre-transformed material is added to the formed porous matrix (e.g., using a material dispensing mechanism), for example, prior to its transformation and/or densification. The hardened and/or pre-transformed material of the porous matrix may be transformed (e.g., using an energy beam. E.g., FIG. 15C, 1521) to form a denser 3D object (e.g., a 3D object that has a greater density than the porous matrix. E.g., FIG. 15D, 1535). The transformation of the PMX (e.g., FIG. 15C, 1520) may comprise forming a melt pool (e.g., FIG. 15C, 1523) by irradiating a portion of the material bed (e.g., 1522) with a transforming energy beam (e.g., 1521). The PMX (e.g., 1515) and/or dense portion (e.g., 1535) may be suspended anchorlessly in the material bed during the 3D printing.

In an aspect, a 3D object is generated by disposing a (e.g., substantially) planar layer of pre-transformed material above (e.g., on) a platform (e.g., build platform) to form a material bed (e.g., FIG. 1, 104). At times, the 3D object may be generated by disposing a planar layer of pre-transformed matter on the base (e.g., FIG. 1, 102) on which the substrate (e.g., FIG. 1, 109) or the material bed may be disposed. At least a portion of the particulate material in the material bed may be irradiated by an energy beam (e.g., 101, 108) to form a transformed material as part of the 3D object. The transformed material may subsequently harden to form at least a portion of the 3D object. The transformed material may form the harden material as part of the 3D object. Optionally, a process of disposing a planar layer of pre-transformed material (e.g., by lowering the platform, dispensing a particulate material, and platinizing the dispensed particulate material), irradiating a portion of the material bed to (e.g., subsequently or directly) form the hardened material my repeat until a requested 3D object is printed layer by layer (e.g., additively, layerwise). A printed 3D object may include a plurality of layers that are indicative of a layerwise forming (e.g., printing) of the 3D object.

In some examples, the 3D object is a large 3D object. In some embodiments, the 3D object comprises a large hanging structure (e.g., wire, ledge, or shell). Large may be a 3D object having a FLS of at least about 1 centimeter (cm), 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The hanging structure may be a (e.g., vertically) thin structure. The hanging structure may be a plane like structure (referred to herein as "three-dimensional plane," or "3D plane"). The 3D plane may have a relatively small width as opposed to a relatively large surface area. For example, the 3D plane may have a small height relative to a large horizontal plane. FIG. 4 shows an example of a 3D plane that is planar. The 3D plane may be planar, curved, or assume an amorphous 3D shape. The 3D plane may be a strip, a blade, or a ledge. The 3D plane may comprise a curvature. The 3D plane may be curved. The 3D plane may be planar (e.g., flat). The 3D plane may have a shape of a curving scarf.

In some embodiments, the 3D object comprises a first portion and a second portion. The first portion may be connected to a rigid-portion (e.g., core) at one, two, or three sides (e.g., as viewed from the top). The rigid-portion may be the rest of the 3D object. The second portion may be connected to the rigid-portion at one, two, or three sides (e.g., as viewed from the top). For example, the first and second portion may be connected to a rigid-portion (e.g., column, post, or wall) of the 3D object. For example, the first and second portion may be connected to an external cover that is a part of the 3D object. The first and/or second portion may be a wire or a 3D plane. The first and/or second portion may be different from a wire or 3D plane. The first and/or second portion may be a blade (e.g., turbine or impeller blade). The first and second portions may be (e.g., substantially) identical in terms of structure, geometry, volume, and/or material composition. The first and second portions may be (e.g., substantially) identical in terms of structure, geometry, volume, material composition, or any combination thereof. The first portion may comprise a top surface. Top may be in the direction away from the platform and/or opposite to the gravitational field. The second portion may comprise a bottom surface (e.g., bottom skin surface). Bottom may be in the direction towards the platform and/or in the direction of the gravitational field.

Figure 5:
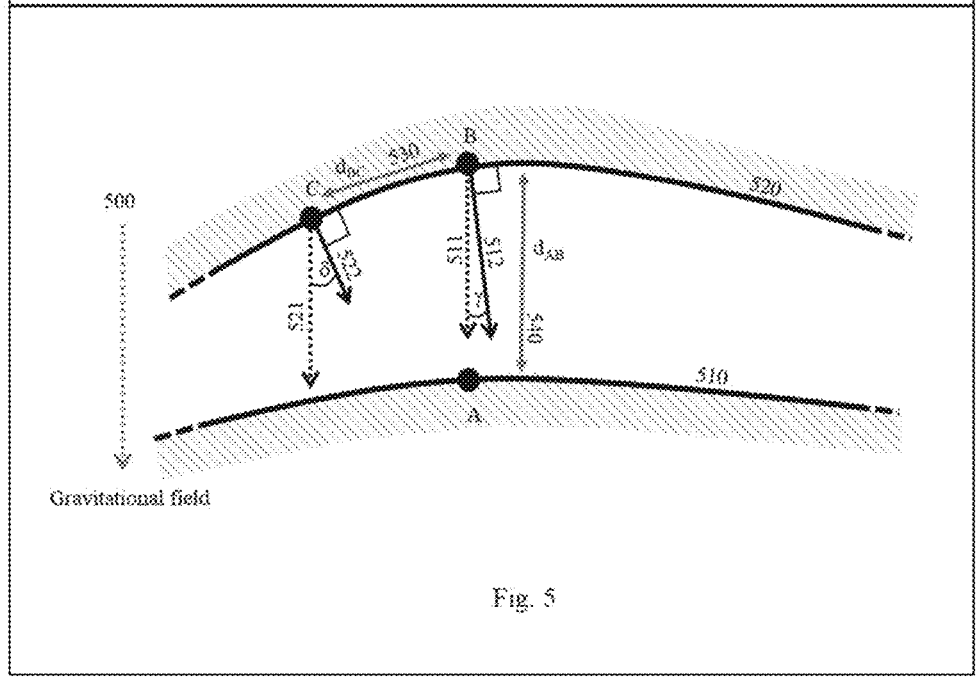
FIG. 5 schematically illustrates a cross section in portion of a 3D object.

FIG. 5 shows an example of a first (e.g., top) surface 510 and a second (e.g., bottom) surface 520. At least a portion of the first and second surface are separated by a gap. At least a portion of the first surface is separated by at least a portion of the second surface (e.g., to constitute a gap). The gap may be filled with pre-transformed or transformed (e.g., and subsequently hardened) material, e.g., during the formation of the 3D object. The second surface may be a bottom skin layer. FIG. 5 shows an example of a vertical gap distance 540 that separates the first surface 510 from the second surface 520. The vertical gap distance may be equal to the vertical distance of the gap as disclosed herein. Point. A (e.g., in FIG. 5) inlay reside on the top surface of the first portion. Point B may reside on the bottom surface of the second portion. The second portion may be a cavity ceiling or hanging structure as part of the 3D object. Point B (e.g., in FIG. 5) may reside above point A. The gap may be the (e.g., shortest) distance (e.g., vertical distance) between points A and B. FIG. 5 shows an example of the gap 540 that constitutes the shortest distance $d_{AB}$ between points A and B. There may be a first normal to the bottom surface of the second portion at point B. FIG. 5 shows an example of a first normal 512 to the surface 520 at point B. The angle between the first normal 512 and a direction of the gravitational acceleration vector 500 (e.g., direction of the gravitational field) may be any angle γ. Point C may reside on the bottom surface of the second portion. There may be a second normal to the bottom surface of the second portion at point C. FIG. 5 shows an example of the second normal 522 to the surface 520 at point C. The angle between the second normal 522 and the direction of the gravitational acceleration vector 500 may be any angle δ. Vectors 511, and 521 are parallel to the gravitational acceleration vector 500. The angles γ and δ may be the same or different. The angle between the first normal 512 and/or the second normal 522 to the direction of the gravitational acceleration vector 500 may be any angle alpha. The angle between the first normal 512 and/or the second normal 522 with respect to the normal to the substrate (e.g., platform) may be any angle alpha disclosed herein. The angle between the first normal 512 and/or the second normal 522 with respect to the normal to the substrate (e.g., platform) may be any angle disclosed herein for the angled structure. The angles γ and δ may be any angle alpha. The angles γ and δ may be any of any angled structure (e.g., acute, or obtuse). For example, alpha may be at most about 45°, 40°, 30°, 20°, 10°, 5°, 3°, 2°, 1°, or 0.5°. The shortest distance between points B and C may be any value of the auxiliary support feature spacing distance mentioned herein. For example, the shortest distance BC (e.g., $d_{BC}$) may be at least about 0.1 millimeters (mm), 0.5 mm, 1 mm, 1.5 mm, 2 mm, 3 mm, 4 mm, 5 mm, 10 mm, 15 mm, 20 mm, 25 mm, 30 mm, 35 mm, 40 mm, 50 mm, 100 mm, 200 mm, 300 mm, 400 mm, or 500 mm. As another example, the shortest distance BC may be at most about 500 mm, 400 mm, 300 mm, 200 mm, 100 mm, 50 mm, 40 mm, 35 mm, 30 mm, 25 mm, 20 mm, 15 mm, 10 mm, 5 mm, 4 mm, 3 mm, 2 mm, 1.5 mm, 1 mm, 0.5 mm, or 0.1 mm. FIG. 5 shows an example of the shortest distance BC (e.g., 530, $d_{BC}$). The bottom skin layer may be the first surface and/or the second surface. The bottom skin layer may be the first formed layer of the 3D object. The bottom skin layer may be the first formed hanging layer in the 3D object (e.g., that is separated by a gap from a previously formed layer of the 3D object). The vertical distance of the gap may be at least about 30 μm, 35 μm, 40 μm, 50 μm, 60 μm, 70 μm, 80 μm, 90 μm, 100 μm, 150 μm, 200 μm, 0.05 mm, 0.1 mm, 0.25 mm, 0.5 mm, 1 mm, 2 mm, 3 mm, 4 mm, 5 mm, 6 mm, 7 mm, 8 mm, 9 mm, or 10 mm. The vertical distance of the gap may be at most about 0.05 mm, 0.1 mm, 0.25 mm, 0.5 mm, 1 m, 2 mm, 3 mm, 4 mm, 5 mm, 6 mm, 7 mm, 8 mm, 9 mm, 10 mm, or 20 mm. The vertical distance of the gap may be any value between the afore-mentioned values (e.g., from about 30 μm to about 200 μm, from about 100 μm to about 200 μm, from about 30 μm to about 100 mm, from about 80 mm to about 150 mm, from about 0.05 mm to about 20 mm, from about 0.05 mm to about 0.5 mm, from about 0.2 mm to about 3 mm, from about 0.1 mm to about 10 mm, or from about 3 mm to about 20 mm).

In some cases, a 3D object comprises multiple bottom skin layers (e.g., bottoms of turbine blades). A 3D object may comprise structures such as cavities, gaps, wires, ledges, or 3D planes. A structure within a forming 3D object may comprise a bottom skin layer (e.g., that is formed above a pre-transformed material without auxiliary support, or with spaced apart auxiliary supports). At times, at least two of the structures may have similar geometry. At times, at least two of the structures may have a different geometry. At times, the one of the structures may connect portions of the 3D object. At times, the structures may be separated by a gap. For example, multiple blades of a turbine may be separated by a gap between a first blade portion and a second blade portion. For example, a first portion (e.g., a blade structure) of the 3D object (e.g., a turbine) may comprise a first bottom skin layer followed by one or more layers that form the first portion, and a second portion (e.g., a second blade structure) of the 3D object (e.g., a turbine) may comprise a second bottom skin layer followed by one or more layers that form the second portion of the 3D object. At times, the first portion and the second portion of the 3D object may be connected by a third portion (e.g., a ledge structure) to form the 3D object. FIGS. 6A-6B show examples of a first portion and/or a second portion of a 3D object that ate connected to one or more rigid-portions. FIG. 6C shows an example of a first portion of a 3D object, which first portion comprises a bottom skin layer, that is not connected to a rigid-portion, and that is suspended anchorlessly in the material bed. FIG. 6A shows an example of a first portion (e.g., 640) and a second portion (e.g., 645) of a 3D object disposed at an angle perpendicular (e.g., 90 degrees, 642, 644) to at least one rigid-portion of the 3D object (e.g., two rigid portions 618, and 682). FIG. 6B shows an example of a first portion (e.g., 660) and a second portion (e.g., 665) of a 3D object (e.g., two blades of a propeller) forming an angle (e.g., 652, 654) that is not perpendicular to the rigid portion of the 3D object (e.g., 620). At times, the first portion and the second portion may not be connected to a portion of the 3D object (e.g., to a rigid-portion. E.g., FIG. 6C). The first portion may comprise one or more layers (e.g. 610, 612, 614, 628, 630, and 632). The second portion may comprise one or more layers (e.g., 602, 604, 606, 622, 624, and 626). The layer may include pre-transformed material (e.g., particulate material). The layer may include a porous matrix. The layer may include transformed (e.g., hardened) material. The layer may include a PMX that has been transformed to form a denser layer of transformed material. The first layer for the first and/or second portions of the 3D object may be a bottom skin layer (e.g., 602, 610, 622, and 628). The bottom skin layer (e.g., 690, 628, 676, 610, and 602) may be a transformed material layer. At times, the bottom skin layer may be parallel to the target surface. At times, the bottom skin layer may be at an angle (e.g., a shallow angle, steep angle, or an intermediate angle) relative to the target surface (e.g., an exposed surface of the material bed and/or the support surface of the platform) and/or a (e.g., average) layering plane of the object. Shallow angle may be at least about 0°, 1°, 2°, 5°, 10°, 15°, 20°, 25°, 30°, or 35°. Shallow angle may be at most about 0°, 1°, 2°, 5°, 10°, 15°, 20°, 25°, 30°, or 35°. Shallow angle may be any angle between the afore-mentioned values (e.g., from about 0° to about 35°, from about 0° to about 10°, from about 10° to about 25°, or from about 25° to about 35°) relative to the target surface and/or a (e.g., average) layering plane of the object. Intermediate angle may be at least about 25°, 30°, 35°, 40°, 45°, 50°, 55°, or 60° relative to the target surface and/or a (e.g., average) layering plane of the object. Intermediate angle may be at most about 25°, 30°, 35°, 40°, 45°, 50°, 55°, or 60° relative to the target surface and/or a (e.g., average) layering plane of the object. Intermediate angle may be any angle between the afore-mentioned values (e.g., from about 25° to about 60°, from about 25° to about 35°, from about 35° to about 50°, or from about 50° to about 60°) relative to the target surface and/or a (e.g., average) layering plane of the object. Steep angle may be at least about 45°, 50°, 55°, 60°, 65°, 70°, 75°, 80°, 85°, or 90° relative to the target surface and/or a (e.g., average) layering plane of the object. Steep angle may be at most about 45°, 50°, 55°, 60°, 65°, 70°, 75°, 80°, 85°, or 90° relative to the target surface and/or a (e.g., average) layering plane of the object. Steep angle may be any angle between the afore-mentioned values (e.g., from about 45° to about 90°, from about 45° to about 60°, from about 60° to about 75°, or from about 75° to about 90°) relative to the target surface and/or a (e.g., average) layering plane of the object. The bottom skin layer may comprise a top surface and a bottom surface. The bottom skin layer may be a wire or a ledge or have a planar surface. At least a portion of the first portion (e.g., the top surface of the top layer, 670) and a portion of the second portion (e.g., the bottom surface of the bottom skin layer, 672) may be separated by pre-transformed material (e.g., 616). At least a portion of the first portion (e.g., the top surface of the top layer, 674) and a portion of the second portion (e.g., the bottom surface of the bottom skin layer, 676) may be separated by a gap (e.g., 656). The gap may be filled with pre-transformed material and may be transformed (e.g., subsequently hardened) during the formation of the 3D object. FIG. 6C shows an example of a portion (e.g., 692) of a 3D object, which portion comprises a bottom skin layer (e.g., 690), that is not connected to a rigid-portion. The portion of the 3D object may be formed in a material bed (e.g., 680) within an enclosure (e.g., comprising 684). The portion of the 3D object may comprise one or more layers formed adjacent to (e.g., above) the bottom skin layer (e.g., 686, 688). The bottom skin layer may be floating (e.g., suspended) anchorlessly within the material bed. The bottom skin layer and/or the one or more layers adjacent to the bottom skin layer may not be connected to a rigid-portion. The bottom skin layer may be formed using any 3D printing methodologies described herein.

Figure 41A:
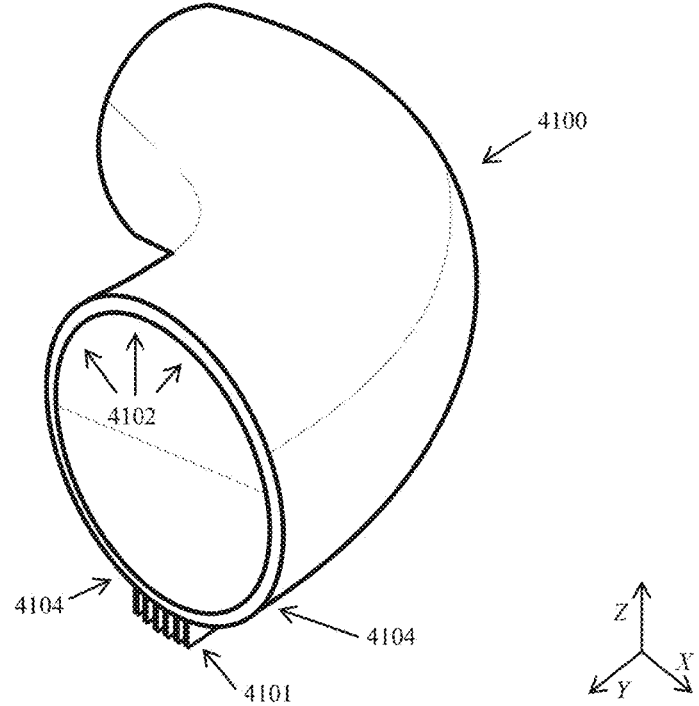
FIGS. 41A and 41B show perspective views of various 3D objects.
Figure 41B:
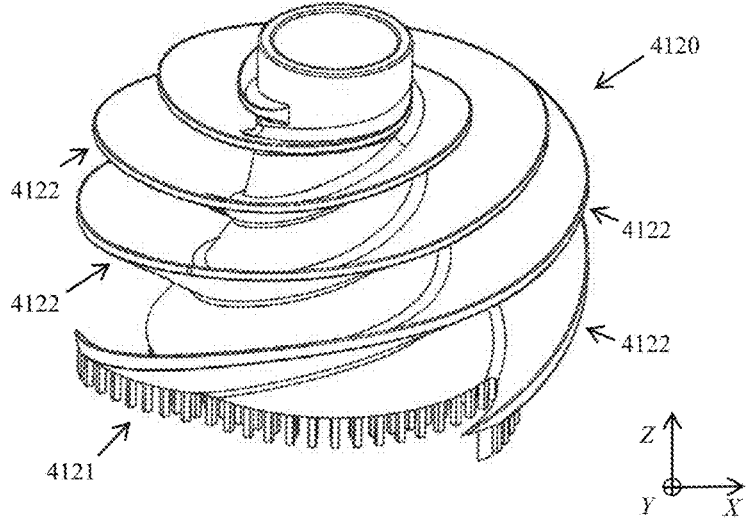

In some embodiments, the 3D object comprises at least one overhang. The overhang of the 3D object may be at least partially defined by the orientation of the 3D object with respect to the target surface (e.g., exposed surface of the material bed and/or the support surface of the platform) and/or a (e.g., average) layering plane. The overhang of the 3D object may be at least partially defined by the orientation of the 3D object with respect to the layering plane (e.g., FIG. 47B, 4741), and/or direction perpendicular to the build direction (e.g., exposed surface of the material bed and/or the support surface of the platform) and/or a (e.g., average) layering plane. The build direction may be opposite to the direction in which the platform is lowered during the printing (e.g., FIG. 1, 112). The build direction may be the direction of layerwise formation (e.g., direction of deposition one layer on another, e.g., growth direction of the 3D object during its printing). The growth direction may oppose the direction in which the platform is lowered during the printing. For example, an overhang portion of a 3D object may be oriented at shallow, steep and/or intermediate angle with respect to the target surface, layering plane, and/or the direction perpendicular to the 3D object's growth direction, during printing. FIG. 41A shows a perspective view of an example object 4100 having a toroid shape (including a support member 4101, which may be removed from the object, e.g., after the printing). An overhang can include (e.g., correspond to) a cavity ceiling (e.g., 4102) and/or a cavity bottom (e.g., 4104) of the object. The overhang (e.g., cavity ceiling and/or cavity bottom) may be free auxiliary supports during the printing. For example, the overhang may be supported by (e.g., coupled to) a previously transformed (e.g., hardened) material of the (e.g., requested) object, during the printing. FIG. 41B shows a perspective view of an example object 4120 having an impeller shape (including a support member 4121, which may be removed from the 3D object, e.g., after its printing). An overhang can include (e.g., correspond to) a bottom portion (e.g., bottom surface) of a ledge (e.g., 4122) (e.g., blade) of the object. The overhang (e.g., ledge or blade) may be free of auxiliary supports during its printing. For example, the overhang may be supported by previously transformed (e.g., hardened) material of the object and/or the material bed (e.g., powder) during its printing. The overhang may be supported in only one of its sides (e.g., to the core of the impeller 4120) during its printing. Printing process parameters, such as one or more characteristics of the energy beam(s) (e.g., power/energy, power density at the target surface, dwell time, scan speed, focus, and/or beam width), may be adjusted depending on whether the overhang being printed is at a shallow, steep or intermediate angle relative to the target surface, layering plane, and/or a direction perpendicular to the direction of build, in order to reduce (e.g., eliminate) deformation of the overhang and/or other portion of the object. For example, different portions of the object 4100 of FIG. 41A and/or the object 4120 of FIG. 41B may be printed using different energy beam characteristic(s).

In some embodiments, the 3D object is printed using printing process parameters. The printing process parameters may be adjusted depending which part of the overhang is being printed and/or the type of overhang. For example, a skin (e.g., bottom skin) of the overhang may be printed using one or more different conditions compared to a core portion (also referred to herein as the "core" or "interior portion") of the overhang and/or 3D object. The bottom skin of the overhang can refer to a portion (e.g., a layer) of the overhang that includes the surface of the overhang that is most proximate to the support surface of the platform (e.g., bottom-most surface of the overhang). FIG. 42A shows an example of a section view of a 3D object 4200, which includes rigid portion (e.g., previously-formed edge of the object) 4202 from which an overhang 4204 can be formed. The overhang can include a skin (e.g., bottom skin) (e.g., 4209) and core (e.g., 4208), e.g., deposited on the skirt. The skin (e.g., bottom skin) of the overhang can include an exterior (e.g., exposed) surface of the overhang. The rigid portion (e.g., 4202) may include a core (also referred to as a rigid portion core) (e.g., 4206) and a skin (also referred to as a rigid portion skin) (e.g., 4203). The overhang may attach to the rigid portion. The rigid portion may comprise one or more layers of hardened material. The overhang can include a plurality of layers (e.g., 4205a,4205b,4205c, and 4205d). Each layer of the overhang can include portions of the skin (e.g., bottom skin) (e.g., 4209) and core (e.g., 4208). The core call comprise PMX or a rigid portion. The exterior surface of the overhang (e.g., bottom skin) may be at an angle (e.g., a) of about 45, 35, 30, 25, 20, 15 or 10 degrees or lower with respect to a (e.g., average) layering plane (e.g., 4210), an exposed surface of the material bed and/or a supporting surface of the build platform. In some embodiments, the skin (e.g., bottom skin) of the overhang is formed using different process parameters than those for forming the core of the overhang. In some embodiments, the skin (e.g., bottom skin) of the overhang is formed using the same process parameters as those for the core of the overhang. The overhang can be a ceiling of the 3D object. FIG. 42B shows a section view of a 3D object 4220, which includes a ceiling 4224. The ceiling may be printed from rigid portions (e.g., 4222a and 4222b). In some embodiments, the ceiling is formed by sequentially forming ledges until the ledges meet to form a bridge. The ceiling may include a skin (e.g., bottom skin) (e.g., 4226) and a core (e.g., 4227). In some cases, the core (e.g., 4227) is formed over the bottom skin (e.g., the bottom skin may support a portion of the core during printing). The rigid portions (e.g., 4222a and 4222b) may include a core (also referred to as rigid portion core) (e.g., 4228a or 4228b) and a skin (also referred to as rigid portion skin) (e.g., 4230a or 4230b). The exterior surface of the ceiling (e.g., bottom skin) may be at an angle (e.g., $\alpha_1$ or $\alpha_2$) of about 45, 35, 30, 25, 20 degrees or lower with respect to a (e.g., average) layering plane of the object, an exposed surface of the material bed and/or a support surface of the build platform. The angles $\alpha_1$ or $\alpha_2$ may be the same or different.

In some cases, different portions of an object are formed using different processes. For example, an interior portion can be formed using a different process than a process used to form an overhang and/or skin portion. In some embodiments, different portions of an overhang (and corresponding bottom skins) are formed using different transformation processes (e.g., at least partially based on an angle relative to the layering plane and/or stacking vector). For example, a first portion of an overhang (and corresponding bottom skin portion) may be formed using a first transformation process (e.g., MTO, STO and/or PMX), and a second portion of the overhang (and corresponding bottom skin portion) may be formed using a first transformation process (e.g., MTO, STO and/or PMX) different than the first transformation process. Different processes may result in different portions of the overhang materials of different properties (e.g., microstructure, density and/or surface roughness). For example, a first portion of the overhang (and corresponding bottom skin) may have a first property, and a second portion of the overhang (and corresponding bottom skin) may have a second property that is different than the first property. The property can be a material characteristic. In some embodiments, an object can have at least 2, 3, 4, 5 or more regions of different material properties (e.g., microstructure, density and/or surface roughness).

In some embodiments, the 3D object comprises an overhang. The overhang may at least partly be defined by a stacking vector (e.g., FIGS. 42A or 42B, vector "Z") anchor a layering plane (e.g., FIG. 42A, 4210 or FIG. 42B, 4231). FIG. 42C shows an example of a section view of an overhang portion 4230 of a 3D object. The bottom surface of an overhang can have an exterior surface (e.g., 4232), where a vector normal (e.g., $V_n$) to the exterior surface that is (i) directed into the object and (ii) has a positive projection onto the stacking vector (e.g., "Z"), is at an acute angle (e.g., alpha (a)) and/or an obtuse angle (beta ((I)) with respect to a layering plane (or an average layering plane) (e.g., 4236). The acute angle (e.g., alpha ($\alpha$)) and the obtuse angle (e.g., beta ($\beta$)) may be supplementary angles. The acute angle (e.g., alpha ($\alpha$)) can be at least about 45 degrees (°), 50°, 55°, 60°, 70°, 80°, or 85°. The acute angle (e.g., alpha ($\alpha$)) can be at most about 90 degrees. The obtuse angle (e.g., beta ($\beta$)) can be complementary to alpha. FIG. 42D shows an example of a section view of an overhang portion 4240 of a 3D object. In some embodiments, a bottom surface of an overhang can have an exterior surface (e.g., 4242), where a vector normal (e.g., $V_n$) to the exterior surface that is (i) into the object and (ii) has a positive projection onto the stacking vector (e.g., "Z"), is at an acute angle (e.g., gamma (γ)) and/or an obtuse angle (e.g., delta (δ)) with respect to the stacking vector (e.g., "Z"). The acute angle (e.g., gamma (γ)) and the obtuse angle (e.g., delta (δ)) may be supplementary angles. The acute angle (e.g., gamma (γ)) can be at most about 45°, 40°, 35°, 30°, 25°, 20°, 15°, 10°, 5°, or 1°. The obtuse angle (e.g., delta (δ)) can be the supplementary angle to gamma.

In some instances, it is desirable to control the manner of forming at least a portion of a layer of hardened material (e.g., core and/or overhang). The layer of hardened material may comprise a plurality of melt pools. The FLS (e.g., depth, or diameter) of the melt pool may be at least about 0.5 µm, 1 µm, 5 µm, 10 µm, 20 µm, 30 µm, 40 µm, 50 µm, 60 µm, 70 µm, 80 µm, or 100 µm. The FLS of the melt pool may be at most about 0.5 µm, 1 µm, 5 µm, 10 µm, 20 µm, 30 µm, 40 µm, 50 µm, 60 µm, 70 µm, 80 µm, or 100 µm. The FLS of the melt pool may be any value between the afore-mentioned values (e.g., from about 0.5 µm to about 100 µm, from about 0.5 µm to about 10 µm, from about 10 µm to about 30 µm from about 30 µm to about 50 µm, or from about 50 µm to about 100 µm).

In some instances, it is desired (e.g., requested) to control one or more characteristics of the fabricated 3D object (e.g., or portions thereof). For example, it may be desirable to control the manner of forming and/or hardening an overhang (e.g., a hanging structure (e.g., ceiling of a cavity or ledge)) as part of the 3D object. The 3D printing methodologies (e.g., methods, apparatuses, systems, and/or software) described herein may utilize a type-2 energy beam and/or a type-1 energy beam (collectively referred to herein as "transforming energy" or "transforming energy beam"). The type-2 energy beam and the type-1 energy beam may differ by at least one characteristic of the irradiating energy. For example, the type-2 energy beam and the type-1 energy beam may differ in their cross section (e.g., with the type-2 energy beam having a larger cross section than the type-1 energy beam). For example, the type-2 energy beam and the type-1 energy beam may differ in their power density (e.g., with the type-2 energy beam having a lower power density than the type-1 energy beam). For example, the type-2 energy beam and the type-1 energy beam may differ in their focus (e.g., with the hatching energy source being more focused than the type-2 energy beam). For example, the type-2 energy beam and the type-1 energy beam may differ in their path trajectory while generating (e.g., directly, or indirectly) a layer of hardened material (e.g., with the type-2 energy beam traveling along the path of tile trajectory, whereas the type-1 energy beam hatches along another trajectory). For example, the type-2 energy beam and the type-1 energy beam may differ in their manner of movement while transforming a layer when forming, a 3D object (e.g., a type-2 energy beam may be (e.g., substantially) stationary for a period of time, whereas the type-1 energy beam may be constantly moving). In some embodiments, at least one characteristic (e.g., cross section and/or power density) of the energy beam is modified during part or all of the transformation (e.g., melting) process. In some embodiments, the focus of the energy beam is modified during part or all of the transformation (e.g., melting) process. For example, the energy beam can be focused for part of the transformation and defocused during another part of the transformation.

In some embodiments, hatching and/or tilting energy beams are used to form different portions of a 3D object. Various 3D objects and portions thereof (e.g., including a rim), apparatuses (e.g., controllers), systems (e.g., 3D printers), software, methods related to the formation of these 3D objects (e.g., generated using tiling and/or hatching), as well as various control schemes are described in U.S. patent application Ser. No. 15/435,128, PCT patent application number. PCT/US17/18191, or European patent application number EP17156707.6, each of which is incorporated herein by reference in its entirety where non-contradictory.

The use of a type-1 energy beam or type-2 energy beam may depend, in part, on the geometry of the 3D object. For example, a type-1 energy beam can be used to form a contour (which can be referred to as a rim, skin (e.g., thickness of the skin), or perimeter portion) of a 3D object. For example, a type-2 energy beam can be used to form an interior portion (also referred to as "core") of the 3D object. In some cases, the bulk of the interior portion has a FLS (e.g., width, length or height) that is larger than the FLS (e.g., width, length or height) of a tile. The FLS may be a horizontal FLS (e.g., width or length). For example, a type-1 energy beam can be used to form a narrow portion of the interior of the 3D object (e.g., having a horizontal FLS that is smaller than the FLS of the tile). To illustrate, FIGS. 28A-28D show examples of top views of 3D objects each having at least one layer of hardened material illustrating various path trajectories of the energy beams used in the formation of a layer of hardened material. FIG. 28A shows an example portion 2810 of a 3D object having a contour 2811 with hatches 2812 made by a type-1 energy beam. The hatches (e.g., 2812) can be made prior to forming a path-of-tiles (not shown). FIG. 28B shows an example of a portion 2820 of the 3D object having a contour 2821 with hatches 2822 made by a type-1 energy beam, and an interior having tiles 2823 made by a type-2 energy beam. FIG. 28C shows an example where a portion 2830 of a 3D object with an interior having tiles 2832 made by a type-2 energy beam prior to forming hatches to fill in narrow section 2833. The contour (e.g., 2831) can be formed before, after, or simultaneously with the tiles (e.g., 2832). The hatches (e.g., 2822) can be formed before, after, or simultaneously with forming the tiles (e.g., 2823). FIG. 28D shows a portion 2840 of a 3D object having contour 2841 with hatches 2842 (e.g., both made by a type-1 energy beam), an interior having tiles 2843 made by a type-2 energy beam and redacted tiles 2844. Redacted tiles 2844 can be formed using the type-2 energy beam, e.g., that is masked (e.g., using a mask or a restrictive aperture).

In some embodiments, a contour (rim) of a at least a portion of a 3D object is processed using a tiling methodology (e.g., that uses a continuous or pulsing energy beam, e.g., that uses a type-1 energy beam or type-2 energy beam as disclosed herein). For example, a contour (rim) of a at least a portion of a 3D object can be generated using a type-2 energy beam. In some cases, this can result in the at least the portion of the 3D object having a smooth surface finish having low Ra or Sa value, and/or having high specular reflectivity). The high specular reflectivity of a surface of the at least the portion of the 3D object may be at least about 2%, 5%, 15%, 25%, 35%, 45%, 55%, 65%, 70%, or 80%. The high specular reflectivity of a surface of the at least the portion of the 3D object may be of any value between the afore mentioned values (e.g., front about 2% to about 80%, front about 2% to about 25%, front about 15% to about 45% or from about 35% to about 80%). The high surface reflectivity and/or low roughness of the at least a portion of the 3D object surface may allow visualization of a tessellation present in the model and/or printing instructions used to generate the 3D object, e.g., when that surface comprises a curvature.

FIGS. 36A-36D show examples of horizontal (e.g., top or bottom) views of 3D objects each having at least one layer of hardened material illustrating various path trajectories of the energy beams used in the formation of hardened material, in accordance with some embodiments. The rim and the interior of a layer of hardened material may be generated using the same energy beam, or different energy beams. The tiles and. the interior may be formed with the same or with different transformation methodology (e.g., tiling or hatching methodology). At least one of the rim and the interior of a layer of hardened material may be generated by a combination of different transformation methodology (e.g., tiling methodology or hatching methodology). The tiles may be of any shape (e.g., corresponding to the shape of the energy beam cross section or footprint on the target surface. For example, the tiles may be elliptical (e.g., round), as shown in the example of FIG. 36C, 3632. For example, the tiles may be rectangular (e.g., square), as shown in the example of FIG. 36B, 3622. In some examples, the rim may be formed using a combination of type-2 energy beam and type-1 energy beam. FIG. 36A shows an example of a layer of a 3D object 3610 having a rim comprising tiles 3611 and 3612 formed using a tiling methodology (e.g., step and repeat) with a type-2 energy beam (that generates circular tiles); and an interior 3615 made using a hatching methodology using the type-1 energy beam. In some cases, at least two of the tiles (e.g., FIG. 36A, 3612) that are adjacent to each other in a path of tiles, overlap with each other. In some cases, at least two of the tiles in a path of tiles do not overlap (not shown). For example, at least two of the tiles in the path of tiles may contact or not contact each other. The tiles (e.g., FIG. 36A, 3612) of the rim (e.g., a perimeter, contour, or outer surface of a layer) can be made prior to, simultaneously with, or after forming an interior portion 3615. The tiles and the interior can be formed using any suitable energy beam (e.g., a type-1 energy beam, or a type-2 energy beam). FIG. 36B shows an example of a layer of a 3D object 3620 having a rim comprising tiles 3621 and 3622, and an interior portion comprising tile 3625 generated by the tiling methodology using a type-2 energy beam (that generated rectangular tiles). FIG. 36C shows an example where a 3D object layer 3630 has a rim comprising tiles 3631 and 3632 formed using a tiling methodology with an interior portion 3635 that is free of hardened material. That is, interior portion 3635 can correspond to a voided region that is surrounded by (e.g., defined by) the rim comprising tiles 3631 and 3632. FIG. 36D shows a layer 3640 of a 3D object having a rim comprising tiles 3641 and 3642 generated using a methodology with a type-2 energy beam an interior portion comprising (i) overlapping tiles comprising tile 3645 made by a tiling methodology using the type-2 energy beam, and (ii) hatches 3646 (e.g., in areas that are too narrow to form tiles) generated by the hatching methodology using the type-1 energy beam.

In some cases, the tiles create a repetitive microtexture on an exterior surface of the 3D object. The exterior surface may be an exterior surface of a skin of the 3D object. The repetitive microtexture may be at least in a localized surface area of the 3D object. The repetitive microtexture may correspond to scales (e.g., FIG. 57A). The repetitive microtexture may correspond to tiles (e.g., overlapping tiles). The repetitive microtexture may have crescent shapes. The repetitive microtexture may be periodic. The repetitive microtexture may be characterized by a profile of the exterior surface (or a portion of the exterior surface). FIG. 51B shows an example microtexture (profile) of an exterior surface 5120 of a layer of a 3D object (e.g., FIG. 36D, cross-section A-A), showing an intralayer periodic repetitive microtexture. FIG. 51C shows an example profile of an exterior surface 5140 across multiple layers 5141, 5143 and 5145 of a 3D object, showing an interlayer periodic repetitive microtexture. The exterior surface can have regions of relative depression (e.g., FIG. 51B, 5122 or FIG. 51C, 5142) and regions of relative elevation (e.g., FIG. 51B, 5124 or FIG. 51C, 5144). The regions of relative elevation may be referred to as peaks. The regions of relative depression may be referred to as valleys. The peaks and valleys may be an alternating series of peaks and valleys. A profile across multiple layers (interlayer microtexture) may be (e.g., substantially) flat or may have different elevations (e.g., 5141, 5143 and 5145) (e.g., with respect to the platform). The profile across the multiple layers (interlayer microtexture) may be stepped (e.g., each step corresponding to a layer). The profile across the multiple layers (interlayer microtexture) may be in accordance with a slope line (e.g., 5147) with respect to a layering plane defined by at least one layer. The interlayer and intralayer microtexture can form a two-dimensional array of periodic peaks and valleys corresponding to a scaled surface texture (e.g., FIG. 57A). The valleys (e.g., FIG. 51B, 5122 or FIG. 51C, 5142) can correspond to overlapping regions of tiles. The peaks (e.g., FIG., 51B, 5124 or FIG. 51C, 5144) may have curved (e.g., rounded) exterior surface in accordance with a melting and/or solidification of the material as a result of the transforming. The peaks may be symmetrically rounded or non-symmetrically rounded (e.g., lopsided). The depths (e.g., FIG. 51B, 5122 or FIG. 51C, 5142) of the valleys may vary. In some embodiments, a depth of at least one of the valleys (or an average depth of a number of valleys) is at most about 0.5 micrometers (µm), 1 µm, 2 µm, 3 µm, 4 µm, 5 µm, 10 µm, 15 µm, 20 µm, 30 µm, 40 µm, or 50 µm. The depth of at least one of the valleys (or an average depth of a number of valleys) can range between any of the aforementioned values (e.g., from about 0.5 µm to 50 µm, from about 0.5 µm to 20 µm, from about 20 µm to 50 µm, or from about 2 µm to 20 µm). The distance (e.g., FIG. 51B, 5123 or FIG. 51C, 5149) between the valleys may correspond to distances between tiles (e.g., between overlapping portions of the tiles). In some embodiments, the distance between the valleys is (e.g., substantially) the same as the distance between centers of the tiles. In some, embodiments, the distance (e.g., FIG. 51B, 5123) between at least two successive valleys within an intralayer microtexture is at least about 10 micrometers (µm), 15 µm, 20 µm, 25 µm, 30 µm, or 35 µm, 50 µm, 70 µm, 80 µm, 100 µm, 200 µm, 250 µm, 300 µm, 350 µm, 400 µm, 450 µm or 500 µm. In some embodiments, the distance (e.g., FIG. 51C, 5149) between at least two successive valleys of an interlayer microtexture is at least about 50 millimeters (mm), 100 mm, 150 mm, 200 mm, 300 mm, 400 mm or 500 mm. In some embodiments, distances (e.g., FIG. 51B, 5123) between valleys of an intralayer microstructure (e.g., FIG. 51B) is more consistent than distances (e.g., FIG. 51C, 5129) between valleys of an interlayer microstructure (e.g., FIG. 51C). The peaks may be curved (e.g., rounded) in accordance with a hardening (e.g., solidification) of the pre-transformed material as a result of its transformation (e.g., melting). The peaks may be symmetrically rounded or non-symmetrically rounded (e.g., lopsided).

It should be noted that any suitable combination of energy beams (e.g., type-2 energy beam and type-2 energy beam)

can be used to form any suitable portion (e.g., contour and interior portion) of a 3D object, and that the embodiments shown in FIGS. 28A-28D and 36A-36D are not meant to be exhaustive of all suitable embodiments described herein That is, the tiles can have any suitable shape and size, and can be (at least in part) overlapping or non-overlapping in the contour and/or the interior portion of a 3D object. The path of tiles can be in accordance with a substantially straight line or in accordance with the curved line. The tiles in the contour and/or the interior portion of the 3D object may be redacted tiles (e.g., that are masked (e.g., using a mask or a restrictive aperture)), as described herein. In some embodiments, at least three of the tiles in a path of tiles are uniformly spaced apart from each other (e.g., distances between centers or edges of the tiles are substantially the same). In some embodiments, at least three of the tiles in a path of tiles are non-uniformly spaced apart from each other (e.g., distances between centers or edges of the tiles are not substantially the same). The dimensions of at least two of the tiles within a path of tiles (and/or within a given layer) can have (e.g., substantially) the same size or have different sizes. The size of each tile can correspond with the size of each melt pool that makes up each tile. For example, FIGS. 37A and 37B show schematic horizontal view examples of overlapping tiles and non-overlapping tiles, in accordance with some embodiments. FIG. 37A shows an example of a cross-section view of a portion of a path 3700 comprising circular-shaped tiles 3702 having the same size (e.g., have the same diameter 3704) and spaced apart from each other a uniform distance 3706 (as measured from adjacent centers of tiles 3702). In the example shown in FIG. 37A, tiles 3702 overlap with each other in that they are spaced apart by distance 3706 that is less than diameter 3704. In some embodiments, a distance between the tile centers (e.g., FIG. 37A, 3706) is at least about 0.9, 0.75, 0.6, 0.5, 0.25,or 0.01 of a diameter of a horizontal cross section of the exposed surface of the tiles (e.g., FIG. 37A, 3704). In some embodiments, the distance between the tile centers ranges between any suitable ranges described above (e.g., from about 0.5 to about 0.75,from about 0.25 to about 0.75,or from about 0.5 to about 0.6) of the diameter of a horizontal cross section of the exposed surface of the tiles). In some embodiments, a distance between tile centers of at least two of successive tiles is at least about 10 micrometers (μm), 15 μm, 20 μm, 25 μm, 30 μm, or 35 μm, 50 μm, 70 μm, 80 μm, 100 μm, 200 μm, 250 μm, 300 μm, 350 μm, 400 μm, 450 μm or 500 μm in some embodiments, the distance between the tile centers is at most about 50 millimeters (mm), 100 mm, 150 mm, 200 mm, 300 mm, 400 mm or 500 mm. In some embodiments, the distance between the tile centers ranges between any of the aforementioned values (e.g., from about 10 μm to about 500 mm, from about 10 μm to about 500 μm, from about 500 μm to about 500 mm, or from about 15 μm to about 30 μm). FIG. 37B shows an example of a cross-sectional view of a portion of a path 3720 comprising circular-shaped tiles 3722 having the same size (e.g., have the same diameter 3724) that are spaced apart from each other by a uniform distance 3726 (e.g., as measured from adjacent centers of tiles 3722). In the example shown in FIG. 37B, tiles 3722 do not overlap as they are spaced apart by distance 3726 that is the same as (e.g., or can be greater than in other examples) diameter 3724. In some embodiments, at least a rim of a portion of a layer of hardened material comprises tiles having cross sectional diameters (e.g., FIG. 37A, 3704 or FIG. 7B, 3724) having a fundamental length scale (FLS) of any of the type-2 energy beams described herein.

Figures 38A, 38B:
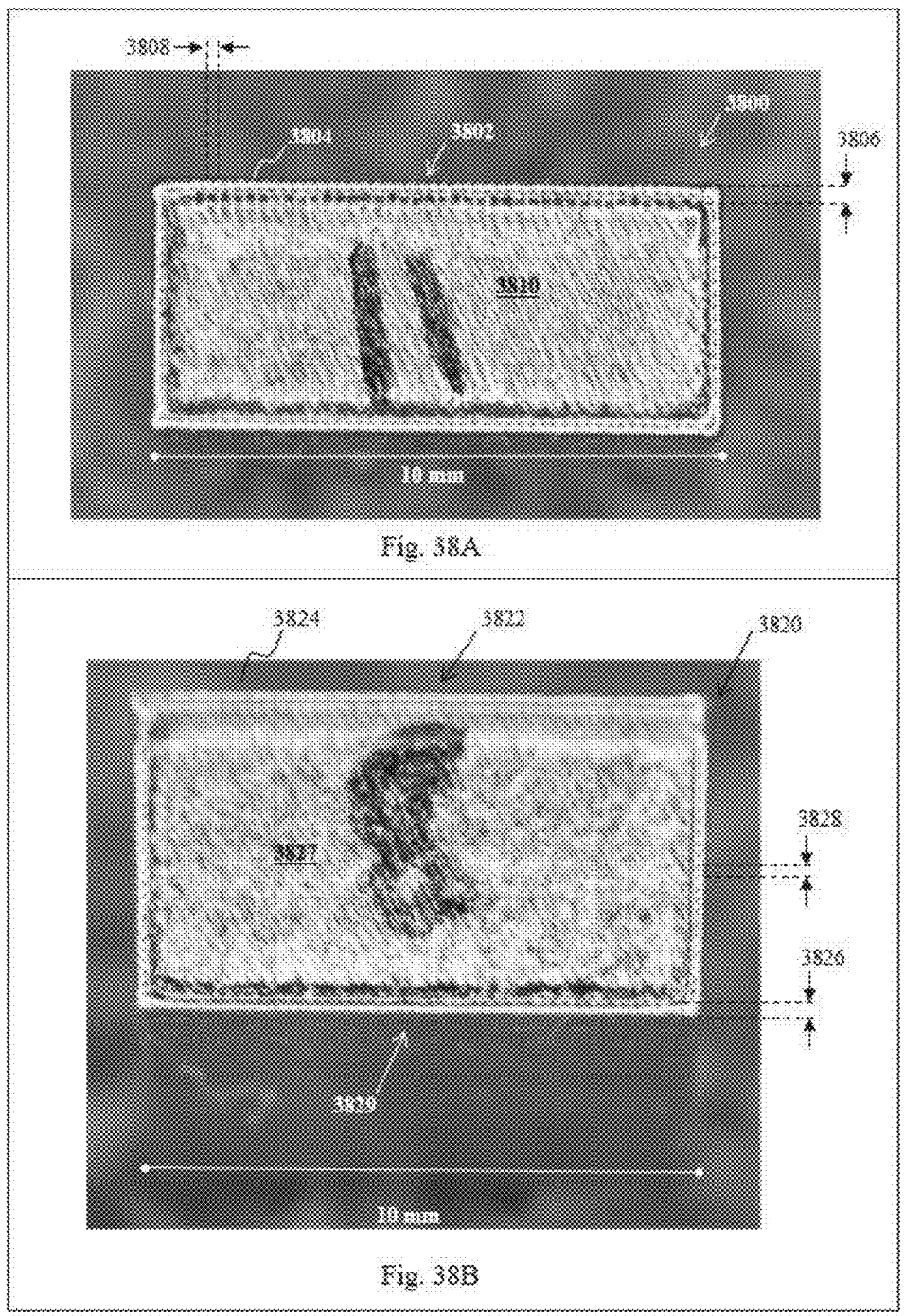
FIGS. 38A and 38B show side and perspective image of 3D objects.

FIGS. 38A and 38B show images of example various 3D objects having rims formed using a tiling process as described herein. FIG. 38A shows a top view example of 3D object 3800 (marked "11"), which includes contour 3802 having a number of overlapping tiles 3804 that are (e.g., substantially) uniformly spaced apart from each other. In some embodiments, the external contour (also referred herein as "rim", e.g., 3804) may form the skin (also referred herein as the "exterior portion" or "outer portion") of the object. An example of the skin (formed of a plurality of contours) is depicted in FIG. 38B, 3829. In some embodiments, the rim (e.g., FIG. 38A, 3802, also referred to as a contour, or contour portion) has a thickness (e.g., FIG. 38A, 3806) that corresponds to the FLS of the energy beam forming the rim (e.g., the type-1 energy beam or the type-2 energy beam, e.g., as described herein). The FLS can be a diameter or diameter equivalent of an exposed surface of the tile. In some embodiments, the tiles (e.g., FIG. 38A, 3804) are space a substantially uniform distance (e.g., FIG. 38A, 3808) from each other (as measured from center of adjacent tiles. e.g., 3804 shown in the example of FIG. 38A) that corresponds to the percentage of overlapped area (e.g., pertaining to the tiles) as disclosed herein. Adjacent tiles may be separated from each other by tile boundaries, which may be visible, e.g., as small surface borders (e.g., indentations) between the tiles centers. An interior portion can be formed using any of the transformation processes described herein. FIG. 38A shows an example of an interior portion 3810 made of hatches. In some embodiments, interior portion is formed using a type-1 energy beam, in accordance with some embodiments described herein. FIG. 38B shows an example of a top view of 3D object 3820 (marked "8"), which includes rim 3822 comprised of several overlapping tiles 3824 that are (e.g., substantially) uniformly spaced apart from each other. In the example shown in FIG. 38B, rim 3822 has a thickness that corresponds to the FLS of the type-2 energy beam that generated the rim. In the example shown in FIG. 3813, tiles 3824 are spaced a (e.g., substantially) uniform distance 3828 from each other (as measured from center of adjacent tiles 3824). In the example shown in FIG. 38B, the interior portion 3827 is formed using a hatching transformation methodology using a type-1 energy beam. The 3D object 3820 shown in the example of FIG. 38B, indicates an exterior surface 3829 (also referred to as an outer surface, external surface, or exposed surface) that has a high specular reflection and low roughness.

In some embodiments, the 3D object formed by one or more methods described herein comprises a high specular reflectivity (e.g., at a wavelength range and an angle of incidence). Formation of a 3D object by at least one methodology described herein may result in a 3D object having at least one surface which is characterized by a specular reflectance percentage (e.g., at a wavelength range and an angle). The specular reflectance percentage may be of at least about 2%, 5%, 10%, 15%, 20%, 30%, 40%, 50%, 60%, or 75%. The specular reflectance percentage may be of any value between the afore-mentioned values (e.g., from about 2% to about 70%, from about 2%, to about 20%, from about 10% to about 40%, from about 30% to about 75%). The wavelength range may be the visible wavelength range (e.g., visible to an average human eye). The angle may be normal incidence to the surface. The specular reflectance percentage (% R) at an angle of incidence and a wavelength range is one hundred (100) times the ratio of: (i) specular reflectance ($R_{Specular}$) at that angle of incidence and at that wavelength range over (ii) total reflectance ($R_{Total}$) at that angle of incidence and at that wavelength range, from a surface (e.g., in a formula format: % R=100*$R_{Specular}/R_{Total}$). For example, the values of specular reflectance percentage can be at normal incidence to the surface and over the visible wavelength range.

In some embodiments, an exterior surface of the 3D object (e.g., that comprises a rim portion formed using a tiling process) is characterized as having a Sa value of at most about 60 μm, 50 μm, 40 μm, 20 μm, 10 μm, 9.5 μm, 9 μm, 8.5 μm, 8 μm, 7.5 μm, 7 μm, 6.5 μm, 6 μm, 5.5 μm, 5 μm, 4.5 μm, 4 μm, 3.5 μm, 3 μm, 2 μm, or 1 μm. In some embodiments, the external surface (e.g., exterior surface 3829) has a Sa ranging between any of the values listed above (e.g., from about 60 μm to about 1 μm, from about 10 to about 1 from about 5 μm to about 1 μm, or from about 3 μm to about 1 μm). It should be noted that the 3D objects represented in FIGS. 38A and 38B are shown as examples and do not limit the scope (e.g., dimensions, properties, etc.) of other 3D objects formed using any of the processes described herein. As illustrated in the example 3D objects in FIGS. 38A and. 38B, tiles (e.g., 3804 and 3824) can be visibly distinct portions of hardened material (e.g. solid metal) that are defined by edges and middle portions. The visibly distinct is by a naked eye or using a magnification (e.g., optical microscopy or a magnifying glass). These distinct edges and middle portions can be a product of the transformation (e.g., melting) and/or hardening (e.g., by cooling) process of each melt pool formed during a transformation process (e.g., using a tiling process). The tile can reflect light differently once hardened (e.g., as opposed to being transformed and/or pre-transformed). The hardened tiles may be visibly different from transformed portion and/or pre-transformed material. Visibly different may comprise having different (e.g., specular) reflectivity. In some embodiments, the edges and/or middle portions may comprise microstructures that differ in at least one microstructure characteristics. The microstructure characteristics may comprise microstructure type, material composition, grain orientation, material density, degree of element segregation (or of compound segregation) to grain boundaries, material phase, metallurgical phase, crystal phase, crystal structure, material porosity, or any combination thereof The microstructure type may comprise a metallurgical phase anchor morphology. The microstructure type may comprise a crystallographic phase and/or crystal morphology. The microstructure type may comprise planar structure, cellular structure, columnar dendritic structure, or equiaxed dendritic structure. A cross section (e.g., vertical cross section) of the generated (i.e., formed) 3D object may reveal a microstructure (e.g., grain structure) indicative of a layered deposition and/or melt pool formation. Without wishing to be bound to theory, the microstructure (e.g., grain structure) may arise due to the solidification of transformed (e.g., powder) material that is typical to and/or indicative of a particular 3D printing method. For example, a cross section may reveal a microstructure indicative of solidified melt pools that are formed in a 3D printing process, e.g., as described herein (e.g., and are indicative of this process). The cross section of the 3D object may reveal a substantially repetitive microstructure (e.g., grain structure). The microstructure (e.g., grain structure) may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure (e.g., grain structure) may comprise substantially repetitive solidification of layered melt pools. The melt pool may have an average FLS of at least about 0.5 μm, 1 μm, 5 μm, 7 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, or 1000 μm. The substantially repetitive microstructure may have an average height of at most about 1000 μm, 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, 30 μm, 20 μm, or 10 μm. The melt pool may have an average FLS of any value between the aforementioned values (e.g., from about 0.5 μm to about 1000 μm, from about 15 μm to about 50 μm, from about 5 μm to about 150 μm, from about 20 μm to about 100 μm, or from about 10 μm to about 80 μm). The melt pool FLS may correspond to the height of a layer of hardened material. The FLS of the melt pool may comprise a height of the melt pool, a diameter (or diameter equivalent) of an exposed surface of the melt pool, or a radius (or radius equivalent) of an exposed surface of the melt pool.

In some examples, the microstructures (e.g., of melt pools) are measured (and examined) by a microscopy method. The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted and/or non-inverted microscope. The proximal probe microscopy may comprise atomic force, or scanning tunneling microscopy, or any other microscopy described herein. The microscopy measurements may comprise using an image analysis system. The microstructures may be measured by a contact or by a non-contact method. The microstructures may be measured by using an electromagnetic beam (e.g., visible or IR). The microstructure measurements may comprise evaluating the dendritic arm spacing and/or the secondary dendritic arm spacing (e.g., using microscopy). The microscopy measurements may comprise an image analysis system. The measurements may be conducted at ambient temperatures (e.g., R.T.), melting point temperature (e.g., of the powder material) or cryogenic temperatures.

Thus, the path of tiles (e.g., formed by sequential tiles) may fill the target layer of hardened material (e.g., corresponding to a target slice of the 3D object model). In some examples, the type-2 energy beam and the type-1 energy beam may differ in the portions of transformed and/or hardened material they generate on forming a layer of transformed and/or hardened material as part of the 3D object (e.g., with the type-2 energy beam forming a first portion of transformed material, whereas the type-1 energy beam forms a second portion of transformed material. The first and second portions may or may not directly contact each other or overlap with each other). In some cases, the type-2 energy beam and the type-1 energy beam have at least one energy characteristic that is (e.g., substantially) identical. For example, both the type-2 energy beam and the type-1 energy beam may be focused. For example, both the type-2 energy beam and the type-1 energy beam may be of the same wave length. For example, both the type-2 energy beam and the hatching energy may be collimated. The type-2 energy beam and type-1 energy beam may be generated by the same (e.g., type of) energy source, or by different energy sources. The type-2 energy beam and type-1 energy beam may be directed by the same (e.g., type of) scanner, or to different scanners (e.g., FIG. 1, 114 and 120). The type-2 energy beam and type-1 energy beam may travel through by the same (e.g., type of) optical window, or through different optical windows (e.g., 115, and 135) on their way to a target surface.

In another aspect, a 3D object comprises successive regions of hardened material indicative of at least one additive manufacturing process. For example, the hardened material may comprise melt pools. An average FLS of the melt pools in a first portion of the 3D object may be larger than the average FLS of the melt pools in a second portion of the 3D object. For example, the average FLS of the melt pools in a surface of the 3D object may be larger than the average FLS of the melt pools in the interior of the 3D object. The first layer of hardened material may be a first hardened layer in the object (e.g., bottom skin layer) as indicated by the spatial orientation of the melt pools (e.g., elongated melt pools, dripping melt pools, and/or stalactite-like melt pools). The average FLS of the melt pools in the surface can be larger than the average FLS of the melt pools in the interior (e.g., by a factor of about two or more).

Figure 8A:
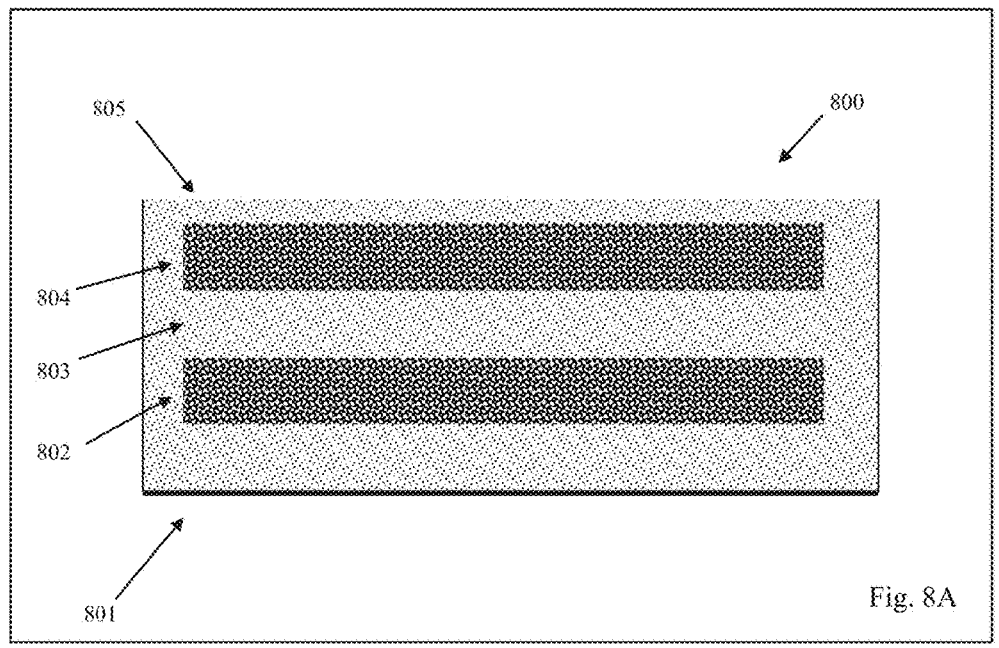
FIGS. 8A-8B schematically illustrate vertical cross sections of various material beds.
Figure 20A:
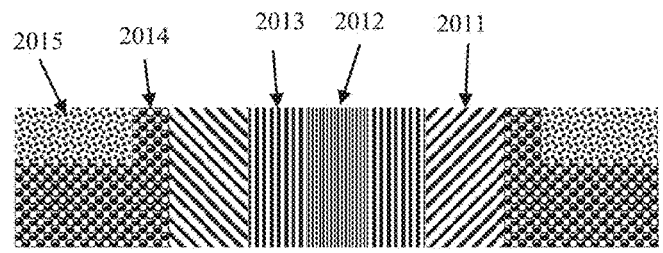
FIG. 20A schematically illustrates a cross section view of a 3D object.
Figure 20B:
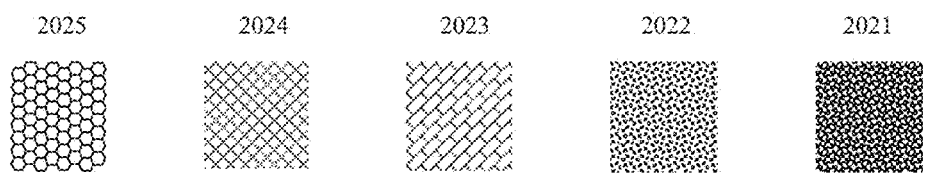
FIG. 20B schematically illustrates a cross section in various portions of 3D objects.

In some embodiments, the porous matrix structure is suspended anchorlessly in the material bed. In some embodiments, the porous matrix structure is anchored to the material bed by one or more auxiliary support features. The porous matrix structure may or may not be anchored to the enclosure (e.g., platform). FIG. 8A shows an example of a first porous matrix 802 and a second porous matrix 804, both disposed in a material bed 800 that comprises a pre-transformed (e.g., particulate) material disposed in an enclosure above a platform 801, which material bed comprises an exposed surface 805. In the example shown in FIG. 8A, the porous matrixes 802 and 804 are suspended anchorlessly in the material bed 800. The porous matrixes (e.g., 802 and/or 804) may comprise a random, irregular, or regular shape. The pores in the porous matrix structure may comprise a random, irregular, or regular shape. The hardened material in the porous matrix structure may comprise a random, irregular, or regular shape. The porous matrix may be formed by randomly transforming the pre-transformed material. The porous matrix may be formed by generating pre-designed structures (e.g., that are not random) by transforming the pre-transformed material. The regular shape may comprise a geometric shape (e.g., a lattice structure). The porous matrix may assume an overall irregular, or regular (e.g., cuboid) shape. At times, a first portion of the porous matrix comprises a first structure, and a second portion of the porous matrix comprises a second structure. The first structure may be (e.g., substantially) similar to the second structure. The first structure may be different from the second structure. In some embodiments, the porous matrix comprises a lattice. The porous matrix may comprise a random structure. The porous matrix may comprise a directional structure (e.g., that may direct a flow of transformed material in a certain direction, e.g., channels). FIG. 20B shows examples of various porous matrix structures. For example, 2025 shows an example of a honeycomb structure, 2024 shows an example of a mesh structure, 2023 shows an example of a brick like structure, 2021, 2022 are examples of random structures of various density. The porous matrix can comprise a space filling polyhedron (e.g., honeycomb pattern). The porous matrix may comprise a lattice pattern. The lattice can be a diamond, tetragonal lattice, or cubic lattice. The porous matrix may comprise fibers. The porous matrix call comprise interconnected features.

In some embodiments, the porous matrix comprises one or more cavities. The cavities may be hollow. The cavities may be devoid, of the particulate, transformed, and/or hardened material. The cavities may comprise one or more gasses. The cavities may have cross-sections that are circular, triangular, square, rectangular, pentagonal, hexagonal, or partial shapes and/or combinations thereof. The cavity and/or cavity walls may have a 3D shape. The multiplicity of cavity walls may form the porous matrix structure. The 3D shape of the cavity and/or cavity walls may comprise a cuboid (e.g., cube), or a tetrahedron. The 3D shape of the cavity may comprise a polyhedron (e.g., primary parallelohedrolf). The cavity and/or cavity walls may comprise a space-filling polyhedron (e.g., plesiohedrolf). The polyhedron may be a prism (e.g., hexagonal prism), or octahedron (e.g., truncated octahedron). The cavity and/or cavity walls may comprise a Platonic solid. The cavity and/or cavity walls may comprise a combination of tetrahedra and octahedra (e.g., that fill a space). The cavity and/or cavity walls may comprise octahedra, truncated octahedron, and cubes, (e.g., combined in the ratio 1:1:3). The cavity and/or cavity walls may comprise tetrahedra and/or truncated tetrahedra. The cavity and/or cavity walls may comprise convex polyhedra (e.g., with regular faces). For example, the cavity and/or cavity walls may comprise a triangular prism, hexagonal prism, cube, truncated octahedron, or gyrobifastigium. The cavity and/or cavity walls may comprise a non-self-intersecting quadrilateral prism. The cavity and/or cavity walls may comprise space-filling polyhedra. The cavity and/or cavity walls may exclude a pentagonal pyramid. The cavity and/or cavity walls may comprise 11-hedra, dodecahedra, 13-hedra, 14-hedra, 15-hedra, 16-hedron 17-hedra, 18-hedron, icosahedra, 21-hedra, 22-hedra, 23-hedra, 24-hedron, or 26-hedron. The cavity and/or cavity walls may comprise at least 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 faces. The cavity and/or cavity walls may comprise at most 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 faces. The cavity and/or cavity walls may comprise any suitable number of faces between the afore-mentioned number of faces (e.g., from 4 to 38, from 4 to 20, from 20 to 40, or from 10 to 30 faces). The cavity and/or cavity walls may comprise a non-convex aperiodic polyhedron, convex polyhedron (e.g., Schmitt-Conway bi-prism). The cross-section of the cavity and/or cavity walls (e.g., vertical, or horizontal) may be a square, rectangle, triangle, pentagon, hexagon, heptagon, octagon, nonagon, octagon, circle, or icosahedron. The cavity may be hollow. The cavity walls may comprise a particulate material (e.g., that was not transformed). The cavity walls may be composed of a transformed (e.g., and subsequently hardened) material. The cavity walls may comprise a material with high porosity. The cavity walls may comprise at least about 30%, 40%, 50%, 60%, 70%, 80%, 90% or 95% material, The cavity walls may comprise at most about 100%, 99%, 95%, 90%, 80%, 70%, 60%, or 50% material. The cavity walls may comprise a percentage of material corresponding to any percentage between the afore-mentioned percentages of material (e.g., the percent may be from 40% to 80%, from 50% to 99%, from 30% to 90%, or from 70% to 100% material). The cavity walls may comprise pores. The layer of hardened material that is included in the 3D object may comprise a percentage of material having a value equal to the abovementioned percentages of material of the cavity walls. At least two of the cavities or cavity walls may have a substantially identical shape and/or cross section. At least two of the cavities or cavity walls may have a different shape and/or cross section. The cavity and/or cavity walls may be of substantially identical shape and/or cross section. The cavities and/or cavity walls can be aligned with one another. Alternatively, or additionally, cavities and/or cavity walls can be angularly disposed in relation to one another.

In some embodiments, the porous matrix structure is characterized as having a microstructure. The porous matrix may assume at least a portion of the 3D object (e.g., the, entire 3D object). For example, the porous matrix may assume at least a portion of an overhang as part of the 3D object. For example, the porous matrix may assume the entire structure of the 3D object. For example, the porous matrix may assume discrete and/or repetitive portions in a (e.g., forming) 3D object.

Figure 8B:
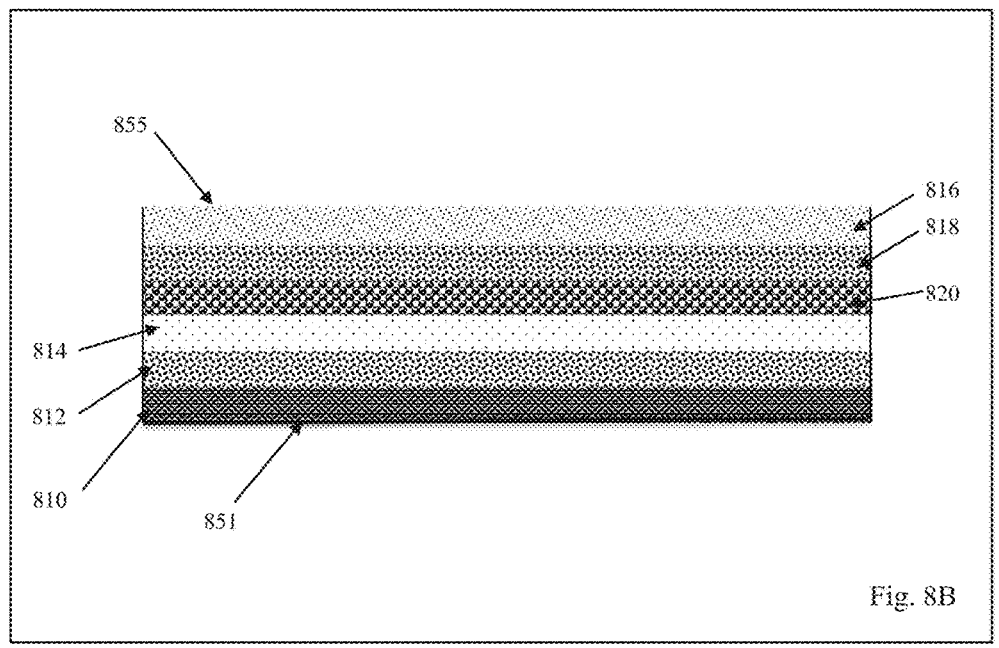

In some embodiments, the porous matrix structure is of a (e.g., substantially) homogenous structure that comprises a plurality of PMX layers, At times, the porous matrix may be of a heterogeneous structure. FIG. 8B shows an example of a heterogeneous structure. The heterogeneous structure may be disposed in an enclosure 851, which comprises an exposed surface 855. In the example shown in FIG. 8B, the PMX layers 810, 812. 814, 816, 818 and 820 are disposed on a platform 851. The first. PMX layer 810 may have a regular shape (e.g., a honeycomb structure). The second PMX layer 812 disposed over the first MPX layer may have a lower porosity structure than the first PMX layer 810. At least one of the subsequent fourth, fifth and sixth PMX layers (e.g., 820, 818, 816, respectively) may have a different or similar structure and/or porosity percentage than at least one of the first, second and/or the third layer. For example, the fourth PMX layer may be denser than the second PMX layer, but less dense than the first PMX layer. The fifth PMX layer may have a porosity that is higher than the second PMX layer and/or less than the first or fourth PMX layer. For example, at least two different portions of the porous matrix may be of different structures (e.g., microstructure). At least a portion of the porous matrix layer may comprise a directional structure. The directional structure may direct the flow of a flowable (e.g., molten) material, for example, by forming barriers to restrain and/or direct the flow of the flowable material within the structure. The flowable material may comprise liquid, semi-liquid, or powder material. For example, the flowable material may comprise molten material. The directionality may contribute to the formation of a 3D object. The directionality may affect the density and/or microstructure in at least a portion of the 3D object (e.g., to which the structure is directed towards). The directionality may affect the microstructure of the portion of hardened material that is (e.g., subsequently) formed at least because of the flow.

In some embodiments, during the process of forming the at least one 3D object, a first porous matrix may he separated by one or more layers of pre-transformed material from another (e.g., a second) porous matrix, thus forming a porous matrix set. FIG. 8A shows an example of a porous matrix set comprising a first porous matrix 802 and a second porous matrix 804 separated by a layer of pre-transformed material 803. Porous matrixes separated by layer(s) of pre-transformed material can be referred to as porous matrix (PMX) sandwich structures. The porous matrix set may comprise one or mote porous matrix layers, wherein at least two of the one or more porous layers ate connected in at least one position. The porous matrix set may comprise one or mote porous layers, wherein at least two of the one or more porous layers are disconnected (e.g., separated by one or more layers of pre-transformed material). The porous matrix set may assume a sandwich like structure which may comprise two or more porous matrix structures and one or more layers of pre-transformed (e g., particulate) material disposed between two porous matrix structures.

At times, the 3D object is formed from a plurality of (e.g., connected or disconnected) porous matrixes. In some instances, at least two of the porous matrixes are disposed in a sandwich like structure comprising at least one layer of pre-transformed material. At times, the 3D object may be formed from a porous matrix that does not comprise a layer of pre-transformed material. The porous matrix may serve as an intermediate step in the formation of a 3D object. For example, the porous matrix may be (e.g., subsequently) densified during formation of the 3D object. In some embodiments, the 3D object is formed by re-transforming (e.g., melting) at least a portion (e.g., the entire) porous matrix into a denser material to form at least a portion of the 3D object. In some embodiments, the 3D object is formed from at least a portion of the porous matrix that is not densified.

At times, the porous matrix layer (e.g., set thereof) has a controlled porosity value. The PMX layer may comprise at most about 10%, 20%, 30%, 40%, 50%, or 60% material, calculates as volume per volume, or area/area porosity, e.g., of a cross-section plane of maximum porosity. The PIV1X layer may comprise any suitable percentage between the afore-mentioned values (e.g., from about 10% to about 60%, from about 10% to about 40%, or from about 40% to about 60% material (v/v, or area/area porosity, e.g., of a cross-section plane of maximum porosity)). The porous matrix structure may be formed by irradiation of the material bed portion by the energy beam. For example, the beam cross-section of the energy beam may be (e.g., substantially) constant, or vary during the 3D printing. At times, the footprint of the energy beam on the exposed surface of the material bed may vary during formation of the porous matrix.

Figure 3:
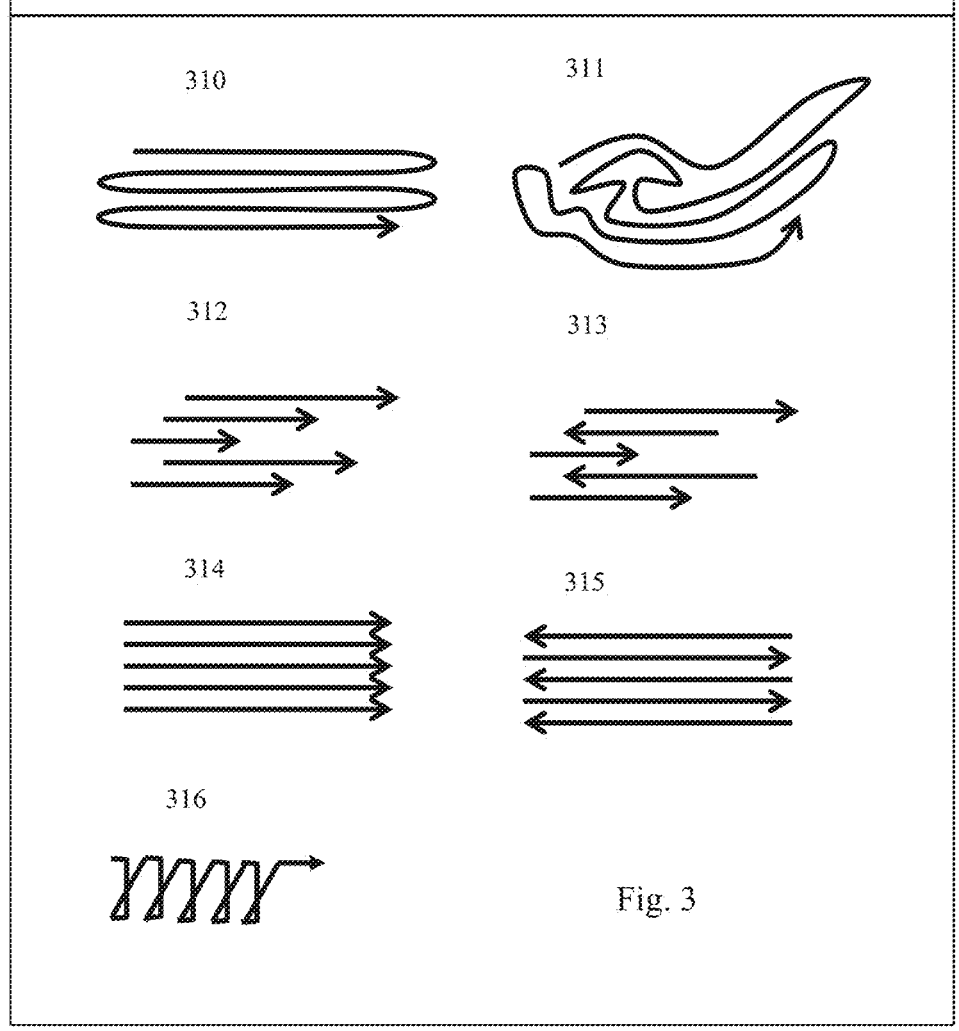
FIG. 3 schematically illustrates various paths.

In some embodiments, the transforming energy beam irradiates a target surface. The energy beam (e.g., forming the PMX) may have any suitable energy beam characteristics disclosed herein. For example, the characteristics may comprise wavelength, charge, power, power per unit area, amplitude, trajectory, footprint, cross-section, focus, intensity, energy, path, or hatching characteristics described. herein. FIG. 3 shows top-down view examples of various paths along which the energy beam may travel. The path may have any suitable shape (e.g., paths 310-316), and can be continuous (e.g., 310, 311 or 316) or discontinuous (e.g., 312, 313, 314, or 315). The discontinuous path may comprise intervals at which the energy beam is (e.g., substantially) stationary. The (e.g., substantially) stationary energy beam may form a tile of transformed material in the material bed. At least two sequential tiles may overlap each other at least in part. The tiles may overlap. The overlapped area may be at least about 10%, 20%, 30%, 40%, 50%, 60%, 70%, 80% or 90% of the average or mean tile area. The overlapped area may be at most about 10%, 20%, 30%, 40%, 50%, 60%, 70%, 80% or 90% of the average or mean tile area. The overlapped area may between any of the afore-mentioned values (e.g., from about 10% to about 90%, from about 10% to about 50%, or from about 40% to about 90%) of the average or mean tile area. The percentage of overlapped area may be (e.g., substantially) identical along the path of the energy beam forming the tiles. During the formation of the tile, the energy beam may be (e.g., substantially) stationary. Tire transforming energy beam (e.g., forming the PMX) may be any energy beam disclosed herein (e.g., having any energy density disclosed herein).

In some embodiments, the type-2 energy beam has an extended cross section. For example, the type-2 energy beam has a FLS (e.g., cross sectional diameter) may be larger than the type-1 energy beam. The FLS of a cross section of the type-2 energy beam may be at least about 0.05 millimeters (mm), 0.1 mm, 0.2 mm, 0.3 mm, 0.4 mm, 0.5 mm, 0.8 mm, 1 mm, 1.5 mm, 2 mm, 2.5 mm, 3 mm, 3.5 mm, 4 mm, 4.5 mm, or 5 mm. The FLS of a cross section of the type-2 energy beam may be between any of the afore-mentioned values (e.g., from about 0.05 mm to about 5 mm, from about 0.05 mm to about 0.2 mm from about 0.3 mm to about 25 mm, or from about 2.5 mm to about 5 mm). The cross section of the energy beam can be at least about 0.1 millimeter squared ($mm^2$), or 0.2. The FLS (e.g., diameter) of a cross-section of the energy beam can be at least about 50 micrometers (μm), 70 μm, 80 μm, 100 μm, 150 μm, 200 μm, 250 μm, 300 μm, 350, 400 μm, 500 μm, or 600 μm. In some embodiments, the distance between the first position and the second position (e.g., distance between tile centers or tile boundaries) is at least about 50 micrometers (μm), 70 μm, 80 μm, 100 μm, 200 μm, 250 μm, 300 μm, 350 μm, 400 μm or 450 μm. In some embodiments, the distance between the first position and the second position (e.g., distance between tile centers) is at least about 50 millimeters (mm), 100 mm, 150 mm, 200 mm, 300 mm, 400 mm or 500 mm. In some embodiments, the distance between the first position and the second position (e.g., distance between tile centers) is at least about 10 micrometers (μm), 15 μm, 20 μm, 25 μm, 30 μm, or 35 μm. The spot size of the energy beam (e.g., at the target surface) can be at least about 50 micrometers (μm), 55 μm, 60 μm, 65 μm, 70 μm, 75 μm, 80 μm, 85 μm, 90 μm, 95 μm, 100 μm, 150 μm, 200 μm, 250 μm, 300 μm, 350, 400 μm, 500 μm, 600 μm, 700 μm, 800 μm, 900 μm, 1000 μm or 11500 μm. The FLS may be measured at full width half maximum intensity of the energy beam. In some embodiments, the type-2 energy beam is a focused energy beam. In some embodiments, the type-2 energy beam is a defocused energy beam. The energy profile of the type-2 energy beam may be (e.g., substantially) uniform (e.g., in the beam cross sectional area that forms the tile). The energy profile of the type-2 energy beam may be (e.g., substantially) uniform during the exposure time (e.g., also referred to herein as tiling time, or dwell time). The exposure time (e.g., at the target surface) of the type-2 energy beam may be at least about 0.1 milliseconds (msec), 0.2 msec, 0.3 msec, 0.4 msec, 0.5 msec, 1 msec, 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time (e.g., at the target surface) of the type-2 energy beam may be at most about 10 msec, 20 msec, 30 msec, 40 msec, 50 msec, 60 msec, 70 msec, 80 msec, 90 msec, 100 msec, 200 msec, 400 msec, 500 msec, 1000 msec, 2500 msec, or 5000 msec. The exposure time may be between any of the above-mentioned exposure times (e.g., from about 0.1 msec to about 5000 msec, from about 0.1 to about 1 msec, from about 1 msec to about 50 msec, from about 50 msec to about 100 msec, from about 100 msec to about 1000 msec, from about 20 msec to about 200 msec, or from about 1000 msec to about 5000 msec). The exposure time may be the dwell time. The power per unit area of the type-2 energy beam may be at least about 100 Watts per millimeter square ($W/mm^2$), 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, or 7000 $W/mm^2$. The power per unit area of the type-2 energy beam may be at most about 100 $W/mm^2$, 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, 8000 $W/mm^2$, 9000 $W/mm^2$, or 10000 $W/mm^2$. The power per unit area of the type-2 energy beam may be any value between the afore-mentioned values (e.g., from about 100 $W/mm^2$ to about 3000 $W/mm^2$, from about 100 $W/mm^2$ to about 5000 $W/mm^2$, from about 100 $W/mm^2$ to about 9000 $W/mm^2$, from about 100 $W/mm^2$ to about 500 $W/mm^2$, from about 500 $W/mm^2$ to about 3000 $W/mm^2$, from about 1000 $W/mm^2$ to about 7000 $W/mm^2$, or from about 500 $W/mm^2$ to about 8000 $W/mm^2$). The type-2 energy beam may emit energy stream towards the target surface in a step and repeat sequence.

In some embodiments, the type-2 energy beam comprises (i) an extended exposure area, (ii) extended exposure time, (iii) low power density (e.g., power per unit area) or (iv) an intensity profile that can fill an area with a flat (e.g., top head) energy profile. Extended may be in comparison with the type-1 energy beam. The extended exposure time may be at least about 1 millisecond and at most 100 milliseconds. In some embodiments, an energy profile of the tiling energy source may exclude a Gaussian beam or round top beam. In some embodiments, an energy profile of the tiling energy source may include a Gaussian beam or round top beam. In some embodiments, the 3D printer comprises a type-1 energy beams. In some, embodiments, an energy profile of the hatching energy may comprise a Gaussian energy beam. In some embodiments, an energy profile of the type-1 energy beam may exclude a Gaussian energy beam. The type-1 energy beam may have any cross-sectional shape comprising an ellipse (e.g., circle), or a polygon (e.g., as disclosed herein). The type-1 energy beam may have a cross section with a diameter of at least about 25 μm, 50 μm, 100 μm, 150 μm, 200 μm, or 250 μm. The type-1 energy beam may have a cross section with a diameter of at most about 40 micrometers , 50 μm, 60 μm, 70 μm, 80 μm, 100 μm, 150 μm, 200 μm, or 250 μm. The type-1 energy beam may have a cross section with a diameter of any value between the afore-mentioned values (e.g., from about 40 μm to about 240 μm, from about 40 μm to about 100 μm, from about 50 μm to about 150 μm, or from about 150 μm to about 250 μm). The power density (e.g., power per unit area) of the type-1 energy beam may at least about 5000 $W/mm^2$, 10000 $W/mm^2$, 20000 $W/mm^2$, 30000 $W/mm^2$, 50000 $W/mm^2$, 60000 $W/mm^2$, 70000 $W/mm^2$, 80000 $W/mm^2$, 90000 $W/mm^2$, or 100000 $W/mm^2$. The power density of the type-1 energy beam may be at most about 5000 $W/mm^2$, 10000 $W/mm^2$, 20000 $W/mm^2$, 30000 $W/mm^2$, 50000 $W/mm^2$, 60000 $W/mm^2$, 70000 $W/mm^2$, 80000 $W/mm^2$, 90000 $W/mm^2$, or 100000 $W/mm^2$. The power density of the type-1 energy beam may be any value between the afore-mentioned values (e.g., from about 5000 $W/mm^2$ to about 100000 $W/mm^2$, from about 10000 $W/mm^2$ to about 50000 $W/mm^2$, or from about 50000 $W/mm^2$ to about 100000 $W/mm^2$). The hatching speed of the type-1 energy beam may be at least about 50 millimeters per second (mm/sec), 100 mm/sec, 500 mm/sec, 1000 mm/sec, 2000 mm/sec, 3000 mm/see, 4000 mm/sec, or 50000 mm/sec. The hatching speed of the type-1 energy beam may be at most about 50 mm/sec, 100 mm/sec, 500 mm/sec, 1000 mm/sec, 2000 mm/sec, 3000 mm/sec, 4000 mm/sec, or 50000 mm/sec. The hatching speed of the type-1 energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The type-1 energy beam may be continuous or non-continuous (e.g., pulsing). In some embodiments, the type-1 energy beam compensates for heat loss at the edges of the target surface after the heat tiling process (e.g., forming the tiles by utilizing the type-2 energy beam). The type-1 energy beam may be continuously moving along the path. The type-2 energy beam may stop and move along the path (e.g., the type-2 energy beam may transform a portion of the material bed along a path of tiles during the "stop" time and cease to transform the material bed along the path of tiles during the "move" time.

In some embodiments, the first bottom skin layer is formed using (i) a constant elocity and pulsing transforming energy beam (ii) a duty cycle energy beam wherein the duty cycle comprises a dwell time and a delay me of irradiating the energy beam, the energy beam may be moved from a first location to a second location during the delay time, (iii) a round cross section, dithering energy beam that may be perpendicular to the direction of growth of the layer of the forming 3D object, or (iv) any combination thereof. At times, the bottom skin layer may be extended (e.g., as a wire, ledge, or a 3D plane) from a rigid-portion (e.g., core) using a type-2 energy beam that may have a (i) circular footprint, or (ii) an elongated footprint. The type-2 energy beam may travel along a trajectory. The trajectory may comprise a back and fourth motion (may be referred to as a "retro scan") along an overall forward direction.

In some embodiments, the first bottom skin layer is formed using a porous matrix structure. The porous matrix structure is formed using (i) a type-2 energy beam and/or (ii) a type-1 energy beam. The porous matrix structure may comprise (i) a portion of transformed material portion and/or (ii) a portion of pores. The transformed material portion may comprise a microstructure. The microstructure may be any microstructure described herein. At times, the porous matrix structure may be tilled (e.g., occupied) with pre-transformed material. The porous matrix layer may be transformed (e.g., hardened, densified) by way of melting the porous matrix layer. The transforming energy beam may perform melting. Melting may be performed by forming one or more melt pools on a portion of the porous matrix structure. For example, FIGS. 15A-15D illustrate example operations (e.g., for forming a bottom skin layer) using a porous matrix layer. FIG. 15A shows an example of a material bed (e.g., 1500) that comprises pre-transformed material (e.g., 1505). FIG. 15B shows an example of irradiating (e.g., and transforming, e.g., sintering and/or melting) a portion of the pre-transformed material within the material bed using a transforming energy beam (e.g., 1510). The pre-transformed material may be transformed to a porous matrix layer (e.g., 1515). The amount of porosity within the porous matrix layer may be controlled (e.g., using a controller, e.g., in real time during formation of the PMX). Controlling may comprise adjusting at least one characteristic of the transforming energy beam (e.g., power per unit area). FIG. 15C shows an example of irradiating a portion of the porous matrix layer (e.g., 1520) within the material bed (e.g., 1522), using a transforming energy beam (e.g., 1521). The transforming energy beam may be moved from a first location to a second location. The transforming energy beam may form a melt pool at the first location and the second location (e.g. 1523). The gray scale of the melt pools shows the propagation of their formation, with a lighter melt pool being formed after a darker melt pool. The transforming energy beam may move in a direction along, or at an angle with respect to the direction of growth of the porous layer, to form the at least one melt pool (e.g., 1523). For example, the transforming energy beam may move in a direction perpendicular to the direction of growth of the porous layer, to form the at least one melt pool. The transforming energy beam that generates the melt pool(s) transforms the porous layer to a transformed material layer (e.g., that subsequently hardens). FIG. 15D shows an example of a transformed material layer (e.g., 1535), that is denser that the porous matrix which served as its precursor.

In some embodiments, the first layer forming the bottom skin layer has a height that is greater than the average height of one or more subsequent layers. For example, the bottom skin layer may have a height of at least about 100 µm, 200 µm, 300 µm, 400 µm, or 500 µm. The one or more subsequent layers to a porous matrix may be layers of particulate material (e.g., powder). The subsequent layers may comprise subsequent porous matrix layers (or layer portions) and/or (e.g., fully) dense layers of hardened material (or layer portions thereof). The one or more subsequent layers may be of (e.g., substantial) similar FLS (e.g. height). The one or more subsequent layers may comprise at least 1, 2, 3, 4, 5, 6, 7, 8, 9, 10, 20, 30, 40, 50, 60, 70, 80, 90,or 100 layers. The one or more subsequent layers may comprise at most 1, 2, 3, 4, 5, 6, 7, 8, 9, 10, 20, 30, 40, 50, 60, 70, 80, 90,or 100 layers. The one or more subsequent layers may comprise any number of layers between the afore-mentioned values (e.g., from 1 to 100 layers, from 1 to 50 layers, or from 50 to 100 layers). The subsequent layers may be transformed (e.g., and subsequently further re-transformed) using the transforming energy bean. At times, the energy beam may be a defocused energy beam. At times, the energy beam may be a focused energy beam. Transforming the one or more subsequent layers may form one or more layers of transformed material respectively. At least two of the transformed one or more layers may have at least one contact point (e.g., connection point) with each other. At least one of the transformed one or more layers may have at least one contact point with a porous matrix (or a transformed porous matrix). At least one of the transformed, one or more layers may have at least one contact point with a rigid-portion of the 3D object (e.g., core). At least one of the transformed one or more layers may have at least one contact point with a bottom skirt layer. The process of forming a porous matrix (e.g. set) and its transformation to form a denser portion of the 3D object may repeated during the 3D printing of the requested 3D object.

At times, a porous matrix (e.g., set) is transformed to form a first transformed material, and on top of the first transformed material, a second porous matrix (e.g., set) is formed and subsequently transformed to form a second transformed material as part of the 3D object. The porous matrix set may be transformed into a dense material using an energy beam. At least a portion of the porous matrix may be filled with a pre-transformed material. An energy beam may irradiate the porous matrix (e.g., set) to transform it into a denser structure. The denser structure may be more compact than the porous matrix by about 1.5\*, 2\*, 5\*, 10\*, 20\*, 30\*, 40\*, 50 times ("\*"). The denser structure may comprise at least about 70%, 75%, 80%, 85%, 90%, 95%, 97%, 98%, 99%, 99.5% material (percentages are calculated as volume per volume, or area/area porosity, e.g., of a cross-section plane of maximum porosity). The denser structure may comprise a material percentage between the afore-mentioned percentage values (e.g., from about 70% to about 99.5%, from about 70% to about 90%, or from about 85% to about 99.5% material. Percentages are calculated as volume per volume, or area per area porosity, e.g., of a cross-section plane of maximum porosity). At times, at least one surface (e.g., exposed bottom skin surface) of the dense material 3D structure may be (e.g., substantially smooth). Substantially is relative to its intended purpose. The average or mean height variation in the surface may be at least about 10 µm, 15 µm, 20 µm, 5 µm, 30 µm, 35 µm, 40 µm, 45 µm, 50 µm, 55 µm, 60 µm, 65 µm, 70 µm, 75 µm, 80 µm, 85 µm, 90 µm, 95 µm or 100 µm. The average or mean height variation in the surface may be at most about 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm or 100 µm. The average or mean height variation in the surface may be between any of the afore-mentioned values (e.g., from about 10 µm to about 100 µm, from about 10 µm to about 30 µm, from about 30 µm to about 70 µm, or from about 70 µm to about 100 µm).

Without wishing to be hound to theory, the hardened material within the porous matrix may provide one or more wetting surfaces for the liquid material (e.g., whether transformed or pre-transformed material). For example, the hardened material within the porous matrix may provide one or more wetting surfaces for a molten metal. For example, the hardened material within the porous matrix may provide one or more wetting surfaces for a liquid polymer. The wetting surface may wet by the liquid (e.g., pre-transformed or transformed material). The wetting surface may form paths and/or channels along which the liquid (e.g., transformed material) travels. The wetting surfaces may provide directionality during the re-transforming (e.g., re-melting) operation and subsequent hardening (e.g., solidification) to form the denser (e.g., high density) material in at least a (e.g., pre-designed) portion of the 3D object. At least a portion of the porous matrix may form a skeleton for the forming 3D object. For example, at least a portion of the porous matrix may form a skeleton for the dense portion of the 3D object.

In some embodiments, the porous matrix comprises a skeleton. The skeleton may direct liquid (e.g., transformed) material in a particular (e.g., designed) manner. Forming a denser structure from the porous matrix (e.g., more compact) may comprise re-melting at least a portion of the porous matrix. Forming a denser structure from the porous matrix (e.g., more compact) may comprise filling at least a portion of the porous matrix with pre-transformed material, and re-melting at least a portion of the porous matrix with at least a portion of the newly introduced pre-transformed material. The porous matrix may facilitate formation of a 3D object comprising functionally graded material. The 3D object comprising the functionally graded material may comprise at least two portions having materials of different density and/or microstructures. The porous matrix may be utilized in the formation of functionally graded material. The functionally graded material may comprise at least two portions of the 3D object that have different densities (e.g., FIG. 20A, 2011, 2012, 2013, 2014, and 2015). The different densities may be pre-designed and/or controlled. The densities may be formed by controlling at least one characteristic of the energy beam. For example, the densities may be formed by attenuating the power density of the energy beam, its footprint on the target surface, or its trajectory (e.g., to form a certain geometry). FIG. 20A shows an example of a functionally graded material comprising plurality of densities, cavities, hardened material structure and/or pore structure. The white areas in FIGS. 20A and 20B designate pores, and the black areas designate hardened material. The cavities may have a uniform shape (e.g., geometrical, homogenous, heterogenous). The cavity may not be uniform in shape (e.g., random). The cavity may represent a portion of the 3D object (e.g., a geometrical subset such as FIG. 20A, 2012, 2013 may represent a columnar cavity within the 3D object). The density of a cavity may be pre-designed based on a requested property (e.g., strength, tension, malleability, conductivity) of the portion of the 3D object represented by the cavity. The 3D object formed using the porous matrix as an intermediate 3D object state, may be (e.g., substantially) less deformed compared to a 3D object that is formed by directly transforming the pre-transformed material into the 3D object without using the porous matrix as an intermediate state. Without wishing to be bound by theory, the porous matrix may facilitate wetting of the forming 3D object surface, and/or conducting heat through one or more layers of the forming 3D object.

In some embodiments, the one or more layers of pre-transformed material (e.g., including the PMX structure) are transformed (e.g., hardened) using at least one minimum threshold value. The minimum threshold value may be (i) of a temperature at a position (e.g., irradiation position) of the target surface, (ii) of the power density of the transforming energy beam, or (iii) of the power of the energy source (e.g., generating the type-1 energy beam). At tunes, transforming includes forming one or more melt pools. Heat may be diffused homogenously or heterogeneously (e.g., in materials with non-uniform heat conductivity, at a shallow angle of the geometry of the 3D object, a wedge) across one or more melt pools. At times, the one or more melt pools may be adjacent to each other. At times, the one or more melt pools may be distant from each other. At times, the melt pools may reach the bottom skin layer of the transformed material (e.g., when they were formed at least one layer above the bottom skin layer). At times, the depth of the melt pool may be controlled.

Figure 14A:
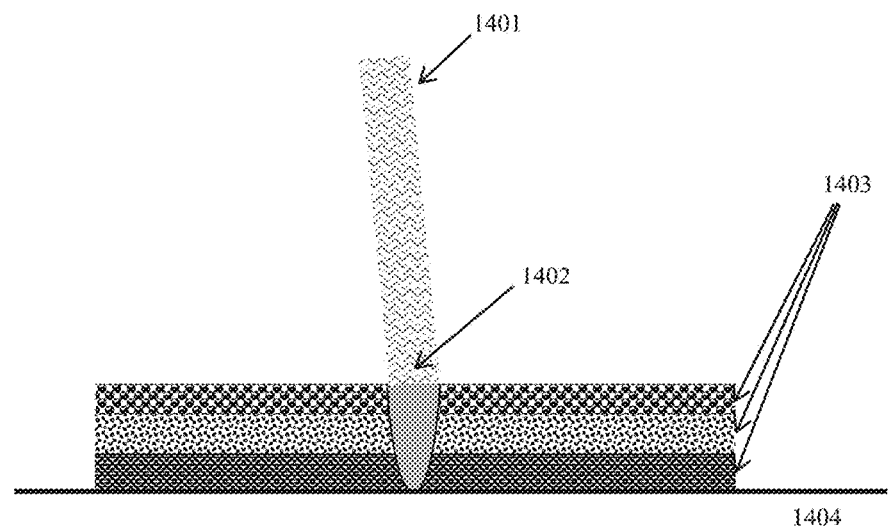
FIGS. 14A-14B schematically illustrate operations in forming a 3D object.
Figure 14B:
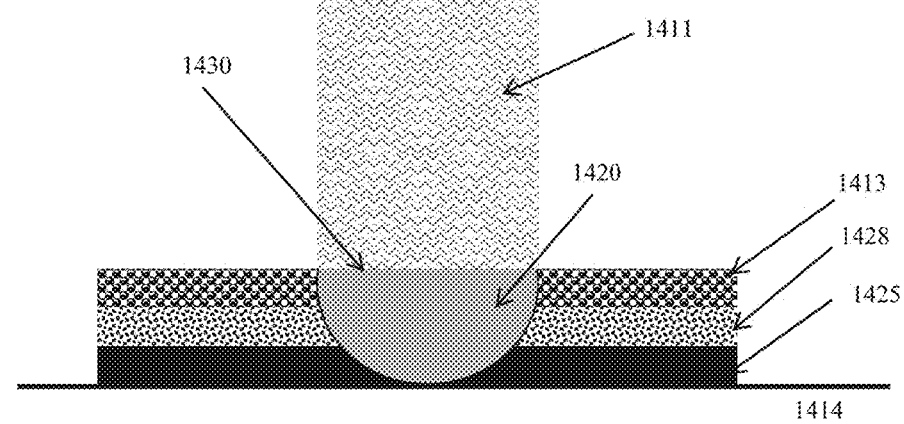

In some embodiments, the PMX structure is transformed (e.g., hardened, densified) by forming one or more melt pools that melt through the (e.g., entire) porous matrix structure (e.g., comprising a plurality of PMX layers, e.g., FIG. 18A, 1802-1804). One or more melt pools may be formed (e.g., FIG. 18B, 1820) by irradiating an energy beam (e.g., a type-2 energy beam and/or a type-1 energy beam, e.g., 1825) through one or more layers (e.g., highly porous PMX layers, denser PMX layers, mixed density layers, or a combination thereof) of the porous matrix structure. During melt pool formation, the transforming energy beam may be a stationary energy beam or a continuously moving energy beam. The transforming energy beam may have a narrow cross section (e.g., type-1 energy beam (or a wide cross section (e.g., type-2 energy beam). One or more characteristics (e.g., power per unit area, footprint, cross section, velocity, FLS (i.e., diameter), dwell time or delay time) of the transforming energy beam may be controlled, when forming the one or more melt pools. The period of time a melt pool remains molten may be controlled (e.g., by controlling a characteristic of the transforming energy beath). Control may be in real time (e.g., when forming a melt pool, when forming a second melt pool adjacent to the first melt pool). Control may be manual. Control may be pre-determined (e.g., feed-forward control). Control may be in real-time (i.e., using a feedback control loop). The one or more layers of the PMX structure may be transformed (e.g., melted through) until the bottom layer of the porous matrix structure plastically yields (e.g., softens). At times, the one or more layers of the porous matrix structure may be transformed (e.g., melted through) until at least one of (i) a portion of the bottom layer of the porous matrix attaches to a previously transformed layer (e.g., hardened layer) of the forming 3D object, (ii) a portion of the bottom skin layer of the portion of the 3D object or the porous matrix plastically yields, or (iii) a portion of the bottom skin may be transformed (e.g., molten). For example, FIGS. 14A-14B show examples of transforming a porous matrix structure using the transforming energy beam. FIG. 14A shows an example of an irradiating type-1 energy beam (e.g., 1401) that forms a melt pool (e.g., 1402) within the porous matrix (e.g., 1403), that is formed of three different layers of porous material (e.g., which melt pool has a high aspect ratio). The layers of the PMX structure may optionally be filled with pre-transformed material (e.g., prior to transformation of the PMX structure). In the illustrated example of FIG. 14A, a narrow high power (e.g., hatching) energy beam forms an elongated, a small diameter, and deep melt pool that propagates (e.g., melts) through more than one layer of the porous matrix (e.g., 1403), (e.g., until the bottom surface of the bottom skin layer of the porous matrix). The diameter of the melt pool may be at least the size of the footprint of the irradiated type-1 energy beam. The porous matrix includes one or more layers that may have different amounts of porosity. The porous matrix may be formed on a platform (e.g. 1404). The porous matrix may be formed on top of the transformed layer, that resides on the target surface (e.g. 1414). FIG. 14B shows an example of a type-2 energy beam (e.g., 1411) that forms a melt pool (e.g., 1420) within the porous matrix (e.g., 1413 and 1428) and the transformed material layer (e.g., 1425). In the illustrated example, the irradiating type-2 energy beam forms a wide, symmetric, conductive, and deep melt pool that spans (e.g., melts through) more than one layer of the porous matrix structure (e.g., till the bottom surface of the bottom layer of the porous matrix 1428) and through the transformed layer (e.g., the bottom surface of the transformed layer 1425).

Figure 21A:
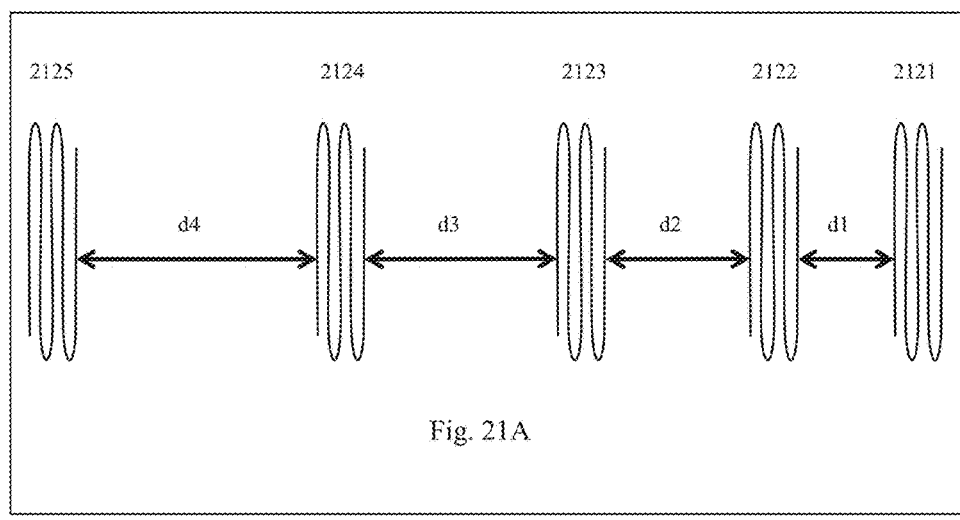
FIGS. 21A-21B schematically illustrate energy beam patterns o forming a portion of a 3D object.
Figure 21B:
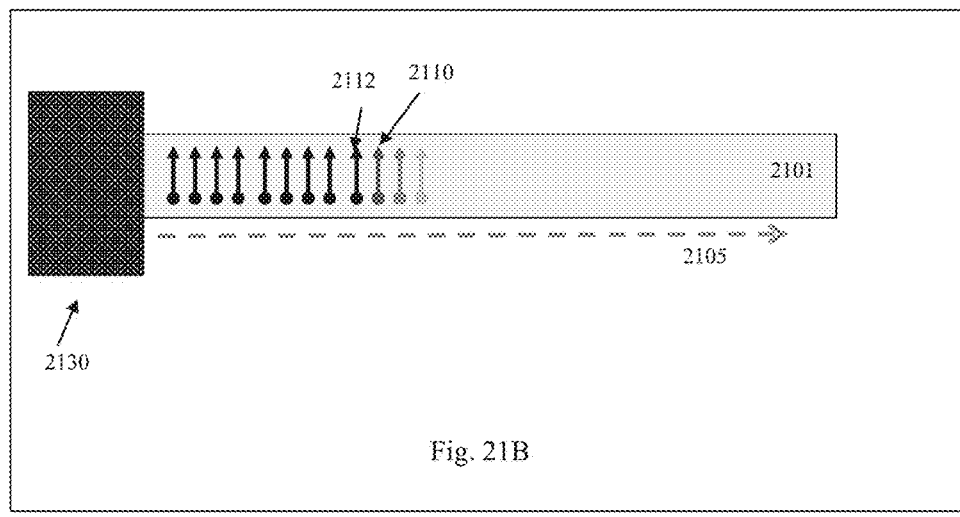

In some embodiments, a hanging structure is formed as part of a 3D object. The hanging structure may be connected to at least one rigid portion that is a portion of the 3D object. The path of the transforming energy beam may form an angle (e.g., perpendicular) relative to the direction of growth of the one or more layers (e.g., anchorlessly suspended layer, ledge, or cavity ceiling). For example, the path (e.g., comprising hatches) of the transforming energy beam may form an angle (e.g., perpendicular) relative to the direction of growth of the hanging structure. FIG. 21B shows a top view example of a direction of a hanging structure wherein the moving energy beam forms a 90-degree angle relative to the direction of growth of a layer that is at least a portion of the hanging structure. In the example of FIG. 21B, the forming layer 2101 of the 3D object is connected (e.g., anchored) to a rigid-portion (e.g., 2130). The forming layer may be parallel to the target surface (e.g., exposed surface of the material bed) and/or platform. The layer of the forming 3D object may be formed within the material bed. For example, the transforming energy beam may be moving (e.g., indicated by the vertical arrows in the FIG. 21B, 2112) at an angle perpendicular (e.g., 90°) to the direction of growth of the layer (e.g., 2105) at a first area on the target surface (e.g., comprising arrow 2112). The moving energy beam may be moved from the first area on the target surface to a second area on the target surface (e.g. from an area comprising 2112 to an area comprising 2110). In the example of FIG. 21B, the arrows on layer 2101 represent the path along which the energy beam travels, and arrow 2105 represents the general progression of the energy beam path. The lighter arrows represent more recent paths, while the darker arrows represent older paths. The path may be any path described herein. The transforming energy beam may move at a constant or varied velocity. At times, the transforming energy beam may be turned off for a period of time (e.g., delay time). Delay time may be at least about 1 (micro) μsec, 2 μsec, 5 μsec, 10 μsec, 20 μsec, 50 μsec, 100 μsec, 200 μsec, 500 μsec, 1 (milli) msec, 2 msec, 5 msec, 10 msec, 20 msec or about 50 msec. Delay time may be at most about 1 (micro) usec, 2 μsec, 5 μsec, 10 μsec, 20 sec, 50 μsec, 100 μsec, 200 μsec, 500 μsec, 1 (milli) msec, 2 msec, 5 msec, 10 msec, 20 msec or about 50 msec. Delay time may be any ranges between the afore-mentioned times (e.g., from about 1 μsec to about 50 msec, from about 1 μsec to about 200 μsec, from about 200 μsec to about 10 msec, or from about 10 msec to about 50 msec). The transforming energy beam may be moved from a first area to a second area on the target surface. The transforming energy beam may be turned off when moving from the first location to the second location. FIG. 21A shows an example of turning off a transforming energy beam. For example, the transforming energy beam may be turned on at a first location (e.g., 2121) for a period of time. This time may be described as the "dwell time". The transforming energy beam may be turned off for a period of time (e.g., FIG. 21A, d1, d2, d3, and d4). This period of time may be described as the "delay time". The dwell time in at least two of the locations (e.g., 2121, 2122, 2123, 2124, and 2125) may be the same. The dwell time in at least two of the locations may be different (e.g., 2121, 2122, 2123, 2124, and 2125). The delay time of at least two intermissions may be the same (e.g., d1, d2, d3, and d4). The delay time of at least two intermissions may be different (e.g., d1, d2, d3, and d4). The transforming energy beam may be moved from a first location to a second location during the dwell time. The transforming energy beam may be moved from a first location to a second location during the delay time. The transforming energy beam may be moving at a constant velocity when moving from the first location to the second location. The first location may be adjacent to the second location. The first location may be distant from the second location. The distance between two adjacent paths of the transforming energy beam (e.g., hatching) may be prescribed based on a requested porosity level of the porous matrix, 3D object, and/or requested structure of the 3D object (or respective portions thereof).

In some embodiments, the transforming energy beam has an elliptical (e.g., circle) cross section. For example, the transforming energy beam may have a round cross section. The transforming energy beam may have an oval cross section. The transforming energy beam may be a dithering (e.g., wavering) energy beam. At times, a dithering energy beam (e.g., retro scan) may be superimposed on the energy beam. The dithering energy beam may be at an angle (e.g., perpendicular) (i) to the direction of movement of the transforming energy beam, or (ii) to the direction of growth of the portion of the 3D object. The angle may be at least about 0°, 1°, 2°, 5°, 10°, 15°, 20°, 25°, 30°, 35°, 40°, 45°, 50°, 55°, 60°, 65°, 70°, 75°, 80°, 85°, or 90°. The angle may be at most about 0°, 1°, 2°, 5°, 10°, 15°, 20°, 25°, 30°, 35°, 40°, 45°, 50°, 55°, 60°, 65°, 70°, 75°, 80°, 85°, or 90°. The angle may be any angle between the afore-mentioned values (e.g., from about 0° to about 90°, from about 0° to about 30°, from about 30° to about 60°, or from about 60° to about 90°).

FIGS. 22A-22D shows examples of dithering energy beams (e.g., retro scan) forming melt pools. FIG. 22A illustrates an example of moving a transforming energy beam in six operations (e.g., 2210) in a forward direction (e.g., 2220) on a target surface (e.g., 2205) along a first line. FIG. 22B illustrates an example of moving the transforming energy beam (e.g., 2235) four operations (e.g., 2230) in a backward direction (e.g., 2240) on the target surface (e.g., 2225) along a second line. FIG. 22C illustrates an example of moving the transforming energy beam (e.g., 2255) six operations (e.g., 2250) in the forward direction (e.g., 2260), on the target surface (e.g., 2245) along a third line. In the retro scan procedure, the operation illustrated in FIG. 22A is executed, followed by the operation illustrated in FIG. 22B, which is subsequently followed by the operation in FIG. 22C. The third line may partially overlap the second line, which partially may overlap the first line. The partial overlapped lines may form an overall propagation of the first line by the third line. Moving the transforming energy beam may include moving one or more s selected from (i) moving in a forward direction to form a first forward path, (ii) irradiating to at least partially overlap the first forward path in a backwards direction to form a backwards path, and (iii) irradiating to at least partially overlap the backwards path in a forward direction. Operations (i) to (iii) can be conducted sequentially In some embodiments, the backwards path overlaps the first forward path in part. In some embodiments, the second forward path overlaps the backwards path in part. Moving the energy beam may include overall moving in the forward direction (e.g., two steps forward and one step backward). For example, when the non-overlapping second forward path exceeds the first forward path in the direction of forward movement (e.g., in FIG. 22E, the difference between positions 7-8 on the target surface irradiated at time 15-16, and position 6 on the target surface irradiated at time 6), FIG. 22D illustrates an example of moving the energy beam in three iteration positions, which circles (e.g., 2280) show an expansion of the superposition of a plurality of irradiated positions on the target surface 2265. In the first iteration, the energy beam moves six steps in the forward direction (e.g., irradiating position 2280). In the second iteration, the energy beam moves four steps in the backward direction (e.g., irradiating position 2275) from the previous iteration. In the third step, the energy beam moves six steps in the forward direction (e.g., irradiating position 2270) from the earlier iteration, thus overall moving eight steps in the forward direction on the target surface (e.g., 2265). In the illustrated example, the earliest irradiation position (e.g. first step) is indicated by the darkest gray circle. The shades of gray are lightened to indicate the subsequent steps (from the earliest to the most recent irradiated position, e.g., step two to step six) in the iteration, and the last irradiation position is indicated by a white circle. FIG. 22E illustrates an example of a graphical representation of the retro scan, wherein the graphical representation illustrates the position of the irradiating energy on the target surface (e.g., 2285) as time (e.g., 2290) progresses. The retro scan may be performed with the transforming energy beam (e.g., type-2 energy beam or type-1 energy beam) having an elliptical (e.g., circular) cross section. The retro scan may be performed the transforming energy beam having an oval (e.g., Cartesian oval) cross section. The retro scan may be performed the transforming energy beam having an elliptical cross section. The retro scan may be performed continuously (e.g., during the 3D printing transformation operation, or a portion thereof). The retro scan may be performed during (e.g., as part of) printing of the 3D object. The movement of the energy beam may be controlled statically (e.g., before or after printing of the 3D object). The movement of the energy beam may be controlled dynamically (e.g., during printing of the 3D object). The elongated energy beam may be superimposed by an oscillating signal (e.g., electronic signal). The oscillating signal may be generated by a scanner. The oscillating signal may further oscillate the retro scan movement to generate an elongated energy beam.

Figure 23:
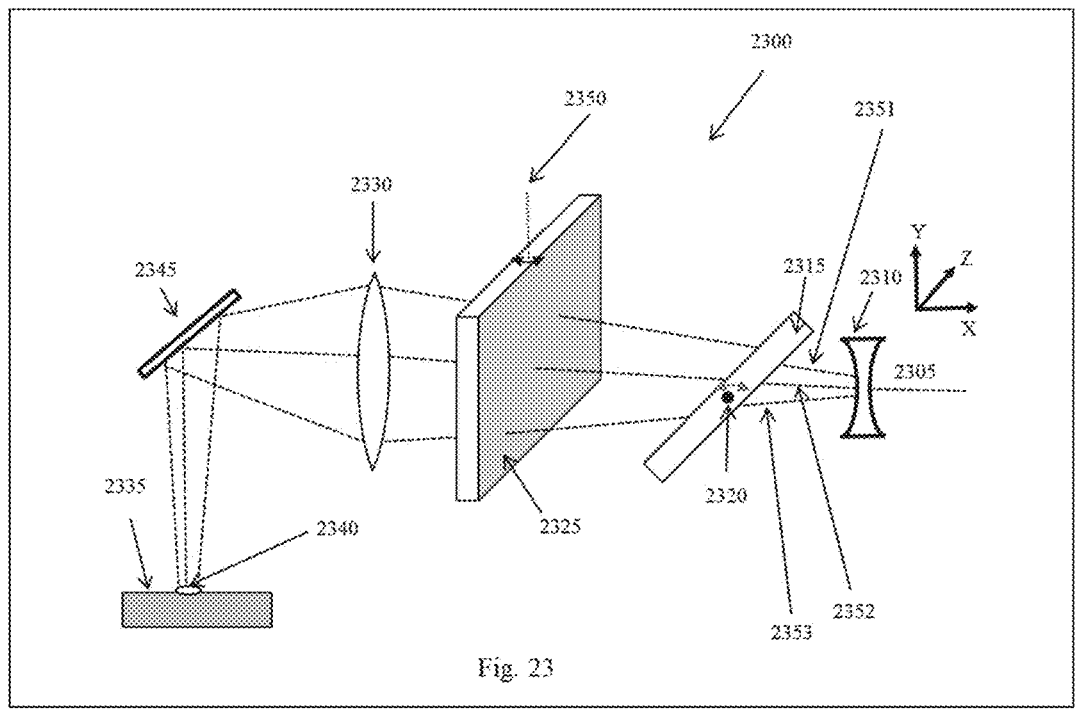
FIG. 23 schematically illustrates an optical system used in the formation of one or more 3D objects.

In some embodiments, the retro scan is performed on an elliptical cross section (e.g., elongated) energy beam. The retro scan can be performed, with any cross section of the irradiating energy (e.g., transforming energy beam) disclosed herein. For example, the retro scan can be performed using an elliptical cross section e.g., using the astigmatism mechanism). For example, the retro scan can be performed using a circular cross section (e.g., focused, defocused; having small or large FLS). FIG. 23 shows an example of an astigmatism system for forming an elongated energy beam. The astigmatism system (e.g., FIG. 23, 2300) may be coupled to the 3D printer. The astigmatism system may be disposed adjacent (e.g., in, or outside of) the processing chamber in which the transforming energy beam. generates the 3D object (e.g., FIG. 1, 126). The astigmatism system may be operatively coupled to an energy source, and/or to a controller. At least one element of the astigmatism system may be controlled before, after, and/or during at least a portion of the 3D printing (e.g., in real time). At least one element of the astigmatism system may be controlled manually and/or automatically (e.g., using a controller). The energy source may irradiate energy (e.g., FIG. 23. 2305 depicting an energy beam). The astigmatism system may be used to form an elongated cross-sectional beam (e.g., narrow, and/or long, FIG. 23, 2340) that irradiates the target surface (e.g., 2335). The energy beam may be elongated along the X-Y plane (e.g., FIG. 23). At times, the footprint of the energy beam may be elongated by an energy beam perforation (e.g., an elongated slit) that the energy beam may be allowed to pass through. At nines, the movement of the energy beam may be controlled to perform a scan or a retro scan to form an elongated energy beam footprint.

In some embodiments, the astigmatism system includes two or more optical elements (e.g., lenses. FIG. 23, 2310, 2330). The optical elements may diverge or converge an irradiating energy (e.g., beam) that travels therethrough. The optical elements may have a constant focus. The optical elements may have a variable focus. At times, the optical element may converge the rays of the energy beam. At times, the optical element may diverge the rays of the energy beam. For example, the first optical element may be a diverging lens. The astigmatism system may comprise one or more medias (e.g., 2315, 2325). The medium may have a high refractive index (e.g., a high refractive index relative to the wavelength of the incoming energy beam). At least one medium may be stationary or translating (e.g., rotating along an axis, FIG. 23, 2320, 2350). Translating may be performed before, after, or during at least a portion of the 3D printing. The first medium may translate along a different axis than the second medium. The translating axes of the mediums may be different than (e.g., perpendicular to) the traveling axis of the irradiating energy. For example, the first medium (e.g., 2315) may translate along the Z axis (e.g., 2320), the second medium (e.g., 2325) may translate along the Y axis (e.g., 2350), and the irradiating energy (e.g., 2305) may travel along the X axis. The distance between the media may be such that they do not collide with each other when translating (e.g., rotating). The irradiating energy may be directed to the second medium after it emerges from the first medium. The first optical element (e.g., 2310) may direct the energy beam to a medium (e.g., an optical window, e.g., 2315). The medium may (e.g., substantially) allow the energy beam to pass through (e.g., may not absorb a substantial portion of the passing energy beam). Substantially may be relative to the intended purpose of the energy beam (e.g., to transform the pre-transformed material).

In some embodiments, the optical astigmatism of the transforming energy beam refers to a resulting elliptical cross section of the transforming energy beam that differs from a circle. Without wishing to be bound to theory, the different paths (e.g., lengths thereof) of the various irradiating energy rays (e.g., 2351, 2352, or 2353), interacting with various thicknesses of the media (having an effective refractive index), may lead to an elongated cross section of the irradiating energy, and subsequently to an elongated footprint of the irradiating energy on the target surface. The relative position of the first media (e.g., optical window) and the second media may lead to an optical astigmatism. The degree and/or direction of the astigmatism may vary (e.g., before, after, and/or during at least a portion of the 3D printing) in relation to the relative positioning of the two media. The degree and/or direction of the astigmatism may be due to the relative positioning of the two media. The angular position of the media may be controlled (e.g., manually, and/or automatically). For example, the angular position of the media may be controlled by one or more controllers. Controlling may include altering the angular position of the media relative to each other. Controlling may include altering the angular position not relative to each other (e.g., relative to the target surface and/or to the energy source). Controlling the degree of astigmatism may lead to controlling the length and/or width of the irradiating energy on the target surface. The irradiating energy may be directed to a second optical element (e.g., FIG. 23, 2330) from the (e.g., first or second) medium. The second optical element may be a converging lens. The converging lens may focus the irradiating energy after its emergence from the (e.g., first or second) medium. The converging lens may translate (e.g., to vary the focus). The focusing power of the lens (e.g., converging lens) may be variable (e.g., electronically, magnetically, or thermally). The second optical element may be placed after the (e.g., first or second) medium. The energy beam may be directed (e.g., converged) on to a reflective element (e.g., mirror, FIG. 23, 2345) and/or a seamier. The energy beam may be directed (e.g., converged) on to a beam directing element. The beam directing (e.g., reflective) element may be translatable. The beam directing element may direct the energy beam to the target surface (e.g., material bed, FIG. 23, 2335). The directed energy beam may be an elongated energy beam. The mirror may be highly reflective mirror (e.g., Betyllium mirror).

In some embodiments, the diameter of the transforming energy beam footprint is at least equal to the length of a forming bottom skin layer (e.g., ledge, wire, or plane). For example, the diameter of the transforming energy beam footprint may be at least equal to the length of a forming hanging structure. At times, the diameter of the transforming energy beam footprint may overlap with a previously formed portion of the 3D object to form a connection between the previously formed portion of the 3D object and the extending bottom skin layer (e.g., as part of a blade). For example, the diameter of the transforming energy beam footprint may overlap with the rigid-portion (e.g., core), and thus form a connection between the rigid-portion and the extending bottom skin layer (e.g., as part of a shelf) At times, the diameter of the transforming energy beam footprint may overlap with a previously formed portion of the 3D object connected to the extending bottom skin layer (e.g., as part of a hanging structure). At times, the long axis of the elongated transforming energy beam footprint may be at least equal to the length of the forming bottom skin layer (e.g., ledge, wire, or plane). At times, the long axis of the elongated transforming energy beam footprint may overlap with a previously formed portion of the 3D object (e.g., the rigid-portion) that is connected to the extending bottom skin layer (e.g., as part of a ledge). At times, the collective path (e.g., superimposed energy beam paths) of the dithering energy beam (e.g., retro scan) may be at least equal to the length of the forming bottom skin layer (e.g., ledge, wire, or plane). At times, the collective path (e.g., superimposed energy beam paths) of the dithering energy beam (e.g., retro scan) may overlap with the rigid-portion (e.g., core) connected to the extending bottom skin layer. At times, the melt pools formed by the transforming energy beam may overlap with at least one previous layer of the forming 3D object. In some cases, when transforming (e.g., melting) the (e.g., entire) porous matrix set (e.g., termed herein as "re-transforming operation"), at least one gas may be trapped within the transformed material, creating trapped pores in the otherwise dense material. At least one characteristic of the energy beam may be modified (e.g., as a function of time) to allow these pores to escape. The characteristics of the energy beam may comprise trajectory, delay-time, fluence, power per unit area (i.e., power density), cross-section, focus/defocus, speed, energy profile, or dwell time. The energy beam may have a constant energy profile over time. At times, the energy beam may vary over time. The variation may be a tailing variation. The variation may be prescribed or adjusted in real-time (e.g., during the transforming operation). At times, the energy beam radiation may allow at least a portion of the transformed (e.g., molten) porous matrix (e.g., set) to remain in the transformed (e.g., molten) state for a period of time that allows the one or more gasses to escape, thus preventing their trapping upon solidification.

FIG. 27 shows an example of energy source power as a function of time, or a power density of the energy beam as a function of time, wherein a phenomenon profile may pertain to the power of the energy source or the power density of the energy beam, respectively. For example, FIG. 27 shows an example of an initial increase in power density on turning the energy beam) at followed by a plateau 2712 during a period from $t_1$ to $t_2$ (e.g., when irradiating at a constant power density), followed by a decrease during a period 2713 from $t_2$ to $t_3$ (e.g., while decreasing the power density as the transformed/transforming material heats beyond a threshold temperature), followed by a second plateau 2714 during a period from $t_3$ to $t_4$ (e.g., during an intermission when the energy beam is turned off). In some examples, the time span from $t_1$ to $t_2$ is substantially zero e.g., and the plateau becomes a point). In some embodiments, the power density variation shown in FIG. 27 represents the power density variation during a single energy pulse (e.g., laser energy pulse) to form a corresponding melt pool. The transforming energy beam may travel along the target (e.g., exposed) surface while having a (e.g., substantially) constant or variable power density (i.e., power per unit area). The variation may comprise initial increase in power density, followed by a decrease in the power density, or any combination thereof. The variation may comprise initial increase in power density, followed by a plateau, followed by a subsequent decrease in the power density, or any combination thereof. The increase may be linear, logarithmic, exponential, polynomial, or any combination or permutation thereof. The decrease and/or increase may be linear, logarithmic, exponential, polynomial, or any combination or permutation thereof. The plateau may comprise of a substantially constant energy density.

In some embodiments, the power density of the energy source is modified during a transformation operation (e.g., during a single-transformation-operation (STO)). In some transformation processes (e.g., STO), each pulse of the energy beam (e.g., laser beam) can be used to form a corresponding melt pool (thus forming a corresponding tile). During formation of the melt pool, the power density of the energy beam can be controlled (e.g., in real time). The control can be using a controller. The controller may use one or more sensor measurements (e.g., of the irradiated portion and/or of the immediate vicinity of the irradiated portion). During formation of the melt pool, the power density of the energy beam can be (e.g., substantially) constant or varied. An example of a power density variation during an energy pulse is indicated in FIG. 27.

At times, the transformed material is overheated during melt pool formation. The overheating may cause departure of at least a portion of the transforming material, e.g., by evaporation, spitting, or plasma formation.

In some embodiments, the power density is spiked to a maximum ($P_{max}$) value, e.g., for a brief period of time. The brief period can be a small $t_1$ to $t_2$ value, e.g., zero. Following the spike in the power density to $P_{max}$, the power density of the energy beam can be reduced (e.g., according to a function), until reaching a minimum power density level $P_{min}$ (e.g., zero). The function can comprise a linear, exponential or trigonometric function (e.g., logarithmic function). The reduction may be effectuated using energy beam modulation. Usage of an energy density profile comprising a short spike to $P_{max}$ followed by a (e.g., steep) reduction to $P_{min}$ during a pulse forming the melt pool, may prevent overheating of the melt pool (e.g., may prevent departure of transforming material from the melt pool). That is, the maximum power density of the energy beam can be sufficiently high to induce transformation of the pre-transformed material (e.g., liquify a powder of pre-transformed material). For example, the maximum power (P at 2712 can be high and have a very short period ($t_1$ to $t_2$). In some embodiments, the period $t_1$ to $t_2$ is near zero. In some cases, the power density diminishes from maximum power ($P_{max}$) gradually. In some embodiments, the power density is max, diminished in a controlled manner, e.g., in accordance with a function (e.g., as disclosed herein). In some embodiments, the maximum power density ($P_{max}$) and/or manner in which the power density is diminished can be controlled in real time (e.g., dining formation of the melt pool, a path of tiles, or a layer of the 3D object). The magnitude of the power density spiking can be characterized using a ratio of the maximum power density ($P_{max}$) to the average power density ($P_{average}$), expressed as $P_{max}/P_{average}$. The $P_{max}/P_{average}$ can vary depending on a number of factors. The factors may include, for example, the type of material of the pre-transformed material, the surface area, size and shape of the particles of a powdered pre-transformed material (e.g., and their size and/or shape distribution), ambient temperatures and atmospheres (e.g., pressure thereof), power of the energy source generating the energy beam, cross section of the energy beam, or any combination thereof. In some embodiments, the $P_{max}/P_{average}$ is at least about 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0. In some embodiments, the $P_{max}/P_{average}$ ranges between any value between the afore-mentioned values (e.g., about 1.5 and 20.0, between about 1.5 and 12.0, between about 1.5 and 4.0, or between about 12.0 and 20.0).

In some embodiments, at least one characteristic of the energy beam forming the contour can be controlled, e.g., in real time during its formation. For example, the power density and/or cross section of the energy beam may be controlled, e.g., using a controller. The controller may use one or more sensor measurements (e.g., of the irradiated portion and/or of the immediate vicinity of the irradiated portion). In some embodiments, a (e.g., real time) modified power density beam is used to form a contour (also referred to as a rim or perimeter portion) of a part.

In some embodiments, the energy beam radiation is used to form a rim in a hatch methodology (e.g., while continuously moving the energy beam). In some embodiments, the energy beam radiation is used to form a rim in a tiling methodology (e.g., while discontinuously moving the energy beam, e.g., in a step and repeat mode). At least one characteristic of the energy beam call be modified (e.g., in real time) during irradiation. The modification of the energy beam may be controlled (e.g., manually and/or by a controller). The controller may comprise closed loop, open loop, feedback, or feed-forward control. The controller can be any controller and/or any control scheme disclosed in U.S. patent application Ser. No. 15/435,128, PCT patent application number PCT/US17/18191, or European patent application number EP17156707.6, each of which is incorporated herein by reference in its entirety where non-contradictory. The at least one characteristic may comprise dwell time, intermission time, pulsing rate, average power density (e.g., during dwell time and/or intermission), cross sectional shape and/or FLS of the beam, beam power density profile over the beam cross section, or power density profile over time (e.g., during dwell time and/or intermission). The modification of at least one characteristic of the energy beam may prevent overheating of the transforming material along contours of a 3D object. The overheating may cause expulsion of the transformed material from the powder bed (e.g., as soot, droplets, plasma, or other form of debris). For example, the modification of at least one characteristic of the energy beam may prevent departure of the transforming material from the rim. In some embodiments, at least one characteristic (e.g., the power density) of the energy beam is modified in accordance with a location along a contour of the part. In some embodiments, at least one characteristic (e.g., the power density) of the energy beam is modified in accordance with various geometric characteristics (e.g., types of geometric variations) along a contour of the part. The geometric characteristics may comprise degree of departure from a straight line or lack thereof (e.g., maintaining a straight path). For example, the geometric characteristics may comprise a curvature having a radius, or a variation degree of a curvature (e.g., a steeply winding path, a gradually winding path, an oscillating path such as a zigzag or sinusoidal path). Different types of controlled energy pulses (e.g., having different power density profiles) can be used to form the contour of a layer of transformed material. The at least one characteristic of the energy beam (e.g., during a dwell time) may be adjusted in real time or predetermined. The at least one characteristic of the energy beam may be roughly predetermined and fine-tuned in real time (e.g., during a dwell time of the energy beam along the path such as along the rim).

Referring to FIG. 28A, for example, the type-1 energy beam used to form the contour (rim) at position 2813 can have a first power density profile that is different from a second power density profile used to form the contour (rim) at position 2814, which can be different from a third power density profile used to form the interior portion at position 2815. Similarly, referring to FIG. 36A, for example, the type-2 energy beam used to form the contour (rim) at position 3613 can have a first power density profile that is different from a second power density profile used to form the contour (rim) at position 3614, winch can be different from a third power density profile used to form the interior portion 3615. In this way, the varied power density along a contour (rim) of a part can result in compensation for different geometric constraints of the resulting layer of transformed material. The variation in power density may consider material properties and/or geometry of the (i) previously formed layers as part of the 3D object, (ii) subsequent (unformed) layers of the 3D object, (iii) the entire 3D object, or (iv) any combination thereof. The material properties may comprise heat conductivity, porosity formation, stress buildup, elasticity of the material, or response to stress buildup. The response to stress buildup may comprise internal tears and/or dislocations. In some embodiments, a controller is configured to (e.g., automatically) adjust the power density profile of the energy beam along a contour. The adjustment may comprise usage of a motion control (e.g., comprising feed forward control, feedback control, closed loop control, or open loop control). In some cases, a control scheme (e.g., feed forward, feedback, closed loop, and/or open loop) is used to control one or more characteristics of a skin, e.g., by controlling the energy beam and/or energy source. At times, a motion of the energy beam is controlled using the controller. For example, the controller controls a size and/or shape of tiles. The control can be done in real time (e.g., during a 3D printing process)). For example, the control can be at least partially based on a signal from a melt pool during the printing process (e.g., thermal reflectivity, and/or specularity). In some cases, the signal (e.g., temperature) of the target surface at the irradiated position varies (e.g., increases) during the minting process. The thermal increase may be referred to as thermal build up. Real time control can be used to compensate for thermal build up. In some embodiments, real time control is used to form features (e.g., tiles) having (e.g., substantially) the same size and/or shape. In some embodiments, real time control is used to form features (e.g., tiles) having different (e.g., pre-determined) sizes and/or shapes. In some embodiments, the control is performed without stopping the energy beam scanning and/or without stopping the 3D printing. In some embodiments, real time control comprises (i) directing an energy beam at a target (e.g., pre-transformed material (e.g., powder) and/or hardened material (e.g., previously transformed using a first transformation process), (ii) monitoring at least one characteristic (e.g., temperature) of the target and/or the energy beam during (i), or (iii) adjusting at least one characteristic of the energy beam (e.g., power density,). For example, real time control can comprise (i), (ii) and (iii). In some embodiments, the monitoring in (ii) includes monitoring the thermal output of a region of the target impinged by the energy beam (e.g., using photodiode temperature sensor(s)) and/or a vicinity thereof (e.g., up to 6 FLSs from the center of the impinged target). The vicinity can be any vicinity of the energy beam disclosed in U.S. patent application Ser. No. 15/435,128,PCT patent application number PCT/US17/18191,or European patent application number EP17156707.6,each of which is incorporated herein by reference in its entirety where non-contradictory. The adjusting in (iii) can be performed while the energy beam is directed at the target. This type of real time control can be used, for example during transformation to form a contour (e.g., a rim). For example, the power density of an energy beam can be varied based on real time control (e.g., comprising feedback control) in order to form a smoother surface of the contoured area (having reduced roughness) and/or formed surface (e.g., sides of the 3D object that are formed by accumulation of rims one on top of another).

In some embodiments, irregular melt pools form within a complex structure of a 3D object (e.g., comprising an overhang structure that forms an angle of about 45, 35,or 30 degrees or lower, from a normal to the gravitational field and/or a building platform), which complex structure is at least a portion of the forming 3D object. The overhang structure may form an acute (e.g., shallow, intermediate, or steep), or obtuse angle with respect to a normal to the gravitational field and/or a building platform. Without wishing to be bound by theory, the irregular melt pool may cause one or more defect (e.g., deformation) in the forming 3D object. To avert the defect (e.g., warping) of the overhang structure, a porous matrix (e.g., structure) can be used, which porous matrix is subsequently densified to form a (e.g., substantially) defect free complex structure. In order to avert the formation of a defect (e.g., stresses and/or pores), a previously densified structure can be re-transformed using an energy beam that re-transforms at least a portion of the densified structure. Elimination of defects may be realized by subjecting the complex structure to at least 1, 2, 3, 4, 5, 6, 7,or 8 cycles or re-transforming. In some embodiments, re-transforming of at least a portion of the 3D object may form at least a portion of the 3D object that has a lower degree of variation from average surface plane (e.g., forming a smoother surface portion), as compared to the at least a portion of the 3D object that has not undergone re-transformation. For example, the at least a portion of the surface may assume a shiny metallic reflection. For example, the at least a portion of the surface may have a high Ra value. FIGS. 16A-16F illustrate example s for forming an overhang structure (e.g., a ledge) using the MTO process. FIG. 16A shows an example of a material bed (e.g., 1600) that comprises pre-transformed material disposed above a platform (e.g., 1605), and an energy beam (e.g., 1615) irradiating (e.g., and transforming, e.g., sintering and/or melting) a portion of the pre-transformed material within the material bed using a transforming energy beam (e.g., 1615). In the example in FIG. 16A, the pre-transformed material is transformed to form a first porous matrix layer (e.g., 1612), that partially overlaps a rigid-portion (e.g., 1614). The porous matrix may connect to the rigid-portion. The amount of porosity within the first porous matrix layer (e.g., 1612) may be controlled. Controlling may comprise adjusting at least one characteristic of the transforming energy beam (e.g., power per unit area). The control may be real-time control during the transformation. FIG. 16B shows an example of irradiating a portion of the porous matrix layer (e.g., 1625) within the material bed (e.g., 1620) using a transforming energy beam (e.g., 1621). The transforming energy beam may be moved from a first location to a second location. The transforming energy beam may form a melt pool at the first location and/or at the second location (e.g. 1627). The transforming energy beam may more along a path. To form a layer of transformed porous matrix, the transforming energy beam may form hatches in a direction along, or at an angle with respect to the direction of growth of the porous layer (e.g., 1622), for example, to form the at least one melt pool. To form a layer of transformed porous matrix, the transforming energy beam may form hatches in a direction perpendicular to the direction of growth of the porous layer. To form a layer of transformed porous matrix, the transforming energy beam may form hatches that form an angle between 0 degrees and 90 degrees with respect to the direction of growth of the porous layer. In some embodiments, one energy beam (e.g., type-2 energy beam) participates in the MTO process to both form the PMX layer (e.g., 1612) and densify it to form the denser layer (e.g., 1630). The energy beam may vary in at least one characteristic between operating in a mode of forming the PMX layer and operating in a mode of density the PMX layer to form a denser layer. In some embodiments, two different energy beams participate in the MTO process. For example, a first beam (e.g., 1615) may form the PMX layer, and the second beam (e.g., 1621) may transform and densify the PMX layer to form a denser layer. For example, a first beam (e.g., 1612) may form the PMX layer, and the second beam (e.g., 1621) may transform and densify the PMX layer to form a denser layer. The first beam may be a type-1 energy beam. The second beam may be the type-2 energy beam. The type-2 energy beam may be a power density that is lower than that of the type-1 energy beam (e.g., lower by at least 3 times (*), 4*, 5*, 6*, 7*, 8*, 9*, 10*, 15*,or 20*). The type-2 energy beam may be focused or defocused. The type-2 energy beam may have a larger cross section as compared to the type-1 energy beam (e.g., larger by at least 2 times (*), 3*, 4*, 5*, 6*, 7*, 8*, 9*, 10*, 15*,or 20*). During the MTO process, the type-2 energy beam may have dwell time (e.g., to form a tile) of about 40 milliseconds (msec), 50 msec, 60 msec, 70 msec, 80 msec, 90 msec, 100 msec, or 500 msec. During the MTO process, the type-2 energy beam may have dwell time between any of the afore-mentioned dwell times (e.g., from about 50 msec to about 500 msec, from about 50 msec to about 100 msec, from about 60 msec to about 80 msec, or from about 100 msec to about 500 msec). The transforming energy beam may generate the melt pools (e.g., 1627), and/or transforms the first porous layer to a transformed (e.g., the first porous layer hardens) material layer that is denser than the porous matrix layer. The formed ledge may be connected to a rigid-portion or to a first formed layer (e.g., ASBS). The rigid-portion may be anchored to the platform. The rigid-portion may be suspended anchorlessly in the material bed (e.g., 1614). Transforming may include (e.g., subsequent) solidification of the one or more melt pools. FIG. 16C shows an example of a transformed material layer (e.g., 1630), that is denser than the first porous layer that served as its precursor (e.g., 1612). FIG. 16D shows an example of dispensing a planar layer of pre-transformed material over the first transformed material layer (e.g., FIG. 16C, 1630), and irradiating (e.g., and transforming, e.g., sintering and/or melting) a portion of the pre-transformed material layer within the material bed (e.g., 1640) using a transforming energy beam (e.g., 1645). The pre-transformed material may be transformed to form a second porous matrix layer (e.g., 1642) adjacent to (e.g., above) previously transformed layer (e.g., 1644) that is denser than the PMX layer. The amount of porosity within the second porous matrix layer may be controlled (e.g., in real time). FIG. 16E shows an example of irradiating (e.g., and transforming) a portion of the second porous matrix layer (e.g., 1655) within the material bed (e.g., 1650) using the transforming energy beam (e.g., 1651). The transforming energy beam may form one or more melt pools (e.g., 1652). The transforming energy beam may transform the second porous matrix layer e.g., 1652), by melting through the second porous layer. In some embodiments, the transformed energy beam transforms a portion of the PMX layer, as well as a portion of previously formed one or more layers (e.g., the first layer, e.g., 1653). Transforming at least a portion of a previously formed (e.g., dense) layer along with transforming the PMX layer, may facilitate adhering of the transforming PMX layer to the previously formed (e.g., dense) layer. For example, transforming at least a portion of the first layer (e.g., 1653) along with the transformation of the second PMX layer (e.g., 1655) may facilitate adhering of the transforming PMX layer (e.g., that results in the layer 1660) to the first densified layer (e.g., 1665). At times, transforming the PMX layer may include transforming of a plurality of previously formed layer. At times, the transforming energy beam may transform (e.g., re-transform) one or more previously transformed layers. FIG. 16F shows an example of multiple (e.g., two) transformed and densified material layers (e.g., 1650, 1665), that are denser than the first PMX layer (e.g., 1612) and second PMX layer (e.g., 1655) that served as their precursors. The two densified layers (e.g., 1660 and 1665) in the example of FIG. 16F, are connected to a rigid-portion (e.g., 1667), which together form at least a portion of the 3D object, which is disposed in a material bed (e.g., 1669).

In some embodiments, a bottom skin is formed using the PMX (e.g., as an intermediate). The PMX bottom skin layer may be re-transformed to create a denser structure (e.g., denser bottom skin layer). The external surface of the resulting densified structure may be (e.g., substantially) smooth. For example, the densified structure may be (e.g., substantially) free of hanging structure (e.g., stalactite-like strictures). In one embodiment, a portion of the PMX bottom skin is re-transformed to generate a partial densified layer (e.g., densified material) and a partial porous matrix layer. The one or more rigid-portions may be coupled to the PMX structure. Prior to densification of the PMX, the porous matrix may be filled at least in part with pre-transformed (e.g., particulate) material. Once filled at least in part, at least a portion of the PMX may be transformed using the transforming energy beam. When a plurality of layers (e.g., PMX or pre-transformed material layers) are transformed (e.g., using the transforming energy beam), the process is also referred to herein as "deep tiling"). The term "deep tiling" refers herein to irradiating a plurality of layers (e.g., PMX, dense layers, and/or pre-transformed material layers). The deep tiling process may result in forming a melt pool that spans more than one layer (e.g. >50 microns), that is, has a height (e.g., FIG. 25A, 2510) of more than one layer. The layer size may be defined by the 3D printing process (e.g., by a layer that is dispensed by the layer dispensing mechanism). For example, the height (e.g., FIG. 25A, 2510) of a melt pool in deep tiling can be in the range of about 100, 200, 300, 400, 500, 600, 700, 800, 900, 1000, 1100, 1200, 1300, 1400, 1500, 1600, 1700, 1800, 1900 or 2000 microns. The formation of the deep tiles can be initiated from a position adjacent to, or comprising a previously formed 3D object portion (e.g., a rigid structure). The formation of the deep tiles can be initiated from a position adjacent to, or comprising the overhang. In some embodiments, the farthest tile from the previously formed 3D object portion (e.g., rigid-portion) may be transformed last. In some embodiments, the operation is repeated until at least the overhang portion is completely densified and reaches a minimum height threshold, after which deformation is not substantial. The threshold height may be, for example, at least 1 mm, 1.5 mm, 2 mm, 2.5 mm, 3 min, 3.5 mm, 4 mm, 4.5 mm and/or 5 mm, depending on the material of the material bed. The deep tile formed by deep tiling may protrude to at least about half the total thickness of the forming 3D object. The deep tile formed by deep tiling may protrude at least about two layers.

Figure 33:
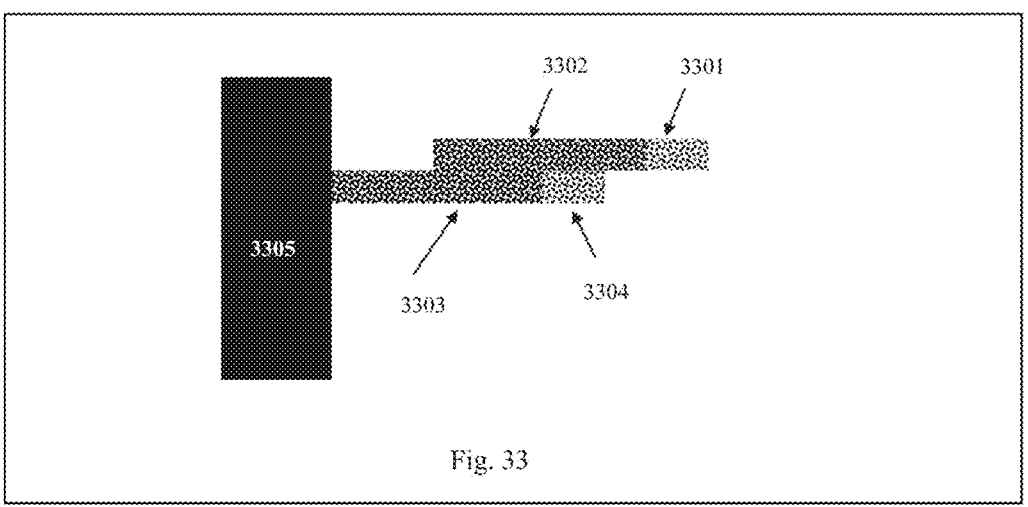
FIG. 33 shows a vertical cross section of a 3D object.

In some embodiments, the layer of transformed material (e.g., PMX or densified PMX layer) comprises a portion that is susceptible to deformation (e.g., a weak portion). In some instances, such operation scheme may result in a layer (e.g., an overhang) in which the vulnerable layer portion is the last transformed portion (e.g., tiled portion) that completes the layer (e.g., overhang) of transformed material. The vulnerable portion may be a portion that is susceptible to deformation. In some embodiments, to compensate for the deformation susceptibility of a first vulnerable layer portion (which is situated in a first layer), one or more subsequent layers (e.g., a second layer) may be formed, which (e.g., micro and/or macro) structure is generated in a way that alters the deformation (e.g., and/or susceptibility to deformation) of the resulting 3D object portion. The second layer may be a PMX layer. The first layer may be a PMX layer. The PMX layer (e.g., second and/or first. PMX layer) may have an inhomogeneous distribution of microstructures and/or pores along the layer. The microstructure inhomogeneity may alter (e.g., reduce) the deformability of the layer portion that was considered to be a vulnerable portion if the microstructure and/or porosity distribution would be homogenous. When two successive layers have vulnerable portions, the position of the layers may be designed such that the first vulnerable portion in the first layer and the second vulnerable portion in the second layer will not re-enforce at least one of their respective vulnerability. The vulnerable portions may be (e.g., vertically, and/or horizontally) misaligned. The vulnerable portions may be (e.g., vertically, and/or horizontally) non-overlapping. For example, the first vulnerable portion should not (e.g., vertically) align with the second vulnerable portion. The misalignment may be effectuated by altering the macro and/or micro structure of the layers (e.g., altering the microstructure of the PMX layer) prior to their transformation to form a portion of the 3D object. The alteration of the structure may comprise a controllably alteration of the level of porosity (e.g., horizontally, and/or vertically) along the PMX layer. FIG. 33 shows an example of two PMX layers shown as a vertical cross section. The first PMX layer comprises a vulnerable portion 3304, and a more robust portion 3303. The second PMX layer comprises a vulnerable portion 3301, and a more robust portion 3302. The first PMX layer is anchored to a rigid-portion 3305. In the example shown in FIG. 33, the vulnerable portions (e.g., 3301 and 3304) are not (e.g., vertically) aligned to overlap with each other. In the example shown in FIG. 33, the vulnerable portions are (e.g., vertically) misaligned, and do not (e.g., vertically) overlap each other.

Figure 24:
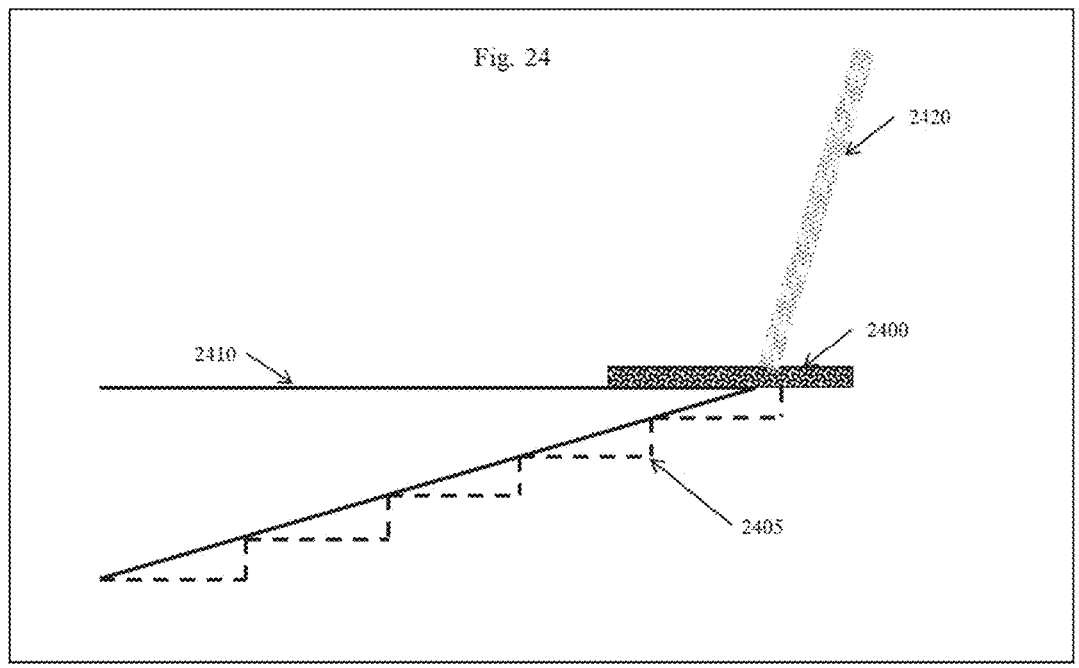
FIG. 24 schematically illustrate a cross section view of a portion of a forming 3D object.

In some embodiments, deep tiling is performed when transforming one or more layers (e.g., of pre-transformed material, PMX layer, and/or densified material layer) to form the 3D object. Deep tiling may include irradiating a target surface to transform through more than one layers (e.g., porous matrix set, pre-transformed material layers, or transformed material layers). Deep tiling may include wetting (e.g., melting) at least one previously deposited and/or formed layer. Deep tiling may be performed with a focused (e.g., hatching) or defocused (e.g., tiling) energy beam. Deep tiling may be performed with the scanning and/or type-2 energy beam. The energy beam may have a small or large cross section. The choice of cross section may relate to the width of the overhang structure that is being formed. In some examples, when forming a shallow angled overhang structure; (e.g., that may form a bottom skin of a ledge and/or a cavity ceiling), wherein the overhang is narrow, the process may require an energy beam having a narrower cross section. FIG. 24 shows an example of extending a ledge of a forming 3D object having an exposed surface 2410. The ledge extension may comprise forming a PMX layer portion (e.g., 2400). The PMX layer may be irradiated using a transforming energy beam (e.g., 2420). In some examples, a portion of one or more previous layers (e.g., having an exposed bottom surface 2405) may be transformed or at least contacted by the transformed material. At times, a bottom surface of the forming 3D object (e.g., ledge having an exposed bottom surface 2405) may be wetted by the transformed (e.g., liquid) material. Wetting of the bottom surface may alter the roughness of the bottom (skin) surface. Wetting of the bottom surface may result in a flatter bottom (skin) surface (e.g., a smoother bottom surface). Wetting of the bottom surface may result in reducing the roughness of the bottom (skin) surface.

Figure 18A:
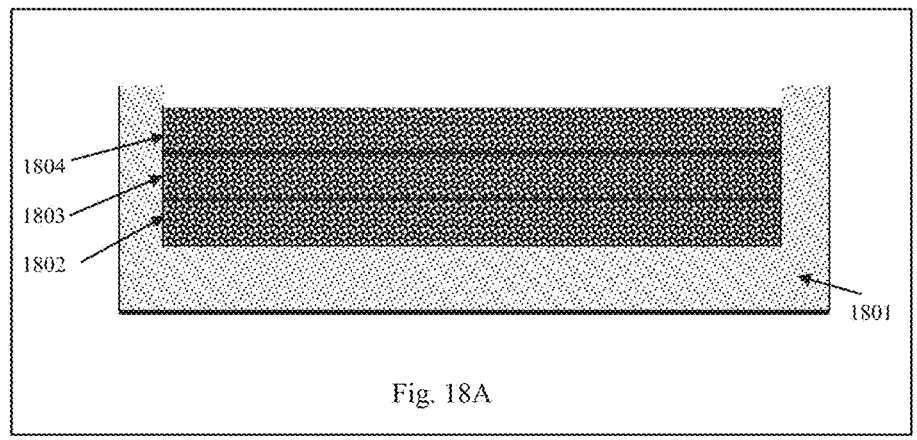
FIGS. 18A-18C schematically illustrate operations in forming a 3D object.
Figure 18B:
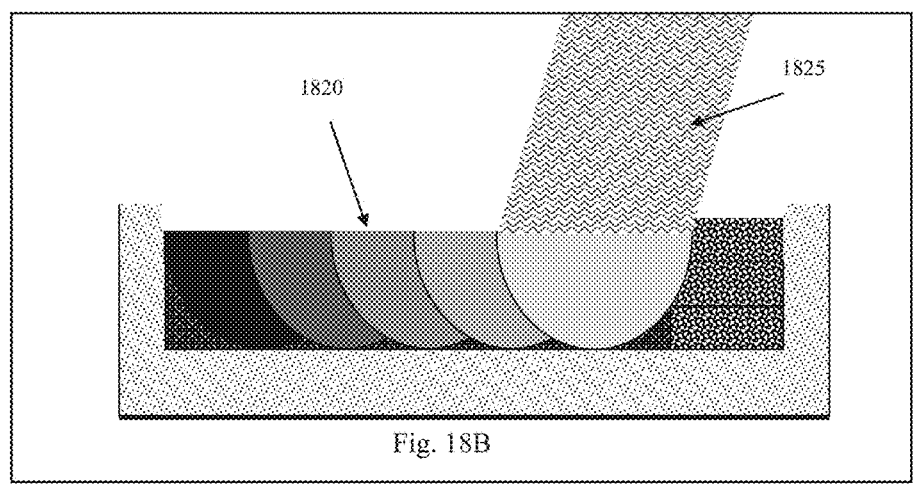
Figure 18C:
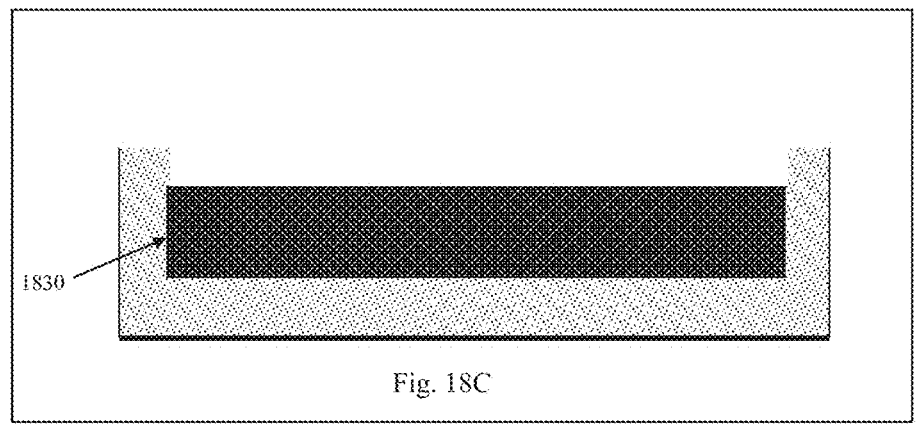
Figure 40A:
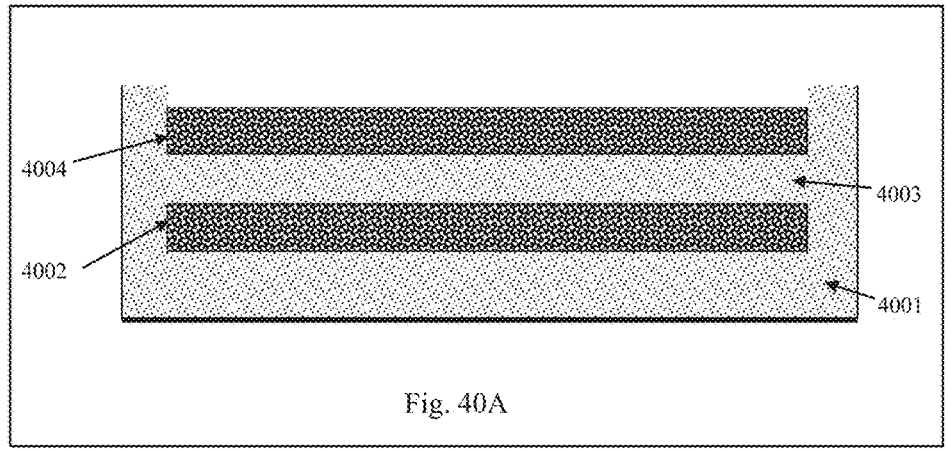
FIGS. 40A-40C schematically illustrate side views of various operations in forming a 3D object and various 3D objects.
Figure 40B:
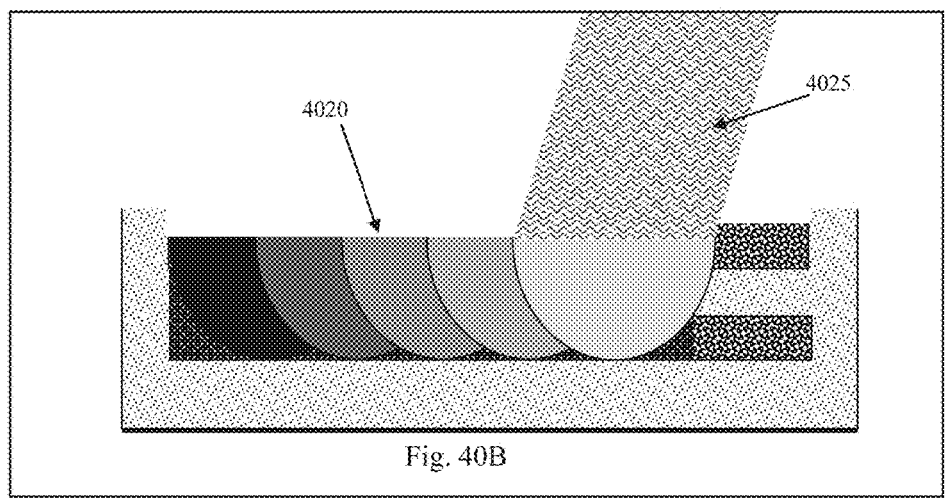
Figure 40C:
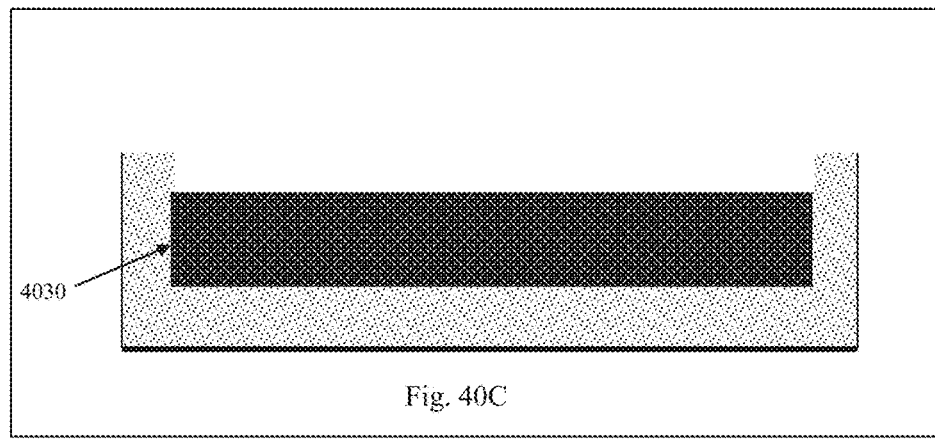

At times, deep tiling is performed to density one or more layers. The one or more layers may comprise layers above the bottom skin layer and/or the rigid-portion (e.g., to form a thickened overhang structure). The one or more layers may include the bottom skin layer. Deep tiling may include irradiating the energy beam to transform (e.g., melt) through more than one layers (e.g., pre-transformed material layer, PMX layer, and/or dense material layers). Deep tiling may include transforming (e.g., melting) at least one previous layer of the forming 3D object. Deep tiling may include irradiating the energy beam to transform more than one previously formed (e.g., hardened, densified) layers of hard material (e.g., PMX or denser layers). FIGS. 18A-18C shows examples of operations in transforming (e.g., re-melting) an (e.g., entire) porous matrix structure comprising a plurality of individually fabricated PMX layers, by melting through more than one PMX layer of the PMX structure. FIG. 18A shows an example of a porous matrix comprising multiple (e.g., three, 1802, 1803, 1804) PMX layers, within a material bed (e.g., 1801). FIG. 40A shows an example of a porous matrix sandwich structure comprising multiple (e.g., two (e.g., 4002 and 4004)) PMX layers separated by a layer of pre-transformed material (e.g., 4003) in a material bed (e.g., 4001). At times, at least two of the PMX layers may have (e.g., substantially) the same porosity. At times, at least two of the PMX layers may have different porosity. FIGS. 18B and 40B show examples of irradiating (e.g., and transforming, e.g., melting) through the multiple PMX layers, using a transforming energy beam (e.g., FIG. 18B, 1825 or FIG. 40B, 4025) (e.g., a type-2 energy beam having sufficient power density and/or operating under sufficient dwell time to penetrate the plurality of PMX layers). The irradiating may include forming one or more melt pools (e.g., FIG. 18B, 1820 or FIG. 40B, 4020). Deep tiling may comprise low aspect ratio (e.g., shallow), homogenously dimensioned (e.g., hemispherical), or high aspect ratio (e.g., deep) melt pools. For example, the melt pool may have a high aspect ratio (e.g., as disclosed herein). For example, the melt pool may be deep. For example, the melt pool may be wide (e.g., have a low aspect ratio (e.g., as disclosed herein). The deep tiling may penetrate a 3D object part. The penetration may be to a depth that facilitates plastic yielding of a parallel position to the footprint of the irradiating energy beam, which parallel position is at least a portion of a bottom skin of the 3D object part. At times, the transformation may extend to (e.g., melt through) at most two layers, melt through at most three layers, or, melt through until the bottom skin layer (or a portion thereof) plastically yields. Deep may comprise melting through a plurality of layers of the filming 3D object. FIGS. 18C and 40C show examples of transformed (e.g., hardened, densified) portions of the 3D objects, that may be denser than the one or more PMX layers that were its precursor. In some embodiments, one energy beam (e.g., type-2 energy beam) participates in the PMX layer (set) formation (e.g., FIG. 18A or FIG. 40A) and in its densification process (e.g., FIG. 18B or FIG. 40B) to form the denser layer (e.g., FIG. 18C, 1830 or FIG. 40C, 4030). The energy beam may vary in at least one characteristic between operating in a mode of forming the PMX layer and operating in a mode of densifying the PMX layer to form a denser layer. In some embodiments, two different energy beams participate in the MTO process. For example, a first beam (e.g., 1615) may form the PMX layer, and the second beam (e.g., 1621) may transform and density the PMX layer to form a denser layer. For example, a first beam (e.g., 1612) may form the PMX layer, and the second beam (e.g., 1621) may transform and density the PMX layer to form a denser layer. The first beam may be a type-1 energy beam. The second beam may be the type-2 energy beam. The type-2 energy beam may be a power density that is lower than that of the type-1 energy beam (e.g., lower by at least 3 times (*), 4*, 5*, 6*, 7*, 8*, 9*, 10*, 15*,or 20*). The type-2 energy beam may be focused or defocused. The type-2 energy beam may have a larger cross section as compared to the type-1 energy beam (e.g., larger by at least 2 times (*), 3*, 4*, 5*, 6*, 7*, 8*, 9*, 10*. 15*,or 20*). During the PMX (set) densification process, the type-2 energy beam may have dwell time (e.g., to form a tile) of about 250 milliseconds (msec), 500 msec, 1.0 second (sec), 1.5 sec, 2.0 sec, 2.5 sec, 3.0 sec, or 5.0 sec. During the PMX (set) densification process, the type-2 energy beam may have dwell time between any of the afore-mentioned dwell times (e.g., from about 250 msec to about 5.0 sec, from about 500 msec to about 3.0 sec, or from about 1.0 sec to about 3.0 sec). The PMX layer set may comprise one or more intervening pre-transformed material layers (e.g., FIG. 8A, 803). The PMX set may be used to vertically extend (e.g., thicken) a bottom skin layer (e.g., of an overhang and/or cavity ceiling structure (e.g., FIG. 30A-30E)). The PMX set used for thickening may similarly comprise one or more intervening pre-transformed material layers. At least two of the plurality of intervening pre-transformed material layers may be separated by PMX layers. At least two of the plurality of intervening pre-transformed material layers may contact each other. The PMX layer set comprising the intervening one or more layers of pre-transformed material, may be densified in one densification process (e.g., FIG. 30D). Thickening a bottom skin (e.g., of an overhang and/or cavity ceiling) may comprise one or more cycles of forming PMX layer (set) density* it, and forming a subsequent PMX layer (set). In some embodiments, the PMX layers can be used to vertically extend any of the 3D printed sections of the 3D object described herein (e.g., the rigid-portion, and/or a densified layer).

At times, it is desirable to form a shallow angled (e.g., complex) structure (e.g., overhang structure) with a low degree of deformation (e.g., no substantial deformation). Substantial may be relative to the intended purpose of the 3D object. The shallow angled structure may be generated by (i) forming a porous matrix layer (e.g., or PMX layer set) that assumes at least a portion of the shallow angled structure. (ii) optionally supplementing the material of the PMX layer (set) by adding pre-transformed material that penetrates into the PMX layer (set) (iii) densifying at least a portion of the PMX layer (set) by transforming it (and optional added pre-transformed material within) with a transforming energy beam, and (iv) optionally repeating operations (i) to (ii). The transformation of the PMX layer (set) may be using the type-2 energy beam (e.g., to form deep, shallow, and/or hemispherical tiles), and/or type-1 energy beam. At least portion of the (e.g., shallow angled) PMX structure may be densified in operation (iii) by generating a non-uniform thermal profile along the forming (e.g., shallow angled) to be densified structure. The non-uniform thermal profile may be controlled (e.g., in real time). The control may be by a controller. The control may comprise altering at least one characteristic of the energy beam and/or energy source that generates the energy beam. For example, a velocity, cross section, and/or power density of the energy beam may be altered such that the resulting temperature at the vulnerable portion will be higher (or lower) as compared to adjacent positions. For example, a velocity, cross section, and/or power density of the energy beam may be altered such that the resulting temperature at a position away from an edge tip and/or rigid-portion will be higher or lower. The edge may connect the (e.g., shallow) angled structure to a bulker portion of the 3D object. The higher temperature may be generated by using a denser path scheme (e.g., dense hatching) along which the energy beam travels (e.g., denser hatching). In some embodiments, the distance between paths of the energy beam (e.g., hatches) may be (e.g., substantially) identical. At times, the distance between the paths may be varied. The variation may follow a pattern. The pattern may be linear (e.g., the variation may be linear). At times, the density of the hatches may be of (e.g., substantially) constant. At times, the density of the hatches may be varied. The higher temperature may be generated by increasing the dwell time of the energy beam in the portion of the (e.g., shallow) angled structure closer to the edge, and/or rigid-portion. The angled structure can have an acute or obtuse angle with respect to a balker portion of the 3D object, the platform, or a direction perpendicular to the platform. The angled structure may have a shallow, intermediate, or steep angle with respect to a bulker portion of the 3D object, the platform, or a direction perpendicular to the platform. Velocity profile of the energy radiation may be variable (e.g., in real time during the densification of at least a portion of the shallow angled PMX matrix). At times, the energy beam may travel at a speed comprising a constant speed or a varied speed. At times, when the velocity profile is at a constant speed, the power profile may be varied. The choice of energy beam characteristic (e.g., temperature, dwell time, and/or delay time) may relate to the angle of the complex (e.g., overhang or ceiling) structure. For example, for a shallow angle 3D structure (e.g., ledge), it may be desirable to shorten the amount of time for solidification of a melt pool (i.e., shorten the time that the melt pool remains molten, e.g., to prevent balling and/or drooping). For example, for a steeper angle complex structure (e.g., blade), it may be desirable to prolong the amount of time for solidification of a melt pool (i.e., prolong the time that the melt pool remains molten, e.g., to allow wetting of the bottom skin). A low power density, and/or short dwell times may be used to shorten the amount of time for solidification of a forming melt pool. A high-power density, and/or long dwell times may be used to prolong the amount of time for solidification of a forming melt pool. To prolong the time for solidification, an elongated energy beam, and/or a dithering (e.g., retro-scan) energy beam may be used. At times, a low power density energy beam e.g., type-2 energy beam) may be used having a higher dwell time to prolong the time for solidification. At times, the material bed may not be heated during at least a portion of the 3D printing (e.g., during the transforming). At times, the material bed may be at an ambient temperature during at least a portion of the 3D printing (e.g., during the transforming).

In some embodiments, the transforming energy beam forms more than one melt pool by transforming at least a portion of the pre-transformed material to a liquid state. The melt pools may be successively formed. The melt pools may contact one another in at least one point. The plurality of melt pools may be fluidly connected such that a first fluid from a first melt pool may aggregate with a second fluid of a second melt pool that is directly adjacent to the first melt pool. In some examples, at least a portion of the material within a plurality of melt pools is retained in a liquid state. In some embodiments, the amount of aggregated liquid material in one or more melt pools may be controlled (e.g., in real time, e.g., by a controller). The controller may control at least one characteristic of the transforming energy beam and/or energy source that generates it, to effectuate control of the liquid material in the one or more melt pools. Effectuate may comprise controlling the temperature (e.g., over a time period) of the one or more melt pools. In some embodiments, the number of melt pools in which at least a portion of the material is in a liquid state, is controlled (e.g., by a controller, in real time, for example, by controlling at least one characteristic of the transforming energy beam and/or the energy source that generates it). In an example, a first melt pool that comprises a first liquid material is formed: and subsequently a second melt pool that is directly adjacent to the first melt pool is formed before the first liquid material completely hardens (e.g., solidifies), which second melt pool comprises a second liquid material. For example, a second melt pool, adjacent to a first melt pool may be formed while the first melt pool contains at least some material that is in a liquid state (e.g., molten). The liquid material in the plurality of contacting melt pools may aggregate (e.g., over the time period). Aggregation (e.g., coming together) of the liquid material (e.g., from overlapping and/or combined melt pools), may form undesired features. The undesired features may affect the appearance and/or (e.g., intended) function of the 3D object. At times, an accumulated (e.g., large) volume of liquid (e.g., molten) material within the forming structure may ball up, and/or drip down from the forming 3D structure. The liquid material may be a liquid volume from at least about 4, 5, 6, 7, 8, 9, or 10 melt pools, depending on the type of pre-transformed material used. The liquid material may be a liquid volume from a melt pool area having a length of at least about 4, 5, 6, 7, 8, 9, or 10 melt pool diameters, depending on the type of pre-transformed material used. The balling and/or dripping (e.g., forming droops) may form the undesired feature(s). For example, the aggregation of liquid may result in fragmentation of the overhang structure and/or roughen the surface (e.g., bottom exposed surface) of the forming 3D structure. The overall volume of the liquid material in the one or more melt pools (e.g., plurality of melt pools) may be controlled (e.g., in real time, e.g., by a controller). The control may be to curb (e.g., avoid) the undesired features (e.g., balling and/or drooping effects). FIG. 25A shows a side view example of one or more melt pools (e.g., 2510). In some embodiments, wetting of the bottom skin surface of a forming 3D object may be desired (e.g., to reduce a roughness of the bottom skin surface). In some embodiments, a controller may control the number of melt pools that at least partially retain liquid material to (i) allow wetting of the bottom surface to a (e.g., desired and/or predetermined) degree, (ii) curb appearance of the undesired features, or any combination thereof (e.g., to allow wetting of the bottom surface to a (e.g., desired and/or predetermined) degree and curb appearance of the undesired features). In some embodiments, a balance is found between having sufficient liquid to wet the bottom surface of the forming 3D object, which volume is insufficient to form the undesired features (e.g., at least to the extent that obstructs and/or disturbs the intended purpose of the 3D object). For example, the controller may maintain an area having a length of at most about one, two, three, four, five or six melt pool diameters (e.g., 2520, comprising $d_1$, $d_2$, and $d_3$) such that all the melt pools in that area will at least partially remain in a liquid state, when forming the layer (e.g., 2525) as part of the 3D object. The controller may maintain an area having a length of at least about one, two, three, four, five or six melt pool diameters, such that all the melt pools in that area will at least partially remain in a liquid state, when forming the layer as part of the 3D object. The controller may maintain an area having a length between any of the afore-mentioned length (e.g., from one diameter to six diameters, or from two diameters to five diameters), such that all the melt pools in that area will at least partially remain in a liquid state, when forming the layer as part of the 3D object. The controller may maintain an area comprising at most about one, two, three, four, five or six melt pools, such that all those melt pools will at least partially remain in a liquid state, when forming the layer as part of the 3D object. The controller may maintain an area comprising at least about one, two, three, four, five or six melt pools, such that all those melt pools will at least partially remain in a liquid state, when forming the layer as part of the 3D object. The controller may maintain an area comprising a number of melt pools between any of the afore-mentioned number of melt pools (e.g., from one melt pool to six melt pools, or from two melt pools to five melt pools), such that all the melt pools in that area will at least partially remain in a liquid state, when forming the layer as part of the 3D object. The liquid material may be accumulated from an area having a width of about one melt pool. The at least partially liquid area may comprise a height (FIG. 25A, "h") of about one melt pool. The length of the at least partially liquid area may comprise an actual number of melt pools that exceeds its number of melt pool diameter length, when the melt pools partially overlap each other. The length of the at least partially molten area that spans a certain number of melt pool diameters (e.g., three melt pool diameters in 2520), may comprise more than three melt pools that partially overlap each other (e.g., four melt pools comprising 2522). In FIG. 25A, the black melt pools in 2525 illustrate hardened melt pools that do not comprise material in a liquid state, whereas the gray melt pools in 2522 at least partially comprise material in a liquid state. The gray shades represent the order in which the melt pools were formed, with the lighter gray being the most recent melt pool (e.g., 2510), and the darker gray being previously formed melt pools. The melt pools in the example shown in FIG. 25A were formed along the trajectory 2530, as viewed from the side. FIG. 25B shows a schematic example of controlling a temperature 2590 of three melt pools (e.g., which three melt pools correspond to graphs 2440, 2442, and 2444) as a function of time 2585. The control may comprise controlling at least one characteristic of the transforming energy beam and/or of the energy source that generates the transforming energy beam. The temperature control may affect (e.g., control) the amount (e.g., volume) of liquid (e.g., molten) material in those melt pools. FIG. 25B shows an example of a first temperature profile (e.g., 2546) of a first melt pool that was formed at ti (e.g., melt pool 2507 of FIG. 25A), wherein during a time period shown in 2585 (e.g., from time #1 to time #12), the first melt pool experiences a (e.g., narrow) temperature distribution that fluctuates around $T_3$ (e.g., above and/or below (e.g., $T_3$), wherein $T_2$ is below (e.g., colder than) $T_m$. At times, although the fluctuations of the temperature (e.g., as measured from the exposed surface of the melt pool) do not reach and/or exceed a melting temperature ($T_m$) of the material from which it is composed (e.g., and hence the first time period in which the measured temperature reach and/or exceed a $T_m$ equals zero), some material in the melt pool remains in a liquid state. FIG. 25B shows an example of a second temperature profile (e.g., 2544) of a second melt pool that was formed at $t_2$ (e.g., melt pool 2508 of FIG. 25A), wherein during a time period shown in 2585, the second melt pool experiences a (e.g., narrow)

temperature distribution that fluctuates around $T_2$ (e.g., above, and/or below (e.g., $T_2$), wherein $T_2$ is below (e.g., colder than) $T_m$. At times, the fluctuations of the temperature reach and/or (e.g., slightly) exceed a melting temperature ($T_m$) of the material from which it is composed. During a second time period in which the fluctuating temperature reaches and/or exceeds the inciting temperature, a portion of a solid material within the second melt pool may melt, and/or a molten material in the second melt pool may remain molten. FIG. 25B shows an example of a third temperature profile (e.g., 2542) of a third melt pool that was formed at $t_1$ (e.g., melt pool 2509 of FIG. 25A), wherein during a time period shown in 2585, the third melt pool experiences a (e.g., narrow) temperature distribution that fluctuates around $T_1$ (e.g., above, and/or below (e.g., $T_1$), wherein $T_1$ is below (e.g., colder than) $T_m$. At times, the fluctuations of the temperature reach and/or exceed a melting temperature ($T_m$) of the material from which it is composed during a time period that is greater as compared to the second melt pool. During a third time period in which the fluctuating temperature reaches and/or exceeds the melting temperature, a portion of a solid material within the third melt pool may melt, and/or a molten material in the third melt pool may remain molten. The third time period is greater than the second time period. FIG. 25B shows an example of a fourth temperature profile (e.g., 2540) of a fourth melt pool that was formed at $t_4$ (e.g., melt pool 2510 of FIG. 25A), wherein during a time period shown in 2585, the fourth melt pool experiences a (e.g., narrow) temperature distribution that fluctuates around $T_m$ (e.g., above, and/or below (e.g., $T_m$), wherein $T_m$ is the melting temperature of the material from which the melt pool is formed. During a fourth time period in which the fluctuating temperature reaches and/or exceeds the melting temperature, a portion of a solid material within the fourth melt pool may melt, and/or a molten material in the fourth melt pool may remain molten. The fourth time period is greater than the third time period. The time ti is before $t_2$ that is before $t_3$ that is before $t_4$. The temperature $T_3$ is colder than $T_2$ that is colder than $T_1$ that is colder than $T_m$. The temperature may be assessed utilizing detector/sensor measurements of the target surface (e.g., of an exposed surface of the melt pools). Retaining the temperature range may comprise temperature fluctuations over time (e.g., as depicted in 2544). The temperature fluctuations can be homogenous (e.g., as in FIG. 25B) or non-homogenous.

At times, the 3D structure is printed without any auxiliary supports other than the one or more rigid-portions (which are part of the 3D object). The printing methodology may comprise (i) forming a porous matrix (e.g., set), (ii) densifying the area enclosed by the porous matrix (e.g., using a transformation operation), and (iii) optionally repeating s (i) to (ii) to increase the height (e.g., thickness) of the overhang. The 3D structures (e.g., overhangs) may have a shallow angle (e.g., with respect to the platform and/or exposed surface of the material bed). In some instances, the rigid-portion may constrain the hardening complex structure. At times, these structural constraints will form one or more deformations (e.g., defects, e.g., structural defects) in a hanging structure and/or cavity that extends from the rigid-portion. The deformations may comprise cracks or breaking points. The process(es) described herein may allow reducing the deformation at least in the overhang (e.g., cavity bottom and/or ceiling cavity) that connect to the rigid-structure(s). The process may comprise creating a bottom skin layer that may or may not be connected to one or more rigid-portions. The bottom skin layer may comprise a PMX or a denser material as compared to the PMX. The process may comprise creating a (e.g., PMX) bottom skin layer that may or may not be connected to one or more rigid-portions. The bottom skin layer can be created using the type-1 energy beam and/or type-2 energy beams. The bottom skin layer may be formed using hatching and/or tiling. The hatches may be a sectoral hatch. The tiling may be along a tiling path. The tiling path may be a sectoral path. The one or more rigid-portions may be anchored to a platform, or may be floating anchorlessly in the material bed. In some examples, an angle is formed between the vector (e.g., hatch, or path-of-tiles) and the growth direction of the bottom skin layer. The direction of the hatch/path vector may be (e.g., substantially) perpendicular to the growth direction of the forming bottom skin layer. The hatch/path vector may correspond to at least a portion of the bottom skin layer. In some embodiments, the requested overhang (e.g., 922) as part of the 3D object forms an angle (e.g., 925) with the rigid-portion (e.g., 920). Formation of the angular structure may be effectuated by depositing successive layers that are offset with respect to each other in the direction of the overhang (e.g., ceiling) growth, which successive layers connect to (e.g., and partially overlap with) each other. FIGS. 17A-17F illustrate example operations in forming an overhang structure by performing the STO process, wherein the overhang structure is connected to a rigid-portion. FIG. 17A shows an example of a material bed (e.g., 1705) disposed on a platform (e.g., 1715) that comprises pre-transformed material. A portion of the material bed may be irradiated (e.g., and transformed) using a transforming energy beam (e.g., 1720) to form a rigid-portion (e.g., 1710). In the example shown in FIG. 17A, the rigid structure contacts the platform. The rigid-portion may provide support for forming the overhang structure. The overhang may contact, connect, and/or be anchored to the rigid-portion. FIG. 17B shows an example of dispensing a (e.g., planar) layer of pre-transformed material (e.g., 1725) above the rigid-portion e.g., 1722) disposed in the material bed. FIG. 17C illustrates an operation of irradiating (e.g., and transforming, e.g., sintering, or melting) a portion of the pre-transformed material layer that contacts the rigid-portion (e.g., and is above the rigid-portion), by using a transforming energy beam (e.g., 1730) to form a portion of the overhang structure (e.g., 1735). Transforming may include generating one or more melt pools. FIG. 13C shows an example of forming one or more melt pools (e.g., 1735) when transforming a portion of the material bed (e.g., 1733) with the transforming energy beam. At least one melt pool (e.g., 1731) may (e.g., horizontally) exceed the rigid-portion. In some embodiments, a row of melt pools may be formed to form a horizontal extension of the rigid-portion in at least one horizontal direction. One or more melt pool in the row of melt pools may connect to and/or overlap the rigid-portion. For example, the row of melt pools may connect to and/or overlap the rigid-portion in at least one position. For example, the row of melt pools may connect to and/or overlap at least a portion of the rigid portion rim. FIG. 13C shows an example of a vertical cross section of a melt pool 1731 that horizontally extends beyond the rigid portion 1732, and melt pools that connect to the overhanging melt pool 1731, and overlap the rigid portion (e.g., 1735). The transforming energy beam may be a type-2 energy beam and/or a type-1 energy beam. The type-2 energy beam may be a power density (e.g., at the target surface) that is lower than that of the type-1 energy beam (e.g., lower by at least 3 times (*), 4*, 5*, 6*, 7*, 8*, 9*, 10*, 15*,or 20*). The type-2 energy beam may be focused or defocused (e.g., at the target surface). The type-2 energy beam may have a larger cross section as compared to the type-1 energy beam (e.g., larger by at least 2 times (*), 3*, 4*, 5*, 6*, 7*, 8*, 9*, 10*, 15*, or 20*). During the STO process, the type-2 energy beam may have dwell time (e.g., at the target surface) of about 1 milliseconds (msec), 5 msec, 10 msec, 15 msec, 20 msec, 30 msec, or 50 msec. During the STO process, the type-2 energy beam may have dwell time (e.g., at the target surface) between any of the afore-mentioned dwell times (e.g., from about 1 msec to about 50 msec, from about 5 msec to about 30 msec, from about 10 msec to about 20 msec, or from about 10 msec to about 50 msec). The transforming energy beam may be (e.g., substantially) circular or elongated. The transforming energy beam may operate in retro-scan mode. In some embodiments, a portion of the rigid structure is extended concurrently with forming the overhang. The extension of the rigid portion may be using any of the 3D printing methodologies described herein (e.g., forming a dense layer, or forming a PMX layer that is subsequently densified). FIG. 17D shows an example of the first transformed layer (e.g., hardened layer, 1740) that is part of an overhang structure that is connected to the rigid-portion. The first transformed may comprise material that is denser than a respective volume containing the pre-transformed material. The first transformed layer of the overhang structure may he at an angle (e.g., shallow angle) with respect to the platform and/or exposed surface of the material bed. The angled overhang structure can have an acute or obtuse angle with respect to a bulker portion of the 3D object, the platform, or a direction perpendicular to the platform. The angled overhang structure may have a shallow, intermediate, or steep angle with respect to a bulker portion of the 3D object, the platform, or a direction perpendicular to the platform. For example, the first transformed material may be (e.g., substantially) parallel to the platform and/or exposed surface of the material bed. FIG. 17E shows an example of dispensing a second layer of pre-transformed material (e.g., 1745) adjacent to (e.g., above) the previously layer (e.g., 1748) of transformed material as part of the overhang structure. The second layer of pre-transformed material may be irradiated (e.g., and transformed, e.g., sintered, or melted) to form a second transformed (e.g., denser, and/or hardened) portion of the overhang structure. Transforming may include irradiating at least a portion of the second pre-transformed material layer, using a transforming energy beam. Transforming may include re-melting the first transformed material layer (e.g., 1748) while forming the second layer (e.g., transforming at least a portion of the pre-transformed material layer, e.g., 1750). Transforming may include generating one or more melt pools (e.g., 1750). The melt pools may be deep enough to melt through multiple layers (e.g., first and second layer). In order to elongate the resulting overhang (e.g., as part of a ceiling), at a portion of one melt pool (e.g., horizontally) exceeds (e.g., 1743) the previously formed layer of transformed material (e.g., 1748). FIG. 17F shows an example of two (e.g., two) layers of transformed material (e.g., 1750, 1755) of an overhang structure, that are connected to a rigid-portion formed within the material bed, which overhang forms an angle beta (β) with the rigid-portion, and an angle alpha (α) with the exposed surface (e.g., 1751) of the material bed (and with the platform 1752).

In some embodiments, the requested 3D object comprises a (e.g., vertical) extension of the bottom skin layer, which bottom skin layer is of a first formed 3D object layer, of a ceiling and/or of an overhang. The vertical extension (e.g., thickening) of the bottom skin layer may be done using any of the 3D printing methodologies disclosed herein. For example, the thickening of the bottom skin layer may comprise (i) forming at least one PMX layer above the bottom skin layer, (ii) dispensing one or more layers of pre-transformed material above the bottom skin layer, or (iii) any combination thereof. Subsequently, (i) a transforming energy beam may transform the PMX layer (set) to form a denser layer of transformed material as part of the 3D object, which denser layer contacts the bottom skin layer and at least vertically extends at least a portion of it, (ii) a transforming energy beam may transform the pre-transformed material layer (set) to form a layer of transformed material as part of the 3D object, which layer of transformed material contacts the bottom skin layer and vertically extends at least a portion of it. The PMX layer may connect in at least one position to the bottom skin layer. The newly transformed layer (e.g., originating from a PMX and/or a pre-transformed material) may connect in at least one position to the bottom skin layer. In some embodiments, the bottom skin layer is connected to a rigid-portion. The PMX layer (set) and/or transformed material portions may connect to the rigid-portion. In some examples, the bottom skin layer, PMX layer (set) and/or transformed material portions may connect to the rigid-portion. FIGS. 30A-30D show examples of operation for thickening a bottom skin of an overhang structure that contacts a rigid-portion. The bottom skin may be formed using any suitable method described herein. For example, the bottom skin may be formed using STO or MTO. In the examples shown in FIGS. 30A-30D, the overhang bottom skin layer is thickened using a PMX layer set. In some examples, the overhang bottom skin layer is thickened using a PMX layer only in part. In some examples, the overhang bottom skin layer is thickened using a single step transformation in which a pre-transformed material is transformed to form a transformed material that (e.g., subsequently) forms a hardened material that is sufficiently dense (e.g., per a requested and/or predetermined density). FIG. 30A shows an example of a material bed 3012 that comprises a rigid portion 3018 and a first bottom skin layer 3010 as part of an overhang structure that contacts the rigid-portion 3018, as well as a first PMX layer portion 3005 located above the rigid-structure 3018 and next to the first bottom skin layer 3010. The overhang structure may be formed by any method described herein (e.g., STO). The first PMX layer may be transformed prior to deposition of a subsequent layer of pre-transformed material and/or prior to formation of a third bottom skin layer as an extension of the bottom skin of the overhang. In some examples, at least two of the thickening layers (e.g., PMX or pre-transformed material) are transformed individually (e.g., prior to each deposition of a new layer of pre-transformed material), for example, transformed one by one. In some examples, at least two of the thickening layers (e.g., PMX or pre-transformed material) are transformed collectively as a set, for example, transformed together (e.g., using deep tiling). The rigid-portion (e.g., 3018) may provide an anchor or a support for (i) the bottom skin layer, (ii) the forming overhang structure (e.g., that includes a thickened bottom skin layer), and/or for (iii) the layer portion that thickens the bottom skin layer.

FIG. 30B shows an example of vertically elongating (e.g., thickening) the first formed overhang bottom skin layer 3028 and the rigid-portion 3029 by: fabricating a second bottom skin layer 3020 that that partially overlaps the first bottom skin layer 3028, wherein the non-overlapping portion of the second bottom skin extends in the direction of overhang extension 3021 vertically elongating (e.g., thickening) a portion of the first bottom skin overhang by fabricating a second PMX layer portion 3025 above that portion of the first bottom skin layer, and vertically elongating the rigid-portion by laterally extending the second PMX layer portion 3025 to above 3027 the rigid-portion 3029. In some examples, the first PMX layer may be densified (e.g., by transformation), prior to formation of the second PMX layer. In the example shown in FIG. 30B, the first PMX layer was not transformed to form a denser layer portion, prior to formation of the second PMX layer. The first and second PMX layers form a PMX layer set. The PMX layer set may be transformed prior to deposition of a subsequent layer of pre-transformed material and/or prior to formation of a third bottom skin layer as an extension of the bottom skin of the overhang. At times, the PMX structure may be provided (e.g., laterally) adjacent to a bottom skin layer. For example, the PMX layer (e.g., 3025) may be formed laterally adjacent to the second bottom skin layer (e.g., 3020). At times, the PMX structure may be provided adjacent to (e.g., above) an overhang structure. For example, the PMX layer (e.g., 3025) may be formed above the first overhang structure (e.g., 3028). At times, the PMX structure (e.g., 3035) may be provided adjacent to (e.g., laterally, and above) one or more overhang structures. For example, the PMX structure e.g., 3035) may be formed above the rigid-portion (e.g., 3029), the first overhang structure (e.g., 3031), the second overhang structure (e.g., 3028), and laterally adjacent to the third overhang structure (e.g., 3032). At times, the PMX structure (e.g., 3035) may be supplemented (e.g., filled) with pre-transformed material prior to its densification (e.g., by transforming it using the transforming energy beam).

FIG. 30C shows an example of further extending the overhang by forming a third bottom skin layer portion 3032, and thickening the previously formed first bottom skin layer 3031 and second bottoms skin layer 3038, by forming a PMX layer 3035 that also serves to vertically elongate the rigid structure 3039. When extending the 3D object, various portions of a previously formed layer of the 3D object may be extended using one or more 3D printing methodologies (e.g., as described here). In some embodiments, the bottom skin layers are vertically elongated (e.g., thickened) by a PMX layer, while the rigid structure is elongated in a process that does not use a PMX layer. In some embodiments, the bottom skin layers are vertically elongated (e.g., thickened) with a PMX layer precursor, while the rigid structure is vertically elongated using a single transformation (STO) process (e.g., using hatching and/or tiling). The transforming energy beam may transform one or more PMX layers. For example, the transforming energy beam may transform a plurality of PMX layers in a single irradiation procedure. In some examples, the transforming energy beam may transform one or more layers that form at least a portion of the overhang structure. The one or more layers may be of PMX or of a higher material density. The transforming energy beam. (e.g., 3045) may form a melt pool (e.g., 3040). The melt pool may have a low aspect ratio, high aspect ratio, or be hemispherical. At times, the melt pool may transform (e.g., re-melt, re-transform) multiple layers (e.g., that form at least a portion of the (e.g., the entire) PMX structure. While transforming the material that vertically extends the bottom skin layers, the transforming energy beam may also re-transformed at least a portion of the bottom skin layers. FIG. 30D shows an example of a melt pool 3040 that penetrates through a plurality of PMX layers, and transforms a portion of those layers. FIG. 30E shows an example in which the transformed material forms a part of a vertical extension portion 3055 of a ledge as part of the 3D object.

In some embodiments, at least a portion of the 3D object may be formed using at least one PMX layer (e.g., as a precursor, or as the requested 3D object). In some embodiments, a bottom skin layer is formed using a PMX layer (e.g., as a precursor). At times, a rigid portion may be formed using a porous matrix structure. At times, a 3D object that comprises a functionally graded material may be formed using the porous matrix structure. The functionally graded 3D object may comprise at least two portions that differ in their microstructure. The microstructure may comprise grain orientation, material density, degree of compound segregation to grain boundaries, degree of element segregation to grain boundaries, material phase, metallurgical phase, material porosity, crystal phase, crystal structure, or material type. The various portions may be made by fabricating at least two different PMX precursors that facilitate the at least two portions of the 3D object respectively, which two different portions differ in their microstructures. For example, the PMX structure may comprise one or more porous layers with different densities, pore morphologies, pore special arrangements, and/or material of the PMX portions. The at least two different portions may be at least two different PMX layers, and/or two different portions of the same PMX layer. The at least two PMX layers may differ in their FLS (e.g., their layer thickness (e.g., height)). FIGS. 19A-19F shows an example of forming a thickened bottom skin layer that is disposed anchorlessly in a material bed above a platform, using a porous matrix structure. FIG. 19A show an example of a material bed (e.g., 1900) that comprises pre-transformed material, disposed above a platform (e.g., 1905). FIG. 19B shows an example of irradiating (e.g., and transforming) a portion of the pre-transformed material within the material bed using a transforming energy beam (e.g., 1910). The pre-transformed material may be transformed to form a first porous layer (e.g., 1915) having a first microstructure. The amount of porosity within the first porous layer may be controlled (e.g., in real time, e.g., using a controlled. Controlling may comprise adjusting at least one characteristic of the transforming energy beam (e.g., power per unit area) and/or of the energy source that generates it. FIG. 19C shows an example of irradiating a portion of a second layer of pre-transformed material that was disposed over the first porous layer (e.g., 1930), the transforming energy beam (e.g., 1922). The pre-transformed material may be transformed to form a second porous layer (e.g., 1925) using the transforming energy beam. The second PMX layer may have the same or a different microstructure, as compared to the first PMX layer. For example, the second PMX layer may comprise a different amount of porosity than the first PMX layer. FIG. 19D shows an example of irradiating a portion of a third layer of pre-transformed material that was dispensed over the previously formed PMX layers (e.g., 1935, 1940). At least a portion of the pre-transformed material in the third layer may be transformed to form a third PMX layer (e.g., 1945), using a transforming energy beam (e.g., 1947). The third porous layer may have a different microstructure (e.g., amount, distribution, and/or arrangement of porosity) than the first porous layer and/or the second porous layer. The combination of the multiple PMX layers may be referred to as the PMX layer set. At times, the PMX layer set may be supplemented with pre-transformed material (e.g., that fill one or more pores within the porous matrix) after its formation, and before its densification. FIG. 19E shows an example of transforming (e.g., densifying) a plurality of PMX layers, by projecting a transforming energy beam (e.g., 1951) that generates one or more melt pools (e.g., 1950). Transforming may comprise melting through the entire PMX layer set (e.g., three PMX layers). Transforming may comprise melting through the PMX layer set until at least a portion of the bottom surface of the PMX layer set plastically yields, transforms, wets, densities, or any combination thereof. FIG. 19F shows an example of a transformed structure (e.g., densified, 1955) that is anchorlessly suspended in the material bed, which layers forming the transformed structure may be denser (e.g., and denser) than their respective PMX layers that served as its precursor. The plurality of denser layers may be substantially identical or may differ. In some embodiments, the densification of the PMX layer set results in a single thick layer of transformed material. The layers of PMX that served as a precursor to the thick may be (e.g., immediately) apparent. It some embodiments, it may not be (e.g., immediately) apparent that several layers sewed as a precursor to the thick transformed material layer.

At times, the forming 3D object comprises a complex geometry (e.g., fine, intricate structures). For example, the complex geometry may include thin wedge, (e.g., shallow) angled structure, small horizontal cross sectional structure, and/or a thin ledge connector. The transforming energy beam (e.g., the type-2 energy beam) may have a footprint that is wider than the fundamental length scale (FLS, i.e., length, height, width, or diameter) of the complex geometry. In some embodiments, to form the complex geometry structure, the printing methodology comprises generating a transformed material by forming a high aspect ratio melt pool. The high aspect ratio melt pool may penetrate one or more layers. The one or more layers may comprise a PMX layer (set), a dense(r) 3D object portion, or a pre-transformed material layer. The high aspect ratio melt pool may be formed with an energy beam that has a footprint sufficiently narrow to form the intricate structure. The high aspect ratio melt pool may be formed with an energy beam that has a sufficient power density to form the high aspect ratio melt pool. In some embodiments, the high aspect ratio melt pool may be elongated (e.g., expanding laterally the amount of transformed material that is a part of the melt pool). The elongation may be effectuated at least in part by moving the transforming energy beam. At times, gas is trapped in the high aspect ratio melt pool. Prior to moving away from the high aspect ratio melt pool, the power density of the energy beam may be lowered during the final stages the high aspect ratio melt pool formation. Lowering the power density of the energy beam may alter (e.g., lower) the amount of gas trapping within the melt pool. In some embodiments, a portion of the forming 3D object includes fine, intricate structures (e.g., at shallow angles). FIG. 26A shows a top view example of 3D object portions comprising intricate structures (e.g., 2605). An energy beam (e.g., 2602) with a narrow footprint (e.g., 2603) may be used to densify the fine portion(s) of the forming 3D object (e.g., when a PMX layer (set) is used as its precursor). The narrow footprinted (e.g., 2603) energy beam (e.g., 2602) may have a beam cross section that is smaller than the beam cross section of the type-2 energy beam. The narrow footprinted energy beam may have a footprint on the target surface that is smaller than the footprint (e.g., 2604) of the type-2 energy beam (e.g., 2601) that is formed on that target surface (e.g., exposed surface of the material bed). FIG. 26B shows an example of forming high aspect ratio melt pools (e.g., 2610), viewed as a vertical cross section of the intricate structure (e.g., 2605). The high aspect ratio melt pool may be formed using a transforming energy beam. The transforming energy beam (e.g., 2615) may comprise a high energy density, and/or a small cross section. The energy beam may be focused or defocused. The energy beam may have a cross section area that may be at most equal to the horizontal cross sectional area of the finer structure area (e.g., 2605). The transforming energy beam may form a high aspect ratio melt pool (e.g., 2610), by irradiating the portion of the target surface. The target surface may comprise a pre-transformed material, or a transformed material (e.g., a PMX layer (set)). At times, the complex portion of the 3D object may be formed by performing the HARMP process. FIGS. 29A-29E show an example of forming a fine portion of a 3D object by forming HARMP, shown as a vertical cross section of the fine portion. FIG. 29A shows an example of a target surface 2900 (e.g., exposed surface of a material bed, or of a PMX layer (set)e.g., 2905). FIG. 29B shows an example of irradiating a portion of the target surface (e.g., 2912) using a transforming energy beam (e.g., 2910). The transforming energy beam may irradiate at a position (e.g., 2915) on the target surface in a (e.g., substantially) stationary mariner. The transforming energy beam may be configured to form a HARMP. FIG. 29C shows an example of forming a HARMP (e.g., 2920) with a depth of "d". The HARMP may extend to a desired depth (e.g., up to a depth "d"). The desired depth may be a bottom of the PMX layer (set). The transforming energy beam may cause (e.g., 2932, 2934) a portion of the material to exit the HARMP volume during its formation. The exiting material may comprise vapor, plasma, and/or other forms of sputtered (e.g., liquid, e.g., molten) material. The exiting material may form a HARMP well (e.g., a cavity with an opening, e.g., 2925). The HARMP well may be formed within at least a portion of the HARMP. At times, optionally, the HARMP well may be elongated in a lateral direction (e.g., to increase the amount of transformed material in a lateral direction), by moving the transforming energy beam in a lateral direction. The HARMP well may be closed to form a melt pool. The melt pool may comprise one or more pores. The position and/or number of pores may be controlled (e.g., in real time, e.g., using a controller). The controller may control at least one characteristic of the energy beam and/or the energy source that generates it. In some instances, the melt pool comprises (e.g., on average) a low porosity percentage. In some instances, the melt pool comprises (e.g., substantially) no (e.g., detectable) pores. FIG. 29D shows an example of closing of a HARMP well (e.g., 2920) to form the melt pool (e.g., 2950). The closing may comprise reducing (e.g., gradually) an intensity of the transforming energy beam (e.g., 2945). The intensity reduction may include reducing the power per unit area of the energy beam. Reducing the intensity of the energy beam may include adjusting one or more optical elements of an optical system or an astigmatism system. Reducing the intensity of the energy beam may include adjusting one or more characteristics of the energy beam comprising its power profile over time, or its pulsation scheme. Reducing the intensity of the energy beam may include adjusting one or more characteristics of the energy source (e.g., its power). At times, the gradual intensity reduction of the transforming energy beam (e.g., 2945) may alter (e.g., reduce) its degree of penetration into the HARMP. A reduction of the energy beam penetration into the HARMP may allow liquid material to settle at the bottom of the HARMP and close the well (e.g., 2943). A reduction of the energy beam penetration into the HARMP may reduce the amount of material that exits the HARMP during the irradiation of the energy beam, and thus reduce the size of the well (e.g., 2940). FIG. 29E shows an example of a transformed a resulting closed HARMP that has hardened (e.g., 2950). The hardened HARMP may comprise a low (e.g., diminished) number of pores.

In some embodiments, the formation of the HARMP utilizes pulse shaping of the transforming energy beam. In some embodiments, the formation of the HARMP utilizes a deviation from at least a portion of a steady power pulse. The power density as a function of time, of transforming energy beam may comprise a plurality of segments (e.g., during a pulse). The plurality of segments may comprise a power ramping up, a spike, a plateau, or a power ramping down. The pulse may be a dwell time of the energy beam during which time it irradiates the target surface. FIG. 31A shows an example of a steady pulse power (e.g., density) over time of the transforming energy beam that comprises a power (e.g., density) ramp up (e.g., 3111), a power (e.g., density) plateau (e.g., 3112), a power (e.g., density) ramp down (e.g., 3113), and an intermission (e.g., 3114); wherein the ramp-down profile is linear. FIG. 31B shows an example of a power (e.g., density) pulse profile over time of the transforming energy beam in which the plateau and ramp down segments are altered as compared to the steady pulse. In the example shown in FIG. 31B, the plateau region (e.g., 3122) is shorter, and the ramp down time (e.g., 3123) is longer and has a non-linear descend. FIG. 31C shows an example of a power e.g., density) pulse profile over time of the transforming energy beam in which the ramp up, plateau, and ramp down segments are altered as compared to the steady pulse. In the example shown in FIG. 31C, the ramp-up power (e.g., density) profile spikes to a higher power (e.g., density) value, the plateau region is eliminated, and the ramp down time (e.g., 3123) is longer and includes a fast linear descend (e.g., 3132) followed by a loner (e.g., gradual) non-linear descend. The graphs shown in FIGS. 31A-31C may also represent the power of the energy source that generates the energy beam, when the power of the energy source is represented as a function of time. The intermission may be referred to as a delay. Any one of the plurality of segments may be controlled (e.g., modulated). At least two of the plurality of segments may be controlled (e.g., varied) collectively (e.g., in real time, e.g., by a controller). At least two of the plurality of segments may be controlled (e.g., varied) separately (e.g., in real time, e.g., by a controller). For example, a pulse profile may comprise a ramp up with a spike, followed by a plateau, and ending the pulse by a (e.g., gradual) power ramping down. Controlling one or more of the plurality of segments may alter the percentage of pores (e.g., gas bubbles) in the HARMP upon its hardening (e.g., solidification).

Figures 32A, 32B:
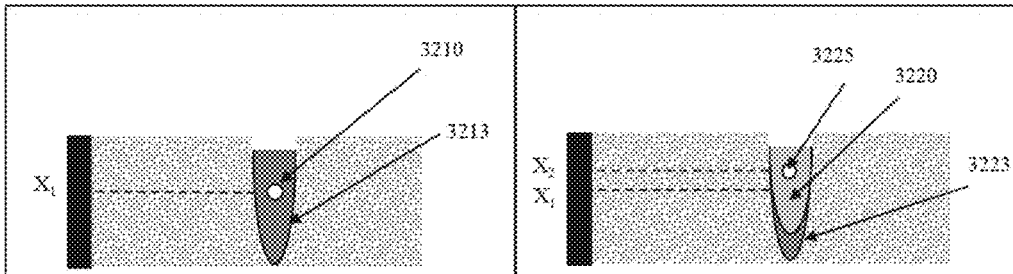
FIGS. 32A-32D schematically illustrate operations in forming a 3D object.
Figures 32C, 32D:
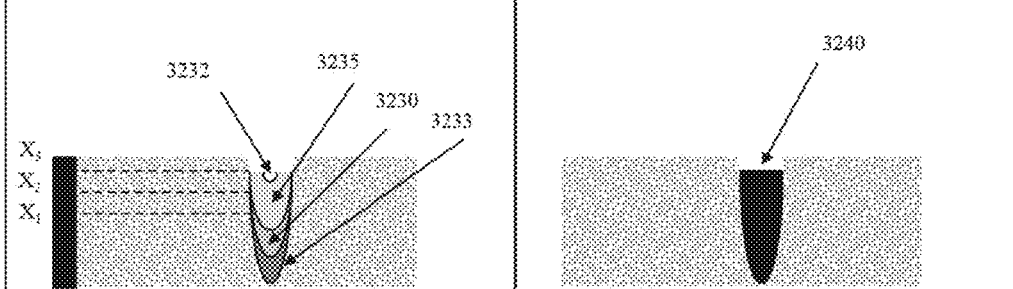

In some embodiments, the position of the trapped gas and/or pore is characteristic of the power pulse profile over time that forms the HARMP. In some embodiments, at least one characteristic of the energy beam and/or power source that generates is, is altered during formation of the HARMP. In some embodiments, the power pulse profile over time that forms the HARMP is manipulated to alter the position of the trapped gas and/or pore. At least two of the plurality of pulses may be (e.g., substantially) identical during the formation of the HARMP. At least two of the plurality of pulses may be (e.g., substantially) different during the formation of the HARMP. The difference may be in a pulse profile, in a characteristic of the energy beam (e.g., power density), and/or in a characteristic of the energy source that generates it. In case the position of the trapped gas and/or pore is disposed away from the lower tip of the HARMP, a plurality of pulses having progressively diminishing depth may result in a reduction (e.g., elimination) of the trapped gas and/or pore in the HARMP. FIGS. 32A-D show examples of vertical cross-sectional views of a HARMP during its formation that comprises three successive energy beam pulses. FIG. 32A shows an example of a HARMP 3213 that was formed using a transforming energy beam, in which HARMP a cavity 3210 is trapped. FIG. 32B shows an example of a HARMP that was formed using two pulses that formed two melt pools with the first melt pool 3223 being deeper than the second (successive) melt pool 3220, in which the cavity 3210 migrated to a higher position in which it is trapped. FIG. 32C shows an example of a HARMP that was formed using three pulses that formed three melt pools with the first melt pool 3233 being deeper than the second (successive) melt pool 3230, which is deeper than the third (successive) melt pool 3235, in which the cavity 3232 migrated to a higher position in which it is no longer trapped. FIG. 32D shows an example of a HARMP 3240 that results from the process of FIGS. 32A-32C, which melt pool is a high aspect ratio melt pool that is free of draped cavities.

In some embodiments, the energy beam irradiates a material and transforms that material (e.g., to a fluid state, e.g., liquid state). In some embodiments, the energy beam is translated during formation of a HARMP. The energy beam may form a transformed material by irradiation (e.g., and generate a high aspect ratio melt pool) and subsequently move laterally to elongate the melt pool in the direction of movement. When irradiating to initiate a melt pool formation (e.g., HARMP), a gas, plasma, or void may be formed (e.g., due to the elevated temperature in the melt pool, e.g., at the position of maximum temperature). The void may form a pore upon hardening (e.g., abruptly), when the melt pool hardens without sufficient time for a fluidic transformed material to close the void. To prevent pore formation, the energy beam may facilitate maintaining a fluid state in the melt pool for a sufficiently long time for to allow closure of the void. For example, the energy beam may translate in a velocity that facilitates closure of the void by a fluid transformed material. For example, the velocity of the energy beam may be a slow velocity. The lateral elongation of the melt pool may be at a velocity that facilitates closure of any pores. The HARMP may be formed using a spiraling (e.g., inward spiraling) or circling energy beam about an axis, which spiraling or circling facilitate a higher temperature at the center of the melt pool relative to its edges.

The hardened HARMP may be formed using one or more pulses that are separated by one or more (respective) intermissions. During formation of a HARMP the duration of at least two of the pulses forming it may be on different time scales as at least two of the intermissions. During formation of a HARMP the duration of at least two of the pulses forming it may be on the same time scales as at least two of the intermissions. For example, a pulse and/or intermission of the transforming energy beam during a HARMP formation may last at least about 0.5 milliseconds (msec). 1 ms, 5 ms, 10 msc, 30 msec, 50 msec, 100 msec, 500 msec, or 1000 msec (e.g., along the path of HARMP melt pools). A pulse and/or intermission of the transforming energy beam during a HARMP formation may last at most 1 ms, 5 ms, 10 msc, 30 msec, 50 msec, 100 msec, 500 msec, or 1000 msec (e.g., along the path of HARMP melt pools). A pulse and/or intermission of the transforming energy beam during a HARMP formation may any time span between the aforementioned time values (e.g., from about 0.5 msec to about 1000 msec, from about 0.5 msec to about 50 msec, from about 30 msec to about 500 msec, or from about 100 msec to about 1000 msec), e.g., along the path of HARMP melt pools. The HARMP may be generated from a pre-transformed material, a PMX, or a denser material than a PMX. The HARMP may be formed using a tiling or type-1 energy beam. At least one characteristic of the energy beam forming the HARMP may be controlled by any controller or control scheme disclosed herein (e.g., real time control). The HARMP may be generated by a type-1 energy beam and/or type-2 energy beam. The HARMP may be generated by irradiating a transforming energy beam in one or more welding modes. The welding modes may comprise a conduction mode, mixed mode (e.g., transition keyhole mode), penetration keyhole mode, and/or drilling mode. For example, a plurality of pulses may be used to form a HARMP. At least two of the plurality of pulses may comprise the same welding mode (e.g., penetration keyhole mode). At least two of the plurality of pulses may comprise the different welding modes (e.g., a combination of penetration keyhole mode and transition keyhole mode).

At times, the pre-transformed material (e.g., powder) is composed of individual particles. The individual particles can be spherical, oval, prismatic, cubic, wires, or irregularly shaped. The particles can have a FLS. The powder can be composed of a homogenously shaped particle mixture such that all of the particles have substantially the same shape and FLS magnitude within at most 1%, 5%, 8%, 10%, 15%, 20%, 25%, 30%, 35%, 40%, 50%, 60%, or 70%, distribution of FLS. In some cases, the powder can be a heterogeneous mixture such that the particles have variable shape and/or FLS magnitude.

At times, the characteristics of the 3D object (e.g., hardened material) and/or any of its parts (e.g., layer of hardened material) is measured by any of the following measurement methodologies. For example, the FLS values e.g., width, height uniformity, auxiliary support space, and or radius of curvature) of the layer of the 3D object and any of its components (e.g., layer of hardened material) may be measured by an of the following measuring methodologies. The measurement methodologies may comprise a microscopy method (e.g., any microscopy method described herein). The measurement methodologies may comprise a coordinate measuring machine (CMM), measuring projector, vision measuring system, and/or a gauge. The gauge can be a gauge distometer (e.g., caliper). The gauge can be a go-no-go gauge. The measurement methodologies may comprise a caliper (e.g., Vernier caliper), positive lens, interferometer, or laser (e.g., tracker). The measurement methodologies may comprise a contact or by a non-contact method. The measurement methodologies may comprise one or more sensors (e.g., optical sensors and/or metrological sensors). The measurement methodologies may comprise a metrological measurement device (e.g., using metrological sensor(s)). The measurements may comprise a motor encoder (e.g., rotary, and/or linear). The measurement methodologies may comprise using an electromagnetic beam (e.g., visible or IR). The microscopy method may comprise ultrasound or nuclear magnetic resonance. The microscopy method may comprise optical microscopy. The microscopy method may comprise electromagnetic, electron, or proximal probe microscopy. The electron microscopy may comprise scanning, tunneling, X-ray photo-, or Auger electron microscopy. The electromagnetic microscopy may comprise confocal, stereoscope, or compound microscopy. The microscopy method may comprise an inverted or non-inverted microscope. The proximal probe microscopy may comprise atomic force, scanning tunneling microscopy, or any other microscopy method. The microscopy measurements may comprise using an image analysis system. The measurements may be conducted at ambient temperatures (e.g., R.T.), melting temperature e.g., of the pre-transformed material) or cryogenic temperatures.

In some embodiments, the microstructures (e.g., of melt pools) of the 3D object are measured by a microscopy method (e.g., any microscopy method described herein). The microstructures may be measured by a contact or by a non-contact method. The microstructures :may be measured by using an electromagnetic beam (e.g., visible or IR). The, microstructure measurements may comprise evaluating the dendritic arm spacing and/or the secondary dendritic arm spacing (e.g., using microscopy). The microscopy measurements may comprise an image analysis system. The measurements may be conducted at ambient temperatures (e.g., R.T.), melting point temperature (e.g., of the pre-transformed material) or cryogenic temperatures.

In some embodiments, various distances relating to the chamber are measured using any of the following measurement techniques. Various distances within the chamber can be measured using any of the measurement techniques. For example, the gap distance (e.g., from the cooling member to the exposed surface of the material bed) may be measured using any of the measurement techniques. The measurements techniques may comprise interferometry and/or confocal chromatic measurements. The measurements techniques may comprise at least one motor encoder (rotary, linear). The measurement techniques may comprise one or more sensors (e.g., optical sensors and/or metrological sensors). The measurement techniques may comprise at least one inductive sensor. The measurement techniques may include an electromagnetic beam (e.g., visible or IR). The measurements may be conducted at ambient temperatures (e.g., R.T.), melting temperature e.g., of the pre-transformed material) or cryogenic temperatures.

The methods described herein can provide surface uniformity across the exposed surface of the material bed such that portions of the exposed surface that comprises the dispensed pre-transformed material, which are separated from one another by a distance of from about 1 mm to about 10 mm, have a vertical (e.g., height) deviation from about 100 µm to about 5 µm. The methods described herein may achieve a deviation from a planar uniformity of the layer of pre-transformed material in at least one plane (e.g., horizontal plane) of at most about 20% 10%, 5%, 2%, 1% or 0.5%, as compared to the average or mean plane (e.g., horizontal plane) created at the exposed surface of the material bed (e.g., top of a material bed) and/or as compared to the platform (e.g., building platform). The vertical deviation can be measured by using one or more sensors (e.g., optical sensors).

At times, the 3D object has various surface roughness profiles, which may be suitable for various applications. The surface roughness may be the deviations in the direction of the nominal vector of a real surface, from its ideal form. The surface roughness may be measured as the arithmetic average of the roughness profile (hereinafter "Ra"). The process for forming 3D object may form 3D objects with a smooth bottom surface (e.g., having a lower Ra value). The process for forming 3D object may form 3D objects with a smooth top surface (e.g., having a lower Ra value). Smooth may include lower surface roughness values. The process for forming 3D objects may be any process described herein. The 3D object can have a Ra value of at least about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The formed object can have a Ra value of at most about 300 µm, 200 µm, 100 µm, 75 µm, 50 µm, 45 µm, 40 µm, 35 µm, 30 µm, 25 µm, 20 µm, 15 µm, 10 µm, 7 µm, 5 µm, 3 µm, 1 µm, 500 nm, 400 nm, 300 nm, 200 nm, 100 nm, 50 nm, 40 nm, or 30 nm. The 3D object can have a Ra value between any of the aforementioned Ra values (e.g., from about 300 μm to about 50 μm, from about 50 μm to about 5μm, from about 5 μm to about 300 nm, from about 300 nm to about 30 nm, or from about 300 nm to about 30 nm). The Ra values may be measured by a contact or by a non-contact method. The Ra values may be measured by a roughness tester and/or by a microscopy method (e.g., any microscopy method described herein). The measurements may be conducted at ambient temperatures (e.g., R.T.), melting point temperature (e.g., of the pre-transformed material) or cryogenic temperatures. The roughness may be measured by a contact or by a non-contact method. The roughness measurement may comprise one or more sensors (e.g., optical sensors). The roughness measurement may comprise using a metrological measurement device (e.g., using metrological sensor(s)). The roughness may be measured using an electromagnetic beam (e.g., visible or IR).

In some embodiments, the 3D object is composed of successive layers of solid material that originated from a transformed material, and subsequently hardened. For example, the 3D object may be composed of successive layers of solid material that originated from an at least partially molten material, and subsequently solidified. The successive layers of solid material may correspond to successive cross sections of a requested 3D object. The transformed material may connect (e.g., weld) to a hardened (e.g., solidified) material. The hardened material may reside within the same layer as the transformed material, in another layer (e.g., a previous layer). In some examples, the hardened material comprises disconnected parts of the three-dimensional object, that are subsequently connected by newly transformed material. Transforming may comprise fusing, binding or otherwise connecting the pre-transformed material (e.g., connecting the particulate material). Fusing may comprise sintering or melting.

In some embodiments, a cross section (e.g., vertical cross section) of the generated (i.e., formed) 3D object reveals a microstructure (e.g., grain structure) indicative of a layered deposition. Without wishing to be bound to theory, the microstructure (e.g., grain structure) may arise due to the solidification of transformed (e.g., powder) material that is typical to anchor indicative of the 3D printing method. For example, a cross section may reveal a microstructure resembling ripples or waves that are indicative of solidified melt pools that may be formed during the 3D printing process. The repetitive layered structure of the solidified melt pools relative to an external plane of the 3D object may reveal the orientation at which the part was printed, since the deposition of the melt pools is in a substantially horizontal plane.

In some embodiments, the cross section of the 3D object reveals a substantially repetitive microstructure (e.g., grain structure). The microstructure (e.g., grain structure) may comprise substantially repetitive variations in material composition, grain orientation, material density, degree of compound segregation or of element segregation to grain boundaries, material phase, metallurgical phase, crystal phase, crystal structure, material porosity, or any combination thereof. The microstructure (e.g., grain structure) may comprise substantially repetitive solidification of layered inch pools. The substantially repetitive microstructure may have an average height of at least about 0.5 μm, 1 μm, 5 μm, 7 μm, 20 μm, 30 μm, 40 μm, 50 μm, 60 μm, 70 μm, 80 μm, 90 μm, 100 μm, 150 μm, 200 μm, 250 μm, 300 μm, 350 μm, 400 μm, 450 μm, 500 μm, or 1000 μm. The substantially repetitive microstructure may have an average height of at most about 1000 μm, 500 μm, 450 μm, 400 μm, 350 μm, 300 μm, 250 μm, 200 μm, 150 μm, 100 μm, 90 μm, 80 μm, 70 μm, 60 μm, 50 μm, 40 μm, 30 μm, 20 μm, or 10 μm. The substantially repetitive microstructure may have an average height of any value between the afore-mentioned values (e.g., from about 0.5 μm to about 1000 μm, from about 15 μm to about 50 μm, from about 5 μm to about 150 μm, front about 20 μm to about 100 μm, or from about 10 μm to about 80 μm). The microstructure (e.g., melt pool) height may correspond to the height of a layer of hardened material.

In some embodiments, the 3D object comprises a reduced amount of constraints (e.g., supports). The 3D object may comprise less constraints. The reduced amount may be relative to prevailing 3D printing methodologies in the art (e.g., respective methodologies). The 3D object may be less constraint (e.g., relative to prevailing 3D printing methodologies in the art). The 3D object may be constraint less (e.g., supportless).

In some embodiments, the pre-transformed material within the material bed can be configured to provide support to the 3D object. The pre-transformed material may be a particulate material. The particulate material may be flowable (e.g., before, after, and/or during the 3D printing). The particulate material in any of the disposed layers in the material bed may be flowable (e.g., before, after, and/or during the 3D printing). Before, during and/or at the end of the 3D printing process, the material that did not transform may be flowable. The material that did not transform to form the 3D object (or a portion thereof) may be referred to as a "remainder." In some instances, a low flowability particulate material (e.g., powder) can be capable of supporting a 3D object better than a high flowability powder. A low flowability particulate material can be achieved inter alia with a particulate material composed of relatively small particles, with particles of non-uniform size or with particles that attract each other. The particulate material may be of low, medium, or high flowability. The particulate material may have compressibility of at least about 1%, 2%, 3%, 4%, 5%, 6%, 7%, 8%, 9%, or 10% in response to an applied force of 15 kilo Pascals (kPa). The particulate material may have a compressibility of at most about 9%, 8%, 7%, 6%, 5%, 4.5%, 4.0%, 3.5%, 3.0%, 2.5%, 2.0%, 1.5%, 1.0%, or 0.5% in response to an applied force of 15 kilo Pascals (kPa). The particulate material may have basic flow energy of at least about 100 milli-Joule (mJ), 200 mJ, 300 mJ, 400 mJ, 450 mJ, 500 mJ, 550 mJ, 600 mJ, 650 mJ, 700 mJ, 750 mJ, 800 mJ, or 900 mJ. The particulate material may have basic flow energy of at most about 200 mJ, 300 mJ, 400 mJ, 450 mJ, 500 mJ, 550 mJ, 600 mJ, 650 mJ, 700 mJ, 750 mJ, 800 mJ, 900 mJ, or 1000 mJ. The particulate material may have basic flow energy in between the above listed values of basic flow energy values (e.g., from about 100 mj to about 1000 mJ, from about 100 mj to about 600 mJ, or from about 500 mj to about 1000 mJ). The particulate material may have a specific energy of at least about 1.0 milli-Joule per gram (mJ/g), 1.5 mJ/g, 2.0 mJ/g, 2.5 mJ/g, 3.0 mJ/g, 3.5 mJ/g, 4.0 mJ/g, 4.5 mJ/g, or 5.0 mJ/g. The particulate material may have a specific energy of at most 5mJ/g, 4.5 mJ/g, 4.0 mJ/g, 3.5 mJ/g, 3.0 mJ/g, 2.5 mJ/g, 2.0 mJ/g, 1.5 mJ/g, or 1.0 mJ/g. The particulate material may have a specific energy in between any of the above values of specific energy (e.g., from about 1.0 mJ/g to about 5.0 mJ/g, from about 3.0 mJ/g to about 5 mJ/g, or from about 1.0 mJ/g to about 3.5 mJ/g).

Dining its formation (e.g., layerwise generation), the 3D object can have one or more auxiliary features. During its formation (e.g., layerwise generation), the 3D object can be devoid of any auxiliary features. The auxiliary feature(s) can be supported by the material (e.g., powder) bed and/or by the enclosure. In some instances, the auxiliary supports may connect to the enclosure (e.g., the platform). Connected may comprise anchored. In some instances, the auxiliary supports may not connect (e.g., be anchored) to the enclosure (e.g., the platform). For example, the auxiliary supports may contact (e.g., touch) and not connect (e.g., be anchored.) to the enclosure (e.g., the platform). The 3D object comprising one or more auxiliary supports, or devoid of auxiliary supports may be suspended (e.g., float) in the material bed. The floating 3D object (with or without the one or more auxiliary supports) may contact or not contact the enclosure.

The term "auxiliary features," as used herein, generally refers to features that are part of a printed 3D object, but are not part of the requested, intended, designed, ordered, modeled, or final 3D object. Auxiliary feature(s) (e.g., auxiliary supports) may provide structural support during and/or subsequent to the formation of the 3D object. Auxiliary features may enable the removal of energy from the 3D object while it is being formed. Examples of auxiliary features comprise the platform (e.g., building platform and/or base), heat fins, wires, anchors, handles, supports, pillars, columns, frame, footing, scaffold, flange, projection, protrusion, mold (a.k.a. mould), or other stabilization features. In some instances, the auxiliary support is a scaffold that encloses the 3D object or part thereof. The scaffold may comprise lightly sintered or lightly fused pre-transformed material. The scaffold may engulf and/or support at least a portion of a 3D object. The scaffold may reduce the deformation and/or deformability of the at least a portion of a 3D object. The scaffold may support at least a portion of the 3D object from 1, 2, 3, 4, 5,or 6 spatial directions. The 3D object can have auxiliary features that can be supported by the material bed and not touch the base, substrate, container accommodating the material bed, and/or the bottom of the enclosure. The 3D part (e.g., 3D object) in a complete or partially formed state can be completely supported by the material bed (e.g., without being anchored to the substrate, base, container accommodating the material bed, or enclosure). The 3D object in a complete or partially formed state can be (completely) supported by the material bed (e.g., without touching anything except the material bed). The 3D object in a complete or partially formed state can be suspended in the material bed without resting on any additional support structures. In some cases, the 3D object in a complete or partially formed (i.e., nascent) state can freely float (e.g., anchorless) in the material bed. Suspended may be floating, disconnected, anchorless, detached, non-adhered, or free. In some examples, the 3D object may not be anchored (e.g., connected) to at least a part of the enclosure (e.g., during formation of the 3D object, and/or during formation of at least one layer of the 3D object). The enclosure may comprise a platform and/or wall that define the material bed. The 3D object may not touch and/or not contact enclosure (e.g., during formation of at least one layer of the 3D object). The 3D object be suspended (e.g., float) in the material bed. The scaffold may comprise a continuously sintered (e.g., lightly sintered) structure that is at most 1 millimeter (mm), 2 mm, 5 mm or 10 mm. The scaffold may comprise a continuously sintered structure that is at least 1 millimeter (mm), 2 mm, 5 mm or 10 mm. The scaffold may comprise a continuously sintered structure having dimensions between any of the afore-mentioned dimensions (e.g., from about 1 mm to about 10 mm, or from about 1 mm to about 5 mm). In some examples, the 3D object may be printed without a supporting scaffold. The supporting scaffold may engulf at least a portion of the 3D object (e.g., the entire 3D object). For example, a supporting scaffold that floats in the material bed, or that is connected to at least a portion of the enclosure.

At times, the printed 3D object is printed without the use of auxiliary features. The printed 3D object may be printed using a reduced number of auxiliary features, and/or printed using spaced apart auxiliary features. In some embodiments, the printed 3D object may be devoid of (one or more) auxiliary support features or auxiliary support feature marks that are indicative of a presence or removal of the auxiliary support feature(s). The 3D object may be devoid of one or more auxiliary support features and of one or more marks of an auxiliary feature (including a base structure) that was removed (e.g., subsequent to, or contemporaneous with, the generation of the 3D object). The printed 3D object may comprise a single auxiliary and/or a single auxiliary support mark The single auxiliary feature (e.g., auxiliary support or auxiliary structure) may be a platform (e.g., a building platform such as a base or substrate), or a mold. The auxiliary support may be adhered to the platform or mold. The 3D object may comprise marks belonging to one or more auxiliary structures. The 3D object may comprise two or more marks belonging to auxiliary feature(s). The 3D object may be devoid of marks pertaining to at least one auxiliary support. The 3D object may be devoid of one or more auxiliary support. The mark may comprise variation in grain orientation, variation in layering orientation, layering thickness, material density, the degree of compound segregation to grain boundaries, material porosity, the degree of element segregation to grain boundaries, material phase, metallurgical phase, crystal phase, or crystal structure; wherein the variation may not have been created by the geometry of the 3D object alone, and may thus be indicative of a prior existing auxiliary support that was removed. The variation may be forced upon the generated 3D object by the geometry of the support. In some instances, the 3D structure of the printed object may be forced by the auxiliary support(s) (e.g., by a mold). For example, a mark may be a point of discontinuity that is not explained by the geometry of the 3D object, which does not include any auxiliary support(s). A mark may be a surface feature that cannot be explained by the geometry of a 3D object, which does not include any auxiliary support(s) (e.g., a mold). The two or more auxiliary features or auxiliary support feature marks may be spaced apart by a spacing distance of at least 1.5 millimeters (mm), 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, 8.5 mm, 9 mm, 9.5 mm, 10 mm, 10.5 mm, 11 mm, 11.5 mm, 12 mm, 12.5 mm, 13 mm, 13.5 mm, 14 mm, 14.5 mm, 15 mm, 15.5 mm, 16 mm, 20 mm, 20.5 mm, 21 mm, 25 mm, 30 mm, 30.5 mm, 31 mm, 35 mm, 40 mm, 40.5 mm, 41 mm, 45 mm, 50 mm, 80 mm, 100 mm, 200 mm, 300 mm, or 500 mm. The two or more auxiliary support features or auxiliary support feature marks may be spaced apart by a spacing distance of any value between the afore-mentioned auxiliary support space values (e.g., from 1.5 mm to 500 mm, from 2 mm to 100 mm, from 15 mm to 50 mm, or from 45 mm to 200 mm). Collectively referred to herein as the "auxiliary feature spacing distance."

At times, the 3D object comprises a layered structure indicative of 3D printing process that is devoid of one or more auxiliary support features or one or more auxiliary support feature marks that are indicative of a presence or removal of the one or more auxiliary support features. The 3D object may comprise a layered structure indicative of 3D printing process, which includes one, two, or more auxiliary support marks. The auxiliary support structure may comprise a supporting scaffold. The supporting scaffold may comprise a dense arrangement (e.g., array) of support structures. The support(s) or support mark(s) can stein from or appear on the surface of the 3D object. The auxiliary supports or support marks can stem from or appear on an external surface and/or on an internal surface (e.g., a cavity within the 3D object). The layered 3D structure can have a layering plane. In one example, two auxiliary support features or auxiliary support :feature marks present in the 3D object may be spaced apart by the auxiliary feature spacing distance.

Figure 11:
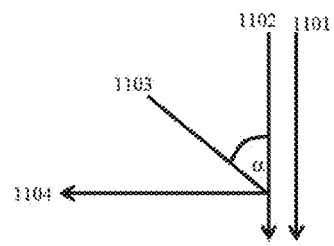
FIG. 11 schematically illustrates a coordinate system.

At times, a portion of the 3D object is formed at an angle from the one or more auxiliary supports. FIG. 11 shows an example of a schematic coordinate system. Line 1104 represents a vertical cross section of a layering plane. Line 1103 represents the straight line connecting the two auxiliary supports or auxiliary supports marks. Line 1102 represent the normal to the layering plane. Line 1101 represents the direction of the gravitational field. The acute (i.e., sharp) angle alpha between the straight line connecting the two auxiliary supports or auxiliary support marks and the direction of normal to the layering plane may be at least about 45 degrees (°), 50°, 55°, 60°, 65°, 70°, 75°, 80°, or 85°. The acute angle alpha between the straight line connecting the two auxiliary supports or auxiliary support marks and the direction of normal to the layering plane may be at most about 90°, 85°, 80°, 75°, 70°, 65°, 60°, 55°, 50°, or 45°. The acute angle alpha between the straight line connecting the two auxiliary supports or auxiliary support marks and the direction of normal to the layering plane may be any angle range between the afore-mentioned angles (e.g., from about 45 degrees (°), to about 90°, from about 60° to about 90°, from about 75° to about 90°, from about 80° to about 90°, or from about 85° to about 90°). The acute angle alpha between the straight line connecting the two auxiliary supports or auxiliary support marks and the direction normal to the layering plane may from about 87° to about 90°. An example of a layering plane can be seen in FIG. 7 showing a vertical cross section of a 3D object 711 that comprises layers 1 to 6, each of which are substantially planar In the schematic example in FIG. 7, the layering plane of the layers can be the layer. For example, layer 1 could correspond to both the layer and the layering plane of layer 1. When the layer is (e.g., substantially) not planar (e.g., FIG. 7, layer 5 of 3D object 712), the layering plane can correspond to the average plane of the layer. The two auxiliary supports or auxiliary support feature marks can be on the same surface (e.g., external surface of the 3D object). The same surface can be an external surface or an internal surface (e.g., a surface of a cavity within the 3D object). When the angle between the shortest straight line connecting the two auxiliary supports or auxiliary support marks and the direction of normal to the layering plane is greater than 90 degrees, or a can consider the complementary acute angle. In some embodiments, any two auxiliary supports or auxiliary support marks are spaced apart by at least about 10.5 millimeters or more. In some embodiments, any two auxiliary supports or auxiliary support marks are spaced apart by at least about 40.5 millimeters or more. In some embodiments, any two auxiliary supports or auxiliary support marks are spaced apart by the auxiliary feature spacing distance.

At times, the 3D object is formed without one or more auxiliary features and/or without contacting a platform (e.g., a base, a substrate, or a bottom of an enclosure). The one or more auxiliary features (which may include a base support) can be used to hold or restrain the 3D object during formation. In some cases, auxiliary features can be used to anchor and/or hold a 3D object or a portion of a 3D object in a material bed (e.g., with or without contacting the enclosure, or with or without connecting to the enclosure). The one or more auxiliary features can be specific to a 3D object and can increase the time, energy, material and/or cost required to form the 3D object. The one or more auxiliary features can be removed prior to use or distribution of the 3D object. The longest dimension of a cross-section of an auxiliary feature can be at most about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension (e.g., FLS) of a cross-section of an auxiliary feature can be at least about 50 nm, 100 nm, 200 nm, 300 nm, 400 nm, 500 nm, 600 nm, 700 nm, 800 nm, 900 nm, or 1000 nm, 1 μm, 3 μm, 10 μm, 20 μm, 30 μm, 100 μm, 200 μm, 300 μm, 400 μm, 500 μm, 700 μm, 1 mm, 3 mm, 5 mm, 10 mm, 20 mm, 30 mm, 50 mm, 100 mm, or 300 mm. The longest dimension of a cross-section of an auxiliary feature can be any value between the above-mentioned values (e.g., from about 50 nm to about 300 mm, from about 5 μm to about 10 mm, from about 50 nm to about 10 mm, or from about 5 mm to about 300 mm). Eliminating the need for auxiliary features can decrease the time, energy, material, and/or cost associated with generating the 3D object (e.g., 3D part). In some examples, the 3D object may be formed with auxiliary features. In some examples, the 3D object may be formed while connecting to the container accommodating the material bed (e.g., side(s) and/or bottom of the container).

In some examples, the diminished number of auxiliary supports or lack of one or more auxiliary supports, will provide a 3D printing process that requires a smaller amount of material, energy, material, and/or cost as compared to commercially available 3D printing processes. In some examples, the diminished number of auxiliary supports or lack of one or more auxiliary supports, will provide a 3D printing process that produces a smaller amount of material waste as compared to commercially available 3D printing processes. The smaller amount can be smaller by at least about 1.1, 1.3, 1.5, 2, 3, 4, 5, 6, 7, 8, 9,or 10. The smaller amount may be smaller by any value between the aforesaid values (e.g., from about 1.1 to about 10,or from about 1.5 to about 5).

In some examples, at least a portion of the 3D object can be vertically displaced (e.g., sink) in the material bed. At least a portion of the 3D object can be surrounded by pre-transformed material within the material bed (e.g., submerged). At least a portion of the 3D object can rest in the pre-transformed material without substantial vertical movement (e.g., displacement). Lack of substantial vertical displacement can amount to a vertical movement (e.g., sinking) of at most about 40%, 20%, 10%, 5%, or 1% of the layer thickness. Lack of substantial sinking can amount to at most about 100 μm, 30 μm, 10 μm, 3 μm, or 1 μm. At least a portion of the 3D object can rest in the pre-transformed material without substantial movement (e.g., horizontal, vertical, and/or angular). Lack of substantial movement can amount to a movement of at most 100 μm, 30 μm, 10 μm, 3 μm, or 1 μm. The 3D object can rest on the substrate when the 3D object is vertically displaced (e.g., sunk) or submerged in the material bed.

FIG. 1 depicts an example of a system that can be used to generate a 3D object using a 3D printing process disclosed herein. The system can include an enclosure (e.g., a chamber 107). At least a fraction of the components in the system can be enclosed in the chamber At least a fraction of the chamber can be filled with a gas to create a gaseous environment (i.e., an atmosphere). The gas can be an inert gas (e.g., Argon, Neon, Helium, Nitrogen). The chamber can be filled with another gas or mixture of gases. The gas can be a non-reactive gas (e.g., an inert gas). The gaseous environment can comprise argon, nitrogen, helium, neon, krypton, xenon, hydrogen, carbon monoxide, or carbon dioxide. The pressure in the chamber can be at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at most about $10^{-7}$ Torr, $10^{-6}$ Torr, $10^{-5}$ Torr, or $10^{-4}$ Torr, $10^{-3}$ Torr, $10^{-2}$ Torr, $10^{-1}$ Torr, 1 Torr, 10 Torr, 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the chamber can be at a range between any of the afore-mentioned pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The pressure can be measured by a pressure gauge. The pressure can be measured at ambient temperature (e.g., R.T.), cryogenic temperature, or at the temperature of the inciting point of the pre-transformed material. In some cases, the pressure in the chamber can be standard atmospheric pressure. In some cases, the pressure in the chamber can be ambient pressure (i.e., neutral pressure). In some examples, the chamber can be under vacuum pressure. In some examples, the chamber can be under a positive pressure (i.e, above ambient pressure).

At times, the chamber comprises two or more gaseous layers. The gaseous layers can be separated by molecular weight or density such that a first gas with a first molecular weight or density is located in a first region, and a second gas with a second molecular weight or density is located in a second region of the chamber above or below the first region. The first molecular weight or density may be smaller than the second molecular weight or density. The first molecular weight or density may be larger than the second molecular weight or density. The gaseous layers can be separated by a temperature difference. The first gas can be in a lower region of the chamber relative to the second gas. The second gas and the first gas can be in adjacent locations. The second gas can be on top of, over, and/or above the first gas. In some cases, the first gas can be argon and the second gas can be helium. The molecular weight or density of the first gas can be at least about 1.5*, 2*, 3*, 4*, 5*, 10*, 15*, 20*, 25*, 30*, 35*, 40*, 50*, 55*, 60*, 70*, 75*, 80*, 90*, 100*, 200*, 300*, 400*,or 500* larger or greater than the molecular weight or density of the second gas (e.g., measured at ambient temperature). The molecular weight of the first gas can be higher than the molecular weight of air. The molecular weight or density of the first gas can be higher than the molecular weight or density of oxygen gas (e.g., $O_2$). The molecular weight or density of the first gas can be higher than the molecular weight or density of nitrogen gas (e.g., $N_2$). The molecular weight or density of the first gas may be lower than that of oxygen gas and/or nitrogen gas.

At times, the first gas with the relatively higher molecular weight or density fills a region of the system where at least a fraction of the pre-transformed material is stored. The first gas with the relatively higher molecular weight or density can fill a region of the system and/or apparatus where the 3D object is formed. Alternatively, the second gas with the relatively lower molecular weight or density can fill a region of the system and/or apparatus where the 3D object is formed. The material layer can be supported on a platform. The platform may comprise a substrate (e.g., 109). The substrate can have a circular, rectangular, square, or irregularly shaped cross-section. The platform may comprise a base disposed above the substrate. The platform may comprise a base (e.g., 102) disposed between the substrate and a material layer (or a space to be occupied by a material layer). A thermal control unit (e.g., a cooling member such as a heat sink or a cooling plate, or a heating plate 113) can be provided inside of the region where the 3D object is formed or adjacent to (e.g., above) time region where the 3D object is formed. The thermal control unit may comprise a thermostat. Additionally, or alternatively, the thermal control unit can be provided outside of the region where the 3D object is formed (e.g., at a predetermined distance). In some cases, the thermal control unit can form at least one section of a boundary region where the 3D object is formed (e.g., the container accommodating the material bed).

At times, the concentration of oxygen and/or humidity in the enclosure (e.g., chamber) can be minimized (e.g., below a predetermined threshold value). The gas composition of the chanter may contain a level of oxygen and/or humidity that is at most about 100 parts per billion (ppb), 10 ppb, 1 ppb, 0.1 ppb, 0.01 ppb, 0.001 ppb, 100 parts per million (ppm), 10 ppm, 1 ppm, 0.1 ppm, 0.01 ppm, or 0.001 ppm. The gas composition of the chanter can contain an oxygen and/or humidity level between any of the aforementioned values (e.g., from about 100 ppb to about 0.001 ppm, from about 1 ppb to about 0.01 ppm, or from about 1 ppm to about 0.1 ppm). The gas composition may be measures by one or more sensors (e.g., an oxygen and/or humidity sensor). The chamber can be opened at the completion of a formation of a 3D object. When the chamber is opened, ambient air containing oxygen and/or humidity can enter the chanter. Exposure of one or more components inside the chamber to air can be reduced by, for example, flowing an inert gas while the chamber is open (e.g., to prevent catty of ambient air), or by flowing a heavy gas (e.g., argon) that tests on the surface of the material bed. In some cases, components that absorb oxygen and/or humidity onto their surface(s) can be sealed while the enclosure (e.g., chamber) is open (e.g., to the ambient environment).

At times, the chamber is configured such that gas inside of the chamber has a relatively low leak rate from the chamber to an environment outside of the chamber. In some cases, the leak rate call be at most about 100 milliTorr/minute (mTorr/min), 50 mTorr/min, 2.5 mTorr/min, 15 mTorr/min, 10 mTorr/min, 5 mTorr/min, 1 mTorr/min, 0.5 mTorr/min, 0.1 mTorr/min, 0.05 mTorr/min, 0.01 mTorr/min, 0.005 mTorr/min, 0.001 mTorr/min, 0.0005 mTorr/min, or 0.0001 mTorr/min. The leak rate may be between any of the aforementioned leak rates (e.g., from about 0.0001 mTorr/min to about, 100 mTorr/min, from about 1 mTorr/min to about 100 mTorr/min, or from about 1 mTorr/min to about, 100 mTorr/min). The leak rate may be measured by one or more pressure gauges and/or sensors (e.g., at ambient temperature). The enclosure can be sealed such that the leak rate of gas from inside the chamber to an environment outside of the chamber is low (e.g., below a certain level). The seals can comprise O-rings, rubber seals, metal seals, load-locks, or bellows on a piston. In some cases, the chamber can have a controller configured to detect leaks above a specified leak rate (e.g., by using at least one sensor). The sensor may be coupled to a controller. In some instances, the controller is able to identify and/or control (e.g., direct and/or regulate). For example, the controller may be able to identify a leak by detecting a decrease in pressure in side of the chamber over a given time interval.

One or more of the system components can be contained in the enclosure (e.g., chamber). The enclosure can include a reaction space that is suitable for introducing precursor to form a 3D object, such as pre-transformed (e.g., powder) material. The enclosure can contain the platform. In some cases, the enclosure can be a vacuum chamber, a positive pressure chamber, or an ambient pressure chamber. The enclosure can comprise a gaseous environment with a controlled pressure, temperature, and/or gas composition. The gas composition in the environment contained by the enclosure can comprise a substantially oxygen free environment. For example, the gas composition can contain at most about 100,000 parts per million (ppm), 10,000 ppm, 1000 ppm, 500 ppm, 400 ppm, 200 ppm, 100 ppm, 50 ppm, 10 ppm, 5 ppm, 1 ppm, 100,000 parts per billion (ppb), 10,000 ppb, 1000 ppb, 500 ppb, 400 ppb, 200 ppb, 100 ppb, 50 ppb, 10 ppb, 5 ppb, 1 ppb, 100,000 parts per trillion (ppt), 10,000 ppt, 1000 ppt, 500 ppt, 400 ppt, 200 ppt, 100 ppt, 50 ppt, 10 ppt, 5 ppt, or 1 ppt oxygen. The gas composition in the environment contained within the enclosure can comprise a substantially moisture (e.g., water) free environment. The gaseous environment can comprise at most about 100,000 ppm, 10,000 ppm, 1000 ppm, 500 ppm, 400 ppm, 200 ppm, 100 ppm, 50 ppm, 10 ppm, 5 ppm, 1 ppm, 100,000 ppb, 10,000 ppb, 1000 ppb, 500 ppb, 400 ppb, 200 ppb, 100 ppb, 50 ppb, 10 ppb, 5 ppb, 1 ppb, 100,000 ppt, 10,000 ppt, 1000 ppt, 500 ppt, 400 ppt, 200 ppt, 100 ppt, 50 ppt, 10 ppt, 5 ppt, or 1 ppt water. The gaseous environment can comprise a gas selected from the group consisting of argon, nitrogen, helium, neon, krypton, xenon, hydrogen, carbon monoxide, carbon dioxide, and oxygen. The gaseous environment can comprise air. The chamber pressure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 760 Torr, 1000 Torr, 1100 Torr, 2 bar, 3 bar, 4 bar, 5 bar, or 10 bar. The chamber pressure can be of any value between the aforementioned chanter pressure values (e.g., from about $10^{-7}$ Torr to about 10 bar, from about $10^{-7}$ Torr to about 1 bar, or from about 1 bar to about 10 bar). In some cases, the enclosure pressure can be standard atmospheric pressure. The gas can be an ultrahigh purity gas. The ultrahigh purity gas can be at least about 99%, 99.9%, 99.99%, or 99.999% pure. The gas may comprise less than about 2 ppm oxygen, less than about 3 ppm moisture, less than about 1 ppm hydrocathons, or less than about 6 ppm nitrogen.

The enclosure can be maintained under vacuum or under an inert, dry, non-reactive and/or oxygen reduced (or otherwise controlled) atmosphere (e.g., a nitrogen ($N_2$), helium (He), or argon (Ar) atmosphere). In some examples, the enclosure is under vacuum. In some examples, the enclosure is under pressure of at most about 1 Torr, $10^{-3}$ Torr, $10^{-6}$ Torr, or $10^{-8}$ Torr. The atmosphere can be furnished by providing an inert, dry, non-reactive, and/or oxygen reduced gas (e.g., Ar). The atmosphere can be furnished by flowing the gas through the enclosure (e.g., chamber).

The system and/or apparatus components described herein can be adapted and configured to generate a 3D object. The 3D object can be generated through a 3D printing process. The 3D printing process may be any 3D printing process described herein. A first layer of pre-transformed material can be provided adjacent to a platform. A platform (e.g., base) can be a previously formed layer of the 3D object or any other surface upon which a layer or bed of pre-transformed material is spread, held, placed, adhered, attached, or supported. When the first layer of the 3D object is generated, the first material layer can be formed in the material bed without a platform (e.g., base), without one or more auxiliary support features (e.g., rods), or without other supporting structure other than the pre-transformed material (e, g., within the material bed). Subsequent layers can be formed such that at least one portion of the subsequent layer fused (e.g., melts or sinters) fuses, binds and/or otherwise connects to the at least a portion of a previously formed layer (or portion thereof). The at least a portion of the previously formed layer that can be transformed and optionally subsequently harden into a hardened material. The at least a portion of the previously formed layer that can acts as a platform (e.g., base) for formation of the 3D object. In some cases, the first layer comprises at least a portion of the platform (e.g., base). The pre-transformed material layer can comprise particles of homogeneous or heterogeneous size and/or shape.

Figure 12:
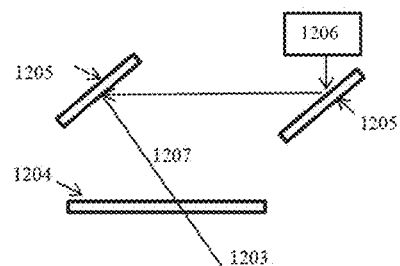
FIG. 12 schematically illustrates an optical setup.

FIG. 12 shows an example of an optical setup in which an energy beam is projected from the energy source 1206, and is deflected by two mirrors 1205, and travels through an optical element 1204 prior to reaching target 1202 (e.g., an exposed surface of a material bed comprising a pre-transformed material and/or hardened or partially hardened material such as from a previous transformation operation). The optical element 1204 can be an optical window, in which case the incoming beam 1207 is substantially unaltered after crossing the optical element 1204. The optical element 1204 can be a focus altering device, in which case the focus (e.g., cross-section) of the incoming beam 1207 is altered after passing through the optical element 1204 and emerging as the beam 1203. The controller may control the scanner (e.g., the mirrors) that directs the movement of the transforming energy beam and/or platform (e.g., in real time).

The system and/or apparatus described herein comprises at least one energy source (e.g., the transforming energy source generating the transforming energy beam). The energy source may be used to transform at least a portion of the material bed into a transformed material (designated herein also as "transforming energy source"). The transforming energy source may project an energy beam (herein also "transforming energy beam"). The transforming energy beam may be any energy beam (e.g., type-1 energy beam or type-2 energy beam) and the associated processes disclosed in U.S. provisional patent application No. 62/265,817,filed on Dec. 10, 2015,titled "APPARATUSES, SYSTEMS AND METHODS FOR EFFICIENT THREE DIMENSIONAL PRINTING," PCT patent application number PCT/US2016/066000,filed on Dec. 9, 2016,titled "SKILLFUL THREE-DIMENSIONAL PRINTING," and U.S. patent application Ser. No. 15/374,318,filed on Dec. 9, 2016, "SKILLFUL THREE-DIMENSIONAL PRINTING," each of which is incorporated herein by reference in its entirety where non-contradictory. The transforming energy source may be any energy source disclosed in U.S. provisional patent application No. 62/265,817,PCT patent application number PCT/US2016/066000,and U.S. patent application Ser. No. 15/374,318,each of which is incorporated herein by reference in its entirety where non-contradictory. The energy beam may travel (e.g., scan) along a path. The path may be predetermined (e.g., by the controller). The methods, systems and/or apparatuses may comprise at least a second energy source. The second energy source may generate a second energy (e.g., second energy beam). The first and/or second energy may transform at least a portion of the pre-transformed material in the material bed to a transformed material. In some embodiments, the first and/or second energy source may beat but not transform at least a portion of the pre-transformed material in the material bed. In some cases, the system can comprise 1, 2, 3, 4, 5, 6, 7, 8, 9, 10, 30, 100, 300, 1000 or more energy beams and/or sources. The system can comprise an array of energy sources (e.g., laser diode array). Alternatively, or additionally the surface, material bed, 3D object (or part thereof), or any combination thereof may be heated by a heating mechanism. The heating mechanism may comprise dispersed energy beams. In some cases, the at least one energy source is a single (e.g., first) energy source.

At times, an energy source is a source configured to deliver energy to an area (e.g., a confined area). An energy source can deliver energy to the confined area through radiative heat transfer. The energy source can project energy (e.g., heat energy, and/or energy beam). The energy (e.g., beam) can interact with at least a portion of the material in the material bed. The energy can heat the material in the material bed before, during and/or after the pre-transformed material is being transformed (e.g., melted). The energy can heat at least a fraction of a 3D object at any point during formation of the 3D object. Alternatively, or additionally, the material bed may be heated by a heating mechanism projecting energy (e.g., radiative heat and/or energy beam). The energy may include an energy beam and/or dispersed energy (e.g., radiator or lamp). The energy may include radiative heat. The radiative heat may be projected by a dispersive energy source (e.g., a heating mechanism) comprising a lamp, a strip heater (e.g., mica strip heater, or any combination thereof), a heating rod (e.g., quartz rod), or a radiator (e.g., a panel radiator). The heating mechanism may comprise an inductance heater. The heating mechanism may comprise a resistor (e.g., variable resistor). The resistor may comprise a varistor or rheostat. A multiplicity of resistors may be configured in series, parallel, or any combination thereof. In some cases, the system can have a single (e.g., first) energy source that is used to transform at least a portion of the material bed. An energy source can be a source configured to deliver energy to an area (e.g., a confined area). An energy source can deliver energy to the confined area through radiative heat transfer (e.g., as described herein).

At times, the energy beam includes a radiation comprising an electromagnetic, or charged particle beam. The energy beam may include radiation comprising electromagnetic, electron, positron, proton, plasma, radical or ionic radiation. The electromagnetic beam may comprise microwave, infrared, ultraviolet, or visible radiation. The energy beam may include an electromagnetic energy beam, electron beam, particle beam, or ion beam. An ion beam may include a cation or an anion. A particle beam may include radicals. The electromagnetic beam may comprise a laser beam. The energy beam may comprise plasma. The energy source may include a laser source. The energy source may include an electron gun. The energy source may include an energy source capable of delivering energy to a point or to an area. In some embodiments, the energy source can be a laser source. The laser source may comprise a $CO_2$, Nd:YAG, Neodymium (e.g., neodymium-glass), an Ytterbium, or an excimer laser. The energy source may include an energy source capable of delivering energy to a point or to an area. The energy source (e.g., transforming energy source) can provide an energy beam having an energy density of at least about 50 joules/cm$^2$ (J/cm$^2$), 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of at most about 50 J/cm$^2$, 100 J/cm$^2$, 200 J/cm$^2$, 300 J/cm$^2$, 400 J/cm$^2$, 500 J/cm$^2$, 600 J/cm$^2$, 700 J/cm$^2$, 800 J/cm$^2$, 1000 J/cm$^2$, 500 J/cm$^2$, 1000 J/cm$^2$, 1500 J/cm$^2$, 2000 J/cm$^2$, 2500 J/cm$^2$, 3000 J/cm$^2$, 3500 J/cm$^2$, 4000 J/cm$^2$, 4500 J/cm$^2$, or 5000 J/cm$^2$. The energy source can provide an energy beam having an energy density of a value between the afore-mentioned values (e.g., from about 50 J/cm$^2$ to about 5000 J/cm$^2$, from about 200 J/cm$^2$ to about 1500 J/cm$^2$, from about 1500 J/cm$^2$ to about 2500 J/cm$^2$, from about 100 J/cm$^2$ to about 3000 J/cm$^2$, or from about 2500 J/cm$^2$ to about 5000 J/cm$^2$). In an example, a laser can provide light energy at a peak wavelength of at least about 100 nanometer (nm), 500 nm, 750 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 2000 nm, 1900 nm, 1800 nm, 1700 nm, 1600 nm, 1500 nm, 1200 nm, 1100 nm, 1090 nm, 1080 nm, 1070 nm, 1060 nm, 1050 nm, 1040 nm, 1030 nm, 1020 nm, 1010 nm, 1000 nm, 750 nm, 500 nm, or 100 nm. The laser can provide light energy at a peak wavelength between any of the afore-mentioned peak wavelength values (e.g., from about 100 nm to about 2000 nm, from about 500 nm to about 1500 nm, or from about 1000 nm to about 1100 nm). The energy beam (e.g., laser) may have a power of at least about 0.5 Watt (W), 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power of at most about 0.5 W, 1 W, 2 W, 3 W, 4 W, 5 W, 10 W, 20 W, 30 W, 40 W, 50 W, 60 W, 70 W, 80 W, 90 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power between any of the afore-mentioned laser power values e.g., from about 0.5 W to about 100 W, from about 1 W to about 110 W, from about 100 W to about 1000 W, or from about 1000 W to about 4000 W). The first energy source (e.g., producing the transforming energy beam) may have at least one of the characteristics of the second energy source.

At times, an energy beam from the energy source(s) is incident on, or is directed perpendicular o, the surface (also herein "target surface"). The target surface may be an exposed surface of the material bed or an exposed surface of a hardened material. The hardened material may be a 3D object or a portion thereof. An energy beam from the energy source(s) can be directed at an acute angle within a value ranging from being parallel to being perpendicular with respect to the average or mean plane of the target surface. The energy beam can be directed onto a specified area of at least a portion of the target surface for a specified time period (e.g., dwell time). The material in target surface (e.g., pre-transformed material such as in a top surface of a material bed) may absorb the energy from the energy beam and, and as a result, a localized region of at least the material at the surface, can increase in temperature. The energy beam can be moveable such that it can translate (e.g., horizontally, vertically, and/or in an angle). The energy source may be movable such that it can translate relative to the target surface. The energy beam(s) can be moved via a scanner (e.g., as disclosed herein). At least two (e.g., all) of the energy sources can be movable with the same scanner. A least two (e.g., all) of the energy beams can be movable with the same scanner. At least two of the energy source(s) and/or beam(s) can be translated independently of each other. In some cases, at least two of the energy source(s) and//or beam(s) can be translated at different rates (e.g., velocities). In some cases, at least two of the energy source(s) and/or beam(s) can be comprise at least one different characteristic. The characteristics may comprise wavelength, charge, power, amplitude, trajectory, footprint, cross-section, focus, intensity, energy, path, or hatching. The charge can be electrical and/or magnetic charge.

In some embodiments, the energy source is an array, or a matrix, of energy sources (e.g., laser diodes). Each of the energy sources in the array, or matrix, can be independently controlled (e.g., by a control mechanism) such that the energy beams can be turned off and on independently. At least a part of the energy sources (e.g., in the array or matrix) can be collectively controlled such that the at least two (e.g., all) of the energy sources can be turned off and on simultaneously. The energy per unit area or intensity of at least two energy sources in the matrix or array can be modulated independently (e.g., by a controller). At times, the energy per unit area or intensity of at least two (e.g., all) of the energy sources (e.g., in the matrix or array) can be modulated collectively (e.g., by a controller). The energy source can scan along the target surface by mechanical movement of the energy source(s), one or more adjustable reflective mirrors one or more polygon light scanners, or any combination or permutation thereof. The energy source(s) can project energy using a DLP modulator, a one-dimensional scanner, a two-dimensional scanner, or any combination. thereof. The energy source(s) can be stationary. The material bed (e.g., target surface) may translate vertically, horizontally, or in an angle (e.g., planar or compound). The translation may be effectuated using a scanner.

At times, the energy source is modulated. The energy beam emitted by the energy source can be modulated. The modulator can include amplitude modulator, phase modulator, or polarization modulator. The modulation may alter the intensity of the energy beam. The modulation may alter the current supplied to the energy source (e.g., direct (nodulation). The modulation may affect the energy beam (e.g., external modulation such as external light modulator). The modulation may include direct modulation (e.g., by a modulator). The modulation may include an external modulator. The modulator can include an acusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam. The focus of the energy beam may be controlled (e.g., modulated). At times, the energy beam may be focused. At times, the energy beam may be defocused (e.g., blurred).

At times, the energy source and/or beam is moveable such that it can translate relative to the material bed and/or target surface. In some instances, the energy beam may be movable such that it can translate across (e.g., laterally) the exposed (e.g., top) surface of the material bed. The energy beam(s) and/or source(s) can be moved via a scanner. The scanner may comprise a galvanometer scanner, a polygon, a mechanical stage (e.g., X-Y stage), a piezoelectric device, gimble, or any combination of thereof. The galvanometer may comprise a mirror. The scanner may comprise a modulator. The scanner may comprise a polygonal mirror. The scanner can be the same scanner for two or more energy sources and/or beams. The scanner may comprise an optical setup. At least two (e.g., each) energy source and/or beam may have a separate scanner. The energy sources can be translated independently of each other. In some cases, at least two energy sources and/or beams can be translated at different rates, and/or along different paths. For example, the movement of the first energy source may be faster (e.g., greater rate) as compared to the movement of the second energy source. The systems and/or apparatuses disclosed herein may comprise one or more shutters (e.g., safety shutters). The energy beam(s), energy source(s), and/or the platform can be moved by the scanner. The galvanometer scanner may comprise a two-axis galvanometer scanner. The scanner may comprise a modulator (e.g., as described herein). The energy source(s) can project energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The scanner can be included in an optical system (e.g., optical setup) that is configured to direct energy from the energy source to a predetermined position on the target surface (e.g., exposed surface of the material bed). The controller can be programmed to control a trajectory of the energy source(s) with the aid of the optical system. The controller can regulate a supply of energy from the energy source to the material (e.g., at the target surface) to form a transformed material.

At times, the energy beam(s) emitted by the energy source(s) is modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

At times, the energy beam (e.g., transforming energy beam) comprises a Gaussian energy beam. The energy beam may have any cross-sectional shape comprising an ellipse (e.g., circle), or a polygon. The energy beam may have a cross section with a FLS (e.g., diameter) of at least about 30 micrometers (μm), 50 μm, 70 μm, 100 μm, 150 μm, 200 μm, 250 μm, or 300 m. The energy beam may have a cross section with a FLS of at most about 50 μm, 60 μm, 70 μm, 100 μm, 150 μm, 200 μm, 250 μm, or 300 μm. The energy beam may have a cross section with a FLS of any value between the afore-mentioned values (e.g., from about 30 μm to about 300 μm, from about 50 μm to about 150 μm, or from about 150 μm to about 300 μm). At times, the FLS of a cross section of the energy beam may be extended. The FLS of a cross section of the energy beam may be at least about 0.3 millimeter (mm), 0.5 mm, 0.8 mm, 1 mm, 1.5 mm, 2 mm, 2.5 mm, 3 mm, 3.5 mm, 4 mm, 4.5 mm, or 5 mm. The FLS of a cross section of the energy beam may be at most about 0.5 mm, 0.8 mm, 1 mm, 1.5 mm, 2 min, 2.5 mm, 3 mm, 3.5 mm, 4 mm, 4.5 mm, or 5 mm. The FLS of a cross section of the energy beam may be between any of the aforementioned values (e.g., from about 0.3 mm to about 5 mm, from about 0.3 mm to about 2.5 mm, or from about 2.5 mm to about 5 mm).

The powder density (e.g., power per unit area at the target surface) of the energy beam may at least about 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The powder density of the energy beam may be at most about 10000 W/mm$^2$, 20000 W/mm$^2$, 30000 W/mm$^2$, 50000 W/mm$^2$, 60000 W/mm$^2$, 70000 W/mm$^2$, 80000 W/mm$^2$, 90000 W/mm$^2$, or 100000 W/mm$^2$. The powder density of the energy beam may be any value between the aforementioned values (e.g., from about 10000 W/mm$^2$ to about 100000 W/mm$^2$, from about 10000 W/mm$^2$ to about 50000 W/mm$^2$, or from about 50000 W/mm$^2$ to about 100000 W/mm$^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/see, or 50000 mm/sec. The scanning speed of the energy beam may any value between the aforementioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process.

In some embodiments, the 3D printing system and/or apparatus is the one described in U.S. provisional patent application No. 62/265,817,PCT patent application number PCT/US2016/066000,or U.S. patent application Ser. No. 15/374,318,each of which is incorporated herein by reference in its entirety Where non-contradictory. The 3D printing system or apparatus may comprise a layer dispensing mechanism may dispense the pre-transformed material (e.g., in the direction of the platform), level, distribute, spread, and/or remove the pre-transformed material in the material bed. The layer dispensing mechanism may be utilized to form the material bed. The layer dispensing mechanism may be utilized to form the layer of pre-transformed material (or a portion thereof). The layer dispensing mechanism may be utilized to level (e.g., planarize) the layer of pre-transformed material (or a portion thereof). The leveling may be to a predetermined height. The layer dispensing mechanism may comprise at least one, two or three of a (i) powder dispensing mechanism (e.g., FIG. 1, 116), (ii) powder leveling mechanism (e.g., FIG. 1, 117), and (iii) powder removal mechanism (e.g., FIG. 1, 118). The layer dispensing mechanism may be controlled by the controller (e.g., in real time), The layer dispensing mechanism or any of its components can be any of those disclosed in U.S. provisional patent application No. 62/265,817; PCT patent application number PCT/US2016/066000; U.S. patent application Ser. No. 15/374, 318; or PCT patent application number PCT/US15/36802, filed on Jun. 19, 2015,titled "APPARATUSES, SYSTEMS AND METHODS FOR THREE-DIMENSIONAL PRINTING," each of which is incorporated herein by reference in its entirety where non-contradictory. The layer dispensing system may comprise a hopper. The layer dispensing system may comprise (e.g., may be) a recoater.

In some embodiments, one or more sensors (at least one sensor) detect the topology of the exposed surface of the material bed and/or the exposed surface of the 3D object (or any portion thereof). The sensor can detect the amount of pre-transformed material deposited in the material bed. The sensor can comprise a proximity sensor. For example, the sensor may detect the amount of pre-transformed material deposited on the platform or on the exposed surface of a material bed. The sensor may detect the physical state of material deposited on the target surface (e.g., liquid, or solid (e.g., powder or bulk)). The sensor can detect the microstructure (e.g., crystallinity) of pre-transformed material deposited on the target surface. The sensor may detect the amount of pre-transformed material disposed by the layer dispensing mechanism (e.g., powder dispenser). The sensor may detect the amount of pre-transformed material that is relocated by the layer dispensing mechanism (e.g., by the leveling mechanism). The sensor can detect the temperature of the powder and/or transformed material in the material bed. The sensor may detect the temperature of the pre-transformed material in a powder dispensing mechanism, and/or in the material bed. The sensor may detect the temperature of the pre-transformed material during and/or after its transformation. The sensor may detect the temperature and/or pressure of the atmosphere within the enclosure (e.g., chamber). The sensor may detect the temperature of the material (e.g., powder) bed at one or more locations.

At times, the at least one sensor is operatively coupled to a control system (e.g., computer control system). The sensor may comprise light sensor, acoustic sensor, vibration sensor, chemical sensor, electrical sensor, magnetic sensor, fluidity sensor, movement sensor, speed sensor, position sensor, pressure sensor, force sensor, density sensor, distance sensor, or proximity sensor. The sensor may comprise temperature sensor, weight sensor, material (e.g., powder) level sensor, metrology sensor, gas sensor, or humidity sensor. The metrology sensor may comprise a measurement sensor (e.g., height, length, width, angle, and/or volume). The metrology sensor may comprise a magnetic, acceleration, orientation, or optical sensor. The sensor may transmit and/or receive sound (e.g., echo), magnetic, electronic, and/or electromagnetic signal. The electromagnetic signal may comprise a visible, infrared, ultraviolet, ultrasound, radio wave, or microwave signal. The metrology sensor may measure a vertical, horizontal, and/or angular position of at least a portion of the target surface. The metrology sensor may measure a gap. The metrology sensor may measure at least a portion of the layer of material. The layer of material may be a pre-transformed material, transformed material, or hardened material. The metrology sensor may measure at least a portion of the 3D object. The gas sensor may sense any of the gas. The distance sensor can be a type of metrology sensor. The distance sensor may comprise an optical sensor, or capacitance sensor. The temperature sensor can comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer (e.g., resistance thermometer), or Pyrometer. The temperature sensor may comprise an optical sensor. The temperature sensor may comprise image processing. The temperature sensor may be coupled to a processor that would perform image processing by using at least one sensor generated signal. The temperature sensor may comprise a camera (e.g., IR camera, CCD camera). The pressure sensor may comprise Barograph, Barometer, Boost gauge, Bourdon gauge, Hot filament ionization gauge, Ionization gauge, McLeod gauge, Oscillating U-tube, Permanent Downhole Gauge, Piezometer, Pirani gauge, Pressure sensor, Pressure gauge, Tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode (e.g., light sensor), Light-addressable potentiometric sensor, Nichols radiometer, Fiber optic sensor, Optical position sensor, Photo detector, Photodiode, Photomultiplier tubes, Phototransistor, Photoelectric sensor, Photoionization detector, Photomultiplier, Photo resistor, Photo switch, Phototube, Scintillometer, Shack-Hartmann, Single-photon avalanche diode, Superconducting nanowire single-photon detector, Transition edge sensor, Visible light photon counter, or Wave front sensor. The weight of the material bed can be monitored by one or more weight sensors. The weight sensor(s) may be disposed in, and/or adjacent to the material bed. A weight sensor disposed in the material bed can be disposed at the bottom of tire material bed (e.g. adjacent to the platform). The weight sensor can be between the bottom of the enclosure (e.g., FIG. 1, 111) and the substrate (e.g., FIG. 1, 109) on which the base (e.g., FIG. 1, 102) or the material bed (e.g., FIG. 1, 104) may be disposed. The weight sensor can be between the bottom of the enclosure and the base on which the material bed may be disposed. The weight sensor can be between the bottom of the enclosure and the material bed. A weight sensor can comprise a pressure sensor. The weight sensor may comprise a spring scale, a hydraulic scale, a pneumatic scale, or a balance, At least a portion of the pressure sensor can be exposed on a bottom surface of the material bed. The weight sensor can comprise a button load cell. The button load cell can sense pressure from pre-transformed material adjacent to the load cell. In an example, one or more sensors (e.g., optical sensors or optical level sensors) can be provided adjacent to the material bed such as above, below, or to the side of the material bed. In some examples, the one or more sensors can sense the level (e.g., height and/or amount) of pre-transformed material in the material bed. The pre-transformed material (e.g., powder) level sensor can be in communication with a layer dispensing mechanism (e.g., powder dispenser). Alternatively, or additionally a sensor can be configured to monitor the weight of the material bed by monitoring a weight of a structure that contains the material bed. One or more position sensors (e.g., height sensors) can measure the height of the material bed relative to the platform. The position sensors can be optical sensors. The position sensors can determine a distance between one or more energy beams (e.g., a laser or an electron beam.) and the exposed surface of the material (e.g., powder) bed. The one or more sensors may be connected to a control system (e.g., to a processor and/or to a computer).

In some embodiments, the systems and/or apparatuses disclosed herein comprise one or more motors. The motors may comprise servomotors. The servomotors may comprise actuated linear lead screw drive motors. The motors may comprise belt drive motors. The motors may comprise rotary encoders. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators. The systems and/or apparatuses disclosed herein may comprise one or more pistons.

In some examples, a pressure system is in fluid communication with the enclosure. The pressure system can be configured to regulate the pressure in the enclosure. In some examples, the pressure system includes one or more pumps. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump, or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valveless pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump.

In some examples, the pressure system includes one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector. The pressure system can include valves; such as throttle valves. The pressure system can include a pressure sensor for measuring the pressure of the chamber and relaying the pressure to the controller, which can regulate the pressure with the aid of one or more vacuum pumps of the pressure system. The pressure sensor can be coupled to a control system (e.g., controller). The pressure can be electronically or manually controlled.

In some examples, the systems, apparatuses, and/or methods described herein comprise a material recycling mechanism. The recycling mechanism can collect at least unused pre-transformed material and return the unused pre-transformed material to a reservoir of a powder dispensing mechanism (e.g., the powder dispensing reservoir), or to a bulk reservoir that feeds the powder dispensing mechanism. The recycling mechanism and the bulk reservoir are described in U.S. provisional patent application No. 62/265,817,U.S. patent application Ser. No. 15/374,318,or PCT patent application minter PCT/US20161066000,each of which is incorporated herein by reference in its entirety where non-contradictory.

In some cases, unused material (e.g., remainder) surround the 3D object in the material bed. The unused material can be substantially removed from the 3D object. The unused material may comprise pre-transformed material. Substantial removal may refer to material covering at most about 20%, 15%, 10%, 8%, 6%, 4%, 2%, 1%, 0.5%, or 0.1% of the surface of the 3D object after removal. Substantial removal may refer to removal of all the material that was disposed in the material bed and remained as pre-transformed material at the end of the 3D printing process (i.e., the remainder), except for at most about 10%, 3%, 1%, 0.3%, or 0.1% of the weight of the remainder. Substantial removal may refer to removal of all the remainder except for at most about 50%, 10%, 3%, 1%, 0.3%, or 0.1% of the weight of the printed 3D object. The unused material can be removed to permit retrieval of the 3D object without digging through the material bed. For example, the unused material can be suctioned out of the material bed by one or more vacuum ports (e.g., nozzles) built adjacent to the material bed, by brushing off the remainder of unused material, by lifting the 3D object from the unused material, by allowing the unused material to flow away from the 3D object (e.g., by opening an exit opening port on the side(s) and/or on the bottom of the material bed from which the unused material can exit). After the unused material is evacuated, the 3D object can be removed. The unused pre-transformed material can be re-circulated to a material reservoir for use in future builds. The removal of the remainder may be effectuated as described in U.S. provisional patent application No. 62/265,817, U.S. patent application Ser. No. 15/374,318, or PCT patent application number PCT/US15/36802, each of which is incorporated herein by reference in its entirety where non-contradictory. In some cases, cooling gas can be directed to the hardened material (e.g., 3D object) for cooling the hardened material during and/or following its retrieval.

In some cases, a layer of the 3D object can be formed within at most about 1 hour (h), 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A layer of the 3D object can be formed within at least about 30 minutes (min), 20 min, 10 min, 5 min, 1 min, 40 seconds (s), 20 s, 10 s, 9 s, 8 s, 7 s, 6 s, 5 s, 4 s, 3 s, 2 s, or 1 s. A. layer of the 3D can be formed within any time between the aforementioned time scales (e.g., from about 1 h to about 1 s, from about 10 min to about 1 s, from about 40 s to about 1 s, from about 10 s to about 1 s, or from about 5 s to about 1 s).

The final form of the 3D object can be retrieved soon after cooling of a final layer of hardened material. Soon after cooling may be at most about 1 day, 12 hours (h), 6 h, 5 h, 4 h, 3 h, 2 h, 1 h, 30 minutes, 15 minutes, 5 minutes, 240 s, 220 s, 200 s, 180 s, 160 s, 140 s, 120 s, 100 s, 80 s, 60 s, 40 s, 20 s, 10 s, 9 s, 8 s, 7 s, 6 s, 5 s, 4 s, 3 s, 2 s, or 1 s. Soon after cooling may be between any of the aforementioned time values (e.g., from about is to about 1 day, from about is to about 1 hour, from about 30 minutes to about 1 day, from about 20 s to about 240 s, from about 12 h to about 1 s, from about 12 h to about 30 min, from about 1 h, to about 1 s, or from about 30 min to about 40 s). In some cases, the cooling can occur by method comprising active cooling by convection using a cooled gas or gas mixture comprising argon, nitrogen, helium, neon, krypton, xenon, hydrogen, carbon monoxide, carbon dioxide, or oxygen. Cooling may be cooling to a handling temperature. Cooling may be cooling to a temperature that allows a person to handle the 3D object.

In some embodiments, the generated 3D object requires very little or no further processing after its retrieval. In some examples, the diminished further processing or lack thereof, will afford a 3D printing process that requires smaller amount of energy and/or less waste as compared to commercially available 3D printing processes. The smaller amount call be smaller by at least about 1.1, 1.3, 1.5, 2, 3, 4, 5, 6, 7, 8, 9, or 10. The smaller amount may be smaller by any value between the aforementioned values (e.g., from about 1.1 to about 10, or from about 1.5 to about 5). Further processing may comprise trimming. Further processing may comprise polishing (e.g., sanding). The generated 3D object can be retrieved and finalized without removal of transformed material and/or auxiliary features. The 3D object can be retrieved when the 3D object, composed of hardened (e.g., solidified) material, is at a handling temperature that is suitable to permit its removal from the material bed without its substantial deformation. The handling temperature can be a temperature that is suitable for packaging of the 3D object. The handling temperature a can be at most about 120° C., 100° C., 80° C., 60° C., 40° C., 30° C., 25° C., 20° C., 10° C., or 5° C. The handling temperature can be of any value between the aforementioned temperature values (e.g., from about 720° C. to about 20° C., from about 40° C. to about 5° C., or from about 40° C. to about 10° C.).

The methods and systems provided herein can result in fast and/or efficient formation of 3D objects. In some cases, the 3D object can be transported within at most about 120 min, 100 min, 80 min, 60 min, 40 min, 30 min, 20 min, 10 min or 5 min after the last layer of the object hardens (e.g., solidifies). In some cases, the 3D object can be transported within at least about 120 min, 100 min, 80 min, 60 min, 40 min, 30 min, 20 min, 10 min, or 5 min after the last layer of the object forms (e.g., hardens). In some cases, the 3D object can be transported within any time between the above-mentioned values (e.g., from about 5 min to about 120 min, from about 5 min to about 60 min, or from about 60 min to about 120 min). The 3D object can be transported once it cools to a temperature of at most about 100° C., 90° C., 80° C., 70° C., 60° C., 50° C., 40° C., 30° C., 25° C., 20° C., 15° C., 10° C., or 5° C. The 3D object can be transported once it cools to a temperature value between the above-mentioned temperature values (e.g., from about 5° C. to about 100° C., from about 5° C. to about 40° C., or from about 15° C. to about 40° C.). Transporting the 3D object can comprise packaging and/or labeling the 3D object. In some cases, the 3D object can be transported directly to a consumer.

In some embodiments, the methods, systems, apparatuses, and/or software presented herein facilitates formation of custom or a stock 3D objects for a customer. A customer can be an individual, a corporation, organization, government, non-profit organization, company, hospital, medical practitioner, engineer, retailer, any other entity, or individual. The customer may be one that is interested in receiving the 3D object and/or that ordered the 3D object. A customer can submit a request for formation of a 3D object. The customer can provide an item of value in exchange for the 3D object. The customer can provide a design or a model for the 3D object. The customer can provide the design in the form 4a stereo lithography (STL) file. The customer can provide a design Wherein the design can be a definition of the shape and/or dimensions of the 3D object in any other numerical or physical form. In some cases, the customer can provide a 3D model, sketch, and/or image as a design of an object to be generated. The design can be transformed in to instructions usable by the printing system to additively generate the 3D object. The customer can provide a request to form the 3D object from a specific material or group of materials (e.g., a material as described herein). In some cases, the design may not contain auxiliary features (or marks of any past presence of auxiliary support features).

In response to the customer request, the 3D object can be formed or generated as described herein. In some cases, the 3D object can be formed by an additive 3D printing process (e.g., additive manufacturing). Additively generating the 3D object can comprise successively depositing and transforming (e.g., melting) a pre-transformed material comprising one or more materials as specified by the customer. The 3D object can be subsequently delivered to the customer. The 3D object can be formed without generation or removal of auxiliary features (e.g., that is indicative of a presence or removal of the auxiliary support feature). Auxiliary features can be support features that prevent a 3D object from shifting, deforming or moving dating the formation of the 3D object.

The 3D object (e.g., solidified material) that is generated for the customer can have an average deviation value from the intended dimensions (e.g., specified by the customer, or designated according to a model of the 3D object) of at most about 0.5 microns (μm), 1 μm, 3 μm, 10 μm, 30 μm, 100 μm, 300 μm, or less. The deviation can be any value between the aforementioned values (e.g., from about 0.5 μm to about 300 μm, from about 10 μm to about 50 μm, from about 15 μm to about 85 μm, from about 5 μm to about 45 μm, or from about 15 μm to about 35 μm). The 3D object can have a deviation from the intended dimensions in a specific direction, according to the formula $D_v \div L/K_{Dv}$, wherein Dv is a deviation value, L is the length of the 3D object in a specific direction, and $K_{Dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, or 300 μm. Dv can have any value between the aforementioned values (e.g., from about 0.5 μm to about 300 μm, from about 10 μm to about 50 μm, from about 15 μm to about 85 μm, from about 5 μm to about 45 μm, or from about 15 μm to about 35 μm). $K_{DB}$ can have a value of at most about 3000, 2500, 2000, 1500, 1000, or 500. $K_{DV}$ can have a value of at least about 500, 1000, 1500, 2000, 2500, or 3000 $k_{DV}$ can have any value between the aforementioned values (e.g., from about 3000 to about 500, from about 1000 to about 2500, from about 500 to about 2000, from about 1000 to about 3000, or from about 1000 to about 2500).

The intended dimensions can be derived from a model design. The 3D part can have the stated accuracy value immediately after its formation, without additional processing or manipulation. Receiving the order for the object, formation of the object, and delivery of the object to the customer can take at most about 7 days, 6 days, 5 days, 3 days, 2 days, 1 day, 12 hours, 6 hours, 5 hours, 4 hours, 3 hours, 2 hours, 1 hour, 30 min, 20 min, 10 min, 5 min, 1 min, 30 seconds, or 10 seconds. Receiving the order for the object, formation of the object, and delivery of the object to the customer can take a period of time between any of the aforementioned time periods (e.g., from about 10 seconds to about 7 days, from about 10 seconds to about 12 hours, from about 12 hours to about 7 days, or from about 12 hours to about 10 minutes). In some cases, the 3D object can be generated in a period between any of the aforementioned time periods (e.g., from about 10 seconds to about 7 days, from about 10 seconds to about 12 hours, from about 12 hours to about 7 days, or from about 12 hours to about 10 minutes). The time can vary based on the physical characteristics of the object, including the size and/or complexity of the object.

In some embodiments, the system and/or apparatus comprises a controlling mechanism (e.g., a controller). The methods, systems, apparatuses, and/or software disclosed herein may incorporate a controller that controls one or more of the components described herein. The controller may comprise a computer-processing unit (e.g., a computer) coupled to any of the systems and/or apparatuses, or their respective components (e.g., the energy source(s)). Alternatively, or additionally, the systems and/or apparatuses disclosed herein may be coupled to a processing unit. Alternatively, or additionally, the methods may incorporate the operation of a processing unit. The computer can be operatively coupled through a wired and/or through a wireless connection. In some cases, the computer can be on board a user device. A user device can be a laptop computer, desktop computer, tablet, smartphone, or another computing device. The controller can be in communication with a cloud computer system and/or a server. The controller can be programmed to selectively direct the energy source(s) to apply energy to the at least a portion of the target surface at a power per unit area. The controller can be in communication with the scanner configured to articulate the energy source(s) to apply energy to at least a portion of the target surface at a power per unit area.

At times, the controller controls the layer dispensing mechanism and/or any of its components. The controller may control the platform. The controller may control the one or more sensors. The controller may control any of the components of the 3D printing system and/or apparatus. The controller may control any of the mechanisms used to effectuate the methods described herein. The control may comprise controlling (e.g., directing and/or regulating) the speed (velocity) of movement of any of the 3D printing mechanisms and/or components. The movement may be horizontal, vertical, and/or in an angle (planar and/or compound). The controller may control at least one characteristic of the transforming energy beam. The controller may control the movement of the transforming energy beam (e.g., according to a path). The controller may control the source of the (transforming) energy beam. The energy beam (e.g., transforming energy beam, or sensing energy beam) may travel through an optical setup. The optical setup may comprise a mirror, a lens, a focusing device, a prism, or an optical window.

At times, the controller controls the level of pressure (e.g., vacuum, ambient, or positive pressure) in the powder removal mechanism powder dispensing mechanism, and/or the enclosure (e.g., chamber). The pressure level (e.g., vacuum, ambient, or positive pressure) may be constant or varied. The pressure level may be turned on and off manually and/or by the controller. The controller may control at least one characteristic and/or component of the layer dispensing mechanism. For example, the controller may control the direction and/or rate of movement of the layer dispensing mechanism and any of its components. The controller may control the cooling member (e.g., external, and/or internal). The movement of the layer dispensing mechanism or any of its components may be predetermined. The movement of the layer dispensing mechanism or any of its components may be according to an algorithm. Other control examples can be found in U.S. provisional patent application No. 62/265,817,U.S. patent application Ser. No. 15/374,318,or PCT patent application number PCT/US15/36802,each of which is incorporated herein by reference in its entirety where non-contradictory. The control may be manual and/or automatic. The control may be programmed and/or be effectuated a whim. The control may be according to an algorithm. The algorithm may comprise a printing algorithm, or motion control algorithm. The algorithm may consider the model of the 3D object.

In some embodiments, properties (e.g., density and/or surface roughness) of a hardened material formed from a first transformation operation (e.g., an STO or PMX process) can be modified by implementing a second transformation operation performed of that hardened material. The second transformation operation (e.g., process) can transform one layer of hardened material at a time, or transform a plurality of layers hardened material, e.g., depending on how deep the second transformation can penetrate and transform (e.g., remelt) the material. The penetration of the second transformation across one or more layers of hardened material may depend on the power density of the energy beam, and/or the material properties (e.g., heat conductivity) of the hardened material. In some examples, a HARMP process can be used to transform a depth of hardened material. The depth may correspond to the depth the generated HARMP melt pool. The HARMP formed melt pool may be (e.g., substantially) devoid of (e.g., detectable) pores. In some embodiments, a HARMP process is implemented on a hardened material that is generated by a 3D process or by a different methodology (e.g., that has a thickens of at least about 100 µm-1000 µm). The different methodology may comprise casting, molting, or welding. In some embodiments, the HARMP process is a second transformation operation. The HARMP process can be implemented on about 10-15 layers (e.g., about 500-1000 µm) of hardened material (e.g., generated from a first transformation process of a 3D printing, e.g., as described herein). In some embodiments, the second transformation operation transforms at least about 2, 3, 4, 5, 6, 7, 8, 9, 10, 11, 12, 13, 14, 15, 16, 18, 19,or 20 layers of hardened material (e.g., that are generated by a first transformation operation of a 3D printing process). The second transformation operation may transform a number of layers between any of the afore-mentioned number of layers of hardened material (e.g., from about 2 to about 15 layers, from about 2 layers to about 10 layers, or from about 10 layers to about 20 layers of hardened material), in some embodiments, the second transformation operation transforms a hardened material having vertical height of at least 100 micrometers (µm), 200 µm, 300 µm, 400 µm, 500 µm, 600 µm, 700 µm, 800 µm, 900 µm, or 1000 µm of hardened material (e.g., that are generated by the first transformation operation). The second transformation operation can transform a vertical height of hardened material layers between any of the afore-mentioned values (e.g., from about 100 µm to about 1000 µm, from about 100 µm to about 500 µm, or from about 500 µm to about 1000 µm a vertical height of hardened material). The aspect ratio of the melt pool of the second transformation process (e.g., HARMP) can by any of the high aspect ratio melt pool values described herein. The hardened material that is submitted for second transformation can have a lower density than the hardened material that results from the second transformation. The hardened material that is submitted for the second transformation operation can have any of the density values described herein for the first density. For example, a maximum density value range spanning from about 60% to about 80% (v/v, or area/area porosity, e.g., of a cross-section plane of maximum porosity). The hardened material that is generated after the second transformation operation can have any of the density values described herein for the denser structure of for the second density. For example, the hardened material that underwent the second transformation operation can be at least 99.5% or 99.9% dense v/v, or area/area porosity, e.g., of a cross-section plane of maximum porosity).

FIG. 34A shows an example of a vertical cross-sectional image of a hardened material portion as part of a 3D object formed using a first transformation operation, in accordance with some embodiments (e.g., using the STO methodology to form each layer), indicating a plurality of pores. FIG. 34B shows an example of a vertical cross-sectional image of a hardened material portion as part of a 3D object formed using a first transformation operation followed by a second transformation operation, in accordance with some embodiments (e.g., wherein each layer was formed using the STO methodology followed by using a HARMP methodology), indicating an absence of pores. In the examples shown in each of FIGS. 34A and 34B, the hardened material has a thickness of about 600 µm. As shown in the example of FIG. 34A, pores (e.g., 3400) form within the hardened material. In some cases, the pores have diameters ranging between about 20 to about 200 µm. The pores can have a random or (e.g., substantially) ellipsoidal shape, e.g., globular shape. Note that in the example shown in FIG. 34A, the melt pool edges (e.g., 3402) are detectable, as well as the exposed surface 3404 (e.g., outer surface) of the hardened material. After the second transformation operation, the hardened material can have substantially no (e.g., detectable) pores, e.g., pores that are greater than about 20 µm. FIG. 34B shows high aspect ratio melt pool (HARMP) having edges (e.g., 3406) as part of the hardened material having an exposed surface 3408. FIG. 35A shows an example of a horizontal X-ray image of a hardened material of a 3D object 3500 formed using a first transformation operation, in accordance with some embodiments (e.g., using the STO) mythology to form each layer), indicating a plurality of pores depicted as bright dots (e.g., 3502). The 3D object shown in FIG. 35A comprises an auxiliary support structure portion 3509 and a sloping ledge portion 3510. FIG. 35B shows an example of a horizontal X-ray image of a hardened material portion as part of a 3D object formed using a first transformation operation followed by a second transformation operation, in accordance with some embodiments (e.g., wherein each layer was formed using the STO mythology followed by using a HARMP methodology), indicating an absence of detectable pores. The 3D object 3503 shown in FIG. 35C comprises an auxiliary support structure portion 3505 and a sloping ledge portion 3507. In the X-ray images shown in FIGS 35A and 35C, the darker gray shaded areas (e.g., 3504) represent denser material portions than the lighter areas (e.g., 3502, pointing to a pore).

In some embodiments, the second transformation operation can modify the surface texture and/or roughness of a hardened material. FIG. 35B shows an example of a topological top view image of a hardened material of a 3D object 3506 formed using a first transformation operation, in accordance with some embodiments (e.g., using the STO mythology to form each layer), indicating an oscillating exposed surface structure. The top view image of the hardened material 3506 shown in FIG. 35B corresponds to a fraction of the ledge portion 3510 shown as an X-ray image in. FIG. 35A. FIG. 35D shows an example of a topological top view image of a hardened material portion as part of a 3D object formed using a first transformation operation followed by a second transformation operation, in accordance with some embodiments (e.g., wherein each layer was formed using the STO mythology followed by using a HARMP methodology), indicating smoother surface as compared to the one shown in FIG. 35B. The topological top view image of the hardened material 3508 shown in FIG. 35D corresponds to a fraction of the ledge portion 3507 shown as an X-ray image in FIG. 35C. In the topological images shown in FIGS. 35B and 35D, the gray scale represents height variations. In the example shown in FIG. 35B, a roughness of the exposed surface 3506 is measured and indicated in terms of average Sa value (the arithmetic average of the roughness profile extended to a surface) of about 18 μm. In FIG. 35D, the exposed surface has a reduced surface roughness that is measured and indicated in terms of an Sa of about 17 μm.

In some embodiments, the second transformation is repeated in a plurality of 3D printing cycles with (i) reproducible, (ii) consistent, and/or (iii) homogenous results, e.g., in terns of deviation from a request shape of the 3D object, material properties (e.g., density, and/or strength), and exposed surface roughness, or any combination thereof. The strength can be tensile strength. In some embodiments, a plurality of 3D printing cycles generates 3D objects that have (i) reproducible. (ii) consistent, and/or (iii) homogenous properties, e.g., in terms of deviation from a request shape of the 3D object, material properties (e.g., density, and/or strength), exposed surface roughness, or any combination thereof. The strength can be tensile strength. In some embodiments, the plurality of 3D printing cycles (e.g., using the second transformation) can generate (e.g., substantially) the same 3D object properties in at least 5, 10, 25,or 50 separately printed parts (e.g., printed in separate print cycles), which properties comprise (I) deviation from a request shape of the 3D object, (II) material properties (e.g., density, and/or strength), or (III) exposed surface roughness. In some pails, the second transformation can be used on an extended ledge, cavity ceiling, undercut, and/or structure (or a portion thereof) that is not anchored to a base. For example, the one or more layers of hardened material can be part of a horizontal non-overlapping portion of the part (e.g., such as portions of an extended ledge. See FIG. 30B, a non-overlapping portion of the second bottom skin layer 3020). Such structures can be constrained structures (e.g., having a bottom skin layer). The second transformation operation can be performed to further densify the hardened material without, for example, deforming (e.g., via roughening and/or warping) portions (e.g., bottom skins) of the ledge, ceiling, undercut, and/or non-anchored structure. In some embodiments, the second transformation comprises a STO tiling process. In some embodiments, the second transformation comprises a HARMP process.

In some aspects, further densifying the hardened material (e.g., in situ and/or in real time) includes (i) using a first transformation operation to form a first hardened material having one or more layers that comprise pores (e.g., at most about 70%, 80%, or 90% dense (v/v, or area/area porosity, e.g., of a cross-section plane of maximum porosity)), (ii) optionally placing a pre-transformed material (e.g., powder) layer on the first hardened material, and (iii) using a second transformation operation to apply energy to the first hardened material (and optionally simultaneously transform the pre-transformed material layer to a transformed material) to form a second hardened material that has a higher density (e.g., at least about 95% or 99.9% dense (v/v, or area/area porosity, e.g., of a cross-section plane of maximum porosity)) and/or lower surface roughness (e.g., Ra of at most 20 μm or 40 μm) as compared to the first hardened material. In some embodiments, the added pre-transformed material (e.g., powder) layer in (ii) can be used to compensate for a volume contraction during the transformation process (e.g., due to elimination of pores). In some cases, the added pre-transformed material layer is utilized to increase a volume (e.g., height) of the first hardened material when generating the second hardened material. In some embodiments, the added pre-transformed material layer in (ii) can be used to increase the volume (e.g., height) of the second hardened material as compared to the first hardened material. In some cases, the first transformation operation transforms the pre-transformed to form a low-density level of hardened material (e.g., powder) (e.g., a density from about 30% to about 60% density) to a moderate density level of hardened material (e.g., a density from about 70% to about 90% density). The second transformation operation may density one or more layers of the moderate density material to a highly (e.g., fully) dense material (e.g., having a density of at least 95%). The density percentages are calculated v/v, or area/area porosity, e.g., of a cross-section plane of maximum porosity. In some cases, at least a portion of the 3D object is gradually densified. For example, the at least a portion of the 3D object is generated as a low density hardened material, which is subsequently densified to a high density hardened material. For example, the at least a portion of the 3D object is generated as an intermediate density hardened material, which is subsequently densified to a high density hardened material. In some cases, at least a portion of the 3D object is gradually densified. For example, the at least a portion of the 3D object is generated as a low density hardened material, which is subsequently densified to an intermediate density hardened material, which is subsequently densified to a high density hardened material. Gradually densifying the 3D object (e.g., in a plurality of transformation operations) to form a fully dense material can facilitate generation of the requested complex 3D object (e.g., comprising extended ledges, cavity ceilings, undercut geometries) with minimal post processing procedures (e.g., or lack thereof). For example, the complex 3D object (or complex portions thereof) may be generated (i) without being anchored (e.g., to the base), and/or (ii) with low degree of dimensional deviation from the requested 3D object (or lack thereof), e.g., with negligible deformation (or lack thereof). In some cases, the second transformation can be implemented through a depth spanning a plurality of layers of hardened material (e.g., and optionally one or more layer of pre-transformed material). In some applications, the fully dense hardened material bottom skin layer is capable of supporting formation of an additional structure that is (i) heavier than the bottom skin layer, (ii) more voluminous than the bottom skin layer, and/or (iii) denser than the bottom skin layer. The additional structure may comprise core or PMX.

Figure 43A:
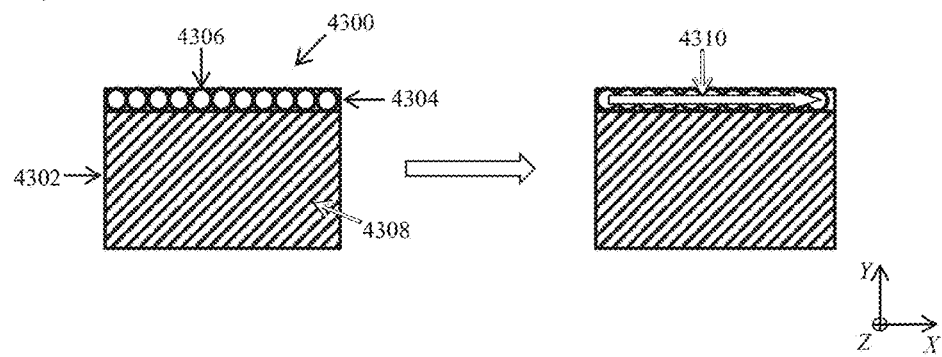
FIGS. 43A-43C schematically illustrate operations in forming 3D objects.
Figure 43B:
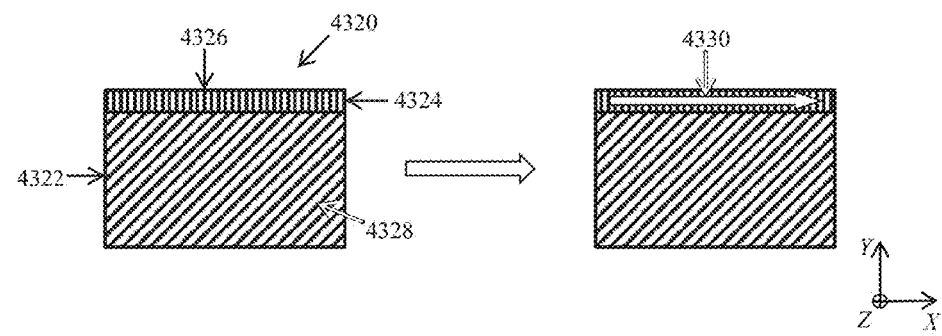
Figure 43C:
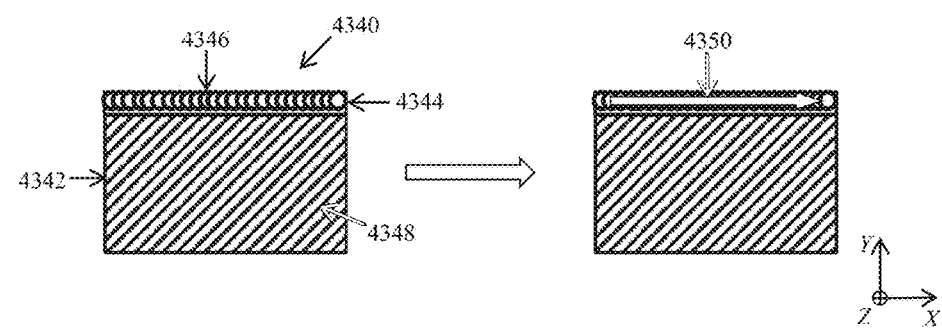

In some embodiments, the 3D process comprises a plurality of transformation methodologies (e.g., processes). The various transformation processes described herein can be used in any combination suitable for accomplishing particular application requirements. For instance, in some embodiments, a HARMP process is used in or after a multi-transformation operation (MTO). In some embodiments, the HARMP process is used to transform an overhang structure of a 3D object. FIGS. 43A-43C show top views of example layers of 3D objects having overhang structures undergoing MTO processes that include HARMP. FIG. 43A shows horizontal (e.g., top or bottom views) examples of a layer 4300 having a core portion 4302 and an overhang portion 4304. The core (e.g., rigid) portion can be formed using a hatching process, thereby forming multiple hatches (e.g., 4308). During a first transformation operation, the overhang portion can be formed using a tiling process to form (e.g., substantially) overlapping or non-overlapping adjacent tiles (e.g., 4306). The tiles may be formed successively. The successive tiles may be adjacent tiles. The tiles can be formed using any tiling process described herein. In some embodiments, (successive and) adjacent tiles are in contact with each other. In some embodiments, (successive and) adjacent tiles do not (e.g., substantially) contact each other. A second transformation operation (e.g., indicated by arrow 4310) can be used to re-transform (e.g., re-melt) at least a portion of the tiles (e.g., 4306 depicting a tile). In some embodiments, the second transformation operation comprises a HARMP operation, a hatch operation, or a second tiling operation (e.g., along the direction of arrow 4310). The second transformation operation can be applied on the entire layer of hardened material, or on a portion thereof (e.g., the overhang portion, e.g., 4310, 4330, or 4350). The second transformation operation may facilitate altering the microstructure of the secondly transformed portion. Altering may comprise altering: a grain (e.g., crystal) structure, percentage of porosity, hardness, metallurgical microstructure, melt pool size direction and/or aspect ratio, direction of epitaxial growth of the grain (e.g., crystal), or surface roughness. In some embodiments, the second transformation operation decreases a porosity and/or a surface roughness of the overhang portion (e.g., 4304) formed during the first transformation. FIG. 43B shows a layer 4320 having a core portion 4322 and an overhang portion 4324. The core portion can be formed using a hatching process, thereby forming multiple hatches (e.g., 4328). During a first transformation operation, the overhang portion (e.g., 4324) can be formed using a hatching process to form overhang hatches (e.g., 4326). The overhang hatches can be formed using any hatching process. A second transformation operation (e.g., indicated by arrow 4330) can be used to re-transform (e.g., re-melt) at least a portion of the overhang hatches (e.g., 4326). The second transformation operation can use the same or a different type of transformation operation. For example, the first and second transformation can use hatching. For example, the first transformation may use hatching, and the second transformation may use tiling. For example, the first transformation may use tiling and the second transformation may use HARMP. In some embodiments, the second transformation operation decreases a porosity and/or a surface roughness of the overhang portion (e.g., 4324) formed from the first transformation. FIG. 43C shows a layer 4340 having a core portion 4342 and an overhang portion 4344. The core portion can be formed using a hatching process, thereby forming multiple hatches (e.g., 4348). During a first transformation operation, the overhang portion (e.g., 4344) can be formed using a tiling process to form overlapping tiles (e.g., 4346) (also referred to as a "densely tiled" region). The tiles can be formed using any tiling process described herein. In some embodiments, at least some of the adjacent tiles (e.g., substantially) completely overlap with each other. A second transformation operation (e.g., indicated by arrow 4350) can be used to re-transform (e.g., re-melt) at least a portion of the tiles (e.g., 4346).

Figure 44A:
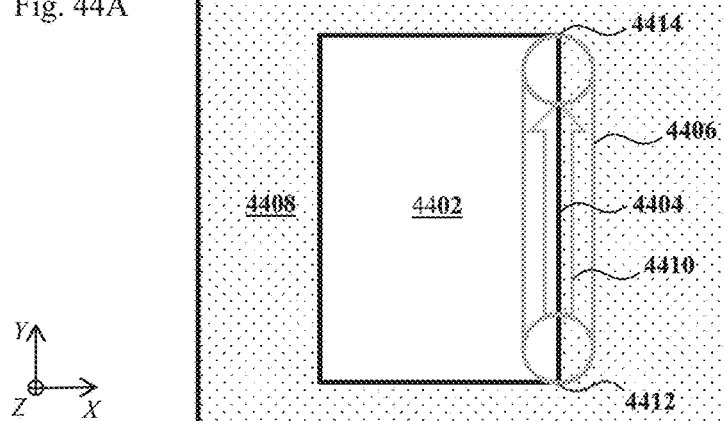
FIGS. 44A-44C schematically illustrate operations in forming 3D objects.
Figure 44B:
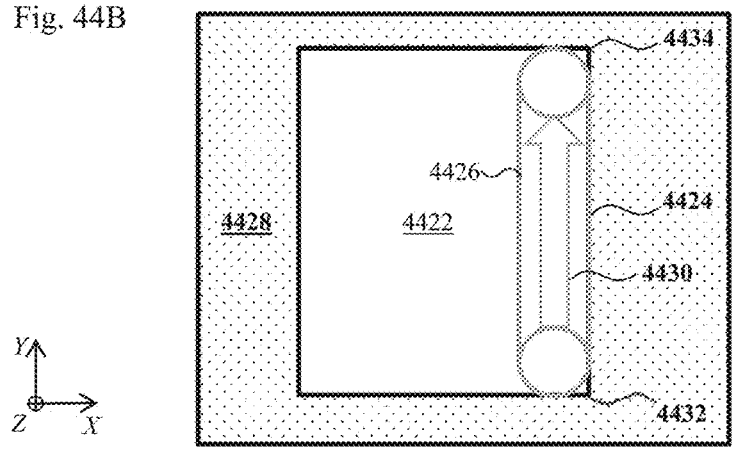
Figure 44C:
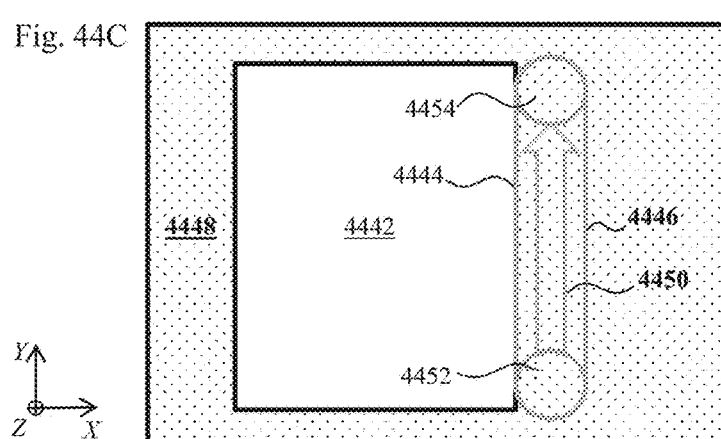

An overhang can be formed in a way that connects the overhang to an edge of a previously transformed (e.g., hardened) segment of the 3D object. The transformation can comprise moving (e.g., scanning) the energy beam along the edge. The transformation can comprise moving (e.g., scanning) the energy beam at an angle with respect to the edge (e.g., 45 degrees or 90 degrees with respect to the edge). The energy beam (e.g., a center of the energy beam) can be on or sufficiently proximate to the edge to re-transform at least a portion of the previously transformed (e.g., hardened) segment of the 3D object at or immediately adjacent to the previously formed edge as part of a previously formed layer of hardened material. The transformation can include any type of transformation process described herein (e.g., tiling, hatching, type-1 energy beam, type-2 energy beam, PMX, MTO and/or STO). The FIGS. 44A-44C show top views of example layers of 3D objects undergoing various transformation processes for forming overhang structures. FIG. 44A shows an example of a previously transformed (e.g., hardened) segment 4402 of a 3D object having an edge 4404 undergoing a transformation (e.g., printing) operation for forming an overhang. During the transformation operation, at least a portion of the energy beam may be directed at the edge (e.g., 4404) and on a pre-transformed material (e.g., that is a part of a material bed, e.g., 4408). In some embodiments, the previously transformed segment (e.g., 4402) is covered by one or more layers of pre-transformed material during the transformation. In some embodiments, the previously transformed segment (e.g., 4402) is exposed (e.g., not covered by one or more layers of pre-transformed material) during the transformation. The energy beam can be scanned along the edge in accordance with a path (e.g., 4406). The energy beam may transform the pre-transformed material and m-transform at least a portion of the previously transformed segment in accordance with the path. The path may be in a direction (e.g., 4410) along the edge (e.g., 4404). The path may be from a first location (e.g., 4412) to a second location (e.g., 4414) along the edge (e.g., 4404). FIG. 44B shows an example of a previously transformed (e.g., hardened) segment 4422 of a 3D object having an edge 4424 undergoing a transformation (e.g., printing) operation for forming an overhang, a first location of the energy beam 4432, a collective direction of energy beam translation 4430 along a path 4426, a second (e.g., end) location of the energy beam 4434, and a material bed 4428. FIG. 44C shows an example of a previously transformed (e.g., hardened) segment 4442 of a 3D object having an edge 4444 undergoing a transformation (e.g., printing) operation for forming an overhang, a first location of the energy beam 4452, a collective direction of energy beam translation 4450 along a path 4444, a second (e.g., end) location of the energy beam 4454, and a material bed 4448. In some embodiments, the 3D object is not formed in a material bed, and 4408, 4428, and 4448 may represent a platform. The scanning trajectory of the energy beam may traverse parallel to the edge (e.g., 4404). The scanning trajectory may be composed of a plurality of tiles (e.g., formed by a step and repeat, or stamping operation) that collectively traverse (e.g., ran, e.g., 4410) parallel to the edge, e.g., the path of tiles may traverse along the edge. The scanning trajectory may be composed of a plurality of smaller trajectories (e.g., hatches) each of which forming an angle with the edge, and collectively traverse (e.g., run) parallel to the edge, e.g., the path of hatches may traverse along the edge.

Figure 45:
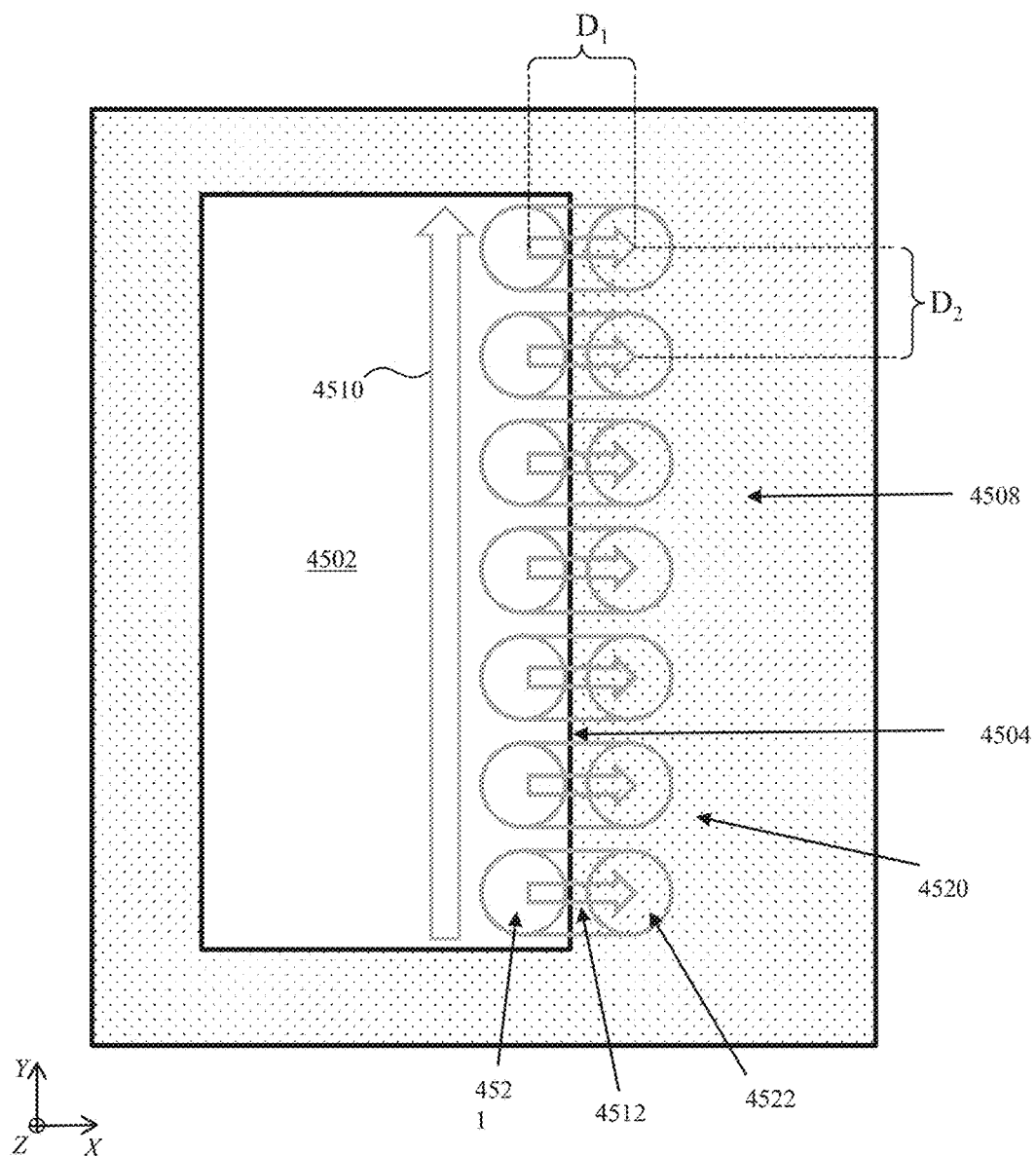
FIG. 45 schematically illustrate operations in forming a 3D object.
Figure 46A:
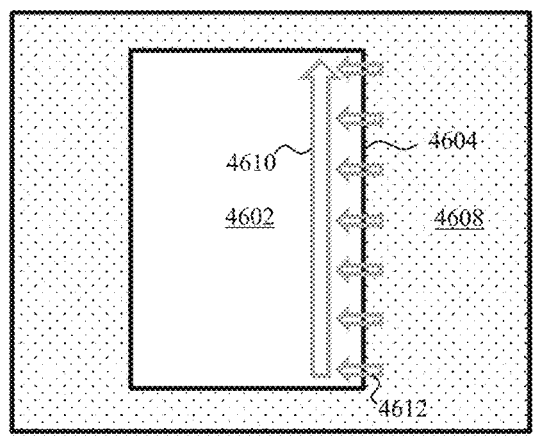
FIGS. 46A-46C schematically illustrate operations in forming 3D objects.
Figure 46B:
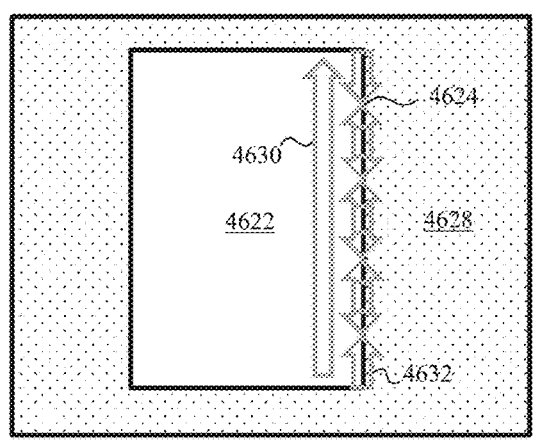
Figure 46C:
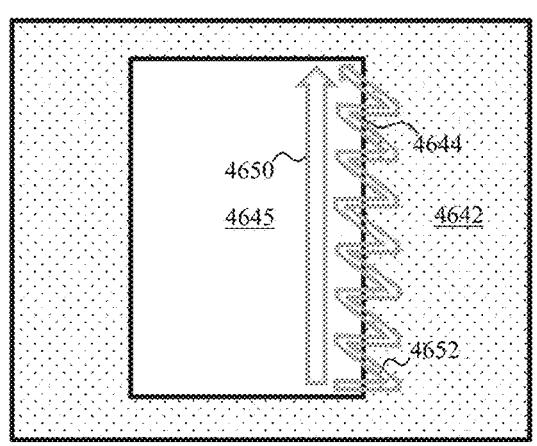

In some embodiments, the overhang is formed by moving the energy beam in a direction that is different than the direction of the overall progression along the path for at least part of a transformation process (e.g., forming path segments). FIG. 45 shows an example of a top view of a previously transformed (e.g., hardened) segment 4502 of a 3D object having an edge 4504 undergoing a transformation (e.g., printing) operation for forming an overhang. The overall path (e.g., trajectory) of the energy beam may be in accordance with a first direction (e.g., 4510) along the edge (e.g., 4504). At least part of the path (also referred to herein as a sub-path) can include directing the energy beam in a second direction (e.g., 4512) that is non-parallel with the first direction to form path segments (e.g., 4520). In some embodiments, the second direction is (e.g., substantially)

orthogonal to the first direction. In some embodiments, the second direction (e.g., substantially) forms an acute or obtuse angle with the first direction. In some embodiments, the second direction is from the previously transformed segment (e.g., 4502) toward the edge (e.g., 4504), to the edge, passed the edge and/or to the pre-transformed material (e.g., powder), e.g., of the material bed (e.g., 4508). The distance (e.g., $D_1$) that the energy beam travels in the second direction (e.g., 4512) and the distance (e.g., $D_2$) between the sub-paths can vary. The distances $D_1$ and $D_2$ can be measured from centers of the energy beam footprint (e.g., irradiation spot) at the target surface. In some embodiments, the distance (e.g., $D_1$) traveled by the energy beam in the second direction and/or the distance (e.g., $D_2$) between sub-paths is less than an FLS (e.g., beam diameter) of the energy beam. D1 may be a shortest distance between a start position (e.g., 4521) and finish position (E.g., 4522) of the path segment. In some embodiments, the distance (e.g., $D_1$) traveled by the energy beam in the second direction and/or the distance (e.g., $D_2$) between sub-paths is (e.g., substantially) equal to or greater than an FLS (e.g., beam diameter) of the energy beam. In some embodiments, the distance (e.g., $D_1$) traveled by the energy beam in the second direction is at least about 10 micrometers (μm), 20 μm, 30 μm, 40 μm, 50 μm, 60 μm, 70 μm, 80 μm, 90 μm, 100 μm, 150 μm, 200 μm, 250 μm, 300 μm, 400 μm, or 500 μm. The distance the distance (e.g., $D_1$) traveled by the energy beam in the second direction can range between any of the aforementioned values (e.g., from about 10 μm to about 500 μm, from about 10 μm to about 100 μm, from about 100 μm to about 500 μm, or from about 50 μm to about 200 μm). In some embodiments, the distance (e.g., $D_2$) between sub-paths is at least about 10 μm, 20 μm, 30 μm, 40 μm, 50 μm, 60 μm, 70 μm, 80 μm, 90 μm, 100 μm, 150 μm, 200 μm, 250 μm, 300 μm, 400 μm, 500 μm, 600 μm, 700 μm, 800 μm, 900 μm, or 1000 μm. The distance (e.g., $D_2$) between sub-paths can range between any of the afore-mentioned values (e.g., from about 10 μm to about 1000 μm, from about 10 μm to about 300 μm, from about 300 μm to about 1000 μm, or from about 20 μm to about 250 μm). The direction of the sub-path (e.g., path sections or path segments) may be in any direction relative to the edge. FIGS. 46A-46C show top view examples of 3D objects undergoing transformation operations for forming overhangs. FIG. 46A shows a previously transformed (e.g., hardened) segment 4602 having an edge 4604 undergoing a transformation operation for forming an overhang. The path of the energy beam may be in accordance with a first direction (e.g., 4610) along the edge (e.g., 4604). A sub-path of the energy beam can be in a second direction (e.g., 4612) that is non-parallel with the first direction. The second direction can be from the pre-transformed material (e.g., powder) of the material bed (e.g., 4608) toward the edge (e.g., 4604) and/or the previously transformed segment (e.g., 4602). FIG. 46B shows a previously transformed (e.g., hardened) segment 4622 in a material bed 4628 and having an edge 4624 undergoing a transformation operation for forming an overhang. The path of the energy beam may be in accordance with a first direction (e.g., 4630) along the edge (e.g., 4624). A sub-path of the energy beam can be in a second direction (e.g., 4632) that is (e.g., substantially) parallel with the first direction. In some cases, the second direction of at least one of the sub-paths is (e.g., substantially) the same as the first direction. In some cases, the second direction of at least one of the sub-paths is (e.g., substantially) opposite the first direction. FIG. 46C shows a previously transformed (e.g., hardened) segment 4645 in a material bed 4642 and having an edge 4644 undergoing a transformation operation for forming an overhang. The path of the energy beam may be in accordance with a first direction (e.g., 4650) along the edge (e.g., 4644). In some cases, a second direction of at least one of the sub-paths is non-parallel and non-orthogonal to the first direction. In some cases, the sub-path is a zig-zag, serpentine, cross-over shape. In some, embodiments, the sub-path has a shape in accordance with one or more of the paths, e.g., 310-316 of FIG. 3.

Once an object is removed from a printer, the object may include identifying one or more characteristics that indicate the orientation of the object dining its formation in the printer. For example, the object may include features (e, g., transition lines, surface steps, melt pools and/or grain boundaries) that indicate one or more (e.g., average) layering planes. In some cases, the object includes features related to the support member(s) (e.g., FIG. 41A, 4101; or FIG. 41B, 4121) that may or may not anchor the object to the platform (e.g., base) during its printing. The support member (s) may be (e.g., chemically and/or physically) bonded with the object and/or platform (e.g., base) during printing. FIG. 51A shows an example of a vertical cross section of a 3D object that includes a main portion 5100 coupled with a support member 5103. The main portion (can include multiple layers (e.g., 5101 and 5102) that were sequentially added during a printing operation. The support member (e.g., auxiliary support) may be printed or may be the platform (e.g., base) itself In some embodiments, the portion of the requested 3D object comprises (e.g., substantially) the same material as the support member. In some embodiments, the portion of the requested object comprises different material than the support member. Some or (e.g., substantially) all the support members may be removed from the main portion (e.g., after the printing is complete). In some cases, the support member causes one or more layers of the portion of the requested object to deform during printing (e.g., due to the presence of the support member during formation of the requested 3D object). Sometimes, the deformed layers comprise a visible mark. The mark may be a region of discontinuity in the layer, such as a microstructure discontinuity and/or an abrupt microstructural variation. The discontinuity in the microstructure may be explained by an inclusion of a foreign object (e.g., the support member). The microstructural variation may include (e.g., abruptly) altered melt pools and/or grain structure (e.g., crystals, e.g., dendrites) at or near the attachment point of the support member. The microstructure variation may be due to differential thermal gradients due to the presence of the support member. The discontinuity may be external at the surface of the 3D object. The discontinuity may arise flora inclusion of the support member to the surface of the 3D object (e.g. and may be visible as a breakage of the support member when at attempt is made to remove the support member after the printing). Breakage may be the result of cutting, shaving, chipping, sawing, polishing, sanding, or any combination thereof (e.g., to remove the support member from the main portion). In some instances, the object includes two or more support members and/or support marks. The two or more support members and/or support marks can be used to define a build plane that is (e.g., substantially) parallel to the platform surface during printing. In some embodiments, the build plane is (e.g., substantially) parallel to the (e.g., average) layering plane.

In some embodiments, the process used for printing at least a portion of the 3D object leaves one or more surface marks. The surface mark(s) may comprise (i) a surface marking characteristic of a top surface, (ii) a surface marking characteristic of a top surface, or (iii) a surface marking characteristic of a side surface. The characteristic may comprise a roughness, material deposition trajectory pattern, tessellation pattern, or auxiliary support(s) or mark(s) indicative thereof.

For example, a way of determining an orientation of an object during printing relates to surface roughness of the 3D object. The surface roughness may be an indication of the type of printing process (e.g., hatching, tiling, HARMP, MTO, PMX, and/or STO) used to form a region of the object. For example, a bottom skin of an overhang (e.g., FIG. 41A, 4102; or FIG. 41B, 4122) may have a different surface roughness than a skin along a non-overhang portion of an object. In some cases, the bottom skin (e.g., as oriented during the printing) has a higher surface roughness than other skin regions of the object. In some cases, the top skin (e.g., as oriented during the printing) has a lower surface roughness than other skin regions of the object. Thus, the differing surface roughness can indicate the orientation of the object with respect to a support member (e.g., FIG. 41A, 4101; or FIG. 41B, 4121), the platform surface and/or the (e.g., average) layering plane, during the printing of the object.

For example, a way of determining orientation of an object during printing relates to the energy beam path (e.g., as instructed by the controller(s)). For example, a change in a direction of a hatching path may result in a corresponding change in the orientation of the hatch(es) in or on the object. In some cases, the hatches are in a pattern (e.g., a checker board and/or stripe pattern) which may be visible by eye or using imaging techniques (e.g., microscope). In some instances, the object includes lines corresponding to borders between tessellations (which may correspond to geometric shapes used in computer modeling of the object and translated to the printing instruction of the object). Such patterns and/or tessellations may indicate the orientation of the layers of the object.

In some cases, a 3D object includes one or more features that may be indicative of the process(es) used to form the 3D object. The features may be microstructure features, which are very small features (e.g., as revealed by imaging techniques such as various microscopies, e.g., as disclosed herein). In some cases, the microstructure features influence and/or dictate physical properties of the 3D object, such as strength, toughness, ductility, hardness, corrosion resistance, thermal conductivity and/or wear resistance. The microstructure features may include melt pools, metallurgical microstructures, grain (e.g., crystal) structures and/or material phases. metallurgical microstructures can comprise cells or dendrites. The shape, size and/or orientation of the microstructure features may be influenced by and/or indicative of the transformation (e.g., melting) process. For example, the size and/or shape of a melt pool may at least partially depend on the power density and/or dwell time of the energy beam at the target surface. The grain (e.g., crystal) structure, material phase, and/or metallurgical microstructure can at least partially depend on the solidification and/or cooling dynamics associated with the transformation process. For example, the type, size, shape and/or orientation of the microstructures may be influenced by thermal gradients in the molten material and/or the rate in which the molten material cools. In some cases, different process conditions (e.g., energy beam power and/or dwell time) result in different microstructures. For instance, in some cases using a type-2 (tiling) energy beam having a lower power density (e.g., and irradiating for a longer amount of time) at a location may result in microstructures associated with slower cooling compared to microstructures resulting from using a type-1 (hatching) energy beam having a higher power density (e.g., and irradiating for a shorter amount of time) at a location. In some cases, a slower hardening rate (e.g., solidification rate, e.g., associated with a cooling rate) is associated with larger and/or more defined microstructure (e.g., larger crystals (e.g., dendrites)). The cooling rate may correspond to a hardening rate of the hardened material. In some cases, a slower cooling rate promotes formation of one alloy type and/or grain (e.g., crystal) structure rather than another formed by relatively quicker cooling. In some cases, the transformation process causes nonequilibrium hardening (e.g., solidification) of the transformed (e.g., molten) material. The nonequilibrium hardening may result in formation of a nonequilibrium phase in the hardened material (e.g., that is typical for the material that is being transformed and/or hardened).

In some cases, the microstructure features are arranged with respect to the orientation of the layers of the 3D object. For example, the microstructure features may be oriented with respect to a (e.g., average) layering plane of the 3D object. FIG. 49 shows an example of a vertical section view of a portion of a 3D object 4900, including an exterior surface 4901 of the object. The 3D object can include a plurality of layers (e.g., 4903 or 4905) of hardened material that are sequentially stacked. The stacked layers can be bound together to form a shape of the 3D object. At least one of the layers can define a (e.g., average) layering plane (e.g., 4914), which can indicate the orientation of the object with respect to the build platform on which the object was formed. The layering plane may be formed during the printing of the object due to layerwise deposition of material to generate the object. In some cases, the (e.g., average) layering plane can be defined by a boundary between two adjacent layers. The layering plane can be (e.g., substantially) parallel to the (e.g., top) surface of the build platform, the exposed surface of a material bed (when present), and/or a normal to the direction of the gravitational field. The 3D object can include melt pools (e.g., 4906, 4908, or 4909). In some embodiments, at least a portion of the melt pools in different layers are (e.g., substantially) aligned with respect to an alignment line (e.g., 4912). The alignment line can be part of a plane. The alignment line may be parallel to the surface of the 3D object. The surface may be planar or non-planar. The line may be straight or comprise a curvature. The surface can be non-planar Aligned melt pools in different layers can be referred to as having inter-layer alignment (e.g., 4908 and 4909). In some embodiments, when a side of two or more layers is aligned, the melt pools at the edge of the sides of the two or more layers are aligned. In some cases, melt pools of a plurality of adjacent layers (e.g., 3, 4, 5, 6, 7, 8, 9, 10, 15, 20, 25 or 30 adjacent layers) are (e.g., substantially) aligned, e.g., when the edges of the layers are aligned and/or these melt pools are at an edge of these sides. FIG. 40 shows an example of a layer 4903 having melt pool 4951 at its edge, and a layer 4905 that has melt pool 4952 at its edge; the layers 4903 and 4905 an aligned at side 4901 (that forms a plane); and the melt pools 4951 and 4952 are aligned with respect to each other and with respect to the side 4901. At least a portion (e.g., centers) of the melt pools may be (e.g., substantially) parallel with respect to an alignment line (e.g., 4912) and/or plane 4901. The alignment line can be at any angle with respect to a (e.g., average) layering plane (e.g., 4914). In some embodiments, the alignment line is (e.g., substantially) orthogonal to the (e.g., average) layering plane. In some embodiments, the alignment line is (e.g., substantially) parallel to at least a portion of the exterior surface (e.g., 4901) of the object. The alignment line may be part of an alignment plane.

In some embodiments, the aligned melt pools form a skin (e.g., 4904) of the object. The skin can be coupled with (e.g., chemically (e.g., metallically) bonded) an interior portion (also referred to as a core) (e.g., 4902). In some embodiments, the melt pools of the skin have widths that span a thickness (e.g., 4911) of the skin. The thickness of the skin may vary depending on the application (e.g., function) of the object. In some embodiments, the skin has a thickness of at least about 20 micrometers (μm), 50 μm, 70 μm, 100 μm, 200 μm, 300 μm, 400 μm, 500 μm, 600 μm, 700 μm, 800 μm, 900 μm, 1000 μm or about 2000 μm. The thickness of skin can range between any of the afore-mentioned values (e.g., from about 20 μm to about 1000 μm, from about 20 μm to about 200 μm, from about 100 μm to about 500 μm, from about 500 μm to about 1000 μm, or from about 200 μm to about 400 μm). The skin may be (e.g., directly) adjacent to a core (also referred to herein as an interior portion) of the object. The skin may be chemically (e.g., metallically) bonded with the core (e.g., rigid portion). In some cases, a border (e.g., 4910) separates the skin from the internal portion. The core can include a melt pools (e.g., 4906) that are not (e.g., substantially) aligned misaligned with the alignment line and/or plane (e.g., 4912). The core melt pools may be more randomly oriented than the skin melt pools. The core melt pools may have larger distribution of sizes (e.g., widths and/or depths) than the skin melt pools. The melt pools within a portion of the 3D object (e.g., its skin) can be more uniform in size, shape and/or alignment as compared to the melt pools in another portion of the 3D object (e.g., the core). The orientation of the melt pool and their relative alignment within the layer and between layers may be indicative of the process used to form them. At times, a border may form between microstructures (e.g., melt pools) indicative of different formation processes. In some embodiments, a portion of the 3D object (e.g., the skin) has melt pools with sizes and/or shapes in accordance with a tiling, hatching, STO, MTO, or HARMP operation. FIG. 50 shows an example vertical cross-section view of a portion of a 3D object (comprised of a nickel alloy), including an exterior surface 5001 of the object. The object in FIG. 50 includes a skin 5004 having (e.g., substantially) aligned melt pools (e.g., 5008) and a core 5002 having melt pools (e.g., 5007).

In some cases, the microstructure features are grains. The grains may comprise crystal structures that form during the hardening (e.g., cooling) of the material of the 3D object. The grains may have an orientation with respect to a (e.g., average) layering plane, direction of build (e.g., layerwise deposition), and/or an exterior surface of the 3D object. The grains may have an orientation with respect to an external surface of the 3D object. The grains may have an orientation with respect to a center of a melt pool, an edge of a melt pool, or an axis in a (e.g., central) portion of a melt pool. FIG. 52A shows an example vertical section view of a portion of a 3D object, including an exterior surface 5201 of the object, and showing a grain structure of the object. The 3D object can include grains (e.g., 5208 or 5209) that are oriented with respect to an alignment line (e.g., 5205). The alignment line may be part of an alignment plane. In some embodiments, the alignment line is (e.g., substantially) orthogonal to the (e.g., average) layering plane. In some embodiments, the alignment line is (e.g., substantially) orthogonal to the (e.g., average) cap (FIG. 14B, 1430) of the melt pool (e.g., FIG. 14B, 1420). In some embodiments, the alignment line is (e.g., substantially) parallel to (i) a direction of layerwise deposition and/or growth of the 3D object, and/or (ii) at least a portion of the exterior surface (e.g., 5201) of the object. In some embodiments, the alignment line follows a surface of the 3D object adjacent to the melt pool. The alignment line may be a rotational symmetry axis. Without wishing to be bound to theory, the alignment line may signify convergence of epitaxial growth of the grains towards a portion of the melt pool that (e.g., fully) hardened last, or that remained hottest the longest. The alignment line may signify convergence of epitaxial growth of the grains towards the center of the melt pool. The grains may grow epitaxially upon hardening of the melt pool. For example, the grains may grow towards the interior and/or the cap (e.g., top) of the melt pool. During the hardening process of the melt pool, an edge (e.g., surface) of the melt pool can harden before its center, followed by (e.g., gradual) hardening of the center of the melt pool. During the hardening process of the melt pool, grains may form initially at an edge (e.g., surface) of the melt pool and propagate towards the center of the melt pool. The direction of grain propagation, their type, makeup, coherence length, and repeating units, may serve as an indication to the process forming the melt pool. The process may include a relation between temperature at various portions of the melt pool (e.g., exterior, and/or interior) over the hardening time of the melt pool. The grain may comprise a crystal. In some embodiments, the oriented grains are within a skin portion (e.g., 5204), which may be (e.g., chemically (e.g., metallically)) bound to a rigid structure such as a core e.g., 5202). A portion of the 3D object associated with and forming the skin and a portion of the 3D object associated with and forming the core, may be separated by a border (e.g., 5203) that indicates a change in grain structures between a process forming the skin and a process forming the core. In some embodiments, grains (e.g., 5208 or 5209) of one process (e.g., forming the skin) may have elongated shapes as compared to another process (e.g., forming the core). Grains indicative of a process (e.g., for forming the skin) may converge (e.g., tend to meet in a point or line, e.g., along the direction of the object's growth). The grains may converge at a central region (e.g., middle) of the melt pool forming the portion (e.g., forming the skin). The grains may converge at the features alignment line (e.g., 5205). The features alignment line may be parallel to the direction of object growth, and/or gravitational field vector. The features alignment line may be perpendicular to the target surface, platform, and/or exposed surface of a material bed that may be used in forming the 3D object. The converging grains may converge at a non-zero angle (e.g., about 10 degrees, 15 degrees, 20 degrees, 25 degrees, 30 degrees, 35 degrees, 40 degrees, 45 degrees or 50 degrees) relative to the features alignment line. The converging grains (e.g., a vertical cross section thereof) may have a V-shape (e.g., chevron shape). An apex of the, v-shaped converging grains may be pointed in a direction that is in accordance with ((e.g., substantially) parallel to) the build direction (e.g., FIG. 52, arrow labeled "Z"), which may also be referred to as a stacking vector. The build direction (stacking vector) can indicate a direction in which the layers of hardened material were bonded together (e.g., printed). The portion (e.g., skin) may include multiple converging grains (e.g., at least 2, 3, 4, 5, 6, 7, 8, 9 or 10). Grains (e.g., 5208 or 5209) of the portion may be (e.g., on average) longer than grains (e.g., 5206) of another portion build by a different process (e.g., the core, e.g., formed using hatching). In some embodiments, the grains of the portion (e.g., skin) have (e.g., average) lengths that are at least about 1.2, 1.5, 2, 3, 4, 5 or 6 times the (e.g., average) lengths of grains of the other portion (e.g., core). One portion may be formed using a different process than the other (e.g., tiling vs. hatching. e.g., HARMP vs. PMX). In some embodiments, the grains of the portion (e.g., skin) have (e.g., average) lengths of at least about 300 micrometers (μm), 320 μm, 330 μm, 340 μm, 350 μm or 400 μm. In some embodiments, the grains of the other portion (e.g., rigid structure or core) have (e.g., average) lengths of at most about 50 μm, 60 μm, 70 μm, 80 μm, 90 μm, 100 μm, 150 μm, 200 μm or 250 μm. In some embodiments, the one and/or other portion has pores. FIG. 52B shows an example vertical section view of a portion of an object, showing a grain structure of the object. In some embodiments, the skin (e.g., 5224) includes pores (e.g., 5226). The pores may be within a central region of the skin. The pores may or may not be visible from an exterior surface (e.g., 5221) of the object. The pores may be (e.g., substantially) spherical in shape. The density of pores may be indicative of the type of process that is used to form the portion. An (e.g., abrupt) variation in the density of pores may be indictive of a transition from one process to another. For example, the skin may have a greater number of pores than the rigid portion (e.g., core. e.g., 5222). For example, one process may have pores and the other may not have pores. In some embodiments, the skin has (e.g., substantially) no pores. In some embodiments, the core has (e.g., substantially) no pores.

The build direction (stacking vector (e.g., "Z")) may be identified by any of number of features, such as growth direction of microstructures (e.g., tiles, melt pools, grains (e.g., crystals, e.g., dendrites)), the location of auxiliary support and/or support marks, surface roughness variations of the 3D object, energy beam path patterns (e.g., hatch patterns) and/or tessellations, indicative of growth direction. For example, a melt pool may have a curved bottom portion (e.g., FIG. 50, 5003 or 5007) indicative of the build direction (stacking vector). For instance, the curved bottom portion of a melt pool may be curved away from (convex to) the build platform during printing and curved toward (concave to) the stacking direction. In some embodiments, the energy beam path patterns (e.g., hatch patterns) and/or tessellations may be on a top surface of the object relative to the platform during printing.

Figure 53A:
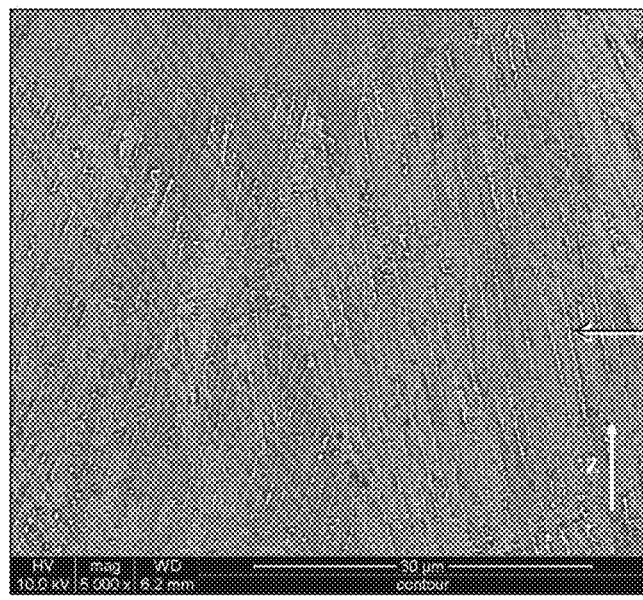
FIGS. 53A and 53B show cross section views of 3D objects.
Figure 53B:

In some embodiments, the microstructures are indictive of a rate of cooling, hardening and/or crystallization. In some embodiments, the microstructures are indictive of faster or slower cooling, hardening and/or crystallization rates. In some cases, the microstructure features are dendrites, which are branched crystal structures. The crystal structures may be formed during the cooling and/or hardening of the material while forming the 3D object. In some cases, the microstructures (e.g., dendrites) are in the form of elongated structures. FIGS. 53A and 53B show example section views of different portions of an example 3D object. FIG. 53A shows an example of crystal (e.g., dendritic) structure of a skin of the 3D object. FIG. 53B shows an example of crystal (e.g., dendritic) structure of a core (e.g., rigid structure) of the 3D object. Crystals (e.g., dendrites) (e.g., 5302 or 5322) of one within the object can have elongated shapes. The microstructures may be separated by inter-microstructure regions. For example, dendrites can be separated by inter-dendritic regions (e.g., light colored lines in FIGS. 53A or 53B). The inter-microstructure region e.g., interdendritic regions) may correspond to different phases of material than the phase of material within the microstructure (e.g., of the crystal (e.g., dendrite)). For example, the inter-microstructure region may include higher or lower concentrations of certain elements as part of a (e.g., metal) alloy (e.g., molybdenum, titanium, nickel, aluminum, and/or niobium). In some embodiments the microstructure of a slower hardening region is (on average) different from microstructures of a faster hardening region of the 3D object. Different may be in size, material type, microstructure shape (e.g., globular or elongated), crystal structure, alignment (e.g., direction), and/or coherence length. In some embodiments, the microstructures of the skin are more organized than the microstructures of the core. More organized may comprise more aligned, form a crystal with larger coherence length, form a crystal with more repeating units, or form larger repeating units. Larger may comprise longer or wider. In some embodiments, the grains (e.g., 5302 dendrites) of the skin are more organized (e.g., aligned) than the grains (e.g., 5322) of the core. For example, in some cases the grains (e.g., at least 2, 5, 10, 20, 50 or 100 grains) of the skin are (e.g., substantially) aligned with respect to an alignment line (e.g., build line z). Aligned can be at an angle of most about 45 degrees, 40 degrees, 35 degrees, 30 degrees, 25 degrees, 20 degrees, 15 degrees, 10 degrees or 5 degrees with respect to the alignment line (e.g., direction of build—"Z"). In some embodiments, the widths of the microstructures of one object portion are greater than the widths of the microstructures of another object portion. In some embodiments, the widths of the crystals of one structure are greater than the widths of the crystals of one or more other structures. For example, the widths of the crystals (e.g., dendrites) can be determined by measuring distances between the crystals interdendritic regions). In some embodiments, a width of a crystal (e.g., dendrite) (or an average width of a portion of crystals (e.g., dendrites)) of a first portion (e.g., skin) is/are at least about 1 micrometer (μm), 1.5 μm, 2 μm, 2.5 or 3 μm. In some embodiments, a width of a crystal (e.g., dendrite) (or an average width of a portion of crystals (e.g., dendrites)) of a second portion (e.g., core) is/are at most about 0.5 micrometers (μm), 0.7 μm, 1 μm, 1.2 μm or 1.5 μm. In some embodiments, a width of a crystal (e.g., dendrite) (or an average width of a portion of crystals (e.g., dendrites)) of the first portion (e.g., skin) is/are at least about 150%, 175%, 200% or 250% wider than a width of a crystal (e.g., dendrite) (or an average width of a portion of crystals (e.g., dendrites)) of the second portion (e.g., core). The crystal size (e.g., dendrite length and/or width) can be associated with a solidification (hardening) rate of the material. In some embodiments, the size (e.g., width) of a crystal (e.g., dendrite) (or an average size of a portion of crystals (e.g., dendrites)) of the first portion (e.g, skin) are associated with a slower solidification (hardening) rate compared to a size (e.g., width) of a crystal (e.g., dendrite) (or an average width of a portion of crystals (e.g., dendrites)) of the second portion (e.g., core).

FIGS. 60A and 60B show example vertical cross-section views (at different magnifications) of a portion of a 3D object (comprised of a titanium alloy). The skin (e.g., FIG. 60A, 6002; or FIG. 60B, 6022) can have a different microstructure than that of an interior portion (core) (e.g., FIG. 60A, 6004; or FIG. 60B, 6024). In some embodiments, the microstructure of the skin is indicative of a slower or faster solidification (hardening) rate than that of the interior portion (core). For example, the skin can have grains (e.g., crystals) (e.g., FIG. 60A, 6003; or FIG. 60B, 6023) that are oriented with respect to an alignment line (e.g., FIG. 60B, 6028). The alignment line may be (e.g., substantially) parallel to an exterior surface (e.g., FIG. 60A, 6001; or FIG. 60B, 6021) of the object and/or a stacking vector (e.g., "Z") indicating a build direction of the multiple layers of material. In some embodiments, the microstructure features (e.g., grains (e.g., crystals)) of the skin may be oriented at a non-perpendicular angle (e.g., about 0 degrees, 5 degrees, 10 degrees, 15 degrees, 20 degrees, 25 degrees, 30 degrees, 35 degrees, 40 degrees, 45 degrees or 50 degrees) relative to the alignment line. The microstructure features (e.g., grains (e.g., crystals)) (e.g., FIG. 60A, 6005; or FIG. 60B, 6025) of the interior portion (core) can be oriented in a (e.g., substantially) random arrangement. At least a portion (e.g., one or more) of the microstructure features (e.g., grains (e.g., crystals)) of the core may be oriented (e.g., substantially) perpendicular to the alignment line. In some embodiments, the skin portion has a microstructure feature e.g., grain (e.g., crystal)) having an average FLS of a portion of microstructure features (e.g., grains (e.g., crystals)) of at least about 50 micrometers (µm), 100 µm, 150 µm, 200 µm, 250 µm, 300 µm, 400 µm, 500 µm or 600 µm. In some embodiments, the interior portion (core) has a microstructure feature having a FLS of at most about 50 micrometers (µm), 60 µm, 70 µm, 80 µm, 90 µm, 100 µm, 150 µm or 200 µm. The FLS can comprise a length a width. In some embodiments, a skin portion includes a microstructure feature having a FLS that is at least about 150%, 200%, 300%, 400%, 500%, 600% or 700% of a microstructure feature of an inner portion (core).

In some embodiments, the overhang portion (e.g., having a shallow or steep angle relative to the layering plane) of an object has a distinctive microstructure. FIGS. 54A and 54B show example dendritic structures of an overhang portion (e.g., at a steep angle) of a 3D object forming using a MTO operation. FIG. 54A shows an example dendritic structure of the overhang after a first transformation process (e.g., using a hatching energy beam). FIG. 54B shows an example dendritic structure of the overhang after a second transformation process using a HARMP energy beam). FIG. 54C shows an example dendritic structure of a core portion of a 3D object (as a comparison to FIGS. 54A and 54B). The second transformation process may alter the microstructure of the re-transformed portion. The first transformation process (e.g., FIG. 54A) can result in forming a crystal (e.g., dendrite) having a width (or an average width of a portion of crystals (e.g., dendrites)) of at least about 1.5 µm, 2 µm, 2.5 µm, 3 µm, 3.5 µm, 4 µm, 4.5 µm, 5 µm or 5.5 µm. The second transformation process (e.g., FIG. 54B) can result in forming a crystal (e.g., dendrite) having a width (or an average width of a portion of crystals (e.g., dendrites)) of at least about 0.8 µm, 1.3 µm, 1.5 µm, 1.8 µm, 2 µm, 2.3 µm, 2.5 µm or 2.8 µm. In some embodiments, the second transformation process can result in the overhang having a crystal (e.g., dendrite) width (or an average width of a portion of crystals (e.g., dendrites)) that is at least about 35%, 40%, 45%, 50%, 55% or 60% of a crystal (e.g., dendrite) width (or an average width of a portion of crystals (e.g., dendrites)) of the overhang after the first transformation process. The second transformation process can result in the overhang having a crystal (e.g, dendrite) with a width (or an average width of a portion of crystals (e.g, dendrites)) that is at least about 120%, 150%, 200%, 250%, 300% or 350% of a crystal (e.g., dendrite) with a width (or an average width of a portion of crystals (e.g., dendrites)) of a second portion (e.g., core (e.g., FIG. 54C)). In some embodiments, the second transformation process can result in the overhang having a microstructure (e.g., grain) FLS that is at least about 10%, 15% 20%, 25%, 35%, 40%, 45%, 50%, 55% or 60% of a FLS of a respective microstructure (e.g., grain) of the overhang after the first transformation process. The min may comprise a crystal or a metallurgical microstructure. The second transformation process can result in the overhang having a microstructure (e.g., grain) having a FLS that is at least about 110%, 120%, 150%, 200%, 250%, 300% or 350% of a (respective) microstructure of a second portion (e.g., core). In some embodiments, a FLS of a microstructure (e.g., grain) of the overhang after the second transformation process is at least about 120%, 150%, 200%, 300%, 400%, 500% or 600% greater than a FLS of a microstructure (e.g., grain) of a second portion (e.g., core).

FIGS. 55A and 55B show example dendritic structures of different types of overhang portions (e.g., at a shallow angles) of 3D objects. FIG. 55A shows an example dendritic structure of a ledge type overhang formed using a hatching energy beam followed by a tiling energy beam. FIG. 55B shows an example dendritic structure of a ceiling type of overhang using a hatching energy beam followed by a tiling energy beam. FIG. 55C shows an example dendritic structure of a core portion of a 3D object (as a comparison to FIGS. 55A and 55B). The hatching and tiling energy beam operation (e.g., FIG. 55A) can result in a ledge type overhang with a crystal (e.g., dendrite) having a width (or an average width of a portion of crystals (e.g., dendrites)) of at least about 2.5 µm, 3 µm, 3.5 µm, 4 µm, 4.5 µm, 5 µm or 5.5 µm. The hatching and tiling energy beam (e.g., FIG. 55B) can result in a ceiling type overhang with a crystal (e.g., dendrite) having a width (or an average width of a portion of crystals (e.g., dendrites)) of at least about 3 µm, 3.5 µm, 4 µm, 4.5 µm, 5 µm, 5.5 µm, 6 µm, 5 µm or 7 µm. In some embodiments, the ledge type overhang (e.g., FIG. 55A) or a ceiling type overhang (e.g., FIG. 55B) can have a crystal (e.g., dendrite) width (or an average width of a portion of crystals (e.g., dendrites)) that is at least about 200%, 300%, 400%, 500%, or 600% of a crystal (e.g., dendrite) width (or an average width of a portion of crystals (e.g., dendrites)) of another portion of the object e.g., core (e.g., FIG. 55C)). In some embodiments, the second transformation process can result in the overhang having a microstructure (e.g., grain) having a FLS that is at least about 10%, 15%, 20%, 25%, 35%, 40%, 45%, 50%, 55% or 60% of a (respective) FLS of a microstructure of the overhang after the first transformation process. The second transformation process can result in the overhang having a crystal (e.g., dendrite) with a length (or an average length of a portion of crystals (e.g., dendrites)) that is at least about 110%, 120%, 150%, 200%, 250%, 300% or 350% of a crystal (e.g., dendrite) with a length (or an average width of a portion of crystals (e.g., dendrites)) of a second portion (e.g., core). In some embodiments, crystals (e.g., dendrites) a ceiling type overhang (e.g., FIG. 55B) can have less elongated shapes (e.g., having more equal lengths as widths (e.g., cellular)) compared to crystals (e.g., dendrites) of a ledge type overhang (e.g., FIG. 55A). The less elongated shape may be at least partially attributed to a (e.g., siibstantially) non-epitaxial growth. For example, a portion of the ceiling may be grown on a pre-transformed material (e.g., powder). A (e.g., substantially) non-epitaxial growth may be associated with crystals (e.g., dendrites) growing with little or no thermal gradient from an already solidified material (e.g., rigid portion).

Figure 56A:
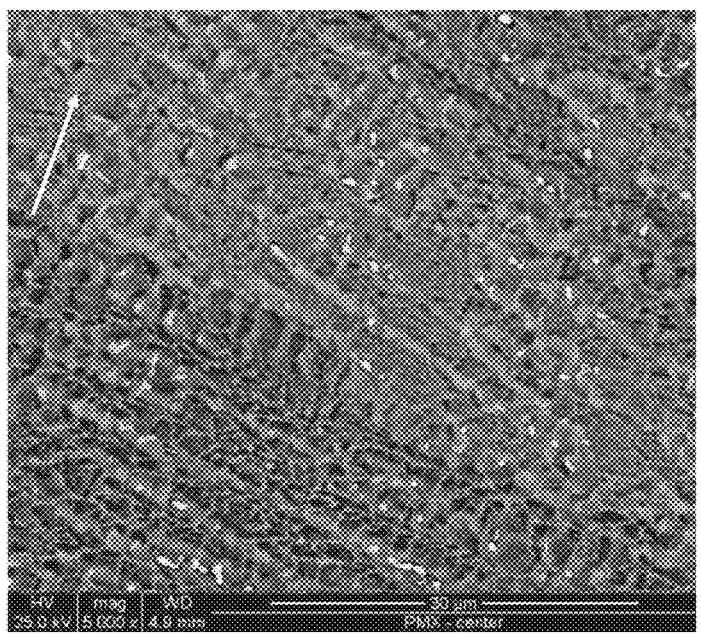
FIGS. 56A and 56B show cross section views of 3D objects.
Figure 56B:

In some embodiments, at least a portion of the 3D object is formed in a process comprising forming a porous matrix (e.g., PMX). In some cases, an overhang is formed comprising forming a porous matrix. The overhang can be thickened by using a porous matrix. Siibsequent to its formation, the porous matrix may be densified using any methods described herein (e.g., tiling, hatching and/or HARMP operation). FIG. 56A shows an example dendritic structure of an overhang of a 3D object formed using a porous matrix sandwich structure (e.g., FIG. 40A) followed by densification using a tiling energy beam. FIG. 56B shows an example dendritic structure of a core portion of a 3D object (as a comparison to FIG. 56A). Forming a porous matrix (e.g., sandwich) structure followed by densification using a tiling energy beam can result in an overhang with a microstructure (e.g., cmvstal, e.g., dendrite) having a width (or an average width of a portion of crystals (e.g., dendrites)) of at least about 2 μm, 3 μm, 4 μ, or 5 μm. In some embodiments, the overhang can have a microstructure having a FLS that is at least about 200%, 300%, 400% or 500% of a FLS of a (respective) microstructure of another portion of the object (e.g., core (e.g., FIG. 56C)).

Figure 57A:
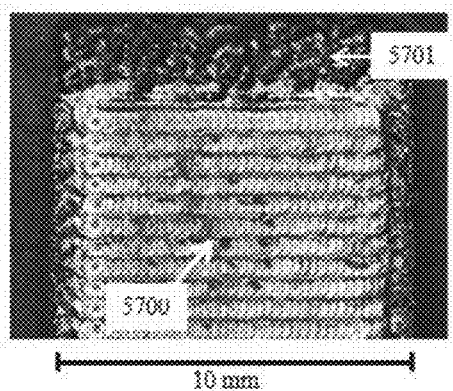
FIGS. 57A-57D show various views of a 3D object.
Figure 57B:
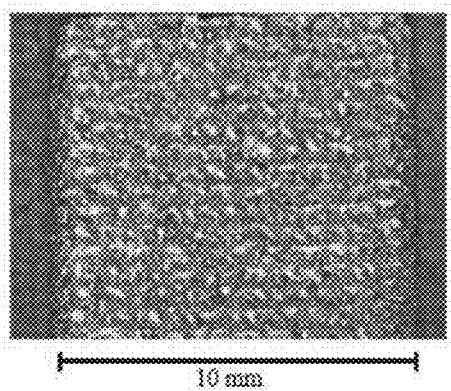
Figure 57C:
Figure 57D:
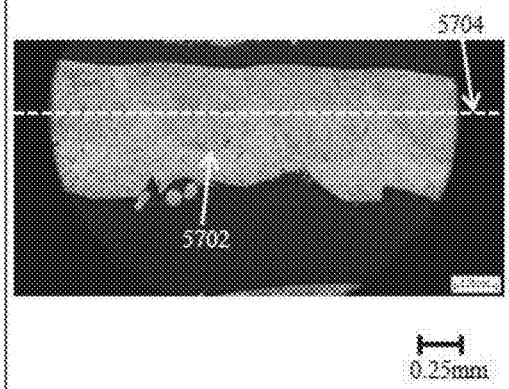

In some embodiments, the overhang portion of an object has a distinctive melt pool structure and/or surface features. FIGS. 57A-57D show examples of various views of an overhang portion of an object formed using a hatching energy beam followed by tiling energy beam. FIG. 57A shows an example top surface 5700 and side surface 5701 of an overhang. FIG. 57B shows an example bottom surface (e.g., bottom skin) of an overhang. The side surface (e.g., 5701) of the overhang may be formed using different types of energy beams and/or process (e.g., alternating hatching and tiling) than the top surface 5700. In the example shown in FIG. 57A, the side surface 5701 is part of a first transformation to form the layer of hardened material (using a first process), and the surface 5700 is part of a second transformation to form the layer of hardened material (using a second process different than the first process). The second process may comprise tiling. FIGS. 57C and 57D show example section views of the overhang, with FIG. 57D showing an example melt pool structure. A surface (e.g., top surface of FIG. 57A) of the object may have (e.g., siibstantially) circular shaped tiles formed from a tiling energy beam. In some cases, adjacent tiles overlap with each other. In some embodiments, the top surface of an overhang is subsequently covered by a rigid structure and/or structure formed using a PMX process. A skin (e.g., bottom skin (e.g., FIG. 57B)) of the overhang may have a surface roughness at or below a prescribed value (e.g., of at most about 50 μm, 40 μm, 30 μm, 20 μm, 10 μm, or 5 μm). The skin (e.g., bottom skin) of the object shown in the example of FIG. 57A, is measured to have an area surface roughness (Sa) of about 48 μm. The tiling energy beam may form melt pools (e.g., 5702) that are (e.g., substantially) aligned with an alignment line (e.g., 5704) that is at an angle no greater than about 15 degrees, 10 degrees or 5 degrees with respect to a (e.g., average) layering plane of the object.

FIGS. 58A-58D show examples of various views of an overhang portion of an object formed using an MTO operation (e.g., using a hatching energy beam followed by HARMP operation). FIG. 58A shows a top surface of the overhang. FIG. 58B shows an example surface (e.g., bottom skin) of the overhang. FIGS. 58C and 58D show example section views of the overhang, with FIG. 58D showing an example melt pool structure. A surface (e.g., top surface of FIG. 58A) of the object may have hatches formed from a hatching energy beam. In some cases, the (linear progression of the) hatches may appear linear in shape, e.g., at the surface. In some embodiments, the top surface of an overhang is subsequently covered by a rigid portion and/or a portion formed using a PMX process. A skin (e.g., bottom skin) of the object in FIG. 58A is measured to have an area surface roughness (Sa) of about 31 μm. A second transformation operation (e.g., HARMP, hatching or tiling) may form high aspect ratio melt pools (e.g., 5802) having bottom portions (e.g., 5804) that are (e.g., substantially) aligned with a direction of the transforming energy beam and top portions (e.g., 5804) having more diffuse melt pools structure. In some embodiments, the bottom portions of melt pools are (e.g., substantially) parallel with each other. In some embodiments, the bottom portions of melt pools are arranged in an angle of at most about 45°, 40°, 35°, 30°, 20°, 10°, or 5° with respect to a (e.g., average) layering plane of the object.

Figure 59A:
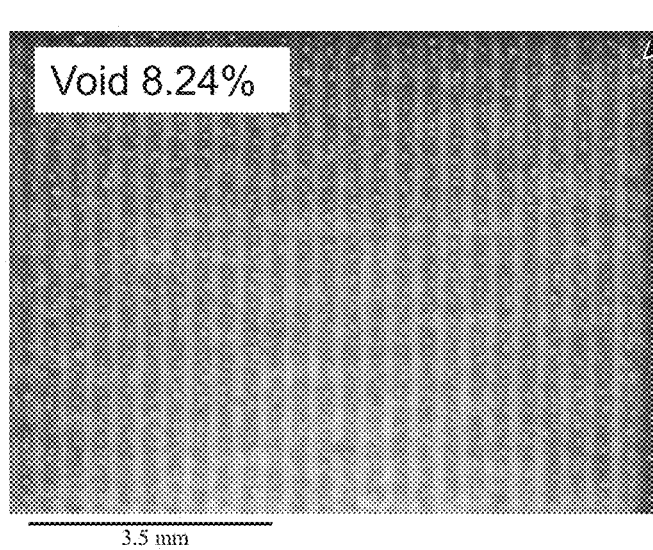
FIGS. 59A and 59B show cross section views of a 3D object.
Figure 59B:
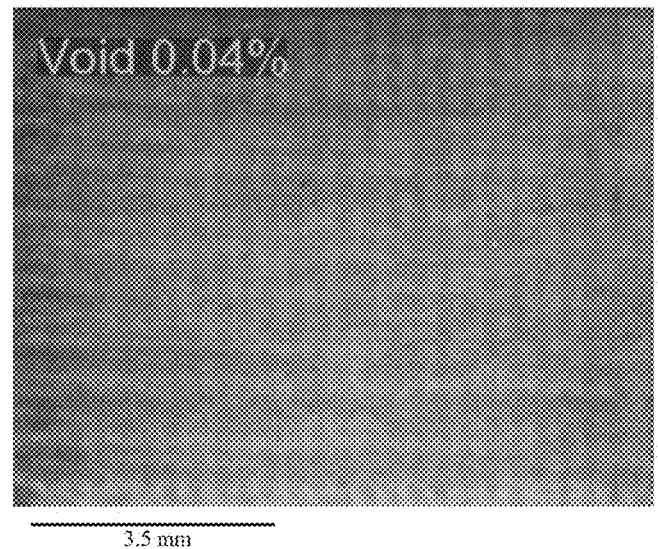

In some embodiments, a second transformation operation (e.g., HARMP, hatching, or tiling) is used to alter (e.g., reduce) the porosity of (e.g., in) an object. FIGS. 59A and 59B show example section views of an overhang portion of an object before and after a HARMP operation as the second transformation. FIG. 59A shows an example overhang formed using a tiling energy beam. In some embodiments, the tiling energy beam causes the overhang to have a porosity (v/v, or area/area porosity, e.g., of a cross-section plane of maximum porosity) of at most about 0.5%, 1%, 2%, 3%, 5%, 10% or 15%. The object in FIG. 59A has pores (e.g., 5901) and has as a measured porosity of about 8.24%. FIG. 59B shows an example overhang after a subsequent HARMP operation. A second transformation operation (e.g., HARMP, hatching or tiling) may cause the overhang to have a porosity (v/v, or area/area porosity, e.g., of a cross-section plane of maximum porosity) of at most about 0.01%, 0.02%, 0.03%, 0.04%, 0.05%, 0.06%, 0.07%, 0.08%, 0.09%, 0.1% or 0.5%. The object in FIG. 59B has as a measured porosity of about 0.04%. The reduction in porosity may be by at least one order of magnitude.

Figure 13:
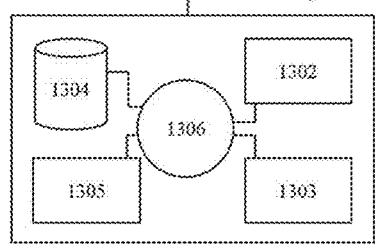
FIG. 13 schematically illustrates a computer system.

At times, the controller comprises a processing unit. The processing unit may be central. The processing unit may comprise a central processing unit (herein "CPU"). The controllers or control mechanisms (e.g., comprising a computer system.) may be programmed to implement methods of the disclosure. The controller may control at least one component of the systems and/or apparatuses disclosed herein. FIG. 13 is a schematic example of a computer system 1300 that is programmed or otherwise configured to facilitate the formation of a 3D object according to the methods provided herein. The computer system 900 can control (e.g., direct and/or regulate) various features of printing methods, apparatuses and systems of the present disclosure, such as, for example, regulating force, translation, heating, cooling and/or maintaining the temperature of a material bed, process parameters (e.g, chamber pressure), scanning rate (e.g., of the energy beam and/or the platform), scanning route of the energy source, position and/or temperature of the cooling member(s), application of the amount of energy emitted to a selected location, or any combination thereof. The computer system 1300 can be part of, or be in communication with, a printing system or apparatus, such as a 3D printing system or apparatus of the present disclosure. The computer may be coupled to one or more mechanisms disclosed herein, and/or any parts thereof. For example, the computer may be coupled to one or more sensors, valves, switches, motors, pumps, optical components, or any combination thereof.

In some embodiments, the computer system 1300 includes a processing unit 1306 (also "processor," "computer" and "computer processor" used herein). The computer system may include memory or memory location 1302 (e.g., random-access memory, read-only memory, flash memory), electronic storage unit 1304 (e.g., hard disk), communication interface 1303 (e.g., network adapter) for communicating with one or more other systems, and peripheral devices 1305, such as cache, other memory, data storage and/or electronic display adapters. The memory 1302, storage unit 1304, interface 1303, and peripheral devices 1305 are in communication with the processing unit 1306 through a communication bus (solid lines), such as a motherboard. The storage unit can be a data storage unit (or data repository) for storing data. The computer system can be operatively coupled to a computer network ("network") 1301 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 1302. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (CPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be pail of a circuit, such as an integrated circuit. One or more other components of the system 900 can be included in the circuit.

The storage unit 1304 can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

The computer system can communicate with one or more remote computer systems through the network. For instance, the computer system can communicate with a remote computer system of a user (e.g., operator). Examples of remote computer systems include personal computers (e.g., portable PC), slate or tablet. PC's (e.g., Apple® iPad, Samsung® Galaxy Tab), telephones, Smart phones (e.g., Apple® iPhone, Android-enabled device, Blackberry®), or personal digital assistants. The user can access the computer system via the network.

Methods as described herein can be implemented by way of machine (e.g., computer processor) executable code stored on an electronic storage location of the computer system, such as, for example, on the memory 1302 or electronic storage unit 1304. The machine executable or machine-readable code can be provided in the form of software. During use, the processor 1306 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processor adapted to execute the code, or can be compiled during runtime. The code can be supplied in a programming language that can be selected to enable the code to execute in a pre-compiled or as-compiled fashion.

At times, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have au area of at least about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of at most about 50 mm$^2$, 60 mm$^2$, 70 nm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of any value between the afore-mentioned values (e.g., front about 50 mm$^2$ to about 800 mm$^2$, from about 50 mm$^2$ to about 500 mm$^2$, or from about 500 mm$^2$ to about 800 mm$^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity; of cores may include at most about 1000, 2000, 3000, 4000, 5000, 6000, 7000, 8000, 9000, 10000, 11000, 12000,13000, 14000, 15000, 20000, 30000,or 40000 cores. The multiplicity of cores may include cores of any number between the afore-mentioned numbers (e.g., from about 2 to about 40000,from about 2 to about 400,from about 400 to about 4000, from about 2000 to about 4000,from about 4000 to about 10000, from about 4000 to about 15000,or from about 15000 to about 40000 cores). In some processors (e.g., FPGA) the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 1 Tera Flops (T-FLOPS), 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, or front about 0.1 T-FLOP to about 10 EXA-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance UNPACK, matrix multiplication (e.g., DGEMM) sustained memory bandwidth to/from memory (e.g., STREAM), array transposing rate measurement (e.g., PTRANS). Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). UNPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PYRANS benchmark may refer to a rate measurement at which the system can transpose a large array (global). MPI refers to Message Passing Interface.

At times, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

At times, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

At times, the computer system includes configurable computing, partially reconfigurable computing, reconfigurable computing, or any combination thereof. The computer system may include a FPGA. The computer system may include an integrated circuit that performs the algorithm For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration.

At times, the computing system includes an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (µs), 1 µs, 10 µs, 100 µs, or 1 millisecond (ms). The physical unit may produce the algorithm output in any time between the afore-mentioned times (e.g., from about 0.1 to about 1 ms, from about 0.1 µs, to about 100 µs, or from about 0.1 µs is to about 10 µs).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400

Gbytes/s). The sensor measurements may be real-time measurements. The real-time measurements may be conducted during the 3D printing process. The real-time measurements may be in-situ measurements in the 3D printing system and/or apparatus, the real-time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec). 1.5 sec, 10 sec, 5 sec, 1 sec, 0.5 sec, 0.25 sec, 0.2 sec, 0.1 sec, 80 milliseconds (msec), 50 msec, 10 msec, 5 msec, or 1 msec. In some instances, the processing unit may use the signal obtained from the at least one sensor to provide a processing unit output, which output is provided at a speed of any value between the aforementioned values (e.g., from about 100 min to about 1 msec, from about 100 min to about 10 min, from about 10 min to about 1 min, from about 5 min to about 0.5 min, from about 30 sec to about 0.1 sec, or from about 0.1 sec to about 1 msec). The processing unit output may comprise an evaluation of the temperature at a location, position at a location (e.g., vertical and/or horizontal), or a map of locations. The location may be on the target surface. The map may comprise a topological or temperature map.

At times, the processing unit uses the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the requested 3D object. The processing unit may use the output in an algorithm that is used in determining the manner in which a model of the requested 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively, or additionally, the controller may use historical data for the control. Alternatively, or additionally, the processing unit may use historical data in its one or more algorithms. The parameters may comprise the height of the layer of pre-transformed material disposed in the enclosure and/or the gap by which the cooling element (e.g., heat sink) is separated from the target surface. The target surface may be the exposed layer of the material bed.

Aspects of the systems, apparatuses, and/or methods provided herein, such as the computer system, can be embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all the tangible memory of the computers, processors or the like, or associated modules thereof, such as various semiconductor memories, tape drives, disk drives, external drives, and the like, winch may provide non-transitory storage at any time for the software programming.

At times, the memory comprises a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash:memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing institutions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

The computer system can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their leading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

At times, the system and/or apparatus described herein (e.g., controller) and/or any of their components comprises an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen. The system and/or apparatus described herein (e.g., controller) and/or any of their components may comprise Bluetooth technology. The system and/or apparatus described herein (e.g., controller) and/or any of their components may comprise a communication port. The communication port may be a serial port or a parallel port. The communication port may be a Universal Serial Bus port (i.e., USB). The system and/or apparatus described herein (e.g., controller) and/or any of their components may comprise USB ports. The USB can be micro or mini USB. The USB port may relate to device classes comprising 00 h, 01 h, 02 h, 03 h, 05 h, 06 h, 07 h, 08 h, 09 h, 0 Ah, 0 Bh, 0 Dh, 0 Eh, 0 Fh, 10 h, 11 h, DCh, EOh, EFh, FEh, or FM. The system and/or apparatus described herein (e, g., controller) and/or any of their components may comprise a plug and/or a socket (e.g., electrical, AC power, DC power). The system and/or apparatus described herein (e.g., controller) and/or any of their components may comprise an adapter (e.g., AC and/or DC power adapter). The system and/or apparatus described herein (e.g., controller) and/or any of their components may comprise a power connector. The power connector can be an electrical power connector. The power connector may comprise a magnetically coupled (e.g., attached) power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80,or 100 pins.

Figure 2:
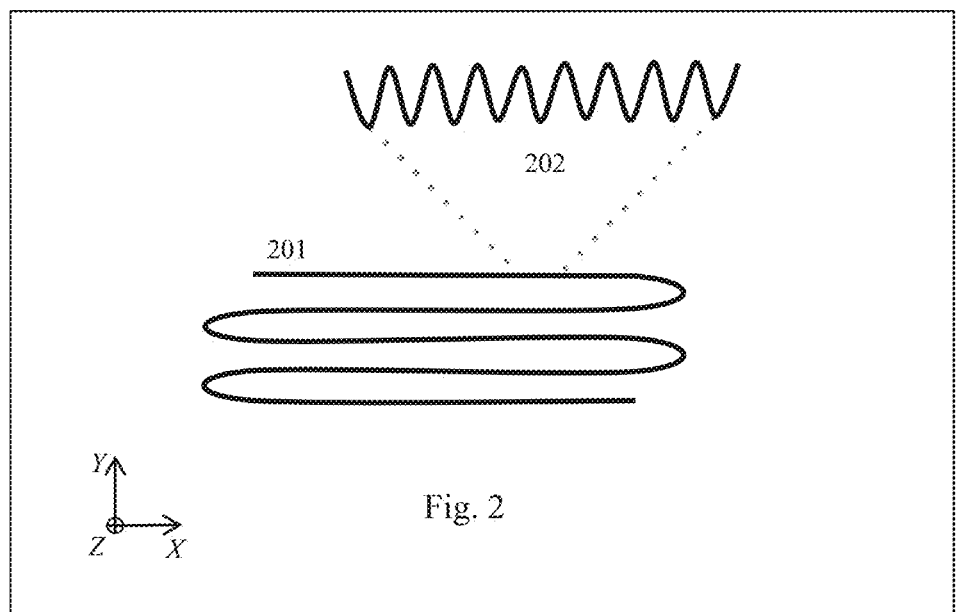
FIG. 2 schematically illustrates a path.

At times, the systems, methods, and/or apparatuses disclosed herein comprises receiving a request for a 3D object (e.g., from a customer). The request can include a model (e.g., CAD) of the requested 3D object. Alternatively, or additionally, a model of the requested 3D object may be generated. The model may be used to generate 3D printing instructions. The 3D printing instructions may exclude the 3D model. The 3D printing instructions may be based on the 3D model. The 3D printing instructions may take the 3D model into account. The 3D printing instructions may be alternatively or additionally be based on simulations. The 3D printing instructions may use the 3D model. The 3D printing instructions may comprise using an algorithm (e.g., embedded in a software) that considers the 3D model, simulations, historical data, sensor input, or any combination thereof. The processor may compute the algorithm during the 3D printing process (e.g., in real-time), during the formation of the 3D object, prior to the 3D printing process, after the 3D printing process, or any combination thereof. The processor may compute the algorithm in the interval between pulses of the energy beam, during the dwell time of the energy beam, before the energy beam translates to a new position, while the energy beam is not translating, while the energy beam does not irradiate the target surface, while the energy beam irradiates the target surface, or any combination thereof. For example, the processor may compute the algorithm while the energy beam translates and does substantially not irradiate the exposed surface. For example, the processor may compute the algorithm while the energy beam does not translate and irradiates the exposed surface. For example, the processor may compute the algorithm while the energy beam does not substantially translate and does substantially not irradiate the exposed surface. For example, the processor may compute the algorithm while the energy beam does translate and irradiates the exposed surface. The translation of the energy beam may be translation along an entire path or a portion thereof. The path may correspond to a cross section of the model of the 3D object. The translation of the energy beam may be translation along at least one hatching within the path. FIG. 3 shows examples of various paths. The direction of the arrow(s) in FIG. 3 represents the direction according to which a position of the energy beam directed to the exposed surface of the material bed is altered with respect to the material bed. The various vectors depicted in FIG. 3, 314 show an example of various hatchings. The respective movement of the energy beam with the material bed may oscillate while traveling along the path. For example, the propagation of the energy beam along a path may be by small path deviations (e.g., variations such as oscillations). FIG. 2 shows an example of a path 201. The sub path 202 is a magnification of a portion of the path 201 showing path deviations (e.g., oscillations).

EXAMPLES

The following are illustrative and non-limiting examples of methods of the present disclosure.

Example 1

In a 28 cm by 28 cm by 30 cm container at ambient temperature and pressure, Inconel 718 powder of average particle size 35 µm is deposited in a container to form a powder bed. The container is disposed in an enclosure to separate the powder bed from the ambient environment. The enclosure is purged with Argon gas for 30 minutes. A 500 W fiber laser beam was used to melt a portion of the powder bed and generate two substantially identical 3D objects, each comprising an extended ledge that was anchored on one of its side to the base using auxiliary supports. The ledge in each of the two 3D objects had an angle (e.g., of about 25°) with respect to the base, in which the laser beam path followed a path scheme resembling the one shown in the example of FIG. 3, 314. The 3D objects were, fabricated by successive deposition of layers of powder material having an average thickness of about 50 µm and melting portions of each of the successively deposited layers using the laser beam. The auxiliary supports were formed using the methodology of forming the rigid-portion (e.g., using hatches) as described herein. The ledge in the first 3D object was formed by generating successive partially overlapping layers of hardened material using the STO methodology. The ledge in the second 3D object was formed by (i) depositing a powder layer having a thickens of 50 µm, (ii) generating a layer of hardened material using the STO methodology in a first transformation operation, (iii) transforming the layer of hardened material using HARMP methodology in a second transformation operation and successively repeating steps (i) to (iii) to generating the requested 3D object. Images of the first 3D object in which the ledge is formed using STO methodology are shown: as a cross section in FIG. 34A, as a topological top view image in FIG. 35B, and as a horizontal X-ray image in FIG. 35A. Images of the second 3D object in which each layer forming the ledge is formed using STO methodology followed by HARMP methodology, are shown as: a cross section in FIG. 34B, as a topological top view image in FIG. 35D, and as a horizontal X-ray image in FIG. 35C. The optical images of FIGS. 34A and 34B were taken using a Epiphot 300 microscope manufactured by Nikon Corporation. The X ray images of FIGS. 35A and 35C were taken using a VERTEX X-ray system manufactured by VJ Electronix. The 3D scan images of FIGS. 35B and 35D were taken using a Keyence VR-3200 manufactured by Keyence Corporation. The surface roughness measurements were performed using the Keyence VR-3200 (surface profilometer).

Example 2

In a 28 cm by 28 cm by 30 cm container at ambient temperature and pressure, Inconel 718 powder of average particle size 35 µm is deposited in a container to form a powder bed. The container is disposed in an enclosure to separate the powder bed from the ambient environment. The enclosure is purged with Argon gas for 30 minutes. A 500 W fiber laser beam was used to melt a portion of the powder bed and form a skin (contour) of a 3D object. The contour was formed by transforming layers of powder material having an average thickness of about 50 µm using a tiling methodology (type-2 energy beam), as described herein. The internal portions of the 3D object layers were formed using a methodology of forming the rigid-portion (e.g., using hatches) as described herein. Images of 3D objects in which a skin (contour) is formed using contour methodology are shown in FIGS. 38A and 38B. The surface roughness of the 3D objects depicted in FIGS. 38A and 38B was measured using the Keyence VR-3200 (surface profilometer), to have an Sa value of 3.5 micrometers. Similar conditions and methodologies were used to form the 3D objects depicted in FIGS. 50, 52A, 52B, 53A and 53B. An optical image of the 3D object shown in FIG. 50 is taken using the Nikon Epiphot 300 microscope. Scanning electron microscope (SEM) images of the object shown in FIGS. 52A, 52B, 53A, 53B, 54C, 55C and 56B are taken using a Nova™ NanoSEM 630 manufactured by FEI Company (subsidiary of Thermo Fisher Scientific).

Example 3

In a 300 mm diameter and 400 mm high container at ambient temperature, Inconel 718 powder of average particle size 35 µm is deposited in a container to form a powder bed. The container is disposed in an enclosure to separate the powder bed from the ambient environment. The enclosure is purged with Argon gas. A 1000 W fiber laser beam was used to melt a portion of the powder bed and form an overhang of a 3D object at an angle with respect to the platform base. The overhang was formed by transforming layers of powder material having an average thickness of about 50 µm using a MTO process as described herein. A first transformation operation was performed used a hatching methodology (type-1 energy beam). A SEM image of the 3D object after the first transformation operation is shown in FIG. 54A using the Nova™ NanoSEM 630. A second transformation operation was performed using a HARMP methodology to re-transform (e.g., remelt) at least a portion of the previously transformed material. An SEM image of the 3D object after the HARMP operation is shown in FIG. 54B using the Nova™λNanoSEM 630. Three-dimensional scan images (and surface roughness measurements) of the object after the HARMP operation shown in FIGS. 58A and 58B were obtained using the Keyence VR-3200. Optical images of the object after the HARMP operation shown in FIGS. 58C and 58D were obtained using the Nikon Epiphot 300 microscope. Similar conditions and methodologies are used to form 3D objects depicted in FIGS. 57A-57D and 59A-59B. The 3D scan images of the object shown in FIGS. 57A and 57B, as well as surface roughness measurements, were obtained using the Keyence VR-3200. Optical images of the object shown in FIGS. 57C and 57D were taken using the Nikon Epiphot 300 microscope. The X-ray image of the 3D object shown in FIG. 59A after a first transformation of an MTO operation is obtained using a XT V160 instrument manufactured by Nikon to determine porosity. An X-ray image of the 3D object shown in FIG. 59B after the second transformation of the MTO operation is using the Nikon XT V160 to determine porosity.

Example 4

In a 300 mm diameter and 400 mm high container at ambient temperature, Inconel 718 powder of average particle size 35 µm is deposited in a container to form a powder bed. The container is disposed in an enclosure to separate the powder bed from the ambient environment. The enclosure is purged with Argon gas. A 1000 W fiber laser beam was used to melt a portion of the powder bed and form an overhang portion of a 3D object at an angle with respect to the platform base. The overhang was formed by transforming layers of powder material having an average thickness of about 50 µm. The transformation included the following: a first layer of powder is transformed using a hatching methodology (type-1 energy beam) to a first transformed material: a second layer of powder is deposited on the first transformed material; the second layer of powder is transformed using a tiling methodology (type-2 energy beam) to a second transformed material. At least some of the first transformed material may be re-transformed (e.g., remelted) using the tiling methodology. An SEM image of the overhang portion is shown in FIG. 55A using the Nova™ NanoSEM 630.

Example 5

In a 28 cm by 28 cm by 30 300 mm diameter and 400 mm high cm container at ambient temperature, Inconel 718 powder of average particle size 35 µm is deposited in a container to form a powder bed. The container is disposed in an enclosure to separate the powder bed from the ambient environment. The enclosure is purged with Argon gas. A 1000 W fiber laser beam was used to melt a portion of the powder bed and form a ceiling type overhang of a 3D object at an angle with respect to the platform base. The ceiling type overhang was formed by transforming layers of powder material having an average thickness of about 50 µm. The transformation included using at least one hatching methodology (type-1 energy beam) and at least one a tiling methodology (type-2 energy beam. At least some of the transformed material may re-transformed (e.g., remelted) using the tiling anchor hatching methodologies. An SEM image of the ceiling overhang is shown in FIG. 55B using the Nova™ NanoSEM 630.

Example 6

In a 300 mm diameter and 400 mm high container at ambient temperature, Inconel 718 powder of average particle size 35 µm is deposited in a container to form a powder bed. The container is disposed in an enclosure to separate the powder bed from the ambient environment. The enclosure is purged with Argon gas. A 1000 W fiber laser beam was used to melt a portion of the powder bed and form an overhang of a 3D object at an angle with respect to the platform base. The overhang was formed by transforming layers of powder material having an average thickness of about 50 µm. The transformation included forming a plurality of layers of porous matrix using a hatching methodology (type-1 energy beam), which are transformed (e.g., melted anchor remelted) using a tiling methodology (type-2 energy beam). An SEM image of the overhang is shown in FIG. 56A using the Nova™ NanoSEM 630.

Example 7

In a 300 mm diameter and 400 mm high container at ambient temperature, titanium alloy (Ti-6Al-4V) powder of average particle of about size 33 µm is deposited in a container to form a powder bed. The container is disposed in an enclosure to separate the powder bed from the ambient environment. The enclosure is purged with Argon gas. A 1000 W fiber laser beam was used to melt a portion of the powder bed and form a skin (contour) of a 3D object. The contour was formed by transforming layers of powder material having an average thickness of about 50 µm using a tiling methodology (type-2 energy beam), as described herein. The internal portions (core) of the 3D object layers were formed using a methodology of forming the rigid-portion (e.g., using hatches) as described herein. Images of 3D objects in which a skin (contour) and internal portion (core) are shown in FIGS. 60A and 60B taken using the Nikon Epiphot 300 microscope.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:
1. A three-dimensional object, comprising:
   a plurality of layers of solid material that are stacked and bonded together to form a shape of the three-dimensional object, which plurality of layers of solid material comprises:
      a core characterized as having a first microstructure comprising a first plurality of grains associated with being formed at a first solidification rate; and
      a skin portion coupled with the core, which skin portion comprises:
         (i) a second microstructure comprising a second plurality of grains associated with being formed at a second solidification rate that is different than the first solidification rate, and
         (ii) an exterior surface corresponding to at least a fraction of an exterior surface of the three-dimensional object
      wherein the second plurality of grains are aligned and the first plurality of grains are misaligned.
2. The three-dimensional object of claim 1, wherein a layer of the skin portion comprises a melt pool across a width of the skin portion.
3. The three-dimensional object of claim 1, wherein the skin portion comprises a melt pool, wherein an alignment line (1) runs through a central portion of the melt pool, (2) is parallel to the exterior surface, and/or (3) is at the exterior surface.
4. The three-dimensional object of claim 3, wherein with respect to the alignment line: the second plurality of grains are aligned, and the first plurality of grains are misaligned.

5. The three-dimensional object of claim 3, wherein grains of the second plurality of grains align at a non-zero angle relative to the alignment line.

6. The three-dimensional object of claim 5, wherein the first plurality of grains is different from the second plurality of grains by at least one aspect selected from the group consisting of: (a) a fundamental length scale, (b) chemical makeup, (c) crystal structure, (d) metallurgical microstructure, (e) coherence length, (d) grain size, and (e) spatial placement relative to the alignment line.

7. The three-dimensional object of claim 5, wherein relative to the first plurality of grains, the second plurality of grains have (a) a larger fundamental length scale, (b) larger coherence length, (c) larger grain size, and/or (d) more organized spatial placement relative to the alignment line.

8. The three-dimensional object of claim 7, wherein an average fundamental length scale of the second plurality of grains is about 1.5 times greater than an average fundamental length scale of grains of the first plurality of grains.

9. The three-dimensional object of claim 5, wherein the first microstructure is characterized by a first grain, wherein the second microstructure is characterized by a second grain that has at least one aspect that is different than the first grain, which at least one aspect is selected from the group consisting of: (a) a fundamental length scale, (b) chemical makeup, (c) crystal structure, (d) metallurgical microstructure, and (e) spatial placement relative to the alignment line.

10. The three-dimensional object of claim 9, wherein the fundamental length scale is selected from the group consisting of: a length and a width.

11. The three-dimensional object of claim 1, wherein the skin portion is bonded with the core.

12. The three-dimensional object of claim 1, wherein the skin portion has a thickness ranging from about 20 micrometers to about 1000 micrometers.

13. The three-dimensional object of claim 1, wherein the second solidification rate is slower than the first solidification rate.

14. The three-dimensional object of claim 1, wherein the first solidification rate is associated with a first cooling rate, wherein the second solidification rate is associated with a second cooling rate different than the first cooling rate.

15. The three-dimensional object of claim 1, wherein the core comprises a first set of melt pools, wherein the skin portion comprises a second set of melt pools, wherein an orientation of the second plurality of grains is with respect to: (I) a rim of a melt pool of the second set of melt pools and/or (II) the exterior surface of the skin portion.

16. The three-dimensional object of claim 1, wherein the exterior surface of the skin portion has an area surface roughness (Sa) of at most about 50 micrometers.

17. A three-dimensional object, comprising:
a plurality of layers of solid material that are stacked and bonded together to form a shape of the three-dimensional object, which plurality of layers of solid material comprises:
a core characterized as having a first microstructure comprising a first plurality of grains associated with being formed at a first solidification rate; and
a skin portion coupled with the core, which skin portion comprises:
(i) a second microstructure comprising a second plurality of grains associated with being formed at a second solidification rate that is different than the first solidification rate, and
(ii) an exterior surface corresponding to at least a fraction of an exterior surface of the three-dimensional object,
wherein the core comprises a first set of melt pools, wherein the skin portion comprises a second set of melt pools, wherein an orientation of the second plurality of grains is with respect to (I) a rim of a melt pool of the second set of melt pools and/or (II) the exterior surface of the skin portion, and wherein melt pools of the second set of melt pools are aligned with the exterior surface of the skin portion.

18. The three-dimensional object of claim 17, wherein a layer of the skin portion comprises a melt pool across a width of the skin portion.

19. The three-dimensional object of claim 17, wherein an alignment line (1) runs through a central portion of a grain of the second plurality of grains, (2) is parallel to the exterior surface, and/or (3) is at the exterior surface.

20. The three-dimensional object of claim 17, wherein relative to the first plurality of grains, the second plurality of grains have (a) a larger fundamental length scale, (b) larger coherence length, (c) larger grain size, and/or (d) more organized spatial placement relative to an alignment line that (1) runs through a central portion of a melt pool of the skin portion, (2) is parallel to the exterior surface, and/or (3) is at the exterior surface.

21. The three-dimensional object of claim 17, wherein the second solidification rate is slower than the first solidification rate.

22. The three-dimensional object of claim 17, wherein the exterior surface of the skin portion has an area surface roughness (Sa) of at most about 50 micrometers.

23. The three-dimensional object of claim 17, wherein the second plurality of grains are aligned and the first plurality of grains are misaligned.

24. A three-dimensional object comprising:
a plurality of layers of solid material that are stacked and bonded together to form a shape of the three-dimensional object, which plurality of layers of solid material comprises:
a core characterized as having a first microstructure comprising a first plurality of grains associated with being formed at a first solidification rate; and
a skin portion coupled with the core, which skin portion comprises:
(i) a second microstructure comprising a second plurality of grains associated with being formed at a second solidification rate that is different than the first solidification rate, and
(ii) an exterior surface corresponding to at least a fraction of an exterior surface of the three-dimensional object,
wherein the skin portion is characterized by a plurality of tiles, wherein centers of successive tiles are substantially uniformly spaced apart from one another.

25. The three-dimensional object of claim 24, wherein at least two successive tiles overlap with each other.

26. The three-dimensional object of claim 24, wherein the second plurality of grains are aligned and the first plurality of grains are misaligned.

27. The three-dimensional object of claim 24, wherein a layer of the skin portion comprises a melt pool across a width of the skin portion.

28. The three-dimensional object of claim 24, wherein relative to the first plurality of grains, the second plurality of grains have (a) a larger fundamental length scale, (b) larger coherence length, (c) larger grain size, and/or (d) more organized spatial placement relative to an alignment line that (1) runs through a central portion of a melt pool of the skin portion, (2) is parallel to the exterior surface, and/or (3) is at the exterior surface.

29. The three-dimensional object of claim 24, wherein the second solidification rate is slower than the first solidification rate.

30. The three-dimensional object of claim 24, wherein the core comprises a first set of melt pools, wherein the skin portion comprises a second set of melt pools, wherein an orientation of the second plurality of grains is with respect to (I) a rim of a melt pool of the second set of melt pools and/or (II) the exterior surface of the skin portion.

31. The three-dimensional object of claim 24, wherein the exterior surface of the skin portion has an area surface roughness (Sa) of at most about 50 micrometers.

* * * * *